United States Patent
Lin et al.

(10) Patent No.: US 12,440,506 B2
(45) Date of Patent: *Oct. 14, 2025

(54) SELECTIVE INHIBITORS OF PROTEIN ARGININE METHYLTRANSFERASE 5 (PRMT5)

(71) Applicant: Prelude Therapeutics, Incorporated, Wilmington, DE (US)

(72) Inventors: Hong Lin, Exton, PA (US); Juan Luengo, Phoenixville, PA (US); Rupa Shetty, Blue Bell, PA (US); Michael Hawkins, Ambler, PA (US); Philip Pitis, North Wales, PA (US); Gisela Saborit Villarroya, Barcelona (ES)

(73) Assignee: Prelude Therapeutics, Incorporated, Wilmington, DE (US)

( * ) Notice: Subject to any disclaimer, the term of this patent is extended or adjusted under 35 U.S.C. 154(b) by 898 days.

This patent is subject to a terminal disclaimer.

(21) Appl. No.: 17/601,485

(22) PCT Filed: Apr. 3, 2020

(86) PCT No.: PCT/US2020/026639
§ 371 (c)(1),
(2) Date: Oct. 5, 2021

(87) PCT Pub. No.: WO2020/206299
PCT Pub. Date: Oct. 8, 2020

(65) Prior Publication Data
US 2022/0152073 A1 May 19, 2022

Related U.S. Application Data

(60) Provisional application No. 62/829,923, filed on Apr. 5, 2019.

(51) Int. Cl.
*A61K 31/7064* (2006.01)

(52) U.S. Cl.
CPC .................. *A61K 31/7064* (2013.01)

(58) Field of Classification Search
CPC .. A61K 31/59; A61K 31/7064; C07D 487/04; C07D 519/00; A61P 3/10; A61P 11/00; A61P 13/12; A61P 21/04; A61P 31/12; A61P 31/16; A61P 37/00; A61P 37/08
USPC ........................................ 514/49
See application file for complete search history.

(56) References Cited

U.S. PATENT DOCUMENTS

| | | | |
|---|---|---|---|
| 3,657,744 A | 4/1972 | Ersek et al. | |
| 4,739,762 A | 4/1988 | Palmaz | |
| 4,992,445 A | 2/1991 | Lawter et al. | |
| 5,001,139 A | 3/1991 | Lawter et al. | |
| 5,023,252 A | 6/1991 | Hseih | |
| 5,040,548 A | 8/1991 | Yock | |
| 5,061,273 A | 10/1991 | Yock | |
| 5,195,984 A | 3/1993 | Schatz | |
| 5,292,331 A | 3/1994 | Boneau | |
| 5,451,233 A | 9/1995 | Yock | |
| 5,496,346 A | 3/1996 | Horzewski et al. | |
| 5,674,278 A | 10/1997 | Boneau | |
| 5,879,382 A | 3/1999 | Boneau | |
| 6,344,053 B1 | 2/2002 | Boneau | |
| 10,711,007 B2 * | 7/2020 | Luengo | C07D 519/00 |
| 11,214,574 B2 * | 1/2022 | Luengo | C07H 19/14 |
| 11,254,683 B2 * | 2/2022 | Luengo | A61P 35/00 |
| 2016/0244475 A1 | 8/2016 | Tatlock et al. | |
| 2019/0048014 A1 * | 2/2019 | Lin | A61P 35/02 |

FOREIGN PATENT DOCUMENTS

| | | |
|---|---|---|
| WO | 2006097547 A1 | 9/2006 |
| WO | 2015200680 A2 | 12/2015 |
| WO | 2016135582 A1 | 9/2016 |
| WO | 2016178870 A1 | 11/2016 |
| WO | 2017032840 A1 | 3/2017 |
| WO | 2017153186 A1 | 9/2017 |
| WO | 2017218802 A1 | 12/2017 |
| WO | 2018065365 A1 | 4/2018 |

(Continued)

OTHER PUBLICATIONS

Davidson et al, Autoimmune Diseases, New England Journal of Medicine, 2001, vol. 345, No. 5, p. 340-350.*
The Merck Manual, 16th Ed., 1992, pp. 339-342 and 1488-1490.*
U.S. Appl. No. 17/674,010 filed Feb. 17, 2022.
U.S. Appl. No. 16/985,611 filed Aug. 5, 2020.
U.S. Appl. No. 16/888,883 filed Jun. 1, 2020.
U.S. Appl. No. 16/376,100 filed Apr. 5, 2019.
Beattie et al., "Synthesis and evaluation of two series of 42-aza-carbocyclic nucleosides as adenosine A"2" A receptor agonists", Bioorganic Medicinal Chemistry letters, 2010, 20, 1219-1224.

(Continued)

*Primary Examiner* — Ganapathy Krishnan
(74) *Attorney, Agent, or Firm* — Polsinelli PC

(57) ABSTRACT

The disclosure is directed to methods of treatment using compounds of Formula (I).

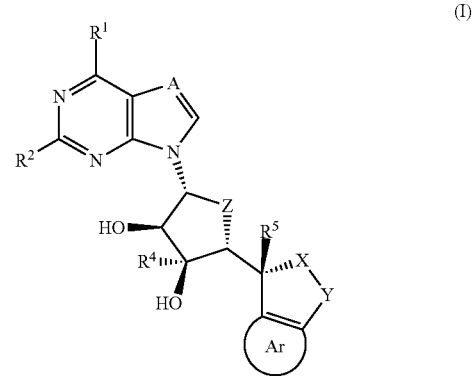

(I)

50 Claims, No Drawings

(56) References Cited

FOREIGN PATENT DOCUMENTS

| | | |
|---|---|---|
| WO | 2018075601 A1 | 4/2018 |
| WO | 2018081451 A1 | 5/2018 |
| WO | 2018085818 A1 | 5/2018 |
| WO | 2018085833 A2 | 5/2018 |
| WO | 2018152501 A1 | 8/2018 |
| WO | 2018152548 A1 | 8/2018 |
| WO | 2018160824 A1 | 9/2018 |
| WO | 2018160855 A1 | 9/2018 |
| WO | 2019032859 A1 | 2/2019 |
| WO | 2019084470 A1 | 5/2019 |
| WO | 2019178368 A1 | 9/2019 |

OTHER PUBLICATIONS

Chung et al., "Protein Arginine Methyltransferase 5 (PRMT5) Inhibition Induces Lymphoma Cell Death through Reactivation of the Retinoblastoma Tumor Suppressor Pathway and Polycomb Repressor Complex 2 (PRC2) Silencing", Journal of Biological Chemistry, Dec. 2013, vol. 288, No. 49, 35534-35547.

Hsu et al., "The spliceosome is a therapeutic vulnerability in MYC-driven cancer", Nature, Sep. 2015, 525(7569), 384-388.

Hulpia et al., "Synthesis of a 3-C-ethynyl—[beta]—d-ribofuranose purine nucleoside library: Discovery of C7-deazapurine analogs as potent antiproliferative nucleosides", European Journal of Medicinal Chemistry, Jul. 29, 2018, vol. 157, 248-267.

Koh et al., "Myc regulates the core pre-mRNA splicing machinery as an essential step in lymphomagenesis", Nature, May 2015, 523(7558), 96-100.

Pal et al., "Human SWI/SNF-Associated PRMT5 Methylates Histone H3 Arginine 8 and Negatively Regulates Expression of ST7 and NM23 Tumor Suppressor Genes", Molecular and Cellular Biology, 2004, vol. 24, No. 21, 9630-9645.

Pal et al., "mSin3A/Histone Deacetylase 2-and PRMT5-Containing Brg1 Complex is Involved in Transcriptional Repression of the Myc Target Gene cad", Molecular and Cellular Biology, Nov. 2003, 7475-7487.

Wang et al., "Protein Arginine Methyltransferase 5 Suppresses the Transcription of the RB Family of Tumor Suppressors in Leukemia and Lymphoma Cells", Molecular and Cellular Biology, Oct. 2008, 6262-6277.

Zhao et al., "PRMT5-mediated methylation of histone H4R3 recruits DNMT3A, coupling histone and DNA methylation In gene silencing", Nature Structural Molecular Biology, Mar. 2009, 16(3), 304-311.

International Search Report and Written Opinion issued in PCT/US2019/022288, dated May 2, 2019.

International Preliminary Report on Patentability and Written Opinion issued in PCT/US2019/022288, dated Sep. 24, 2020.

Aouadi Wahiba et al. <<Toward the identification of viral cap-methyltransferase inhibitors by fluorescence screening assay>>. Antiviral Research, Aug. 2017, 144, pp. 330-339, doi: 10.1016/j.antiviral.2017.06.021, section <<Introduction>>, table 2.

Hong Lin et al: "Nucleoside protein arginine methyltransferase 5 (PRMT5) inhibitors", Bioorganic & Medicinal Chemistry Letters, vol. 29, No. 11, Mar. 27, 2019 (Mar. 27, 2019), pp. 1264-1269, XP055663652, Amsterdam NL, ISSN: 0960-894X, DOI: 10.1016/j.bmcl.2019.03.042.

Extended European Search Report for European Application No. 20785172.6, dated Nov. 28, 2022, 12 pages.

International Preliminary Report on Patentability for Application No. PCT/US2020/026639, mailed on Oct. 14, 2021, 6 pages.

International Search Report and Written Opinion issued in PCT/US2020/026639, dated Jul. 16, 2020, 8 pages.

Webb L.M., et al., "PRMT5-Selective Inhibitors Suppress Inflammatory T Cell Response and Experimental Autoimmune Encephalomyelitis," The Journal of Immunology, Jan. 13, 2017, vol. 198, No. 04, XP055782699, USISSN: 0022-1767, DOPI: 10.4049/jimmunol.1601702, pp. 1439-1451, Retrieved from the Internet: URL: https://www.ncbi.nlm.nih.gov/pmc/articles/PMC5292587/pdf/1601702.pdf.

* cited by examiner

SELECTIVE INHIBITORS OF PROTEIN ARGININE METHYLTRANSFERASE 5 (PRMT5)

CROSS-REFERENCE TO RELATED APPLICATIONS

This application is the United States National Stage Application of International Patent Application No. PCT/US2020/026639, filed Apr. 3, 2020, which claims priority to U.S. Provisional Patent Application No. 62/829,923, filed Apr. 5, 2019, the entirety of which is incorporated by reference herein.

TECHNICAL FIELD

The disclosure is directed to PRMT5 inhibitors and methods of their use.

BACKGROUND

Protein arginine methylation is a common post-translational modification that regulates numerous cellular processes, including gene transcription, mRNA splicing, DNA repair, protein cellular localization, cell fate determination, and signaling. Three types of methyl-arginine species exist: ω NG monomethylarginine (MMA), ω NG, NG asymmetric dimethylarginine (ADMA) and ω NG, N'G symmetric dimethylarginine (SDMA). The formation of methylated arginines is catalyzed by the protein arginine methyl transferases (PRMTs) family of methyltransferases. Currently, there are nine PRMTs annotated in the human genome. The majority of these enzymes are Type I enzymes (PRMT1, -2, -3, -4, -6, -8) that are capable of mono- and asymmetric dimethylation of arginine, with S-adenosylmethionine (SAM) as the methyl donor. PRMT-5, -7 and -9 are considered to be Type II enzymes that catalyze symmetric dimethylation of arginines. Each PRMT species harbors the characteristic motifs of seven beta strand methyltransferases (Katz et al., 2003), as well as additional "double E" and "THW" sequence motifs particular to the PRMT subfamily.

PRMT5 is as a general transcriptional repressor that functions with numerous transcription factors and repressor complexes, including BRG1 and hBRM, Blimp1, and Snail. This enzyme, once recruited to a promoter, symmetrically dimethylates H3R8 and H4R3. Importantly, the H4R3 site is a major target for PRMT1 methylation (ADMA) and is generally regarded as a transcriptional activating mark. Thus, both H4R3me2s (repressive; me2s indicates SDMA modification) and H4R3me2a (active; me2a indicates ADMA modification) marks are produced in vivo. The specificity of PRMT5 for H3R8 and H4R3 can be altered by its interaction with COPR5 and this could perhaps play an important role in determining PRMT5 corepressor status.

PRMTs have been implicated in a number of diseases and disorders. Compounds that inhibit PRMTs, including PRMT5, are needed.

SUMMARY

The disclosure is directed to methods of treating a disease or disorder, including that is rejection of transplanted organs or tissue; graft-versus-host diseases brought about by transplantation; multiple sclerosis, myasthenia gravis; pollen allergies; type I diabetes; prevention of psoriasis; Crohn's disease; ulcerative colitis, acute respiratory distress syndrome; adult respiratory distress syndrome; influenza; COVID-19 (coronavirus disease); or post-infectious autoimmune diseases including rheumatic fever and post-infectious glomerulonephritis, in a patient by administering to the patient an effective amount of a compound of Formula I:

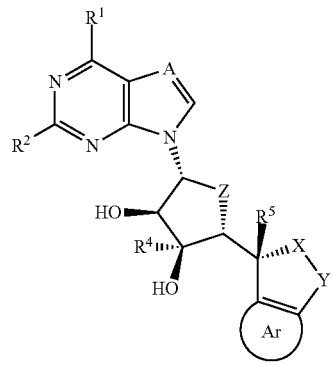

I or a pharmaceutically acceptable salt or solvate thereof; wherein
A is N or C—$R^3$;
$R^1$ is H, halo, —$C_1$-$C_6$alkyl, —$C_1$-$C_6$alkoxy, —$C_1$-$C_4$haloalkyl, —$C_3$-$C_6$cycloalkyl, —$C_3$-$C_6$halocycloalkyl, —$C_1$-$C_6$alk-O—$C_1$-$C_6$alkyl, —$C_1$-$C_6$alk-S(O)—$C_1$-$C_6$alkyl, —$C_1$-$C_6$alk-S(O)$_2$—$C_1$-$C_6$alkyl, —$CR^6R^{6'}$CN, —$NR^6R^{6'}$, —NHC$R^6R^{6'}$CN, —NHCON$R^6R^{6'}$, —NHC(O)O$R^7$, NHC(O)—$C_1$-$C_6$alkyl, NHC(O)—$C_1$-$C_6$haloalkyl, —NH—$C_1$-$C_6$alk-C(O)—$C_1$-$C_6$alkyl, —NHC(S)N$R^6R^{6'}$, —NH—O—$R^6$, or —NH—N$R^6R^{6'}$;
$R^2$ is H, halo, —$C_1$-$C_6$alkyl, or $NH_2$;
$R^3$ is H, halo, —$C_1$-$C_6$alkyl, —$C_1$-$C_6$alkoxy, —$C_2$-$C_6$alkenyl, or —$C_2$-$C_6$alkynyl;
$R^4$ is H, —$C_1$-$C_6$alkyl, —$C_1$-$C_6$haloalkyl, —$C_2$-$C_6$alkenyl, or —$C_2$-$C_6$alkynyl;
$R^5$ is H or —$C_1$-$C_6$alkyl;
$R^6$ and $R^{6'}$ are each independently H, $C_1$-$C_6$alkyl, or —$C_1$-$C_6$alk-O$C_1$-$C_6$alkyl;
or $R^6$ and $R^{6'}$, together with the atom to which they are attached, form a $C_2$-$C_6$heterocycloalkyl ring or a $C_3$-$C_6$cycloalkyl ring;
$R^7$ is —$C_1$-$C_6$alkyl or —$C_0$-$C_6$alk-$C_3$-$C_6$cycloalkyl;
X is O, S, NH, or N($C_1$-$C_6$alkyl), and Y is —$(CR^9R^{9'})_n$—, —$CR^9$=$CR^{9'}$—, C(=O), —C(=O)—$(CR^9R^{9'})_n$—, —C(=O)—O—$(CR^9R^{9'})_n$—, —$CR^9R^{9'}$—O—, —$(CR^9R^{9'})_n$—O—$(CR^9R^{9'})_m$—, —$(CR^9R^{9'})_n$—$NR^{10}$, C(=O)$NR^{10}$, or CH—$C_1$-$C_4$alk-$NH_2$; or
X is —$SO_2$— and Y is —$(CR^9R^{9'})_n$—, —$CR^9$=$CR^{9'}$—, —$CR^9R^{9'}$O—, —$(CR^9R^{9'})_n$—O—$(CR^9R^{9'})_m$—, —$(CR^9R^{9'})_n$—$NR^{10}$, or CH—$C_1$-$C_4$alk-$NH_2$;
wherein n=1, 2, or 3; m=1 or 2;
each instance of $R^9$ or $R^{9'}$ is independently H, D, $C_1$-$C_6$alkyl, $C_1$-$C_6$haloalkyl, halo, —$C_1$-$C_6$alkoxy, or hydroxy;
$R^{10}$ is H or $C_1$-$C_6$alkyl;
Z is O, $CH_2$, or $CF_2$; and
Ar is an optionally substituted 6-membered aryl ring, an optionally substituted 6-membered heteroaryl ring, or an optionally substituted 5-membered heteroaryl ring.

Stereoisomers of the compounds of Formula I, and the pharmaceutical salts and solvates thereof, are also contemplated, described, and encompassed herein. Methods of using compounds of Formula I are described, as well as pharmaceutical compositions including the compounds of Formula I.

DETAILED DESCRIPTION OF ILLUSTRATIVE EMBODIMENTS

The disclosure may be more fully appreciated by reference to the following description, including the following definitions and examples. Certain features of the disclosed compositions and methods which are described herein in the context of separate aspects, may also be provided in combination in a single aspect. Alternatively, various features of the disclosed compositions and methods that are, for brevity, described in the context of a single aspect, may also be provided separately or in any subcombination.

The term "alkyl," when used alone or as part of a substituent group, refers to a straight- or branched-chain hydrocarbon group having from 1 to 12 carbon atoms ("$C_1$-$C_{12}$"), preferably 1 to 6 carbons atoms ("$C_1$-$C_6$"), in the group. Examples of alkyl groups include methyl (Me, $C_1$alkyl), ethyl (Et, $C_2$alkyl), n-propyl ($C_3$alkyl), isopropyl ($C_3$alkyl), butyl ($C_4$alkyl), isobutyl ($C_4$alkyl), sec-butyl ($C_4$alkyl), tert-butyl ($C_4$alkyl), pentyl ($C_5$alkyl), isopentyl ($C_5$alkyl), tert-pentyl ($C_5$alkyl), hexyl ($C_6$alkyl), isohexyl ($C_6$alkyl), and the like.

The term "alkoxy," when used alone or as part of a substituent group, refers to an oxygen radical to which is attached an alkyl group (i.e., —O-alkyl) Examples of alkoxy groups include methoxy (—OMe, $C_1$alkoxy), ethoxy (—OEt, $C_2$alkoxy), n-propoxy ($C_3$alkoxy), isopropoxy ($C_3$alkoxy), and the like.

The term "halo" when used alone or as part of a substituent group refers to chloro, fluoro, bromo, or iodo.

The term "haloalkyl" when used alone or as part of a substituent group refers to refers to an alkyl group wherein one or more of the hydrogen atoms has been replaced with one or more halogen atoms. Halogen atoms include chlorine, fluorine, bromine, and iodine. Examples of haloalkyl groups of the disclosure include, for example, trifluoromethyl (—$CF_3$), chloromethyl (—$CH_2Cl$), and the like.

The term "haloalkoxy," when used alone or as part of a substituent group, refers to an oxygen radical to which is attached a haloalkyl group (i.e., —O-haloalkyl). Examples of haloalkoxy groups include trifluoromethoxy (—$OCF_3$, $C_1$haloalkoxy), difluoromethoxy (—$OCHF_2$, $C_1$haloalkoxy), fluoromethoxy (—$OCH_2F$, $C_1$haloalkoxy), trifluoroethoxy (—$OCH_2CF_3$, $C_2$ haloalkoxy), and the like.

The term "cycloalkyl" when used alone or as part of a substituent group refers to cyclic-containing, non-aromatic hydrocarbon groups having from 3 to 10 carbon atoms ("$C_3$-$C_{10}$"), preferably from 3 to 6 carbon atoms ("$C_3$-$C_6$"). Examples of cycloalkyl groups include, for example, cyclopropyl ($C_3$), cyclobutyl ($C_4$), cyclopropylmethyl ($C_4$), cyclopentyl ($C_5$), cyclohexyl ($C_6$), 1-methylcyclopropyl ($C_4$), 2-methylcyclopentyl ($C_4$), adamantanyl ($C_{10}$), and the like.

The term "halocycloalkyl" when used alone or as part of a substituent group refers to cyclic-containing, non-aromatic hydrocarbon groups having from 3 to 10 carbon atoms ("$C_3$-$C_{10}$"), preferably from 3 to 6 carbon atoms ("$C_3$-$C_6$"), wherein one or more of the hydrogen atoms has been replaced with one or more halogen atoms. Halogen atoms include chlorine, fluorine, bromine, and iodine. Examples of halocycloalkyl groups include, for example, halocyclopropyl ($C_3$), halocyclobutyl ($C_4$), halocyclopropylmethyl ($C_4$), halocyclopentyl ($C_5$), halocyclohexyl ($C_6$), and the like.

The term "heterocycloalkyl" when used alone or as part of a substituent group refers to any three to ten membered monocyclic or bicyclic, saturated ring structure containing at least one heteroatom selected from the group consisting of O, N and S. The heterocycloalkyl group may be attached at any heteroatom or carbon atom of the ring such that the result is a stable structure. Examples of suitable heterocycloalkyl groups include, but are not limited to, azepanyl, aziridinyl, azetidinyl, pyrrolidinyl, dioxolanyl, imidazolidinyl, pyrazolidinyl, piperazinyl, piperidinyl, dioxanyl, morpholinyl, dithianyl, thiomorpholinyl, oxazepanyl, oxiranyl, oxetanyl, quinuclidinyl, tetrahydrofuranyl, tetrahydropyranyl, piperazinyl, and the like.

The term "alkenyl" when used alone or as part of a substituent group refers to a straight- or branched-chain group having from 2 to 12 carbon atoms ("$C_2$-$C_{12}$"), preferably 2 to 4 carbons atoms ("$C_2$-$C_4$"), in the group, wherein the group includes at least one carbon-carbon double bond. Examples of alkenyl groups include vinyl (—CH=$CH_2$; $C_2$alkenyl) allyl (—$CH_2$—CH=$CH_2$; $C_3$alkenyl), propenyl (—CH=$CHCH_3$; $C_3$alkenyl); isopropenyl (—C($CH_3$)=$CH_2$; $C_3$alkenyl), butenyl (—CH=$CHCH_2CH_3$; $C_4$alkenyl), sec-butenyl (—C($CH_3$)=$CHCH_3$; $C_4$alkenyl), iso-butenyl (—CH=C($CH_3$)$_2$; $C_4$alkenyl), 2-butenyl (—$CH_2$CH=$CHCH_3$; $C_4$alkyl), pentenyl (CH=$CHCH_2CH_2CH_3$; $C_5$alkenyl), and the like.

The term "alkynyl" when used alone or as part of a substituent group refers to a straight- or branched-chain group having from 1 to 12 carbon atoms ("$C_1$-$C_{12}$"), preferably 1 to 4 carbons atoms ("$C_2$-$C_4$"), in the group, and wherein the group includes at least one carbon-carbon triple bond. Examples of alkynyl groups include ethynyl (—C≡CH; $C_2$alkynyl); propargyl (—$CH_2$—C≡CH; $C_3$alkynyl), propynyl (—C≡$CCH_3$; $C_3$alkynyl); butynyl (—C≡$CCH_2CH_3$; $C_4$alkynyl), pentynyl (C≡$CCH_2CH_2CH_3$; $C_5$alkynyl), and the like.

The term "aryl" when used alone or as part of a substituent group refers to a mono- or bicyclic-aromatic hydrocarbon ring structure having 6 or 10 carbon atoms in the ring, wherein one or more of the carbon atoms in the ring is optionally substituted. Exemplary substituents include halogen atoms, —$C_1$-$C_3$ alkyl groups, and $C_1$-$C_3$haloalkyl groups. Halogen atoms include chlorine, fluorine, bromine, and iodine. $C_1$-$C_3$haloalkyl groups include, for example, —$CF_3$, —$CH_2CF_3$, and the like.

The term "heteroaryl" when used alone or as part of a substituent group refers to a mono- or bicyclic-aromatic ring structure including carbon atoms as well as up to four heteroatoms selected from nitrogen, oxygen, and sulfur. Heteroaryl rings can include a total of 5, 6, 9, or 10 ring atoms. The heteroaryl moiety can be optionally substituted. Exemplary substituents include halogen atoms; —$C_1$-$C_3$ alkyl groups, and $C_1$-$C_3$haloalkyl groups. Halogen atoms include chlorine, fluorine, bromine, and iodine.

When a range of carbon atoms is used herein, for example, $C_1$-$C_6$, all ranges, as well as individual numbers of carbon atoms are encompassed. For example, "$C_1$-$C_3$" includes $C_1$-$C_3$, $C_1$-$C_2$, $C_2$-$C_3$, $C_1$, $C_2$, and $C_3$.

The term "$C_1$-$C_6$alk" when used alone or as part of a substituent group refers to an aliphatic linker having 1, 2, 3, 4, 5, or 6 carbon atoms and includes, for example, —$CH_2$—, —CH($CH_3$)—, —CH($CH_3$)—$CH_2$—, and —C($CH_3$)$_2$—. The term "—$C_0$alk-" refers to a bond. In some aspects, the $C_1$-$C_6$alk can be substituted with one or more —OH, —$NH_2$, or halo (e.g., —F, —Cl, —Br, with —F being preferred) substituents.

"Pharmaceutically acceptable" means approved or approvable by a regulatory agency of the Federal or a state government or the corresponding agency in countries other than the United States, or that is listed in the U.S. Pharmacopoeia or other generally recognized pharmacopoeia for use in animals, e.g., in humans.

"Pharmaceutically acceptable salt" refers to a salt of a compound of the disclosure that is pharmaceutically acceptable and that possesses the desired pharmacological activity of the parent compound. In particular, such salts are non-toxic may be inorganic or organic acid addition salts and base addition salts. Specifically, such salts include: (1) acid addition salts, formed with inorganic acids such as hydrochloric acid, hydrobromic acid, sulfuric acid, nitric acid, phosphoric acid, and the like; or formed with organic acids such as acetic acid, propionic acid, hexanoic acid, cyclopentanepropionic acid, glycolic acid, pyruvic acid, lactic acid, malonic acid, succinic acid, malic acid, maleic acid, fumaric acid, tartaric acid, citric acid, benzoic acid, 3-(4-hydroxybenzoyl)benzoic acid, cinnamic acid, mandelic acid, methanesulfonic acid, ethanesulfonic acid, 1,2-ethanedisulfonic acid, 2-hydroxyethanesulfonic acid, benzenesulfonic acid, 4-chlorobenzenesulfonic acid, 2-naphthalenesulfonic acid, 4-toluenesulfonic acid, camphorsulfonic acid, 4-methylbicyclo[2.2.2]-oct-2-ene-1-carboxylic acid, glucoheptonic acid, 3-phenylpropionic acid, trimethylacetic acid, tertiary butylacetic acid, lauryl sulfuric acid, gluconic acid, glutamic acid, hydroxynaphthoic acid, salicylic acid, stearic acid, muconic acid, and the like; or (2) salts formed when an acidic proton present in the parent compound either is replaced by a metal ion, e.g., an alkali metal ion, an alkaline earth ion, or an aluminum ion; or coordinates with an organic base such as ethanolamine, diethanolamine, triethanolamine, N-methylglucamine and the like. Salts further include, by way of example only, sodium, potassium, calcium, magnesium, ammonium, tetraalkylammonium, and the like; and when the compound contains a basic functionality, salts of non-toxic organic or inorganic acids, such as hydrochloride, hydrobromide, tartrate, mesylate, acetate, maleate, oxalate and the like.

A "pharmaceutically acceptable excipient" refers to a substance that is non-toxic, biologically tolerable, and otherwise biologically suitable for administration to a subject, such as an inert substance, added to a pharmacological composition or otherwise used as a vehicle, carrier, or diluent to facilitate administration of an agent and that is compatible therewith. Examples of excipients include calcium carbonate, calcium phosphate, various sugars and types of starch, cellulose derivatives, gelatin, vegetable oils, and polyethylene glycols.

A "solvate" refers to a physical association of a compound of Formula I with one or more solvent molecules.

"Subject" includes humans. The terms "human," "patient," and "subject" are used interchangeably herein.

"Treating" or "treatment" of any disease or disorder refers, in one embodiment, to ameliorating the disease or disorder (i.e., arresting or reducing the development of the disease or at least one of the clinical symptoms thereof). In another embodiment "treating" or "treatment" refers to ameliorating at least one physical parameter, which may not be discernible by the subject. In yet another embodiment, "treating" or "treatment" refers to modulating the disease or disorder, either physically, (e.g., stabilization of a discernible symptom), physiologically, (e.g., stabilization of a physical parameter), or both. In yet another embodiment, "treating" or "treatment" refers to delaying the onset of the disease or disorder. In some embodiments, "treating" or "treatment" refers to prophylactic treatment, i.e., preventing the onset of the disease or disorder.

"Compounds of the present disclosure," and equivalent expressions, are meant to embrace compounds of Formula I as described herein, as well as their subgenera, which expression includes the stereoisomers (e.g., entaniomers, diastereomers) and constitutional isomers (e.g., tautomers) of compounds of Formula I as well as the pharmaceutically acceptable salts, where the context so permits.

As used herein, the term "isotopic variant" refers to a compound that contains proportions of isotopes at one or more of the atoms that constitute such compound that is greater than natural abundance. For example, an "isotopic variant" of a compound can be radiolabeled, that is, contain one or more radioactive isotopes, or can be labeled with non-radioactive isotopes such as for example, deuterium ($^2$H or D), carbon-13 ($^{13}$C), nitrogen-15 ($^{15}$N), or the like. It will be understood that, in a compound where such isotopic substitution is made, the following atoms, where present, may vary, so that for example, any hydrogen may be $^2$H/D, any carbon may be $^{13}$C, or any nitrogen may be $^{15}$N, and that the presence and placement of such atoms may be determined within the skill of the art.

It is also to be understood that compounds that have the same molecular formula but differ in the nature or sequence of bonding of their atoms or the arrangement of their atoms in space are termed "isomers." Isomers that differ in the arrangement of their atoms in space are termed "stereoisomers," for example, diastereomers, enantiomers, and atropisomers. The compounds of this disclosure may possess one or more asymmetric centers; such compounds can therefore be produced as individual (R)- or (S)-stereoisomers at each asymmetric center, or as mixtures thereof. Unless indicated otherwise, the description or naming of a particular compound in the specification and claims is intended to include all stereoisomers and mixtures, racemic or otherwise, thereof. Where one chiral center exists in a structure, but no specific stereochemistry is shown for that center, both enantiomers, individually or as a mixture of enantiomers, are encompassed by that structure. Where more than one chiral center exists in a structure, but no specific stereochemistry is shown for the centers, all enantiomers and diastereomers, individually or as a mixture, are encompassed by that structure. The methods for the determination of stereochemistry and the separation of stereoisomers are well-known in the art.

In some aspects, the disclosure is directed to compounds of Formula I.

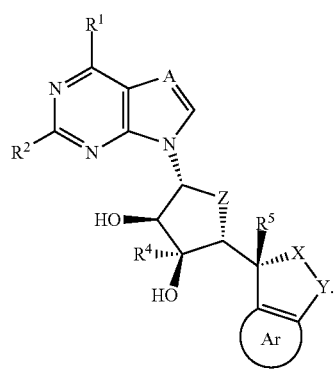

According to the disclosure, $R^1$ in Formula I is H, halo, —$C_1$-$C_6$alkyl, —$C_1$-$C_6$alkoxy, —$C_1$-$C_4$haloalkyl, —$C_3$-$C_6$cycloalkyl, —$C_3$-$C_6$halocycloalkyl, —$C_1$-$C_6$alk-O—$C_1$-$C_6$alkyl, —$C_1$-$C_6$alk-S(O)—$C_1$-$C_6$alkyl, —$C_1$-$C_6$alk-S(O)$_2$—$C_1$-$C_6$alkyl, —$CR^6R^{6'}CN$, —$NR^6R^{6'}$, —$NHCR^6R^{6'}CN$, —$NHCONR^6R^{6'}$, —$NHC(O)OR^7$, NHC(O)—$C_1$-$C_6$alkyl, NHC(O)—$C_1$-$C_6$haloalkyl, —NH—$C_1$-$C_6$alk-C(O)—$C_1$-$C_6$alkyl, —$NHC(S)NR^6R^{6'}$, —NH—O—$R^6$, or —NH—$NR^6R^{6'}$ In some embodiments, $R^1$ in Formula I is H.

In some embodiments, $R^1$ is halo (e.g., —F, —Cl, —Br, or —I), preferably —F.

In other embodiments, $R^1$ is —$C_1$-$C_6$alkyl, for example, —$C_1$alkyl, —$C_2$alkyl, —$C_3$alkyl, —$C_4$alkyl, —$C_5$alkyl, —$C_6$alkyl, methyl, ethyl, propyl, isopropyl, butyl, isobutyl, s-butyl, t-butyl, pentyl, and the like. In some embodiments, $R^1$ is methyl.

In some embodiments, when $R^1$ is —$C_1$alkyl, $R^1$ is —$CD_3$.

In yet other embodiments $R^1$ is —$C_1$-$C_6$alkoxy, for example, —$C_1$alkoxy, —$C_2$alkoxy, —$C_3$alkoxy, —$C_4$alkoxy, —$C_5$alkoxy, —$C_6$alkoxy, methoxy, ethoxy, propoxy, isopropoxy, butoxy, isobutoxy, s-butoxy, t-butox, pentoxy, and the like.

In other embodiments, $R^1$ is —$C_1$-$C_4$haloalkyl, for example, —$CF_3$ or —$CHF_2$, —$CH_2CH_2Cl$, —$CH_2CH_2F$, or —$CH_2CHF_2$. In some embodiments, $R^1$ is —$CH_2CH_2Cl$. In other embodiments, $R^1$ is —$CH_2CH_2F$. In yet other embodiments, $R^1$ is —$CH_2CHF_2$.

In other embodiments, $R^1$ is —$C_3$-$C_6$cycloalkyl, for example, for example, cyclopropyl, cyclobutyl, cyclopentyl, or cyclohexyl. In some embodiments, $R^1$ is cyclopropyl.

In other embodiments, $R^1$ is —$C_3$-$C_6$halocycloalkyl, for example chlorocyclopropyl, fluorocyclobutyl, bromocyclopentyl, iodocyclohexyl, and the like.

In other embodiments, $R^1$ is —$C_1$-$C_6$alk-O—$C_1$-$C_6$alkyl, for example, —$C_1$alk-O—$C_1$alkyl, —$C_2$alk-O—$C_1$alkyl, —$C_3$alk-O—$C_1$alkyl, —$C_4$alk-O—$C_1$alkyl, —$C_5$alk-O—$C_1$alkyl, —$C_6$alk-O—$C_1$alkyl, —$C_1$alk-O—$C_2$alkyl, —$C_2$alk-O—$C_2$alkyl, —$C_3$alk-O—$C_2$alkyl, —$C_4$alk-O—$C_2$alkyl, —$C_5$alk-O—$C_2$alkyl, —$C_6$alk-O—$C_2$alkyl, —$C_1$alk-O—$C_3$alkyl, —$C_2$alk-O—$C_3$alkyl, —$C_3$alk-O—$C_3$alkyl, —$C_4$alk-O—$C_3$alkyl, —$C_5$alk-O—$C_3$alkyl, —$C_6$alk-O—$C_3$alkyl, —$C_1$alk-O—$C_4$alkyl, —$C_2$alk-O—$C_4$alkyl, —$C_3$alk-O—$C_4$alkyl, —$C_4$alk-O—$C_4$alkyl, —$C_5$alk-O—$C_4$alkyl, —$C_6$alk-O—$C_4$alkyl, —$C_1$alk-O—$C_5$alkyl, —$C_2$alk-O—$C_5$alkyl, —$C_3$alk-O—$C_5$alkyl, —$C_4$alk-O—$C_5$alkyl, —$C_5$alk-O—$C_5$alkyl, —$C_6$alk-O—$C_5$alkyl, —$C_1$alk-O—$C_6$alkyl, —$C_2$alk-O—$C_6$alkyl, —$C_3$alk-O—$C_6$alkyl, —$C_4$alk-O—$C_6$alkyl, —$C_5$alk-O—$C_6$alkyl, —$C_6$alk-O—$C_6$alkyl, —$CH_2CH_2OMe$, —$CH_2OMe$, —$CH_2CH_2OCH_2CH_3$, —$CH_2OCH_2CH_3$, —$CH_2CH_2CH_2OCH_3$, and the like.

In other embodiments, $R^1$ is —$C_1$-$C_6$alk-S(O)—$C_1$-$C_6$alkyl, for example, —$C_1$alk-S(O)—$C_1$alkyl, —$C_2$alk-S(O)—$C_1$alkyl, —$C_3$alk-S(O)—$C_1$alkyl, —$C_4$alk-S(O)—$C_1$alkyl, —$C_5$alk-S(O)—$C_1$alkyl, —$C_6$alk-S(O)—$C_1$alkyl, —$C_1$alk-S(O)—$C_2$alkyl, —$C_2$alk-S(O)—$C_2$alkyl, —$C_3$alk-S(O)—$C_2$alkyl, —$C_4$alk-S(O)—$C_2$alkyl, —$C_5$alk-S(O)—$C_2$alkyl, —$C_6$alk-S(O)—$C_2$alkyl, —$C_1$alk-S(O)—$C_3$alkyl, —$C_2$alk-S(O)—$C_3$alkyl, —$C_3$alk-S(O)—$C_3$alkyl, —$C_4$alk-S(O)—$C_3$alkyl, —$C_5$alk-S(O)—$C_3$alkyl, —$C_6$alk-S(O)—$C_3$alkyl, —$C_1$alk-S(O)—$C_4$alkyl, —$C_2$alk-S(O)—$C_4$alkyl, —$C_3$alk-S(O)—$C_4$alkyl, —$C_4$alk-S(O)—$C_4$alkyl, —$C_5$alk-S(O)—$C_4$alkyl, —$C_6$alk-S(O)—$C_4$alkyl, —$C_1$alk-S(O)—$C_5$alkyl, —$C_2$alk-S(O)—$C_5$alkyl, —$C_3$alk-S(O)—$C_5$alkyl, —$C_4$alk-S(O)—$C_5$alkyl, —$C_5$alk-S(O)—$C_5$alkyl, —$C_6$alk-S(O)—$C_5$alkyl, —$C_1$alk-S(O)—$C_6$alkyl, —$C_2$alk-S(O)—$C_6$alkyl, —$C_3$alk-S(O)—$C_6$alkyl, —$C_4$alk-S(O)—$C_6$alkyl, —$C_5$alk-S(O)—$C_6$alkyl, —$C_6$alk-S(O)—$C_6$alkyl, —$CH_2CH_2S(O)Me$, and the like.

In other embodiments, $R^1$ is —$C_1$-$C_6$alk-S(O)$_2$—$C_1$-$C_6$alkyl, for example, —$C_1$alk-S(O)$_2$—$C_1$alkyl, —$C_2$alk-S(O)$_2$—$C_1$alkyl, —$C_3$alk-S(O)$_2$—$C_1$alkyl, —$C_4$alk-S(O)$_2$—$C_1$alkyl, —$C_5$alk-S(O)$_2$—$C_1$alkyl, —$C_6$alk-S(O)$_2$—$C_1$alkyl, —$C_1$alk-S(O)$_2$—$C_2$alkyl, —$C_2$alk-S(O)$_2$—$C_2$alkyl, —$C_3$alk-S(O)$_2$—$C_2$alkyl, —$C_4$alk-S(O)$_2$—$C_2$alkyl, —$C_5$alk-S(O)$_2$—$C_2$alkyl, —$C_6$alk-S(O)$_2$—$C_2$alkyl, —$C_1$alk-S(O)$_2$—$C_3$alkyl, —$C_2$alk-S(O)$_2$—$C_3$alkyl, —$C_3$alk-S(O)$_2$—$C_3$alkyl, —$C_4$alk-S(O)$_2$—$C_3$alkyl, —$C_5$alk-S(O)$_2$—$C_3$alkyl, —$C_6$alk-S(O)$_2$—$C_3$alkyl, —$C_1$alk-S(O)$_2$—$C_4$alkyl, —$C_2$alk-S(O)$_2$—$C_4$alkyl, —$C_3$alk-S(O)$_2$—$C_4$alkyl, —$C_4$alk-S(O)$_2$—$C_4$alkyl, —$C_5$alk-S(O)$_2$—$C_4$alkyl, —$C_6$alk-S(O)$_2$—$C_4$alkyl, —$C_1$alk-S(O)$_2$—$C_5$alkyl, —$C_2$alk-S(O)$_2$—$C_5$alkyl, —$C_3$alk-S(O)$_2$—$C_5$alkyl, —$C_4$alk-S(O)$_2$—$C_5$alkyl, —$C_5$alk-S(O)$_2$—$C_5$alkyl, —$C_6$alk-S(O)$_2$—$C_5$alkyl, —$C_1$alk-S(O)$_2$—$C_6$alkyl, —$C_2$alk-S(O)$_2$—$C_6$alkyl, —$C_3$alk-S(O)$_2$—$C_6$alkyl, —$C_4$alk-S(O)$_2$—$C_6$alkyl, —$C_5$alk-S(O)$_2$—$C_6$alkyl, —$C_6$alk-S(O)$_2$—$C_6$alkyl, —$CH_2CH_2SO_2Me$, and the like.

In some embodiments, $R^1$ is —$CR^6R^{6'}CN$. Thus, in some embodiments wherein $R^6$ and $R^{6'}$ are both H, $R^1$ is cyanomethyl (i.e., —$CH_2CN$).

In some embodiments, $R^1$ is —$NR^6R^{6'}$. Thus, in some embodiments wherein $R^6$ and $R^{6'}$ are both H, $R^1$ is —$NH_2$. In some embodiments wherein $R^6$ and $R^{6'}$ are both methyl, $R^1$ is —$N(CH_3)_2$. In embodiments wherein $R^6$ is H and $R^{6'}$ is methyl, $R^1$ is —$NH(CH_3)$.

In some embodiments, $R^1$ is —$NHCR^6R^{6'}CN$. Thus, in some embodiments wherein $R^6$ and $R^{6'}$ are both H, $R^1$ is —$NHCH_2CN$.

In some embodiments, $R^1$ is —$NHCONR^6R^{6'}$. Thus, in some embodiments wherein $R^6$ and $R^{6'}$ are both H, $R^1$ is —$NHCONH_2$. In embodiments wherein $R^6$ and $R^{6'}$ are both methyl, $R^1$ is —$NHCON(CH_3)_2$. In embodiments wherein $R^6$ is H and $R^{6'}$ is methyl, $R^1$ is —$NHCONHCH_3$.

In some embodiments, $R^1$ is or —$NHC(O)OR^7$. Thus, in some embodiments wherein $R^7$ is methyl, $R^1$ is or —$NHC(O)OCH_3$.

In some aspects, $R^1$ is —NHC(O)—$C_1$-$C_6$alkyl, for example, —NHC(O)—$C_1$alkyl, NHC(O)—$C_2$alkyl, NHC(O)—$C_3$alkyl, NHC(O)—$C_4$alkyl, NHC(O)—$C_5$alkyl, NHC(O)—$C_6$alkyl, NHC(O)-methyl, NHC(O)-ethyl, and the like.

In other aspects, $R^1$ is NHC(O)—$C_1$-$C_6$haloalkyl, for example, —NHC(O)—$C_1$haloalkyl, NHC(O)—$C_2$haloalkyl, NHC(O)—$C_3$haloalkyl, NHC(O)—$C_4$haloalkyl, NHC(O)—$C_5$haloalkyl, —NHC(O)—$C_6$haloalkyl, —NHC(O)-chloromethyl, —NHC(O)-chloroethyl, —NHC(O)-fluoromethyl, —NHC(O)-fluoroethyl and the like.

In other aspects, $R^1$ is —NH—$C_1$-$C_6$alk-C(O)—$C_1$-$C_6$alkyl, for example, —NH—$C_1$alk-C(O)—$C_1$-$C_6$alkyl, —NH—$C_2$alk-C(O)—$C_1$-$C_6$alkyl, —NH—$C_3$alk-C(O)—$C_1$-$C_6$alkyl, —NH—$C_4$alk-C(O)—$C_1$-$C_6$alkyl, —NH—$C_5$alk-C(O)—$C_1$-$C_6$alkyl, —NH—$C_6$alk-C(O)—$C_1$-$C_6$alkyl, —NH—$C_1$-$C_6$alk-C(O)—$C_1$alkyl, —NH—$C_1$-$C_6$alk-C(O)—$C_2$alkyl, —NH—$C_1$-$C_6$alk-C(O)—$C_3$alkyl, —NH—$C_1$-$C_6$alk-C(O)—$C_4$alkyl, —NH—$C_1$-$C_6$alk-C(O)—$C_5$alkyl, —NH—$C_1$-$C_6$alk-C(O)—$C_6$alkyl and the like. In some aspects, $R^1$ is —NH—$CH_2$—C(O)—$CH_3$.

In some aspects, $R^1$ is $NHC(S)NR^6R^{6'}$. Thus, in some embodiments wherein $R^6$ and $R^{6'}$ are both H, $R^1$ is —NHC (S)NH$_2$. In embodiments wherein R$^6$ and R$^{6'}$ are both methyl, R$^1$ is —NHC(S)N(CH$_3$)$_2$. In embodiments wherein R$^6$ is H and R$^{6'}$ is methyl, R$^1$ is —NHC(S)NHCH$_3$.

In some aspects, R$^1$ is —NH—O—R$^6$. In some embodiments wherein R$^6$ is C$_1$-C$_6$alkyl, for example, methyl, R$^1$ is —NH—OCH$_3$. In some embodiments wherein R$^6$ is H, R$^1$ is —NH—OH.

In some aspects, R$^1$ is —NH—NR$^6$R$^{6'}$. In some embodiments wherein R$^6$ and R$^{6'}$ are both H, R$^1$ is —NH—NH$_2$. In embodiments wherein R$^6$ and R$^{6'}$ are both C$_1$-C$_6$alkyl, for example, methyl, R$^1$ is —NH—N(CH$_3$)$_2$. In embodiments wherein R$^6$ is H and R$^{6'}$ is C$_1$-C$_6$alkyl, for example, methyl, R$^1$ is —NH—NHCH$_3$.

It will be apparent that when R$^1$ is —NH—O—R$^6$ or —NH—NR$^6$R$^{6'}$, the compounds of Formula I may exist as tautomers having (E)- or (Z)-geometry at the exocyclic carbon-nitrogen double bond. The compounds of Formula I described and claimed herein are meant to encompass all such tautomers and geometric isomers. The depiction of a particular tautomer or geometric isomer is not intended to be limiting.

In embodiments of the disclosure, R$^6$ and R$^{6'}$ in Formula I are each independently H, C$_1$-C$_6$alkyl (e.g., methyl, ethyl, propyl, isopropyl, butyl, isobutyl, s-butyl, t-butyl, pentyl, and the like), or —C$_0$-C$_6$alk-OC$_1$-C$_6$alkyl (e.g., —C$_0$alk-OC$_1$-C$_6$alkyl, —C$_1$-C$_6$alk-OC$_1$-C$_6$alkyl, —C$_1$-C$_5$alk-OC$_1$-C$_6$alkyl, —C$_1$-C$_4$alk-OC$_1$-C$_6$alkyl, —C$_1$-C$_3$alk-OC$_1$-C$_6$alkyl, —C$_1$-C$_2$alk-OC$_1$-C$_6$alkyl, —C$_1$alk-OC$_1$-C$_6$alkyl, —C$_0$-C$_6$alk-OC$_1$-C$_5$alkyl, —C$_0$-C$_6$alk-OC$_1$-C$_4$alkyl, —C$_0$-C$_6$alk-OC$_1$-C$_3$alkyl, —C$_0$-C$_6$alk-OC$_1$-C$_2$alkyl, or —C$_0$-C$_6$alk-OC$_1$alkyl).

In some embodiments, R$^6$ is H or C$_1$-C$_6$alkyl. In some embodiments, R$^{6'}$ is H or C$_1$-C$_6$alkyl.

In some embodiments, R$^6$ and R$^{6'}$ are each H.

In other embodiments, R$^6$ and R$^{6'}$ are each independently C$_1$-C$_6$alkyl. Thus, in some embodiments R$^6$ is methyl and R$^{6'}$ is methyl.

In some aspects, R$^6$ is C$_1$-C$_6$alkyl and R$^{6'}$ is H. Thus, in some embodiments, R$^6$ is methyl and R$^{6'}$ is H.

In other aspects, R$^6$ and R$^{6'}$ are each independently —C$_0$-C$_6$alk-OC$_1$-C$_6$alkyl.

In other aspects, R$^6$ is —C$_0$-C$_6$alk-OC$_1$-C$_6$alkyl and R$^{6'}$ is H.

In embodiments of the disclosure, R$^6$ and R$^{6'}$, together with the atom to which they are attached, may form a C$_3$-C$_6$cycloalkyl ring, for example, cyclopropyl, cyclobutyl, cyclopentyl, or cyclohexyl. In other embodiments of the disclosure, R$^6$ and R$^{6'}$, together with the atom to which they are attached, form a C$_2$-C$_6$heterocycloalkyl, for example, azepanyl, aziridinyl, azetidinyl, pyrrolidinyl, imidazolidinyl, pyrazolidinyl, piperazinyl, piperidinyl, morpholinyl, thiomorpholinyl, oxazepanyl, piperazinyl, and the like.

In embodiments of the disclosure, R$^7$ is —C$_1$-C$_6$alkyl, or —C$_0$-C$_6$alk-C$_3$-C$_6$cycloalkyl. In some embodiments, R$^7$ is C$_1$-C$_6$alkyl, for example, methyl, ethyl, propyl, isopropyl, butyl, isobutyl, s-butyl, t-butyl, pentyl, and the like. Thus, in some embodiments, R$^7$ is methyl.

In other aspects, R$^7$ is —C$_0$-C$_6$alk-C$_3$-C$_6$cycloalkyl, for example, —C$_0$alk-C$_3$cycloalkyl, —C$_1$alk-C$_3$cycloalkyl, —C$_2$alk-C$_3$cycloalkyl, —C$_3$alk-C$_3$cycloalkyl, —C$_4$alk-C$_3$cycloalkyl, —C$_5$alk-C$_3$cycloalkyl, —C$_6$alk-C$_3$cycloalkyl, —C$_0$alk-C$_4$cycloalkyl, —C$_1$alk-C$_4$cycloalkyl, —C$_2$alk-C$_4$cycloalkyl, —C$_3$alk-C$_4$cycloalkyl, —C$_4$alk-C$_4$cycloalkyl, —C$_5$alk-C$_4$cycloalkyl, —C$_6$alk-C$_4$cycloalkyl, —C$_0$alk-C$_5$cycloalkyl, —C$_1$alk-C$_5$cycloalkyl, —C$_2$alk-C$_5$cycloalkyl, —C$_3$alk-C$_5$cycloalkyl, —C$_4$alk-C$_5$cycloalkyl, —C$_5$alk-C$_5$cycloalkyl, —C$_6$alk-C$_5$cycloalkyl, —C$_0$alk-C$_6$cycloalkyl, —C$_1$alk-C$_6$cycloalkyl, —C$_2$alk-C$_6$cycloalkyl, —C$_3$alk-C$_6$cycloalkyl, —C$_4$alk-C$_6$cycloalkyl, —C$_5$alk-C$_6$cycloalkyl, —C$_6$alk-C$_6$cycloalkyl.

According to the disclosure, R$^2$ in Formula I is H, halo, —C$_1$-C$_6$alkyl, or NH$_2$. Thus in some embodiments, R$^2$ is H. In other embodiments, R$^2$ is halo, for example F, Cl, Br, or I. In other embodiments, R$^2$ is —C$_1$-C$_6$alkyl, for example, methyl, ethyl, propyl, isopropyl, butyl, isobutyl, s-butyl, t-butyl, pentyl, and the like. Thus, in some embodiments, R$^2$ is methyl (Me). In yet other embodiments, R$^2$ is NH$_2$. In the most preferred embodiments, R$^2$ is H.

According to the disclosure, R$^4$ in Formula I is H, —C$_1$-C$_6$alkyl, —C$_1$-C$_6$haloalkyl, —C$_2$-C$_6$alkenyl, or —C$_2$-C$_6$alkynyl. Thus in some embodiments, R$^4$ is H.

In other aspects, R$^4$ is —C$_1$-C$_6$alkyl, for example, methyl, ethyl, propyl, isopropyl, butyl, isobutyl, s-butyl, t-butyl, pentyl, and the like. Thus, in some embodiments, R$^4$ is methyl (Me).

In other aspects, R$^4$ is —C$_1$-C$_6$haloalkyl, for example, —CF$_3$ or —CHF$_2$. In some embodiments, R$^4$ is —CF$_3$.

In some aspects, R$^4$ is —C$_2$-C$_6$alkenyl, preferably —C$_2$-C$_4$alkenyl, for example, vinyl, allyl, and the like.

In other aspects, R$^4$ is —C$_2$-C$_6$alkynyl, preferably —C$_2$-C$_4$alkynyl, for example, ethynyl, propargyl, and the like.

According to the disclosure, R$^5$ in Formula I is H or —C$_1$-C$_6$alkyl. Thus in some embodiments, R$^5$ is H. In other embodiments, R$^5$ is —C$_1$-C$_6$alkyl, for example, methyl, ethyl, propyl, isopropyl, butyl, isobutyl, s-butyl, t-butyl, pentyl, and the like. Thus, in some embodiments, R$^5$ is methyl (Me).

In some aspects of the disclosure, X in Formula I is O, S, NH, or N(C$_1$-C$_6$alkyl); and Y in Formula I is —(CR$^9$R$^{9'}$)$_n$—, —CR$^9$=CR$^{9'}$—, C(=O), —C(=O)—(CR$^9$R$^{9'}$)$_n$—, —C(=O)—O—(CR$^9$R$^{9'}$)$_n$—, —CR$^9$R$^{9'}$—O—, —(CR$^9$R$^{9'}$)$_n$—O—(CR$^9$R$^{9'}$)$_m$—, —(CR$^9$R$^{9'}$)$_n$—NR$^{10}$, C(=O)NR$^{10}$, or CH—C$_1$-C$_4$alk-NH$_2$, wherein n=1 or 2, m=1 or 2, and wherein each instance of R$^9$ or R$^{9'}$ is independently H, D (i.e., deuterium), C$_1$-C$_6$alkyl, C$_1$-C$_6$haloalkyl, halo, —C$_1$-C$_6$alkoxy, or hydroxy, and wherein R$^{10}$ is H or C$_1$-C$_6$alkyl.

In other aspects of the disclosure, X in Formula I is —SO$_2$— and Y in Formula I is —(CR$^9$R$^{9'}$)$_n$—, —CR$^9$=CR$^{9'}$—, —CR$^9$R$^{9'}$—O—, —(CR$^9$R$^{9'}$)$_n$—O—(CR$^9$R$^{9'}$)$_m$—, —(CR$^9$R$^{9'}$)$_n$—NR$^{10}$, or CH—C$_1$-C$_4$alk-NH$_2$, wherein n=1 or 2, m=1 or 2, and wherein each instance of R$^9$ or R$^{9'}$ is independently H, D (i.e., deuterium), C$_1$-C$_6$alkyl, C$_1$-C$_6$haloalkyl, halo, —C$_1$-C$_6$alkoxy, or hydroxy, and wherein R$^{10}$ is H or C$_1$-C$_6$alkyl.

In some embodiments, X is O. In other embodiments, X is S. In other embodiments, X is SO$_2$. In yet other embodiments, X is NH. In some embodiments, X is N(C$_1$-C$_6$alkyl), for example, N(C$_1$alkyl), N(C$_2$alkyl), N(C$_3$alkyl), N(C$_4$alkyl), N(C$_5$alkyl), N(C$_6$alkyl), N(CH$_3$), N(CH$_2$CH$_3$), and the like.

In some aspects, Y is —(CR$^9$R$^{9'}$)$_n$—. In some embodiments n=1, and Y is —CR$^9$R$^{9'}$—. In some embodiments n=1, R$^9$ and R$^{9'}$ are each H, and Y is —CH$_2$—.

In other embodiments wherein Y is —(CR$^9$R$^{9'}$)$_n$—, n=1, R$^9$ and R$^{9'}$ are each F, and Y is —CF$_2$—.

In some embodiments wherein Y is —(CR$^9$R$^{9'}$)$_n$—, n=1, R$^9$ and R$^{9'}$ are each C$_1$-C$_6$alkyl, and Y is —C(C$_1$-C$_6$alkyl)$_2$—. In some embodiments, C$_1$-C$_6$alkyl is —CH$_3$, and Y is —C(CH$_3$)$_2$—.

In some embodiments wherein Y is —$(CR^9R^{9'})_n$—, n=2, and Y is —$CR^9R^{9'}$—$CR^9R^{9'}$—. In some embodiments wherein Y is —$(CR^9R^{9'})_n$— and n=2, each $R^9$ and each $R^{9'}$ is H, and Y is —$CH_2CH_2$—.

In some embodiments wherein Y is —$(CR^9R^{9'})_n$— and n=2, one $R^9$ is —$C_1$-$C_6$alkoxy, the other $R^9$ is H, and each $R^{9'}$ is H, and Y is —$CH_2CH(C_1$-$C_6$alkoxy)-. In some embodiments, $C_1$-$C_6$alkoxy is —$OCH_3$, and Y is —$CH_2CH(OCH_3)$—.

In some embodiments wherein Y is —$(CR^9R^{9'})_n$— and n=2, one $R^9$ is -hydroxy, the other $R^9$ is H, and each $R^{9'}$ is H, and Y is —$CH_2CH(OH)$—.

In some embodiments wherein Y is —$(CR^9R^{9'})_n$— and n=2, one $R^9$ is —$C_1$-$C_6$alkyl, the other $R^9$ is H, and each $R^{9'}$ is H, and Y is —$CH_2CH(C_1$-$C_6$alkyl). In some embodiments, $C_1$-$C_6$alkyl is —$CH_3$, and Y is —$CH_2CH(CH_3)$—.

In some embodiments wherein Y is —$(CR^9R^{9'})_n$— and n=2, one $R^9$ is —$C_1$-$C_6$alkyl, one $R^9$ is H, one $R^{9'}$ is —$C_1$-$C_6$alkyl, one $R^{9'}$ is H, and Y is —$CH_2C(C_1$-$C_6$alkyl)$_2$-. In some embodiments, $C_1$-$C_6$alkyl is —$CH_3$, and Y is —$CH_2C(CH_3)_2$—.

In some embodiments wherein Y is —$(CR^9R^{9'})_n$— and n=2, one $R^9$ is —$C_1$-$C_6$haloalkyl, the other $R^9$ is H, and each $R^{9'}$ is H, and Y is —$CH_2CH(C_1$-$C_6$haloalkyl)-. In some embodiments, $C_1$-$C_6$haloalkyl is —$CF_3$, and Y is —$CH_2CH(CF_3)$—.

In some embodiments wherein Y is —$(CR^9R^{9'})_n$— and n=2, one $R^9$ is —F, the other $R^9$ is H, and each $R^{9'}$ is H, and Y is —$CH_2CHF$—.

In some embodiments wherein Y is —$(CR^9R^{9'})_n$— and n=2, one $R^9$ is F, the other $R^9$ is H, one $R^{9'}$ is F, and the other $R^{9'}$ is H, and Y is —$CH_2CF_2$—.

In some embodiments wherein Y is —$(CR^9R^{9'})_n$— and n=2, one $R^9$ is D, the other $R^9$ is H, one $R^{9'}$ is D, and the other $R^{9'}$ is H, and Y is —$CH_2CD_2$-.

In some embodiments wherein Y is —$(CR^9R^{9'})_n$— and n=1, $R^9$ and $R^{9'}$ are each $C_1$-$C_6$alkyl, and Y is —$C(C_1$-$C_6$alkyl)$_2$-. In some embodiments, $C_1$-$C_6$alkyl is —$CH_3$, and Y is —$C(CH_3)_2$—.

In some embodiments, Y is —$(CR^9R^{9'})_n$— and n=3. In some embodiments n=3, $R^9$ and $R^{9'}$ are each H, and Y is —$CH_2CH_2CH_2$—.

In some aspects, Y is —$CR^9$=$CR^{9'}$—. In some embodiments wherein Y is —$CR^9$=$CR^{9'}$—, $R^9$ and $R^{9'}$ are each H, and Y is —CH=CH—.

In other aspects, Y is C(=O).

In some aspects, Y is —C(=O)—$(CR^9R^{9'})_n$—. In some embodiments, n=1, $R^9$ and $R^{9'}$ are both H, and Y is —C(=O)—$CH_2$—.

In some aspects, Y is —C(=O)—O—$(CR^9R^{9'})_n$—. In some embodiments, n=1, $R^9$ and $R^{9'}$ are both H, and Y is —C(=O)—O—$CH_2$—. In other embodiments, n=2, $R^9$ and $R^{9'}$ are both H, and Y is —C(=O)—O—$CH_2CH_2$—.

In some aspects, Y is —$CR^9R^{9'}$—O—. In some embodiments, $R^9$ and $R^{9'}$ are both H, and Y is —$CH_2$—O—. In other embodiments, $R^9$ and $R^{9'}$ are both F, and Y is —$CF_2$—O—.

In some aspects, Y is —$(CR^9R^{9'})_n$—O—$(CR^9R^{9'})_m$—. In some embodiments, n=m=1, and each $R^9$ and each $R^{9'}$ is H, and Y is —$CH_2$—O—$CH_2$—. In other embodiments, n=m=1, and one $R^9$ is H and one $R^9$ is F, and one $R^{9'}$ is H and one $R^{9'}$ is F, and Y is —$CF_2$—O—$CH_2$—. In other embodiments, n=1, m=2, each $R^9$ and each $R^{9'}$ is H, and Y is —$CH_2$—O—$CH_2CH_2$—. In other embodiments, n=1, m=2, one $R^9$ is F and the other $R^9$ are H, and one $R^{9'}$ is F and the other $R^{9'}$ are H, and Y is —$CF_2$—O—$CH_2CH_2$—.

In some aspects, Y is —$(CR^9R^{9'})_n$—$NR^{10}$—. In some embodiments, n=1, $R^9$, $R^{9'}$, and $R^{10}$ is H, and Y is —$CH_2$—NH—. In other embodiments, n=1, $R^9$ are $R^{9'}$ are both H, $R^{10}$ is $C_1$-$C_6$alkyl, and Y is —$CH_2$—N($C_1$-$C_6$alkyl)-.

In some aspects, Y is —C(=O)$NR^{10}$. In some embodiments, $R^{10}$ is H, and Y is —C(=O)NH—. In other embodiments, $R^{10}$ is $C_1$-$C_6$alkyl, and Y is —C(=O)N($C_1$-$C_6$alkyl)-.

It will be apparent to those skilled in the art that some embodiments of the element Y attach to the element X of Formula I through one atom, and to the Ar group of Formula I through a different atom (i.e., when Y is —$(CR^9R^{9'})_n$— with n=2, —$CR^9$=$CR^{9'}$—, —C(=O)—$(CR^9R^{9'})_n$—, —C(=O)—O—$(CR^9R^{9'})_n$—, —$CR^9R^{9'}$—O—, —$(CR^9R^{9'})_n$—O—$(CR^9R^{9'})_m$—, —$(CR^9R^{9'})_n$—$NR^{10}$, and —C(=O)$NR^{10}$). When such embodiments of Y attach to X and Ar through only non-carbonyl carbon atoms (i.e., when Y is —$(CR^9R^{9'})_n$— with n=2, —$CR^9$=$CR^{9'}$—, or —$(CR^9R^{9'})_n$—O—$(CR^9R^{9'})_m$—, then Y may attach to X or to Ar through either carbon atom. For example, when Y is —$CR^9$=$CR^{9'}$—, Y may attach as either Ar—$CR^9$=$CR^{9'}$—X or as X—$CR^9$=$CR^{9'}$—Ar. Similarly, when Y is —$(CR^9R^{9'})_n$—O—$(CR^9R^{9'})_m$—, Y may attach as either Ar—$(CR^9R^{9'})_n$—O—$(CR^9R^{9'})_m$—X or as X—$(CR^9R^{9'})_n$—O—$(CR^9R^{9'})_m$—Ar.

When such embodiments of Y attach through a non-carbonyl carbon atom and a carbonyl carbon atom (i.e., when Y is —C(=O)—$(CR^9R^{9'})_n$— or —C(=O)—O—$(CR^9R^{9'})_n$—), then the carbonyl carbon atom of Y attaches to X, and the non-carbonyl carbon atom of Y attaches to Ar. The following examples illustrate this point. When Y is —C(=O)—$(CR^9R^{9'})_n$—, then Y attaches as:

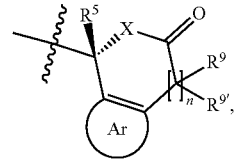

but NOT as:

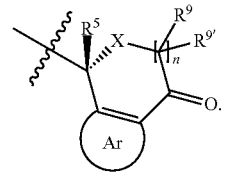

Similarly, when Y is —C(=O)—O—$(CR^9R^{9'})_n$—, then Y attaches as:

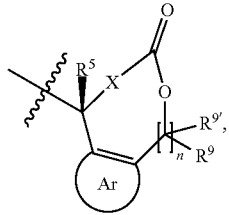

but NOT as:

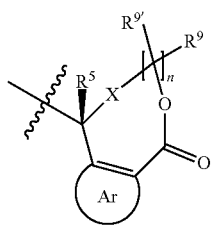

When embodiments of Y attach to X and Ar through a carbon atom of Y and an oxygen or nitrogen atom of Y (i.e., when Y is —CR$^9$R$^{9'}$—O—, —(CR$^9$R$^{9'}$)$_n$—NR$^{10}$—, or —C(=O)NR$^{10}$—), then Y attaches to Ar through only the oxygen or nitrogen atom, and Y attaches to X through only the carbon atom. That is, Y attaches as X—CR$^9$R$^{9'}$—O—Ar, X—(CR$^9$R$^{9'}$)$_n$—NR$^{10}$—Ar, or X—C(=O)NR$^{10}$—Ar. The following examples illustrate this point. When Y is —CR$^9$R$^{9'}$—O—, or —(CR$^9$R$^{9'}$)$_n$—NR$^{10}$—, then Y attaches as:

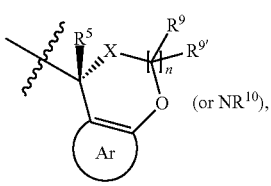

but NOT as:

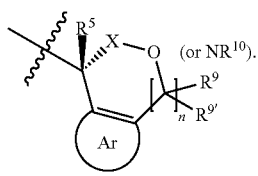

When Y is —C(=O)NR$^{10}$—, then Y attaches as:

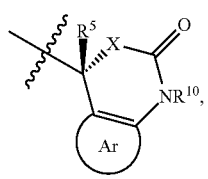

but NOT as

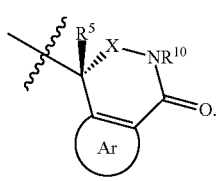

In other embodiments, Y is CH—C$_1$-C$_4$alk-NH$_2$, for example, CH—C$_1$alk-NH$_2$, CH—C$_2$alk-NH$_2$, CH—C$_3$alk-NH$_2$, CH—C$_4$alk-NH$_2$, CH—CH$_2$—NH$_2$, CH—CH$_2$CH$_2$—NH$_2$, and the like.

According to the disclosure, Ar in Formula I is an optionally substituted 6-membered aryl ring, an optionally substituted 6-membered heteroaryl ring, or an optionally substituted 5-membered heteroaryl ring. In some embodiments, Ar is an optionally substituted 6-membered aryl ring. In some embodiments, the 6-membered aryl ring is unsubstituted. In other embodiments, the 6-membered aryl ring is substituted with one or more substituents, independently selected from halo, C$_1$-C$_6$alkyl, C$_1$-C$_6$haloalkyl, C$_1$-C$_6$alkoxy, and C$_1$-C$_6$haloalkoxy. In some preferred embodiments, the 6-membered aryl ring is substituted with one or more —F, —Cl, —CH$_3$, —CF$_3$, or —OCF$_3$ substituents.

In some embodiments, Ar is an optionally substituted 6-membered heteroaryl ring. In some embodiments, the 6-membered heteroaryl ring is unsubstituted. In other embodiments, the 6-membered heteroaryl ring is substituted with one or more substituents, independently selected from halo, C$_1$-C$_6$alkyl, C$_1$-C$_6$haloalkyl, C$_1$-C$_6$alkoxy, and C$_1$-C$_6$haloalkoxy. In some preferred embodiments, the 6-membered heteroaryl ring is substituted with one or more —F, —Cl, —CH$_3$, —CF$_3$, or —OCF$_3$ substituents.

In some embodiments, Ar is an optionally substituted 5-membered heteroaryl ring. In some embodiments, the 5-membered heteroaryl ring is unsubstituted. In other embodiments, the 5-membered heteroaryl ring is substituted with one or more substituents, independently selected from halo, C$_1$-C$_6$alkyl, C$_1$-C$_6$haloalkyl, C$_1$-C$_6$alkoxy, and C$_1$-C$_6$haloalkoxy. In some preferred embodiments, the 5-membered heteroaryl ring is substituted with one or more —F, —Cl, —CH$_3$, —CF$_3$, or —OCF$_3$ substituents.

According to the disclosure, A in Formula I is N or C—R$^3$. In some embodiments, A is N and the compounds of Formula I are of the Formula I-B:

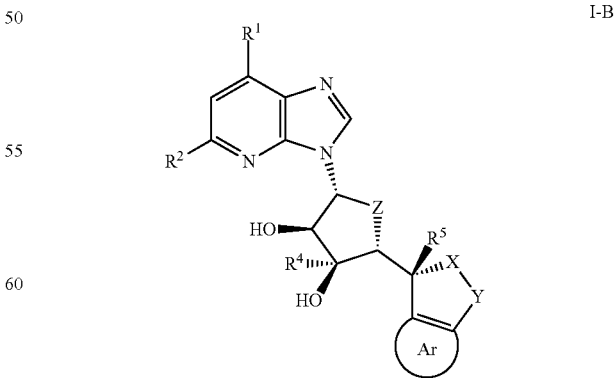

In other embodiments, A is C—R$^3$ and the compounds of Formula I are of the Formula I-C:

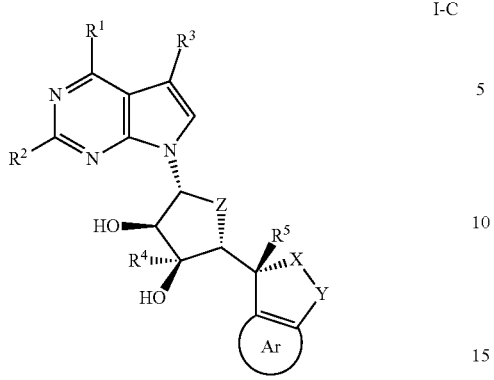

I-C

In embodiments of the disclosure that are compounds of Formula I-C, $R^3$ is H, halo, —$C_1$-$C_6$alkyl, —$C_1$-$C_6$alkoxy, —$C_2$-$C_6$alkenyl, or —$C_2$-$C_6$alkynyl.

In some embodiments of the compound of Formula I-C, $R^3$ is H. In other embodiments of the compound of Formula I-C, $R^3$ is halo (i.e., —F, —Cl, —Br, or —I), preferably F. In other embodiments of the compounds of Formula I-C, $R^3$ is —$C_1$-$C_6$alkyl, for example, —$C_1$alkyl, —$C_2$alkyl, —$C_3$alkyl, —$C_4$alkyl, —$C_5$alkyl, —$C_6$alkyl, methyl, ethyl, propyl, isopropyl, butyl, isobutyl, s-butyl, t-butyl, pentyl, and the like. In yet other embodiments of the compounds of Formula I-C, $R^3$ is —$C_1$-$C_6$alkoxy, for example, —$C_1$alkoxy, —$C_2$alkoxy, —$C_3$alkoxy, —$C_4$alkoxy, —$C_5$alkoxy, —$C_6$alkoxy, methoxy, ethoxy, propoxy, isopropoxy, butoxy, isobutoxy, s-butoxy, t-butox, pentoxy, and the like. In some other embodiments, $R^3$ is —$C_2$-$C_6$alkenyl, preferably —$C_2$-$C_4$alkenyl, for example, vinyl, allyl, and the like. In yet other embodiments, $R^3$ is —$C_2$-$C_6$alkynyl, preferably —$C_2$-$C_4$alkynyl, for example, ethynyl, propargyl, and the like.

According to the disclosure, Z in Formula I is O, $CH_2$, or $CF_2$. In some embodiments, Z is O, and the compounds of Formula I are of the Formula I-D:

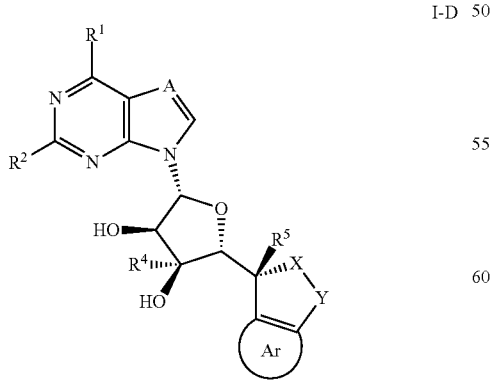

I-D

In other embodiments, Z is $CH_2$, and the compounds of Formula I are of the Formula I-E:

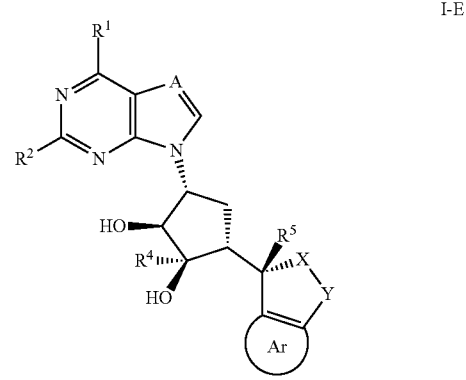

I-E

In yet other embodiments, Z is $CF_2$, and the compounds of Formula I are of the Formula I-F:

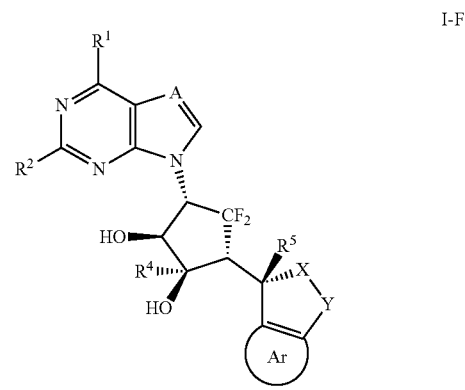

I-F

In some embodiments, Ar in the compounds of Formula I is an optionally substituted 6-membered aryl ring, or an optionally substituted 6-membered heteroaryl ring, and the compounds of Formula I are of the Formula I-G:

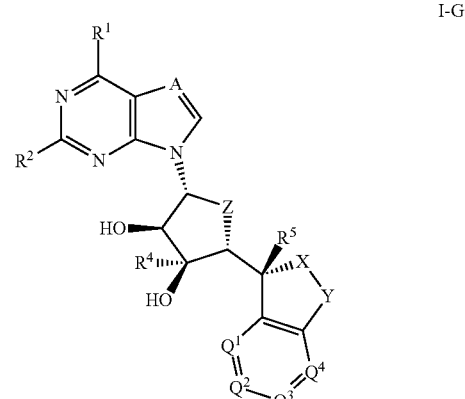

I-G wherein $Q^1$, $Q^2$, $Q^3$, and $Q^4$ are each independently selected from CH, C—$R^8$, or N; and $R^8$ is halo, $C_1$-$C_6$alkyl, $C_1$-$C_6$haloalkyl, $C_1$-$C_6$alkoxy, or $C_1$-$C_6$haloalkoxy.

Thus, in some embodiments of compounds of Formula I-G, $R^8$ is halo (e.g., —F, —Cl, —Br, —I), preferably —F or —Cl. In other embodiments of compounds of Formula I-G, $R^8$ is $C_1$-$C_6$alkyl, for example, —$C_1$alkyl, —$C_2$alkyl, —$C_3$alkyl, —$C_4$alkyl, —$C_5$alkyl, —$C_6$alkyl, methyl, ethyl, propyl, isopropyl, butyl, isobutyl, s-butyl, t-butyl, pentyl, and the like.

In other embodiments of compounds of Formula I-G, $R^8$ is $C_1$-$C_6$haloalkyl, for example, —$C_1$haloalkyl, —$C_2$haloalkyl, —$C_3$haloalkyl, —$C_4$haloalkyl, —$C_5$haloalkyl, —$C_6$haloalkyl, fluoromethyl, fluoroethyl, fluoropropyl, fluorobutyl, fluoropentyl, chloromethyl, chloroethyl, chloropropyl, chlorobutyl, chloropentyl, bromomethyl, bromoethyl, bromopropyl, bromobutyl, bromopentyl, iodomethyl, iodoethyl, iodopropyl, iodobutyl, iodopentyl, and the like.

In other embodiments of compounds of Formula I-G, $R^8$ is —$C_1$-$C_6$alkoxy, for example, —$C_1$alkoxy, —$C_2$alkoxy, —$C_3$alkoxy, —$C_4$alkoxy, —$C_5$alkoxy, —$C_6$alkoxy, methoxy, ethoxy, propoxy, isopropoxy, butoxy, isobutoxy, s-butoxy, t-butox, pentoxy, and the like.

In other embodiments of compounds of Formula I-G, $R^8$ is —$C_1$-$C_6$haloalkoxy, for example, —$C_1$haloalkoxy, —$C_2$haloalkoxy, —$C_3$haloalkoxy, —$C_4$haloalkoxy, —$C_5$haloalkoxy, —$C_6$haloalkoxy, halomethoxy, haloethoxy, halopropoxy, haloisopropoxy, halobutoxy, haloisobutoxy, halo-s-butoxy, halo-t-butoxy, halopentoxy, and the like.

In other embodiments, Ar is a 5-membered heteroaryl group, and the compounds of Formula I are of the Formula I-H:

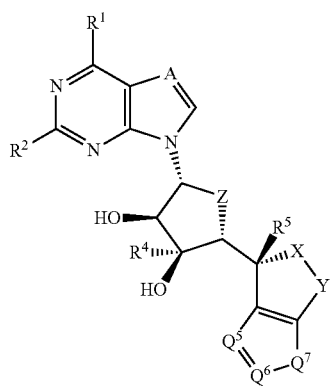

I-H wherein $Q^5$ and $Q^6$ are CH, C—$R^8$, or N, and $Q^7$ is NH, N($C_1$-$C_6$alkyl), S, O, or, when at least one of $Q^5$ and $Q^6$ is N, $Q^7$ may be $CH_2$ or CH—$R^8$; and wherein and $R^8$ is halo, $C_1$-$C_6$alkyl, $C_1$-$C_6$haloalkyl, $C_1$-$C_6$alkoxy, or $C_1$-$C_6$haloalkoxy.

It will be apparent that when $Q^7$ is NH, $CH_2$, or CH—$R^8$, then the 5-membered heteroaryl group in compounds of Formula I-H may exist in tautomeric forms. All such tautomeric forms are encompassed by the present disclosure.

Thus, in some embodiments of compounds of Formula I-H, $R^8$ is halo (e.g., —F, —Cl, —Br, —I), preferably —F or —Cl. In other embodiments of compounds of Formula I-H, $R^8$ is $C_1$-$C_6$alkyl, for example, —$C_1$alkyl, —$C_2$alkyl, —$C_3$alkyl, —$C_4$alkyl, —$C_5$alkyl, —$C_6$alkyl, methyl, ethyl, propyl, isopropyl, butyl, isobutyl, s-butyl, t-butyl, pentyl, and the like.

In other embodiments of compounds of Formula I-H, $R^8$ is $C_1$-$C_6$haloalkyl, for example, —$C_1$haloalkyl, —$C_2$haloalkyl, —$C_3$haloalkyl, —$C_4$haloalkyl, —$C_5$haloalkyl, —$C_6$haloalkyl, fluoromethyl, fluoroethyl, fluoropropyl, fluorobutyl, fluoropentyl, chloromethyl, chloroethyl, chloropropyl, chlorobutyl, chloropentyl, bromomethyl, bromoethyl, bromopropyl, bromobutyl, bromopentyl, iodomethyl, iodoethyl, iodopropyl, iodobutyl, iodopentyl, and the like.

In other embodiments of compounds of Formula I-H, $R^8$ is —$C_1$-$C_6$alkoxy, for example, —$C_1$alkoxy, —$C_2$alkoxy, —$C_3$alkoxy, —$C_4$alkoxy, —$C_5$alkoxy, —$C_6$alkoxy, methoxy, ethoxy, propoxy, isopropoxy, butoxy, isobutoxy, s-butoxy, t-butox, pentoxy, and the like.

In other embodiments of compounds of Formula I-H, $R^8$ is —$C_1$-$C_6$haloalkoxy, for example, —$C_1$haloalkoxy, —$C_2$haloalkoxy, —$C_3$haloalkoxy, —$C_4$haloalkoxy, —$C_5$haloalkoxy, —$C_6$haloalkoxy, halomethoxy, haloethoxy, halopropoxy, haloisopropoxy, halobutoxy, haloisobutoxy, halo-s-butoxy, halo-t-butoxy, halopentoxy, and the like.

In other embodiments, Ar is a 5-membered heteroaryl group, and the compounds of Formula I are of the Formula I-I.

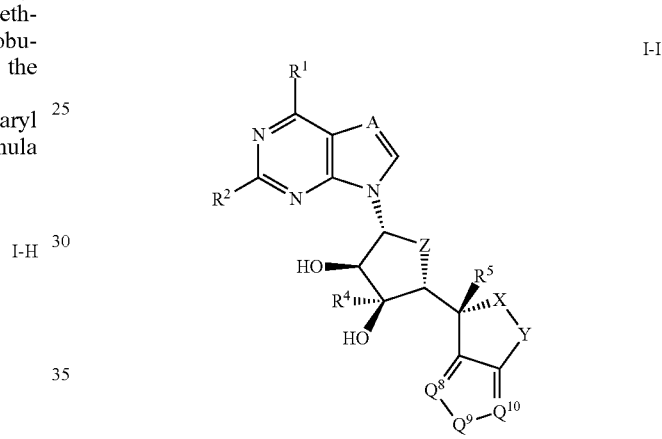

I-I wherein $Q^8$ and $Q^{10}$ are CH, C—$R^8$, or N, and $Q^9$ is NH, N($C_1$-$C_6$alkyl), S, O, or, when at least one of $Q^8$ and $Q^{10}$ is N, $Q^9$ may be $CH_2$ or CH—$R^8$; and wherein $R^8$ is halo, $C_1$-$C_6$alkyl, $C_1$-$C_6$haloalkyl, $C_1$-$C_6$alkoxy, or $C_1$-$C_6$haloalkoxy.

It will be apparent that when $Q^9$ is NH, $CH_2$, or CH—$R^8$, then the 5-membered heteroaryl group in compounds of Formula I-I may exist in tautomeric forms. All such tautomeric forms are encompassed by the present disclosure.

Thus, in some embodiments of compounds of Formula I-I, $R^8$ is halo (e.g., —F, —Cl, —Br, —I), preferably —F or —Cl. In other embodiments of compounds of Formula I-I, $R^8$ is $C_1$-$C_6$alkyl, for example, —$C_1$alkyl, —$C_2$alkyl, —$C_3$alkyl, —$C_4$alkyl, —$C_5$alkyl, —$C_6$alkyl, methyl, ethyl, propyl, isopropyl, butyl, isobutyl, s-butyl, t-butyl, pentyl, and the like.

In other embodiments of compounds of Formula I-I, $R^8$ is $C_1$-$C_6$haloalkyl, for example, —$C_1$haloalkyl, —$C_2$haloalkyl, —$C_3$haloalkyl, —$C_4$haloalkyl, —$C_5$haloalkyl, —$C_6$haloalkyl, fluoromethyl, fluoroethyl, fluoropropyl, fluorobutyl, fluoropentyl, chloromethyl, chloroethyl, chloropropyl, chlorobutyl, chloropentyl, bromomethyl, bromoethyl, bromopropyl, bromobutyl, bromopentyl, iodomethyl, iodoethyl, iodopropyl, iodobutyl, iodopentyl, and the like.

In other embodiments of compounds of Formula I-I, $R^8$ is —$C_1$-$C_6$alkoxy, for example, —$C_1$alkoxy, —$C_2$alkoxy, —$C_3$alkoxy, —$C_4$alkoxy, —$C_5$alkoxy, —$C_6$alkoxy, methoxy, ethoxy, propoxy, isopropoxy, butoxy, isobutoxy, s-butoxy, t-butox, pentoxy, and the like.

In other embodiments of compounds of Formula I-I, $R^8$ is $-C_1-C_6$haloalkoxy, for example, $-C_1$haloalkoxy, $-C_2$haloalkoxy, $-C_3$haloalkoxy, $-C_4$haloalkoxy, $-C_5$haloalkoxy, $-C_6$haloalkoxy, halomethoxy, haloethoxy, halopropoxy, haloisopropoxy, halobutoxy, haloisobutoxy, halo-s-butoxy, halo-t-butoxy, halopentoxy, and the like.

In yet other embodiments, Ar is a 5-membered heteroaryl group, and the compounds of Formula I are of the Formula I-J:

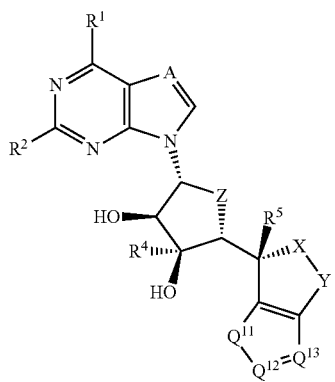

I-J wherein $Q^{12}$ and $Q^{13}$ are CH, $C-R^8$, or N, and $Q^{11}$ is NH, $N(C_1-C_6$alkyl$)$, S, O, or, when at least one of $Q^{12}$ and $Q^{13}$ is N, $Q^{11}$ may be $CH_2$ or $CH-R^8$; and wherein $R^8$ is halo, $C_1-C_6$alkyl, $C_1-C_6$haloalkyl, $C_1-C_6$alkoxy, or $C_1-C_6$haloalkoxy.

It will be apparent that when $Q^{11}$ is NH, $CH_2$, or $CH-R^8$, then the 5-membered heteroaryl group in compounds of Formula I-J may exist in tautomeric forms. All such tautomeric forms are encompassed by the present disclosure.

Thus, in some embodiments of compounds of Formula I-J, $R^8$ is halo (e.g., —F, —Cl, —Br, —I), preferably —F or —Cl. In other embodiments of compounds of Formula I-J, $R^8$ is $C_1-C_6$alkyl, for example, $-C_1$alkyl, $-C_2$alkyl, $-C_3$alkyl, $-C_4$alkyl, $-C_5$alkyl, $-C_6$alkyl, methyl, ethyl, propyl, isopropyl, butyl, isobutyl, s-butyl, t-butyl, pentyl, and the like.

In other embodiments of compounds of Formula I-J, $R^8$ is $C_1-C_6$haloalkyl, for example, $-C_1$haloalkyl, $-C_2$haloalkyl, $-C_3$haloalkyl, $-C_4$haloalkyl, $-C_5$haloalkyl, $-C_6$haloalkyl, fluoromethyl, fluoroethyl, fluoropropyl, fluorobutyl, fluoropentyl, chloromethyl, chloroethyl, chloropropyl, chlorobutyl, chloropentyl, bromomethyl, bromoethyl, bromopropyl, bromobutyl, bromopentyl, iodomethyl, iodoethyl, iodopropyl, iodobutyl, iodopentyl, and the like.

In other embodiments of compounds of Formula I-J, $R^8$ is $-C_1-C_6$alkoxy, for example, $-C_1$alkoxy, $-C_2$alkoxy, $-C_3$alkoxy, $-C_4$alkoxy, $-C_5$alkoxy, $-C_6$alkoxy, methoxy, ethoxy, propoxy, isopropoxy, butoxy, isobutoxy, s-butoxy, t-butox, pentoxy, and the like.

In other embodiments of compounds of Formula I-J, $R^8$ is $-C_1-C_6$haloalkoxy, for example, $-C_1$haloalkoxy, $-C_2$haloalkoxy, $-C_3$haloalkoxy, $-C_4$haloalkoxy, $-C_5$haloalkoxy, $-C_6$haloalkoxy, halomethoxy, haloethoxy, halopropoxy, haloisopropoxy, halobutoxy, haloisobutoxy, halo-s-butoxy, halo-t-butoxy, halopentoxy, and the like.

In some embodiments, compounds of formula I-J are those wherein A is C—H; $R^2$ is H, $R^3$ is $-NH_2$ or $-CH_3$; $R^4=R^5=H$; $X=Z=O$; $Y=-CH_2CH_2-$; $Q^{11}$ is S, $Q^{13}$ is CH, and $Q^{12}$ is $C-R^8$, wherein $R^8$ is halogen.

Some preferred embodiments of the compounds of Formula I are compounds of Formula I-A:

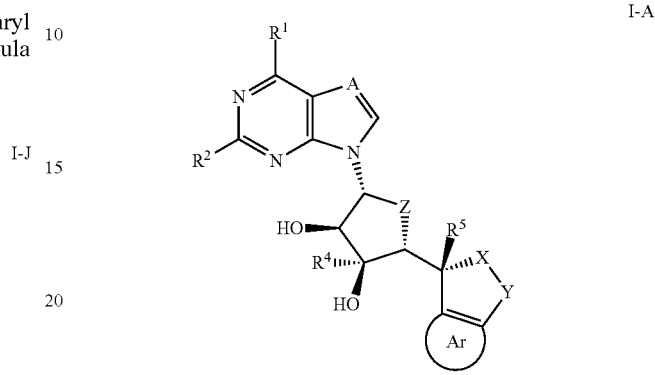

I-A or a pharmaceutically acceptable salt, or solvate thereof; wherein

A is N or $C-R^3$;

$R^1$ is halo, $NH_2$, $-C_1-C_6$alkyl, $-C_1-C_6$alkoxy, or $-C_1-C_6$alk-O-$C_1-C_6$alkyl;

$R^2$ is H, halo, $-C_1-C_6$alkyl, or $NH_2$;

$R^3$ is H, halo, $-C_1-C_6$alkyl, or $-C_1-C_6$alkoxy;

$R^4$ is H or $-C_1-C_6$alkyl;

$R^5$ is H or $-C_1-C_6$alkyl;

X is O, S, NH, or $N(C_1-C_6$alkyl$)$; and Y is $CH_2$, $-CH_2CH_2-$, $C(CH_3)_2$, $CF_2$, $C(=O)$, or $CH-C_1-C_4$alk-$NH_2$; or X is $SO_2$; and Y is $CH_2$, $-CH_2CH_2-$, $C(CH_3)_2$, $CF_2$, or $CH-C_1-C_4$alk-$NH_2$;

Z is O, $CH_2$, or $CF_2$; and

Ar is an optionally substituted 6-membered aryl ring, an optionally substituted 6-membered heteroaryl ring, or an optionally substituted 5-membered heteroaryl ring.

Other preferred embodiments of the compounds of Formula I are compounds of Formula I-A, or a pharmaceutically acceptable salt, or solvate thereof; wherein A is N or $C-R^3$;

$R^1$ is halo, $NH_2$, $-C_1-C_6$alkyl, $-C_1-C_6$alkoxy, or $-C_1-C_6$alk-O-$C_1-C_6$alkyl;

$R^2$ is H, halo, $-C_1-C_6$alkyl, or $NH_2$;

$R^3$ is H, halo, $-C_1-C_6$alkyl, or $-C_1-C_6$alkoxy;

$R^4$ is H or $-C_1-C_6$alkyl;

$R^5$ is H or $-C_1-C_6$alkyl;

X is O, S, NH, or $N(C_1-C_6$alkyl$)$;

Y is $-C(=O)-(CR^9R^{9'})_n-$, wherein n=1 or 2, each $R^9$ and $R^{9'}$ is H;

Z is O, $CH_2$, or $CF_2$; and

Ar is an optionally substituted 6-membered aryl ring, an optionally substituted 6-membered heteroaryl ring, or an optionally substituted 5-membered heteroaryl ring.

Other preferred embodiments of the compounds of Formula I are compounds of Formula I-A, or a pharmaceutically acceptable salt, or solvate thereof; wherein A is N or $C-R^3$;

$R^1$ is halo, $NH_2$, $-C_1-C_6$alkyl, $-C_1-C_6$alkoxy, or $-C_1-C_6$alk-O-$C_1-C_6$alkyl;

$R^2$ is H, halo, $-C_1-C_6$alkyl, or $NH_2$;

$R^3$ is H, halo, $-C_1-C_6$alkyl, or $-C_1-C_6$alkoxy;

$R^4$ is H or —$C_1$-$C_6$alkyl;
$R^5$ is H or —$C_1$-$C_6$alkyl;
X is O, S, $SO_2$, NH, or N($C_1$-$C_6$alkyl);
Y is —$CR^9$=$CR^{9'}$—, each $R^9$ and $R^{9'}$ is H;
Z is O, $CH_2$, or $CF_2$; and
Ar is an optionally substituted 6-membered aryl ring, an optionally substituted 6-membered heteroaryl ring, or an optionally substituted 5-membered heteroaryl ring.

Other preferred embodiments of the compounds of Formula I are compounds of Formula I-A, or a pharmaceutically acceptable salt, or solvate thereof; wherein A is N or C—$R^3$;
$R^1$ is halo, $NH_2$, —$C_1$-$C_6$alkyl, —$C_1$-$C_6$alkoxy, or —$C_1$-$C_6$alk-O—$C_1$-$C_6$alkyl;
$R^2$ is H, halo, —$C_1$-$C_6$alkyl, or $NH_2$;
$R^3$ is H, halo, —$C_1$-$C_6$alkyl, or —$C_1$-$C_6$alkoxy;
$R^4$ is H or —$C_1$-$C_6$alkyl;
$R^5$ is H or —$C_1$-$C_6$alkyl;
X is O, S, NH, or N($C_1$-$C_6$alkyl);
Y is —C(=O)—O—$(CR^9R^{9'})_n$— wherein n=1 or 2 and each $R^9$ and $R^{9'}$ is H;
Z is O, $CH_2$, or $CF_2$; and
Ar is an optionally substituted 6-membered aryl ring, an optionally substituted 6-membered heteroaryl ring, or an optionally substituted 5-membered heteroaryl ring.

Other preferred embodiments of the compounds of Formula I are compounds of Formula I-A-1:

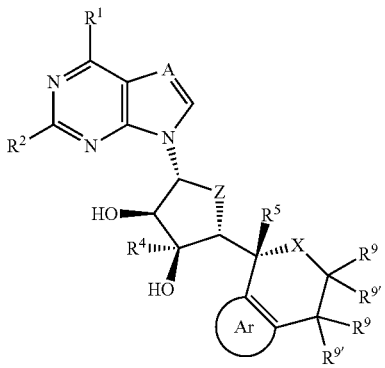

I-A-1 or a pharmaceutically acceptable salt, or solvate thereof; wherein

A is N or C—$R^3$;
$R^1$ is halo, $NH_2$, —$C_1$-$C_6$alkyl, —$C_1$-$C_6$alkoxy, or —$C_1$-$C_6$alk-O—$C_1$-$C_6$alkyl;
$R^2$ is H, halo, —$C_1$-$C_6$alkyl, or $NH_2$;
$R^3$ is H, halo, —$C_1$-$C_6$alkyl, or —$C_1$-$C_6$alkoxy;
$R^4$ is H or —$C_1$-$C_6$alkyl;
$R^5$ is H or —$C_1$-$C_6$alkyl;
X is O, S, $SO_2$, NH, or N($C_1$-$C_6$alkyl);
each $R^9$ is independently selected from H, D, F, OH, $OCH_3$, $CH_3$, or $CF_3$; each $R^{9'}$ is independently selected from H, D, F, OH, $OCH_3$, $CH_3$, or $CF_3$;
Z is O, $CH_2$, or $CF_2$; and
Ar is an optionally substituted 6-membered aryl ring, an optionally substituted 6-membered heteroaryl ring, or an optionally substituted 5-membered heteroaryl ring.

Other preferred embodiments of the compounds of Formula I are compounds of Formula I-A-2:

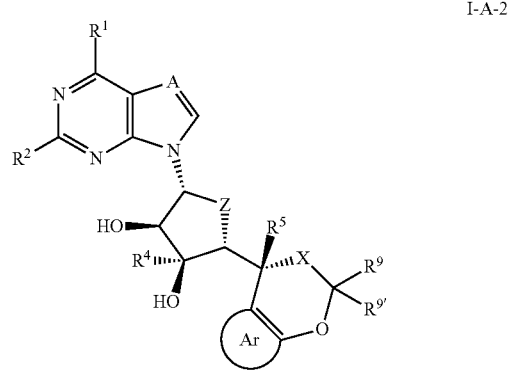

I-A-2 or a pharmaceutically acceptable salt, or solvate thereof; wherein

A is N or C—$R^3$;
$R^1$ is halo, $NH_2$, —$C_1$-$C_6$alkyl, —$C_1$-$C_6$alkoxy, or —$C_1$-$C_6$alk-O—$C_1$-$C_6$alkyl;
$R^2$ is H, halo, —$C_1$-$C_6$alkyl, or $NH_2$;
$R^3$ is H, halo, —$C_1$-$C_6$alkyl, or —$C_1$-$C_6$alkoxy;
$R^4$ is H or —$C_1$-$C_6$alkyl;
$R^5$ is H or —$C_1$-$C_6$alkyl;
X is O, S, $SO_2$, NH, or N($C_1$-$C_6$alkyl);
each $R^9$ is independently selected from H, D, or F; each $R^{9'}$ is independently selected from H, D, or F;
Z is O, $CH_2$, or $CF_2$; and
Ar is an optionally substituted 6-membered aryl ring, an optionally substituted 6-membered heteroaryl ring, or an optionally substituted 5-membered heteroaryl ring.

In some preferred embodiments, the compounds of Formula I-A-2 are those wherein A is C—$R^3$; $R^1$ is —$NH_2$ or —$CH_3$; $R^2$=$R^3$=$R^4$=$R^5$=$R^9$=$R^{9'}$=H; Z is O; X is O; and Ar is a phenyl ring substituted with 1-2 halogen atoms.

Other preferred embodiments of the compounds of Formula I are compounds of Formula I-A-3:

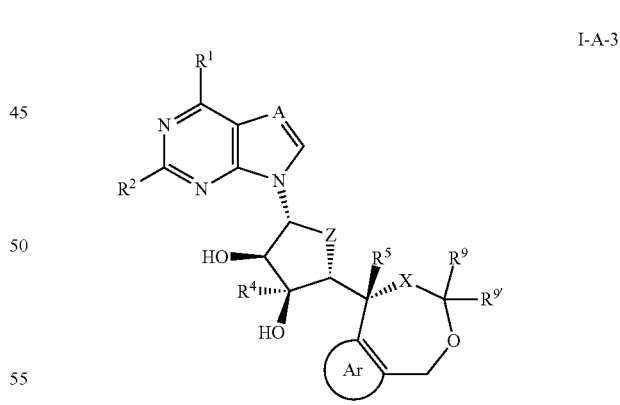

I-A-3 or a pharmaceutically acceptable salt, or solvate thereof; wherein

A is N or C—$R^3$;
$R^1$ is halo, $NH_2$, —$C_1$-$C_6$alkyl, —$C_1$-$C_6$alkoxy, or —$C_1$-$C_6$alk-O—$C_1$-$C_6$alkyl;
$R^2$ is H, halo, —$C_1$-$C_6$alkyl, or $NH_2$;
$R^3$ is H, halo, —$C_1$-$C_6$alkyl, or —$C_1$-$C_6$alkoxy;
$R^4$ is H or —$C_1$-$C_6$alkyl;
$R^5$ is H or —$C_1$-$C_6$alkyl;
X is O, S, $SO_2$, NH, or N($C_1$-$C_6$alkyl);

R$^9$ is selected from H, D, or F; R$^{9'}$ is selected from H, D, or F;

Z is O, CH$_2$, or CF$_2$; and

Ar is an optionally substituted 6-membered aryl ring, an optionally substituted 6-membered heteroaryl ring, or an optionally substituted 5-membered heteroaryl ring.

In some preferred embodiments, the compounds of Formula I-A-3 are those wherein A is C—R$^3$; R$^1$ is —NH$_2$ or —CH$_3$; R$^2$=R$^3$=R$^4$=R$^5$=R$^9$=R$^{9'}$=H; Z is O; X is O; and Ar is a phenyl ring substituted with 1-2 halogen atoms.

Other preferred embodiments of the compounds of Formula I are compounds of Formula I-A-4:

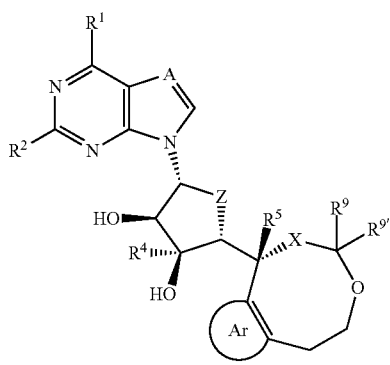

I-A-4 or a pharmaceutically acceptable salt, or solvate thereof; wherein

A is N or C—R$^3$;

R$^1$ is halo, NH$_2$, —C$_1$-C$_6$alkyl, —C$_1$-C$_6$alkoxy, or —C$_1$-C$_6$alk-O—C$_1$-C$_6$alkyl;

R$^2$ is H, halo, —C$_1$-C$_6$alkyl, or NH$_2$;

R$^3$ is H, halo, —C$_1$-C$_6$alkyl, or —C$_1$-C$_6$alkoxy;

R$^4$ is H or —C$_1$-C$_6$alkyl;

R$^5$ is H or —C$_1$-C$_6$alkyl;

X is O, S, SO$_2$, NH, or N(C$_1$-C$_6$alkyl);

R$^9$ is selected from H, D, or F; R$^{9'}$ is selected from H, D, or F;

Z is O, CH$_2$, or CF$_2$; and

Ar is an optionally substituted 6-membered aryl ring, an optionally substituted 6-membered heteroaryl ring, or an optionally substituted 5-membered heteroaryl ring.

In other preferred embodiments, the compounds of the disclosure are compounds of Formula I-G-1

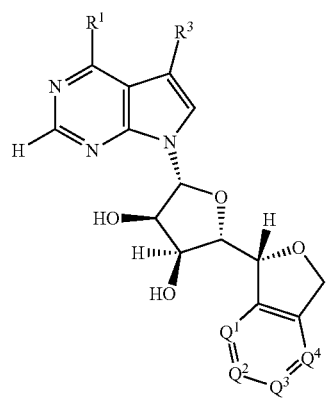

I-G-1 wherein R$^1$ is NH$_2$, —C$_1$-C$_6$alkyl, or —C$_1$-C$_6$alk-O—C$_1$-C$_6$alkyl; R$^3$ is H or halo; and Q$^1$, Q$^2$, Q$^3$, and Q$^4$ are each independently selected from N, CH, or C—R$^8$, wherein R$^8$ is halo, —C$_1$haloalkyl, or C$_1$haloalkoxy.

In some preferred embodiments, the compounds of Formula I-G-1 are those wherein R$^1$ is NH$_2$, —CH$_3$, or —CH$_2$—O—CH$_2$CH$_3$; R$^3$ is H or F; and Q$^1$, Q$^2$, Q$^3$, and Q$^4$ are each independently selected from N, CH, or C—R$^8$, wherein R$^8$ is —F, —Cl, —CF$_3$, or —OCF$_3$.

In other preferred embodiments, the compounds of Formula I-G-1 are those wherein R$^1$ is NH$_2$; R$^3$ is H; and Q$^1$, Q$^2$, Q$^3$, and Q$^4$ are each independently selected from N, CH, or C—R$^8$, wherein R$^8$ is —F, —Cl, —CF$_3$, or —OCF$_3$. In some preferred embodiments, the compounds of Formula I-G-1 are those wherein R$^1$ is NH$_2$; R$^3$ is H; and Q$^1$, Q$^2$, Q$^3$, and Q$^4$ are each independently selected from N, CH, or C—R$^8$, wherein at least one of Q$^1$, Q$^2$, Q$^3$, and Q$^4$ is C—R$^8$, and wherein R$^8$ is —F, —Cl, —CF$_3$, or —OCF$_3$.

In other preferred embodiments, the compounds of Formula I-G-1 are those wherein R$^1$ is —CH$_3$; R$^3$ is H; and Q$^1$, Q$^2$, Q$^3$, and Q$^4$ are each independently selected from N, CH, or C—R$^8$, wherein R$^8$ is —F, —Cl, —CF$_3$, or —OCF$_3$. In some preferred embodiments, the compounds of Formula I-G-1 are those wherein R$^1$ is —CH$_3$; R$^3$ is H; and Q$^1$, Q$^2$, Q$^3$, and Q$^4$ are each independently selected from N, CH, or C—R$^8$, wherein at least one of Q$^1$, Q$^2$, Q$^3$, and Q$^4$ is C—R$^8$, and wherein R$^8$ is —F, —Cl, —CF$_3$, or —OCF$_3$.

In other preferred embodiments, the compounds of Formula I-G-1 are those wherein R$^1$ is NH$_2$; R$^3$ is H; and Q$^1$, Q$^2$, Q$^3$, and Q$^4$ are each independently selected from CH, or C—R$^8$, wherein R$^8$ is —F, —Cl, —CF$_3$, or —OCF$_3$. In other preferred embodiments, the compounds of Formula I-G-1 are those wherein R$^1$ is —CH$_3$; R$^3$ is H; and Q$^1$, Q$^2$, Q$^3$, and Q$^4$ are each independently selected from CH, or C—R$^8$, wherein R$^8$ is —F, —Cl, —CF$_3$, or —OCF$_3$.

In other preferred embodiments, the compounds of Formula I-G-1 are those wherein R$^1$ is NH$_2$; R$^3$ is H; and Q$^1$, Q$^2$, Q$^3$, and Q$^4$ are each independently selected from N, CH, or C—R$^8$, wherein R$^8$ is —F or —Cl. In some preferred embodiments, the compounds of Formula I-G-1 are those wherein R$^1$ is NH$_2$; R$^3$ is H; and Q$^1$, Q$^2$, Q$^3$, and Q$^4$ are each independently selected from N, CH, or C—R$^8$, wherein at least one of Q$^1$, Q$^2$, Q$^3$, and Q$^4$ is C—R$^8$, and wherein R$^8$ is —F or —Cl.

In other preferred embodiments, the compounds of Formula I-G-1 are those wherein R$^1$ is —CH$_3$; R$^3$ is H; and Q$^1$, Q$^2$, Q$^3$, and Q$^4$ are each independently selected from N, CH, or C—R$^8$, wherein R$^8$ is —F or —Cl. In some preferred embodiments, the compounds of Formula I-G-1 are those wherein R$^1$ is —CH$_3$; R$^3$ is H; and Q$^1$, Q$^2$, Q$^3$, and Q$^4$ are each independently selected from N, CH, or C—R$^8$, wherein at least one of Q$^1$, Q$^2$, Q$^3$, and Q$^4$ is C—R$^8$, and wherein R$^8$ is —F or —Cl.

In other preferred embodiments, the compounds of Formula I-G-1 are those wherein R$^1$ is NH$_2$; R$^3$ is H; and Q$^1$, Q$^2$, Q$^3$, and Q$^4$ are each independently selected from CH, or C—R$^8$, wherein R$^8$ is —F or —Cl. In other preferred embodiments, the compounds of Formula I-G-1 are those wherein R$^1$ is —CH$_3$; R$^3$ is H; and Q$^1$, Q$^2$, Q$^3$, and Q$^4$ are each independently selected from CH, or C—R$^8$, wherein R$^8$ is —F or —Cl.

In other preferred embodiments, the compounds of the disclosure are compounds of Formula I-G-2:

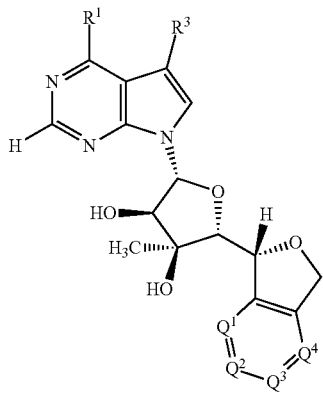

I-G-2 wherein $R^1$ is $NH_2$ or —$C_1$-$C_6$alkyl; $R^3$ is H or halo; and $Q^1$, $Q^2$, $Q^3$, and $Q^4$ are each independently selected from CH, or C—$R^8$, wherein $R^8$ is halo, —$C_1$haloalkyl, or $C_1$haloalkoxy.

In some preferred embodiments, the compounds of Formula I-G-2 are those wherein $R^1$ is $NH_2$ or —$CH_3$; $R^3$ is H or F; and $Q^1$, $Q^2$, $Q^3$, and $Q^4$ are each independently selected from N, CH, or C—$R^8$, wherein $R^8$ is —F, —Cl, —$CF_3$, or —$OCF_3$.

In other preferred embodiments, the compounds of Formula I-G-2 are those wherein $R^1$ is $NH_2$; $R^3$ is H; and $Q^1$, $Q^2$, $Q^3$, and $Q^4$ are each independently selected from N, CH, or C—$R^8$, wherein $R^8$ is —F, —Cl, —$CF_3$, or —$OCF_3$. In some preferred embodiments, the compounds of Formula I-G-2 are those wherein $R^1$ is $NH_2$; $R^3$ is H; and $Q^1$, $Q^2$, $Q^3$, and $Q^4$ are each independently selected from N, CH, or C—$R^8$, wherein at least one of $Q^1$, $Q^2$, $Q^3$, and $Q^4$ is C—$R^8$, and wherein $R^8$ is —F, —Cl, —$CF_3$, or —$OCF_3$.

In other preferred embodiments, the compounds of Formula I-G-2 are those wherein $R^1$ is —$CH_3$; $R^3$ is H; and $Q^1$, $Q^2$, $Q^3$, and $Q^4$ are each independently selected from N, CH, or C—$R^8$, wherein $R^8$ is —F, —Cl, —$CF_3$, or —$OCF_3$. In some preferred embodiments, the compounds of Formula I-G-2 are those wherein $R^1$ is —$CH_3$; $R^3$ is H; and $Q^1$, $Q^2$, $Q^3$, and $Q^4$ are each independently selected from N, CH, or C—$R^8$, wherein at least one of $Q^1$, $Q^2$, $Q^3$, and $Q^4$ is C—$R^8$, and wherein $R^8$ is —F, —Cl, —$CF_3$, or —$OCF_3$.

In other preferred embodiments, the compounds of Formula I-G-2 are those wherein $R^1$ is $NH_2$; $R^3$ is H; and $Q^1$, $Q^2$, $Q^3$, and $Q^4$ are each independently selected from CH, or C—$R^8$, wherein $R^8$ is —F or —Cl. In other preferred embodiments, the compounds of Formula I-G-2 are those wherein $R^1$ is —$CH_3$; $R^3$ is H; and $Q^1$, $Q^2$, $Q^3$, and $Q^4$ are each independently selected from CH, or C—$R^8$, wherein $R^8$ is —F or —Cl.

In other preferred embodiments, the compounds of Formula I-G-2 are those wherein $R^1$ is $NH_2$; $R^3$ is H; and $Q^1$, $Q^2$, $Q^3$, and $Q^4$ are each independently selected from N, CH, or C—$R^8$, wherein $R^8$ is —F or —Cl. In some preferred embodiments, the compounds of Formula I-G-2 are those wherein $R^1$ is $NH_2$; $R^3$ is H; and $Q^1$, $Q^2$, $Q^3$, and $Q^4$ are each independently selected from N, CH, or C—$R^8$, wherein at least one of $Q^1$, $Q^2$, $Q^3$, and $Q^4$ is C—$R^8$, and wherein $R^8$ is —F or —Cl.

In other preferred embodiments, the compounds of Formula I-G-2 are those wherein $R^1$ is —$CH_3$; $R^3$ is H; and $Q^1$, $Q^2$, $Q^3$, and $Q^4$ are each independently selected from N, CH, or C—$R^8$, wherein $R^8$ is —F or —Cl. In some preferred embodiments, the compounds of Formula I-G-2 are those wherein $R^1$ is —$CH_3$; $R^3$ is H; and $Q^1$, $Q^2$, $Q^3$, and $Q^4$ are each independently selected from N, CH, or C—$R^8$, wherein at least one of $Q^1$, $Q^2$, $Q^3$, and $Q^4$ is C—$R^8$, and wherein $R^8$ is —F or —Cl.

In other preferred embodiments, the compounds of Formula I-G-2 are those wherein $R^1$ is $NH_2$; $R^3$ is H; and $Q^1$, $Q^2$, $Q^3$, and $Q^4$ are each independently selected from CH, or C—$R^8$, wherein $R^8$ is —F or —Cl. In other preferred embodiments, the compounds of Formula I-G-2 are those wherein $R^1$ is —$CH_3$; $R^3$ is H; and $Q^1$, $Q^2$, $Q^3$, and $Q^4$ are each independently selected from CH, or C—$R^8$, wherein $R^8$ is —F or —Cl.

In other preferred embodiments, the compounds of formula I-G-2 are those wherein wherein $R^1$ is $NH_2$, —$C_1$-$C_6$alkyl, or —$C_1$-$C_6$alk-O—$C_1$-$C_6$alkyl; $R^3$ is H or halo; Y is —(CR$^9$R$^{9'}$)$_n$—, —CR$^9$=CR$^{9'}$—, C(=O), —C(=O)—(CR$^9$R$^{9'}$)$_n$—, —C(=O)—O—(CR$^9$R$^{9'}$)$_n$—, —CR$^9$R$^{9'}$—O—(CR$^9$R$^{9'}$)$_n$—O—(CR$^9$R$^{9'}$)$_m$—, —(CR$^9$R$^{9'}$)$_n$—NR$^{10}$—, —C(=O)NR$^{10}$—; n=1 or 2; m=1 or 2; $R^9$ and $R^{9'}$ are each independently H, D, $CH_3$, $CF_3$, OH, $OCH_3$, or F; $R^{10}$ is H or $C_1$-$C_6$alkyl; each and $Q^1$, $Q^2$, $Q^3$, and $Q^4$ are each independently selected from N, CH, or C—$R^8$, wherein $R^8$ is halo, —$C_1$haloalkyl, or $C_1$haloalkoxy.

In some preferred embodiments, the compounds of Formula I-G-2 are those wherein $R^1$ is $NH_2$ or —$CH_3$; $R^3$ is H or F; Y is —$CH_2CH_2$—, —$CH_2CH(C_1$-$C_6$alkoxy)-, —$CH_2CH(OCH_3)$—, —CH(OH)$CH_2$—, —CH($C_1$-$C_6$alkyl)$CH_2$—, —CH($CH_3$)$CH_2$—, —$CH_2C(C_1$-$C_6$alkyl)$_2$-, —$CH_2C(CH_3)_2$—, —CH($C_1$-$C_6$haloalkyl)$CH_2$—, —$CH_2CH(CF_3)$—, —$CH_2CHF$—, —$CH_2CF_2$—, —$CH_2CD_2$—, —CH=CH—, —C(=O)—$CH_2$—, —C(=O)—O—$CH_2$—, —C(=O)—O—$CH_2CH_2$—, —$CH_2$—O—, —$CF_2$—O—, —$CH_2$—O—$CH_2$—, —$CF_2$—O—$CH_2$—, —$CH_2$—O—$CH_2CH_2$—, —$CF_2$—O—$CH_2CH_2$—; and $Q^1$, $Q^2$, $Q^3$, and $Q^4$ are each independently selected from N, CH, or C—$R^8$, wherein $R^8$ is —F, —Cl, —$CF_3$, or —$OCF_3$.

In other preferred embodiments, the compounds of Formula I-G-2 are those wherein $R^1$ is $NH_2$ or —$CH_3$; $R^3$ is H; Y is —$CH_2CH_2$—, —CH($OCH_3$)$CH_2$—, —CH(OH)$CH_2$—, —$CH_2CH(CH_3)$—, —$CH_2C(C_1$-$C_6$alkyl)$_2$-, —$CH_2C(CH_3)_2$—, —$CH_2CH(CF_3)$—, —$CH_2CHF$—, —$CH_2CF_2$—, —$CH_2CD_2$-, —CH=CH—, —C(=O)$CH_2$—, —C(=O)—O—$CH_2$—, —C(=O)—O—$CH_2CH_2$—, —$CH_2$—O—, —$CF_2$—O—, —$CH_2$—O—$CH_2$—, —$CF_2$—O—$CH_2$—, —$CH_2$—O—$CH_2CH_2$—, —$CF_2$—O—$CH_2CH_2$—; and $Q^1$, $Q^2$, $Q^3$, and $Q^4$ are each independently selected from N, CH, or C—$R^8$, wherein $R^8$ is —F or —Cl.

In some preferred embodiments, the compounds of the disclosure are compounds of Formula I-G-3

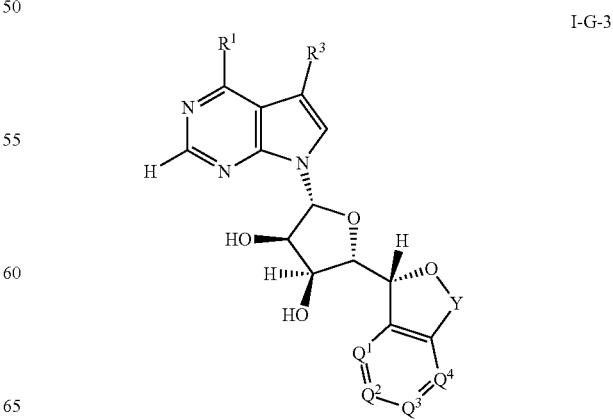

I-G-3 wherein $R^1$ is $NH_2$, $—C_1$-$C_6$alkyl, or $—C_1$-$C_6$alk-O—$C_1$-$C_6$alkyl; $R^3$ is H or halo; Y is $—CH_2CH_2—$, $C(CH_3)_2$, $CF_2$, or $C(=O)$; and $Q^1$, $Q^2$, $Q^3$, and $Q^4$ are each independently selected from N, CH, or C—$R^8$, wherein $R^8$ is halo, —$C_1$haloalkyl, or $C_1$haloalkoxy.

In some preferred embodiments, the compounds of Formula I-G-3 are those wherein $R^1$ is $NH_2$,—$CH_3$, or —$CH_2$—O—$CH_2CH_3$; $R^3$ is H or F; Y is $—CH_2CH_2—$, $C(CH_3)_2$, $CF_2$, or $C(=O)$; and $Q^1$, $Q^2$, $Q^3$, and $Q^4$ are each independently selected from N, CH, or C—$R^8$, wherein $R^8$ is —F, —Cl, —$CF_3$, or —$OCF_3$.

In other preferred embodiments, the compounds of Formula I-G-3 are those wherein $R^1$ is $NH_2$; $R^3$ is H; Y is $—CH_2CH_2—$, $C(CH_3)_2$, $CF_2$, or $C(=O)$; and $Q^1$, $Q^2$, $Q^3$, and $Q^4$ are each independently selected from N, CH, or C—$R^8$, wherein $R^8$ is —F, —Cl, —$CF_3$, or —$OCF_3$. In other preferred embodiments, the compounds of Formula I-G-3 are those wherein $R^1$ is —$CH_3$; $R^3$ is H; Y is $—CH_2CH_2—$, $C(CH_3)_2$, $CF_2$, or $C(=O)$; and $Q^1$, $Q^2$, $Q^3$, and $Q^4$ are each independently selected from N, CH, or C—$R^8$, wherein $R^8$ is —F, —Cl, —$CF_3$, or —$OCF_3$.

In other preferred embodiments, the compounds of Formula I-G-3 are those wherein $R^1$ is $NH_2$; $R^3$ is H; Y is $—CH_2CH_2—$, $C(CH_3)_2$, $CF_2$, or $C(=O)$; and $Q^1$, $Q^2$, $Q^3$, and $Q^4$ are each independently selected from CH, or C—$R^8$, wherein $R^8$ is —F, —Cl, —$CF_3$, or —$OCF_3$. In other preferred embodiments, the compounds of Formula I-G-3 are those wherein $R^1$ is —$CH_3$; $R^3$ is H; Y is $—CH_2CH_2—$, $C(CH_3)_2$, $CF_2$, or $C(=O)$; and $Q^1$, $Q^2$, $Q^3$, and $Q^4$ are each independently selected from CH, or C—$R^8$, wherein $R^8$ is —F, —Cl, —$CF_3$, or —$OCF_3$.

In other preferred embodiments, the compounds of Formula I-G-3 are those wherein $R^1$ is $NH_2$; $R^3$ is H; Y is $—CH_2CH_2—$, $C(CH_3)_2$, $CF_2$, or $C(=O)$; and $Q^1$, $Q^2$, $Q^3$, and $Q^4$ are each independently selected from N, CH, or C—$R^8$, wherein $R^8$ is —F or —Cl. In other preferred embodiments, the compounds of Formula I-G-3 are those wherein $R^1$ is —$CH_3$; $R^3$ is H; Y is $—CH_2CH_2—$, $C(CH_3)_2$, $CF_2$, or $C(=O)$; and $Q^1$, $Q^2$, $Q^3$, and $Q^4$ are each independently selected from N, CH, or C—$R^8$, wherein $R^8$ is —F or —Cl.

In other preferred embodiments, the compounds of Formula I-G-3 are those wherein $R^1$ is $NH_2$; $R^3$ is H; Y is $—CH_2CH_2—$, $C(CH_3)_2$, $CF_2$, or $C(=O)$; and $Q^1$, $Q^2$, $Q^3$, and $Q^4$ are each independently selected from CH, or C—$R^8$, wherein $R^8$ is —F or —Cl. In other preferred embodiments, the compounds of Formula I-G-3 are those wherein $R^1$ is —$CH_3$; $R^3$ is H; Y is $—CH_2CH_2—$, $C(CH_3)_2$, $CF_2$, or $C(=O)$; and $Q^1$, $Q^2$, $Q^3$, and $Q^4$ are each independently selected from CH, or C—$R^8$, wherein $R^8$ is —F or —Cl.

In other preferred embodiments, the compounds of formula I-G-3 are those wherein wherein $R^1$ is $NH_2$, —$C_1$-$C_6$alkyl, or —$C_1$-$C_6$alk-O—$C_1$-$C_6$alkyl; $R^3$ is H or halo; Y is $—(CR^9R^{9'})_n—$, $—CR^9=CR^{9'}—$, $—C(=O)—(CR^9R^{9'})_n—$, $—C(=O)—O—(CR^9R^{9'})_n—$, $—CR^9R^{9'}\text{-}O$, $—(CR^9R^{9'})_n—O—(CR^9R^{9'})_m—$, n=1 or 2, $R^9$ and $R^{9'}$ are each independently H, D, $CH_3$, $CF_3$, OH, $OCH_3$, of F; each and $Q^1$, $Q^2$, $Q^3$, and $Q^4$ are each independently selected from N, CH, or C—$R^8$, wherein $R^8$ is halo, —$C_1$haloalkyl, or $C_1$haloalkoxy.

In some preferred embodiments, the compounds of Formula I-G-3 are those wherein $R^1$ is $NH_2$ or —$CH_3$; $R^3$ is H or F; Y is $—CH_2CH_2—$, $—CH_2CH(C_1$-$C_6$alkoxy)-, $—CH_2CH(OCH_3)—$, $—CH(OH)CH_2—$, $—CH(C_1$-$C_6$alkyl)$CH_2—$, $—CH(CH_3)CH_2—$, $—CH_2C(C_1$-$C_6$alkyl)$_2$-, $—CH_2C(CH_3)_2—$, $—CH(C_1$-$C_6$haloalkyl)$CH_2—$, $—CH_2CH(CF_3)—$, $—CH_2CHF—$, $—CH_2CF_2—$, $—CH_2CD_2—$, $—CH=CH—$, $—C(=O)—CH_2—$, $—C(=O)—O—CH_2—$, $—C(=O)—O—CH_2CH_2—$, $—CH_2—O—$, $—CF_2—O—$, $—CH_2—O—CH_2—$, $—CF_2—O—CH_2—$, $—CH_2—O—CH_2CH_2—$, $—CF_2—O—CH_2CH_2—$, and $Q^1$, $Q^2$, $Q^3$, and $Q^4$ are each independently selected from N, CH, or C—$R^8$, wherein $R^8$ is —F, —Cl, —$CF_3$, or —$OCF_3$.

In other preferred embodiments, the compounds of Formula I-G-3 are those wherein $R^1$ is $NH_2$ or —$CH_3$; $R^3$ is H; Y is $—CH_2CH_2—$, $—CH(OCH_3)CH_2—$, $—CH(OH)CH_2—$, $—CH_2CH(CH_3)—$, $—CH_2C(C_1$-$C_6$alkyl)$_2$-, $—CH_2C(CH_3)_2—$, $—CH_2CH(CF_3)—$, $—CH_2CHF—$, $—CH_2CF_2—$, $—CH_2CD_2$-, $—CH=CH—$, $—C(=O)CH_2—$, $—C(=O)—O—CH_2—$, $—C(=O)—O—CH_2CH_2—$, $—CH_2—O—$, $—CF_2—O—$, $—CH_2—O—CH_2—$, $—CF_2—O—CH_2—$, $—CH_2—O—CH_2CH_2—$, $—CF_2—O—CH_2CH_2—$; and $Q^1$, $Q^2$, $Q^3$, and $Q^4$ are each independently selected from N, CH, or C—$R^8$, wherein $R^8$ is —F or —Cl.

In other preferred embodiments, the compounds of Formula I-G-3 are those wherein $R^1$ is $NH_2$, —$CH_3$, or —$CD_3$; $R^3$ is H or F; Y is $—CH_2CH_2—$, $—CH_2CH_2CH_2—$, $—C(=O)CH_2—$, or $—CH_2CHF—$; and $Q^1$, $Q^2$, $Q^3$, and $Q^4$ are each independently selected from N, CH, or C—$R^8$, wherein $R^8$ is —F, —Cl, or —$CH_3$.

In other preferred embodiments, the compounds of Formula I-G-3 are those wherein $R^1$ is $NH_2$, —$CH_3$, or —$CD_3$; $R^3$ is H or F; Y is $—CH_2CH_2—$, $—CH_2CH_2CH_2—$, $—C(=O)CH_2—$, or $—CH_2CHF—$; and $Q^1$, $Q^2$, and $Q^4$ are each independently selected from CH or C—$R^8$, wherein $R^8$ is —F, —Cl, or —$CH_3$; and $Q^3$ is C—$R^8$, wherein $R^8$ is —Cl.

In other preferred embodiments, the compounds of Formula I-G-3 are those wherein $R^1$ is $NH_2$, or —$CH_3$; $R^3$ is H; Y is $—CH_2CH_2—$, $—CH_2CH_2CH_2—$, $—C(=O)CH_2—$, or $—CH_2CHF—$; and $Q^1$, $Q^2$, and $Q^4$ are each independently selected from CH or C—$R^8$, wherein $R^8$ is —F, —Cl, or —$CH_3$; and $Q^3$ is C—$R^8$, wherein $R^8$ is —Cl.

In other preferred embodiments, the compounds of Formula I-G-3 are those wherein $R^1$ is $NH_2$, —$CH_3$, or —$CD_3$; $R^3$ is H or F; Y is $—CH_2CH_2—$, $—CH_2CH_2CH_2—$, $—C(=O)CH_2—$, or $—CH_2CHF—$; and $Q^1$ is CH; $Q^2$ and $Q^4$ are each independently selected from CH or C—$R^8$, wherein $R^8$ is —F, —Cl, or —$CH_3$; and $Q^3$ is C—$R^8$, wherein $R^8$ is —Cl.

In other preferred embodiments, the compounds of Formula I-G-3 are those wherein $R^1$ is $NH_2$, or —$CH_3$; $R^3$ is H; Y is $—CH_2CH_2—$, $—CH_2CH_2CH_2—$, $—C(=O)CH_2—$, or $—CH_2CHF—$; and $Q^1$ is CH; $Q^2$, and $Q^4$ are each independently selected from CH or C—$R^8$, wherein $R^8$ is —F, —Cl, or —$CH_3$; and $Q^3$ is C—$R^8$, wherein $R^8$ is —Cl.

In some preferred embodiments, the compounds of the disclosure are compounds of Formula I-G-4

I-G-4

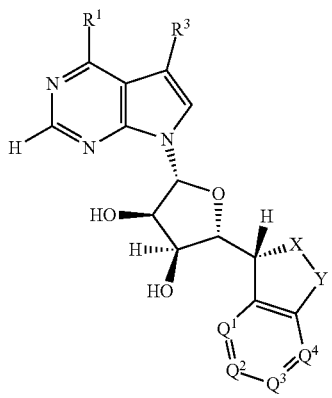

wherein $R^1$ is $NH_2$, —$C_1$-$C_6$alkyl, or —$C_1$-$C_6$alk-O—$C_1$-$C_6$alkyl; $R^3$ is H or halo; X is S, NH, or N($C_1$-$C_6$alkyl); Y is $CH_2$, or C(═O); and $Q^1$, $Q^2$, $Q^3$, and $Q^4$ are each independently selected from N, CH, or C—$R^8$, wherein $R^8$ is halo, —$C_1$haloalkyl, or $C_1$haloalkoxy.

In some preferred embodiments, the compounds of Formula I-G-4 are those wherein $R^1$ is $NH_2$, —$CH_3$, or —$CH_2$—O—$CH_2CH_3$; $R^3$ is H or F; X is S, NH, or N($C_1$-$C_6$alkyl); Y is $CH_2$, or C(═O); and $Q^1$, $Q^2$, $Q^3$, and $Q^4$ are each independently selected from N, CH, or C—$R^8$, wherein $R^8$ is —F, —Cl, —$CF_3$, or —$OCF_3$.

In other preferred embodiments, the compounds of Formula I-G-4 are those wherein $R^1$ is $NH_2$; $R^3$ is H; X is S, $SO_2$, NH, or N($C_1$-$C_6$alkyl); Y is $CH_2$, or C(═O); and $Q^1$, $Q^2$, $Q^3$, and $Q^4$ are each independently selected from N, CH, or C—$R^8$, wherein $R^8$ is —F, —Cl, —$CF_3$, or —$OCF_3$. In other preferred embodiments, the compounds of Formula I-G-4 are those wherein $R^1$ is —$CH_3$; $R^3$ is H; X is S, NH, or N($C_1$-$C_6$alkyl); Y is $CH_2$, or C(═O); and $Q^1$, $Q^2$, $Q^3$, and $Q^4$ are each independently selected from N, CH, or C—$R^8$, wherein $R^8$ is —F, —Cl, —$CF_3$, or —$OCF_3$.

In other preferred embodiments, the compounds of Formula I-G-4 are those wherein $R^1$ is $NH_2$; $R^3$ is H; X is S, NH, or N($C_1$-$C_6$alkyl); Y is $CH_2$, or C(═O); and $Q^1$, $Q^2$, $Q^3$, and $Q^4$ are each independently selected from CH, or C—$R^8$, wherein $R^8$ is —F, —Cl, —$CF_3$, or —$OCF_3$. In other preferred embodiments, the compounds of Formula I-G-4 are those wherein $R^1$ is —$CH_3$; $R^3$ is H; X is S, NH, or N($C_1$-$C_6$alkyl); Y is $CH_2$, or C(═O); and $Q^1$, $Q^2$, $Q^3$, and $Q^4$ are each independently selected from CH, or C—$R^8$, wherein $R^8$ is —F, —Cl, —$CF_3$, or —$OCF_3$.

In other preferred embodiments, the compounds of Formula I-G-4 are those wherein $R^1$ is $NH_2$; $R^3$ is H; X is S, NH, or N($C_1$-$C_6$alkyl); Y is $CH_2$, or C(═O); and $Q^1$, $Q^2$, $Q^3$, and $Q^4$ are each independently selected from N, CH, or C—$R^8$, wherein $R^8$ is —F or —Cl. In other preferred embodiments, the compounds of Formula I-G-4 are those wherein $R^1$ is —$CH_3$; $R^3$ is H; X is S, NH, or N($C_1$-$C_6$alkyl); Y is $CH_2$, or C(═O); and $Q^1$, $Q^2$, $Q^3$, and $Q^4$ are each independently selected from N, CH, or C—$R^8$, wherein $R^8$ is —F or —Cl.

In other preferred embodiments, the compounds of Formula I-G-4 are those wherein $R^1$ is $NH_2$; $R^3$ is H; X is S, NH, or N($C_1$-$C_6$alkyl); Y is $CH_2$, or C(═O); and $Q^1$, $Q^2$, $Q^3$, and $Q^4$ are each independently selected from CH, or C—$R^8$, wherein $R^8$ is —F or —Cl. In other preferred embodiments, the compounds of Formula I-G-4 are those wherein $R^1$ is —$CH_3$; $R^3$ is H; X is S, NH, or N($C_1$-$C_6$alkyl); Y is $CH_2$, or C(═O); and $Q^1$, $Q^2$, $Q^3$, and $Q^4$ are each independently selected from CH, or C—$R^8$, wherein $R^8$ is —F or —Cl.

In some preferred embodiments, the compounds of Formula I-G-4 are those wherein $R^1$ is $NH_2$ or $CH_3$; $R^3$ is H; X is NH; Y is —$CH_2CH_2$—; and $Q^1$, $Q^2$, $Q^3$, and $Q^4$ are each independently selected from CH, or C—$R^8$, wherein $R^8$ is —F or —Cl.

In some preferred embodiments, the compounds of the disclosure are compounds of Formula I-G-5

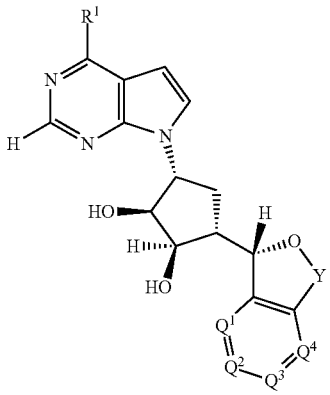

I-G-5 wherein $R^1$ is $NH_2$, or —$C_1$-$C_6$alkyl, Y is —$CH_2$— or C(═O); and $Q^1$, $Q^2$, $Q^3$, and $Q^4$ are each independently N, CH, or C—$R^8$, wherein $R^8$ is halo.

In some preferred embodiments, the compounds of Formula I-G-5 are those wherein $R^1$ is $NH_2$, Y is —$CH_2$—; and $Q^1$, $Q^2$, $Q^3$, and $Q^4$ are each independently CH, or C—$R^8$, wherein $R^8$ is —F or —Cl. In other preferred embodiments, the compounds of Formula I-G-5 are those wherein $R^1$ is —$CH_3$, Y is —$CH_2$—; and $Q^1$, $Q^2$, $Q^3$, and $Q^4$ are each independently CH, or C—$R^8$, wherein $R^8$ is —F or —Cl.

In some preferred embodiments, the compounds of Formula I-G-5 are those wherein $R^1$ is $NH_2$, Y is C(═O); and $Q^1$, $Q^2$, $Q^3$, and $Q^4$ are each independently CH, or C—$R^8$, wherein $R^8$ is —F or —Cl. In other preferred embodiments, the compounds of Formula I-G-5 are those wherein $R^1$ is —$CH_3$, Y is C(═O); and $Q^1$, $Q^2$, $Q^3$, and $Q^4$ are each independently CH, or C—$R^8$, wherein $R^8$ is —F or —Cl.

In some preferred embodiments, the compounds of the disclosure are compounds of Formula I-G-6

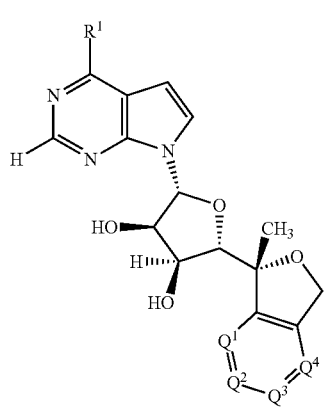

I-G-6 wherein $R^1$ is $NH_2$, or —$C_1$-$C_6$alkyl; and $Q^1$, $Q^2$, $Q^3$, and $Q^4$ are each independently selected from N, CH, or C—$R^8$, wherein $R^8$ is halo, —$C_1$haloalkyl, or $C_1$haloalkoxy.

In some preferred embodiments, the compounds of Formula I-G-6 are those wherein $R^1$ is $NH_2$, or —$CH_3$, and $Q^1$, $Q^2$, $Q^3$, and $Q^4$ are each independently selected from N, CH, or C—$R^8$, wherein $R^8$ is —F, —Cl, —$CF_3$, or —$OCF_3$.

In other preferred embodiments, the compounds of Formula I-G-6 are those wherein $R^1$ is $NH_2$; and $Q^1$, $Q^2$, $Q^3$, and $Q^4$ are each independently selected from N, CH, or C—$R^8$, wherein $R^8$ is —F, —Cl, —$CF_3$, or —$OCF_3$. In other preferred embodiments, the compounds of Formula I-G-6 are those wherein $R^1$ is —$CH_3$; and $Q^1$, $Q^2$, $Q^3$, and $Q^4$ are each independently selected from N, CH, or C—$R^8$, wherein $R^8$ is —F, —Cl, —$CF_3$, or —$OCF_3$.

In other preferred embodiments, the compounds of Formula I-G-6 are those wherein $R^1$ is $NH_2$; and $Q^1$, $Q^2$, $Q^3$, and $Q^4$ are each independently selected from CH, or C—$R^8$, wherein $R^8$ is —F, —Cl, —$CF_3$, or —$OCF_3$. In other preferred embodiments, the compounds of Formula I-G-6 are those wherein $R^1$ is —$CH_3$; and $Q^1$, $Q^2$, $Q^3$, and $Q^4$ are each independently selected from CH, or C—$R^8$, wherein $R^8$ is —F, —Cl, —$CF_3$, or —$OCF_3$.

In other preferred embodiments, the compounds of Formula I-G-6 are those wherein $R^1$ is $NH_2$; and $Q^1$, $Q^2$, $Q^3$, and $Q^4$ are each independently selected from N, CH, or C—$R^8$, wherein $R^8$ is —F or —Cl. In other preferred embodiments, the compounds of Formula I-G-6 are those wherein $R^1$ is —$CH_3$; and $Q^1$, $Q^2$, $Q^3$, and $Q^4$ are each independently selected from N, CH, or C—$R^8$, wherein $R^8$ is —F or —Cl.

In other preferred embodiments, the compounds of Formula I-G-6 are those wherein $R^1$ is $NH_2$; and $Q^1$, $Q^2$, $Q^3$, and $Q^4$ are each independently selected from CH, or C—$R^8$, wherein $R^8$ is —F or —Cl. In other preferred embodiments, the compounds of Formula I-G-6 are those wherein $R^1$ is —$CH_3$; $R^3$ is H; and $Q^1$, $Q^2$, $Q^3$, and $Q^4$ are each independently selected from CH, or C—$R^8$, wherein $R^8$ is —F or —Cl.

In other aspects, the disclosure is directed to compounds of Formula I-H-1:

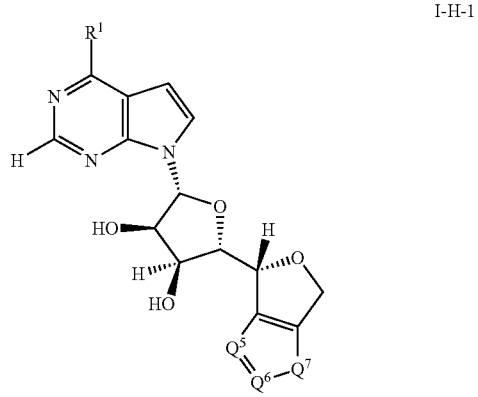

I-H-1 wherein $R^1$ is $NH_2$ or $C_1$-$C_6$alkyl; $Q^5$ and $Q^6$ are independently CH, C—$R^8$, or N, and $Q^7$ is NH, or S, and $R^8$ is halo, $C_1$-$C_6$alkyl, $C_1$-$C_6$haloalkyl, $C_1$-$C_6$alkoxy, or $C_1$-$C_6$haloalkoxy. In preferred embodiments, compounds of Formula I-H-1 are those wherein $R^1$ is $NH_2$; $Q^5$ and $Q^6$ are independently CH, C—$R^8$, or N, $Q^7$ is NH, or S; and $R^8$ is —F or —Cl. In other preferred embodiments, compounds of Formula I-H-1 are those wherein $R^1$ is —$CH_3$; $Q^5$ and $Q^6$ are independently CH, C—$R^8$, or N, $Q^7$ is NH, or S; and $R^8$ is —F or —Cl.

In other aspects, the disclosure is directed to compounds Formula I-I-1:

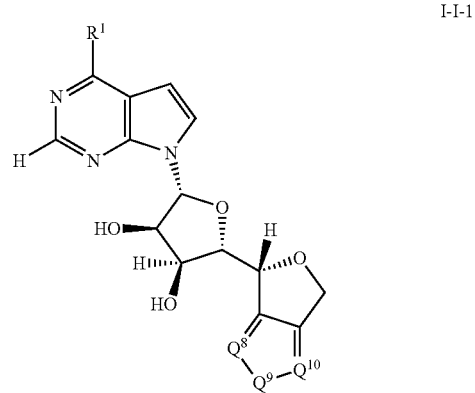

I-I-1 wherein $R^1$ is $NH_2$ or $C_1$-$C_6$alkyl; $Q^8$ and $Q^{10}$ are independently CH, C—$R^8$, or N, and $Q^9$ is N($C_1$-$C_6$alkyl), and $R^8$ is halo, $C_1$-$C_6$alkyl, $C_1$-$C_6$haloalkyl, $C_1$-$C_6$alkoxy, or $C_1$-$C_6$haloalkoxy. In preferred embodiments, compounds of Formula I-I-1 are those wherein $R^8$ is $NH_2$; $Q^8$ and $Q^{10}$ are independently CH, C—$R^8$, or N, and $Q^9$ is N($CH_3$), and $R^8$ is —F, or —Cl. In other preferred embodiments, compounds of Formula I-I-1 are those wherein $R^1$ is —$CH_3$; $Q^8$ and $Q^{10}$ are independently CH, C—$R^8$, or N; $Q^9$ is N($CH_3$), and $R^8$ is —F, or —Cl.

References to compounds of Formula I herein also refer to all subgenera described herein, including, for example, compounds of Formula I-A, I-A-1, I-A-2, I-A-3, I-A-4, I-B, I-C, I-D, I-E, I-F, I-G, I-G-1, I-G-2, I-G-3, I-G-4, I-G-5, I-G-6, I-H, I-H-1, I-I, I-I-1, and I-J.

It will be apparent that the compounds of Formula I, including all subgenera described herein, have multiple stereogenic centers. As a result, there exist multiple stereoisomers (enantiomers and diastereomers) of the compounds of Formula I (subgenera described herein). The present disclosure contemplates and encompasses each stereoisomer of any compound of Formula I (and subgenera described herein), as well as mixtures of said stereoisomers.

Pharmaceutically acceptable salts and solvates of the compounds of Formula I (including all subgenera described herein) are also within the scope of the disclosure.

Isotopic variants of the compounds of Formula I (including all subgenera described herein) are also contemplated by the present disclosure.

Pharmaceutical Compositions and Methods of Administration

The subject pharmaceutical compositions are typically formulated to provide a therapeutically effective amount of a compound of the present disclosure as the active ingredient, or a pharmaceutically acceptable salt, ester, prodrug, solvate, hydrate or derivative thereof. Where desired, the pharmaceutical compositions contain pharmaceutically acceptable salt and/or coordination complex thereof, and one or more pharmaceutically acceptable excipients, carriers, including inert solid diluents and fillers, diluents, including sterile aqueous solution and various organic solvents, permeation enhancers, solubilizers and adjuvants.

The subject pharmaceutical compositions can be administered alone or in combination with one or more other agents, which are also typically administered in the form of pharmaceutical compositions. Where desired, the one or more compounds of the invention and other agent(s) may be mixed into a preparation or both components may be formulated into separate preparations to use them in combination separately or at the same time.

In some embodiments, the concentration of one or more compounds provided in the pharmaceutical compositions of the present invention is less than 100%, 90%, 80%, 70%, 60%, 50%, 40%, 30%, 20%, 19%, 18%, 17%, 16%, 15%, 14%, 13%, 12%, 11%, 10%, 9%, 8%, 7%, 6%, 5%, 4%, 3%, 2%, 1%, 0.9%, 0.8%, 0.7%, 0.6%, 0.5%, 0.4%, 0.3%, 0.2%, 0.1%, 0.09%, 0.08%, 0.07%, 0.06%, 0.05%, 0.04%, 0.03%, 0.02%, 0.01%, 0.009%, 0.008%, 0.007%, 0.006%, 0.005%, 0.004%, 0.003%, 0.002%, 0.001%, 0.0009%, 0.0008%, 0.0007%, 0.0006%, 0.0005%, 0.0004%, 0.0003%, 0.0002%, or 0.0001% (or a number in the range defined by and including any two numbers above) w/w, w/v or v/v.

In some embodiments, the concentration of one or more compounds of the invention is greater than 90%, 80%, 70%, 60%, 50%, 40%, 30%, 20%, 19.75%, 19.50%, 19.25%, 19%, 18.75%, 18.50%, 18.25% 18%, 17.75%, 17.50%, 17.25% 17%, 16.75%, 16.50%, 16.25%, 16%, 15.75%, 15.50%, 15.25% 15%, 14.75%, 14.50%, 14.25% 14%, 13.75%, 13.50%, 13.25%, 13%, 12.75%, 12.50%, 12.25%, 12%, 11.75%, 11.50%, 11.25% 11%, 10.75%, 10.50%, 10.25% 10%, 9.75%, 9.50%, 9.25%, 9%, 8.75%, 8.50%, 8.25% 8%, 7.75%, 7.50%, 7.25%, 7%, 6.75%, 6.50%, 6.25%, 6%, 5.75%, 5.50%, 5.25%, 5%, 4.75%, 4.50%, 4.25%, 4%, 3.75%, 3.50%, 3.25%, 3%, 2.75%, 2.50%, 2.25%, 2%, 1.75%, 1.50%, 1.25%, 1%, 0.9%, 0.8%, 0.7%, 0.6%, 0.5%, 0.4%, 0.3%, 0.2%, 0.1%, 0.09%, 0.08%, 0.07%, 0.06%, 0.05%, 0.04%, 0.03%, 0.02%, 0.01%, 0.009%, 0.008%, 0.007%, 0.006%, 0.005%, 0.004%, 0.003%, 0.002%, 0.001%, 0.0009%, 0.0008%, 0.0007%, 0.0006%, 0.0005%, 0.0004%, 0.0003%, 0.0002%, or 0.0001% (or a number in the range defined by and including any two numbers above) w/w, w/v, or v/v.

In some embodiments, the concentration of one or more compounds of the invention is in the range from approximately 0.0001% to approximately 50%, approximately 0.001% to approximately 40%, approximately 0.01% to approximately 30%, approximately 0.02% to approximately 29%, approximately 0.03% to approximately 28%, approximately 0.04% to approximately 27%, approximately 0.05% to approximately 26%, approximately 0.06% to approximately 25%, approximately 0.07% to approximately 24%, approximately 0.08% to approximately 23%, approximately 0.09% to approximately 22%, approximately 0.1% to approximately 21%, approximately 0.2% to approximately 20%, approximately 0.3% to approximately 19%, approximately 0.4% to approximately 18%, approximately 0.5% to approximately 17%, approximately 0.6% to approximately 16%, approximately 0.7% to approximately 15%, approximately 0.8% to approximately 14%, approximately 0.9% to approximately 12%, approximately 1% to approximately 10% w/w, w/v or v/v.

In some embodiments, the concentration of one or more compounds of the invention is in the range from approximately 0.001% to approximately 10%, approximately 0.01% to approximately 5%, approximately 0.02% to approximately 4.5%, approximately 0.03% to approximately 4%, approximately 0.04% to approximately 3.5%, approximately 0.05% to approximately 3%, approximately 0.06% to approximately 2.5%, approximately 0.07% to approximately 2%, approximately 0.08% to approximately 1.5%, approximately 0.09% to approximately 1%, approximately 0.10% to approximately 0.9% w/w, w/v or v/v.

In some embodiments, the amount of one or more compounds of the invention is equal to or less than 10 g, 9.5 g, 9.0 g, 8.5 g, 8.0 g, 7.5 g, 7.0 g, 6.5 g, 6.0 g, 5.5 g, 5.0 g, 4.5 g, 4.0 g, 3.5 g, 3.0 g, 2.5 g, 2.0 g, 1.5 g, 1.0 g, 0.95 g, 0.9 g, 0.85 g, 0.8 g, 0.75 g, 0.7 g, 0.65 g, 0.6 g, 0.55 g, 0.5 g, 0.45 g, 0.4 g, 0.35 g, 0.3 g, 0.25 g, 0.2 g, 0.15 g, 0.1 g, 0.09 g, 0.08 g, 0.07 g, 0.06 g, 0.05 g, 0.04 g, 0.03 g, 0.02 g, 0.01 g, 0.009 g, 0.008 g, 0.007 g, 0.006 g, 0.005 g, 0.004 g, 0.003 g, 0.002 g, 0.001 g, 0.0009 g, 0.0008 g, 0.0007 g, 0.0006 g, 0.0005 g, 0.0004 g, 0.0003 g, 0.0002 g, or 0.0001 g (or a number in the range defined by and including any two numbers above).

In some embodiments, the amount of one or more compounds of the invention is more than 0.0001 g, 0.0002 g, 0.0003 g, 0.0004 g, 0.0005 g, 0.0006 g, 0.0007 g, 0.0008 g, 0.0009 g, 0.001 g, 0.0015 g, 0.002 g, 0.0025 g, 0.003 g, 0.0035 g, 0.004 g, 0.0045 g, 0.005 g, 0.0055 g, 0.006 g, 0.0065 g, 0.007 g, 0.0075 g, 0.008 g, 0.0085 g, 0.009 g, 0.0095 g, 0.01 g, 0.015 g, 0.02 g, 0.025 g, 0.03 g, 0.035 g, 0.04 g, 0.045 g, 0.05 g, 0.055 g, 0.06 g, 0.065 g, 0.07 g, 0.075 g, 0.08 g, 0.085 g, 0.09 g, 0.095 g, 0.1 g, 0.15 g, 0.2 g, 0.25 g, 0.3 g, 0.35 g, 0.4 g, 0.45 g, 0.5 g, 0.55 g, 0.6 g, 0.65 g, 0.7 g, 0.75 g, 0.8 g, 0.85 g, 0.9 g, 0.95 g, 1 g, 1.5 g, 2 g, 2.5, 3 g, 3.5, 4 g, 4.5 g, 5 g, 5.5 g, 6 g, 6.5 g, 7 g, 7.5 g, 8 g, 8.5 g, 9 g, 9.5 g, or 10 g (or a number in the range defined by and including any two numbers above).

In some embodiments, the amount of one or more compounds of the invention is in the range of 0.0001-10 g, 0.0005-9 g, 0.001-8 g, 0.005-7 g, 0.01-6 g, 0.05-5 g, 0.1-4 g, 0.5-4 g, or 1-3 g.

The compounds according to the invention are effective over a wide dosage range. For example, in the treatment of adult humans, dosages from 0.01 to 1000 mg, from 0.5 to 100 mg, from 1 to 50 mg per day, and from 5 to 40 mg per day are examples of dosages that may be used. An exemplary dosage is 10 to 30 mg per day. The exact dosage will depend upon the route of administration, the form in which the compound is administered, the subject to be treated, the body weight of the subject to be treated, and the preference and experience of the attending physician.

A pharmaceutical composition of the invention typically contains an active ingredient (i.e., a compound of the disclosure) of the present invention or a pharmaceutically acceptable salt and/or coordination complex thereof, and one or more pharmaceutically acceptable excipients, carriers, including but not limited to inert solid diluents and fillers, diluents, sterile aqueous solution and various organic solvents, permeation enhancers, solubilizers and adjuvants.

Described below are non-limiting exemplary pharmaceutical compositions and methods for preparing the same.

Pharmaceutical Compositions for Oral Administration.

In some embodiments, the invention provides a pharmaceutical composition for oral administration containing a compound of the invention, and a pharmaceutical excipient suitable for oral administration.

In some embodiments, the invention provides a solid pharmaceutical composition for oral administration containing: (i) an effective amount of a compound of the invention; optionally (ii) an effective amount of a second agent; and (iii) a pharmaceutical excipient suitable for oral administration. In some embodiments, the composition further contains: (iv) an effective amount of a third agent.

In some embodiments, the pharmaceutical composition may be a liquid pharmaceutical composition suitable for oral consumption. Pharmaceutical compositions of the invention suitable for oral administration can be presented as discrete dosage forms, such as capsules, cachets, or tablets, or liquids or aerosol sprays each containing a predetermined amount of an active ingredient as a powder or in granules, a solution, or a suspension in an aqueous or non-aqueous liquid, an oil-in-water emulsion, or a water-in-oil liquid emulsion. Such dosage forms can be prepared by any of the methods of pharmacy, but all methods include the step of bringing the active ingredient into association with the carrier, which constitutes one or more necessary ingredients. In general, the compositions are prepared by uniformly and intimately admixing the active ingredient with liquid carriers or finely divided solid carriers or both, and then, if necessary, shaping the product into the desired presentation. For example, a tablet can be prepared by compression or molding, optionally with one or more accessory ingredients. Compressed tablets can be prepared by compressing in a suitable machine the active ingredient in a free-flowing form such as powder or granules, optionally mixed with an excipient such as, but not limited to, a binder, a lubricant, an inert diluent, and/or a surface active or dispersing agent. Molded tablets can be made by molding in a suitable machine a mixture of the powdered compound moistened with an inert liquid diluent.

This invention further encompasses anhydrous pharmaceutical compositions and dosage forms comprising an active ingredient, since water can facilitate the degradation of some compounds. For example, water may be added (e.g., 5%) in the pharmaceutical arts as a means of simulating long-term storage in order to determine characteristics such as shelf-life or the stability of formulations over time. Anhydrous pharmaceutical compositions and dosage forms of the invention can be prepared using anhydrous or low moisture containing ingredients and low moisture or low humidity conditions. Pharmaceutical compositions and dosage forms of the invention which contain lactose can be made anhydrous if substantial contact with moisture and/or humidity during manufacturing, packaging, and/or storage is expected. An anhydrous pharmaceutical composition may be prepared and stored such that its anhydrous nature is maintained. Accordingly, anhydrous compositions may be packaged using materials known to prevent exposure to water such that they can be included in suitable formulary kits. Examples of suitable packaging include, but are not limited to, hermetically sealed foils, plastic or the like, unit dose containers, blister packs, and strip packs.

An active ingredient can be combined in an intimate admixture with a pharmaceutical carrier according to conventional pharmaceutical compounding techniques. The carrier can take a wide variety of forms depending on the form of preparation desired for administration. In preparing the compositions for an oral dosage form, any of the usual pharmaceutical media can be employed as carriers, such as, for example, water, glycols, oils, alcohols, flavoring agents, preservatives, coloring agents, and the like in the case of oral liquid preparations (such as suspensions, solutions, and elixirs) or aerosols; or carriers such as starches, sugars, micro-crystalline cellulose, diluents, granulating agents, lubricants, binders, and disintegrating agents can be used in the case of oral solid preparations, in some embodiments without employing the use of lactose. For example, suitable carriers include powders, capsules, and tablets, with the solid oral preparations. If desired, tablets can be coated by standard aqueous or nonaqueous techniques.

Binders suitable for use in pharmaceutical compositions and dosage forms include, but are not limited to, corn starch, potato starch, or other starches, gelatin, natural and synthetic gums such as acacia, sodium alginate, alginic acid, other alginates, powdered tragacanth, guar gum, cellulose and its derivatives (e.g., ethyl cellulose, cellulose acetate, carboxymethyl cellulose calcium, sodium carboxymethyl cellulose), polyvinyl pyrrolidone, methyl cellulose, pre-gelatinized starch, hydroxypropyl methyl cellulose, microcrystalline cellulose, and mixtures thereof.

Examples of suitable fillers for use in the pharmaceutical compositions and dosage forms disclosed herein include, but are not limited to, talc, calcium carbonate (e.g., granules or powder), microcrystalline cellulose, powdered cellulose, dextrates, kaolin, mannitol, silicic acid, sorbitol, starch, pre-gelatinized starch, and mixtures thereof.

Disintegrants may be used in the compositions of the invention to provide tablets that disintegrate when exposed to an aqueous environment. Too much of a disintegrant may produce tablets which may disintegrate in the bottle. Too little may be insufficient for disintegration to occur and may thus alter the rate and extent of release of the active ingredient(s) from the dosage form. Thus, a sufficient amount of disintegrant that is neither too little nor too much to detrimentally alter the release of the active ingredient(s) may be used to form the dosage forms of the compounds disclosed herein. The amount of disintegrant used may vary based upon the type of formulation and mode of administration, and may be readily discernible to those of ordinary skill in the art. About 0.5 to about 15 weight percent of disintegrant, or about 1 to about 5 weight percent of disintegrant, may be used in the pharmaceutical composition. Disintegrants that can be used to form pharmaceutical compositions and dosage forms of the invention include, but are not limited to, agar-agar, alginic acid, calcium carbonate, microcrystalline cellulose, croscarmellose sodium, crospovidone, polacrilin potassium, sodium starch glycolate, potato or tapioca starch, other starches, pre-gelatinized starch, other starches, clays, other algins, other celluloses, gums or mixtures thereof.

Lubricants which can be used to form pharmaceutical compositions and dosage forms of the invention include, but are not limited to, calcium stearate, magnesium stearate, mineral oil, light mineral oil, glycerin, sorbitol, mannitol, polyethylene glycol, other glycols, stearic acid, sodium lauryl sulfate, talc, hydrogenated vegetable oil (e.g., peanut oil, cottonseed oil, sunflower oil, sesame oil, olive oil, corn oil, and soybean oil), zinc stearate, ethyl oleate, ethyl laureate, agar, or mixtures thereof. Additional lubricants include, for example, a syloid silica gel, a coagulated aerosol of synthetic silica, or mixtures thereof. A lubricant can optionally be added, in an amount of less than about 1 weight percent of the pharmaceutical composition.

When aqueous suspensions and/or elixirs are desired for oral administration, the active ingredient therein may be combined with various sweetening or flavoring agents, coloring matter or dyes and, if so desired, emulsifying and/or suspending agents, together with such diluents as water, ethanol, propylene glycol, glycerin and various combinations thereof.

The tablets can be uncoated or coated by known techniques to delay disintegration and absorption in the gastrointestinal tract and thereby provide a sustained action over a longer period. For example, a time delay material such as glyceryl monostearate or glyceryl distearate can be employed. Formulations for oral use can also be presented as hard gelatin capsules wherein the active ingredient is mixed with an inert solid diluent, for example, calcium carbonate, calcium phosphate or kaolin, or as soft gelatin capsules wherein the active ingredient is mixed with water or an oil medium, for example, peanut oil, liquid paraffin or olive oil.

Surfactant which can be used to form pharmaceutical compositions and dosage forms of the invention include, but are not limited to, hydrophilic surfactants, lipophilic surfactants, and mixtures thereof. That is, a mixture of hydrophilic surfactants may be employed, a mixture of lipophilic surfactants may be employed, or a mixture of at least one hydrophilic surfactant and at least one lipophilic surfactant may be employed.

A suitable hydrophilic surfactant may generally have an HLB value of at least 10, while suitable lipophilic surfactants may generally have an HLB value of or less than about 10. An empirical parameter used to characterize the relative hydrophilicity and hydrophobicity of non-ionic amphiphilic compounds is the hydrophilic-lipophilic balance ("HLB" value). Surfactants with lower HLB values are more lipophilic or hydrophobic, and have greater solubility in oils, while surfactants with higher HLB values are more hydrophilic, and have greater solubility in aqueous solutions.

Hydrophilic surfactants are generally considered to be those compounds having an HLB value greater than about 10, as well as anionic, cationic, or zwitterionic compounds for which the HLB scale is not generally applicable. Similarly, lipophilic (i.e., hydrophobic) surfactants are compounds having an HLB value equal to or less than about 10. However, HLB value of a surfactant is merely a rough guide generally used to enable formulation of industrial, pharmaceutical and cosmetic emulsions.

Hydrophilic surfactants may be either ionic or non-ionic. Suitable ionic surfactants include, but are not limited to, alkylammonium salts; fusidic acid salts; fatty acid derivatives of amino acids, oligopeptides, and polypeptides; glyceride derivatives of amino acids, oligopeptides, and polypeptides; lecithins and hydrogenated lecithins; lysolecithins and hydrogenated lysolecithins; phospholipids and derivatives thereof; lysophospholipids and derivatives thereof; carnitine fatty acid ester salts; salts of alkylsulfates; fatty acid salts; sodium docusate; acyl lactylates; mono- and di-acetylated tartaric acid esters of mono- and di-glycerides; succinylated mono- and di-glycerides; citric acid esters of mono- and di-glycerides; and mixtures thereof.

Within the aforementioned group, ionic surfactants include, by way of example: lecithins, lysolecithin, phospholipids, lysophospholipids and derivatives thereof; carnitine fatty acid ester salts; salts of alkylsulfates; fatty acid salts; sodium docusate; acylactylates; mono- and di-acetylated tartaric acid esters of mono- and di-glycerides; succinylated mono- and di-glycerides; citric acid esters of mono- and di-glycerides; and mixtures thereof.

Ionic surfactants may be the ionized forms of lecithin, lysolecithin, phosphatidylcholine, phosphatidylethanolamine, phosphatidylglycerol, phosphatidic acid, phosphatidylserine, lysophosphatidylcholine, lysophosphatidylethanolamine, lysophosphatidylglycerol, lysophosphatidic acid, lysophosphatidylserine, PEG-phosphatidylethanolamine, PVP-phosphatidylethanolamine, lactylic esters of fatty acids, stearoyl-2-lactylate, stearoyl lactylate, succinylated monoglycerides, mono/diacetylated tartaric acid esters of mono/diglycerides, citric acid esters of mono/diglycerides, cholylsarcosine, caproate, caprylate, caprate, laurate, myristate, palmitate, oleate, ricinoleate, linoleate, linolenate, stearate, lauryl sulfate, tetradecyl sulfate, docusate, lauroyl carnitines, palmitoyl carnitines, myristoyl carnitines, and salts and mixtures thereof.

Hydrophilic non-ionic surfactants may include, but are not limited to, alkylglucosides; alkylmaltosides; alkylthioglucosides; lauryl macrogolglycerides; polyoxyalkylene alkyl ethers such as polyethylene glycol alkyl ethers; polyoxyalkylene alkylphenols such as polyethylene glycol alkyl phenols; polyoxyalkylene alkyl phenol fatty acid esters such as polyethylene glycol fatty acids monoesters and polyethylene glycol fatty acids diesters; polyethylene glycol glycerol fatty acid esters; polyglycerol fatty acid esters; polyoxyalkylene sorbitan fatty acid esters such as polyethylene glycol sorbitan fatty acid esters; hydrophilic transesterification products of a polyol with at least one member of the group consisting of glycerides, vegetable oils, hydrogenated vegetable oils, fatty acids, and sterols; polyoxyethylene sterols, derivatives, and analogues thereof; polyoxyethylated vitamins and derivatives thereof; polyoxyethylene-polyoxypropylene block copolymers; and mixtures thereof; polyethylene glycol sorbitan fatty acid esters and hydrophilic transesterification products of a polyol with at least one member of the group consisting of triglycerides, vegetable oils, and hydrogenated vegetable oils. The polyol may be glycerol, ethylene glycol, polyethylene glycol, sorbitol, propylene glycol, pentaerythritol, or a saccharide.

Other hydrophilic-non-ionic surfactants include, without limitation, PEG-10 laurate, PEG-12 laurate, PEG-20 laurate, PEG-32 laurate, PEG-32 dilaurate, PEG-12 oleate, PEG-15 oleate, PEG-20 oleate, PEG-20 dioleate, PEG-32 oleate, PEG-200 oleate, PEG-400 oleate, PEG-15 stearate, PEG-32 distearate, PEG-40 stearate, PEG-100 stearate, PEG-20 dilaurate, PEG-25 glyceryl trioleate, PEG-32 dioleate, PEG-20 glyceryl laurate, PEG-30 glyceryl laurate, PEG-20 glyceryl stearate, PEG-20 glyceryl oleate, PEG-30 glyceryl oleate, PEG-30 glyceryl laurate, PEG-40 glyceryl laurate, PEG-40 palm kernel oil, PEG-50 hydrogenated castor oil, PEG-40 castor oil, PEG-35 castor oil, PEG-60 castor oil, PEG-40 hydrogenated castor oil, PEG-60 hydrogenated castor oil, PEG-60 corn oil, PEG-6 caprate/caprylate glycerides, PEG-8 caprate/caprylate glycerides, polyglyceryl-10 laurate, PEG-30 cholesterol, PEG-25 phyto sterol, PEG-30 soya sterol, PEG-20 trioleate, PEG-40 sorbitan oleate, PEG-80 sorbitan laurate, polysorbate 20, polysorbate 80, POE-9 lauryl ether, POE-23 lauryl ether, POE-10 oleyl ether, POE-20 oleyl ether, POE-20 stearyl ether, tocopheryl PEG-100 succinate, PEG-24 cholesterol, polyglyceryl-lOoleate, Tween 40, Tween 60, sucrose monostearate, sucrose mono laurate, sucrose monopalmitate, PEG 10-100 nonyl phenol series, PEG 15-100 octyl phenol series, and poloxamers.

Suitable lipophilic surfactants include, by way of example only: fatty alcohols; glycerol fatty acid esters; acetylated glycerol fatty acid esters; lower alcohol fatty acids esters; propylene glycol fatty acid esters; sorbitan fatty acid esters; polyethylene glycol sorbitan fatty acid esters; sterols and sterol derivatives; polyoxyethylated sterols and sterol derivatives; polyethylene glycol alkyl ethers; sugar esters; sugar ethers; lactic acid derivatives of mono- and di-glycerides; hydrophobic transesterification products of a polyol with at least one member of the group consisting of glycerides, vegetable oils, hydrogenated vegetable oils, fatty acids and sterols; oil-soluble vitamins/vitamin derivatives; and mixtures thereof. Within this group, preferred lipophilic surfactants include glycerol fatty acid esters, propylene glycol fatty acid esters, and mixtures thereof, or are hydrophobic transesterification products of a polyol with at least one member of the group consisting of vegetable oils, hydrogenated vegetable oils, and triglycerides.

In one embodiment, the composition may include a solubilizer to ensure good solubilization and/or dissolution of the compound of the present invention and to minimize precipitation of the compound of the present invention. This can be especially important for compositions for non-oral use, e.g., compositions for injection. A solubilizer may also be added to increase the solubility of the hydrophilic drug and/or other components, such as surfactants, or to maintain the composition as a stable or homogeneous solution or dispersion.

Examples of suitable solubilizers include, but are not limited to, the following: alcohols and polyols, such as ethanol, isopropanol, butanol, benzyl alcohol, ethylene glycol, propylene glycol, butanediols and isomers thereof, glycerol, pentaerythritol, sorbitol, mannitol, transcutol, dimethyl isosorbide, polyethylene glycol, polypropylene glycol, polyvinylalcohol, hydroxypropyl methylcellulose and other cellulose derivatives, cyclodextrins and cyclodextrin derivatives; ethers of polyethylene glycols having an average molecular weight of about 200 to about 6000, such as tetrahydrofurfuryl alcohol PEG ether (glycofurol) or methoxy PEG; amides and other nitrogen-containing compounds such as 2-pyrrolidone, 2-piperidone, ε-caprolactam, N-alkylpyrrolidone, N-hydroxyalkylpyrrolidone, N-alkylpiperidone, N-alkylcaprolactam, dimethylacetamide and polyvinylpyrrolidone; esters such as ethyl propionate, tributylcitrate, acetyl triethylcitrate, acetyl tributyl citrate, triethylcitrate, ethyl oleate, ethyl caprylate, ethyl butyrate, triacetin, propylene glycol monoacetate, propylene glycol diacetate, ε-caprolactone and isomers thereof, δ-valerolactone and isomers thereof, β-butyrolactone and isomers thereof; and other solubilizers known in the art, such as dimethyl acetamide, dimethyl isosorbide, N-methyl pyrrolidones, monooctanoin, diethylene glycol monoethyl ether, and water.

Mixtures of solubilizers may also be used. Examples include, but not limited to, triacetin, triethylcitrate, ethyl oleate, ethyl caprylate, dimethylacetamide, N-methylpyrrolidone, N-hydroxyethylpyrrolidone, polyvinylpyrrolidone, hydroxypropyl methylcellulose, hydroxypropyl cyclodextrins, ethanol, polyethylene glycol 200-100, glycofurol, transcutol, propylene glycol, and dimethyl isosorbide. Particularly preferred solubilizers include sorbitol, glycerol, triacetin, ethyl alcohol, PEG-400, glycofurol and propylene glycol.

The amount of solubilizer that can be included is not particularly limited. The amount of a given solubilizer may be limited to a bioacceptable amount, which may be readily determined by one of skill in the art. In some circumstances, it may be advantageous to include amounts of solubilizers far in excess of bioacceptable amounts, for example to maximize the concentration of the drug, with excess solubilizer removed prior to providing the composition to a subject using conventional techniques, such as distillation or evaporation. Thus, if present, the solubilizer can be in a weight ratio of 10%, 25%, 50%), 100%, or up to about 200%> by weight, based on the combined weight of the drug, and other excipients. If desired, very small amounts of solubilizer may also be used, such as 5%>, 2%>, 1%) or even less. Typically, the solubilizer may be present in an amount of about 1%> to about 100%, more typically about 5%> to about 25%> by weight.

The composition can further include one or more pharmaceutically acceptable additives and excipients. Such additives and excipients include, without limitation, detackifiers, anti-foaming agents, buffering agents, polymers, antioxidants, preservatives, chelating agents, viscomodulators, tonicifiers, flavorants, colorants, odorants, opacifiers, suspending agents, binders, fillers, plasticizers, lubricants, and mixtures thereof.

In addition, an acid or a base may be incorporated into the composition to facilitate processing, to enhance stability, or for other reasons. Examples of pharmaceutically acceptable bases include amino acids, amino acid esters, ammonium hydroxide, potassium hydroxide, sodium hydroxide, sodium hydrogen carbonate, aluminum hydroxide, calcium carbonate, magnesium hydroxide, magnesium aluminum silicate, synthetic aluminum silicate, synthetic hydrocalcite, magnesium aluminum hydroxide, diisopropylethylamine, ethanolamine, ethylenediamine, triethanolamine, triethylamine, triisopropanolamine, trimethylamine, tris(hydroxymethyl) aminomethane (TRIS) and the like. Also suitable are bases that are salts of a pharmaceutically acceptable acid, such as acetic acid, acrylic acid, adipic acid, alginic acid, alkanesulfonic acid, amino acids, ascorbic acid, benzoic acid, boric acid, butyric acid, carbonic acid, citric acid, fatty acids, formic acid, fumaric acid, gluconic acid, hydroquinosulfonic acid, isoascorbic acid, lactic acid, maleic acid, oxalic acid, para-bromophenylsulfonic acid, propionic acid, p-toluenesulfonic acid, salicylic acid, stearic acid, succinic acid, tannic acid, tartaric acid, thioglycolic acid, toluenesulfonic acid, uric acid, and the like. Salts of polyprotic acids, such as sodium phosphate, disodium hydrogen phosphate, and sodium dihydrogen phosphate can also be used. When the base is a salt, the cation can be any convenient and pharmaceutically acceptable cation, such as ammonium, alkali metals, alkaline earth metals, and the like. Example may include, but not limited to, sodium, potassium, lithium, magnesium, calcium and ammonium.

Suitable acids are pharmaceutically acceptable organic or inorganic acids. Examples of suitable inorganic acids include hydrochloric acid, hydrobromic acid, hydriodic acid, sulfuric acid, nitric acid, boric acid, phosphoric acid, and the like. Examples of suitable organic acids include acetic acid, acrylic acid, adipic acid, alginic acid, alkanesulfonic acids, amino acids, ascorbic acid, benzoic acid, boric acid, butyric acid, carbonic acid, citric acid, fatty acids, formic acid, fumaric acid, gluconic acid, hydroquinosulfonic acid, isoascorbic acid, lactic acid, maleic acid, methanesulfonic acid, oxalic acid, para-bromophenylsulfonic acid, propionic acid, p-toluenesulfonic acid, salicylic acid, stearic acid, succinic acid, tannic acid, tartaric acid, thioglycolic acid, toluenesulfonic acid, uric acid and the like.

Pharmaceutical Compositions for Injection.

In some embodiments, the invention provides a pharmaceutical composition for injection containing a compound of the present invention and a pharmaceutical excipient suitable for injection. Components and amounts of agents in the compositions are as described herein.

The forms in which the novel compositions of the present invention may be incorporated for administration by injection include aqueous or oil suspensions, or emulsions, with sesame oil, corn oil, cottonseed oil, or peanut oil, as well as elixirs, mannitol, dextrose, or a sterile aqueous solution, and similar pharmaceutical vehicles.

Aqueous solutions in saline are also conventionally used for injection. Ethanol, glycerol, propylene glycol, liquid polyethylene glycol, and the like (and suitable mixtures thereof), cyclodextrin derivatives, and vegetable oils may also be employed. The proper fluidity can be maintained, for example, by the use of a coating, such as lecithin, for the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like.

Sterile injectable solutions are prepared by incorporating the compound of the present invention in the required amount in the appropriate solvent with various other ingredients as enumerated above, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, certain desirable methods of preparation are vacuum-drying and freeze-drying techniques which yield a powder of the active ingredient plus any additional desired ingredient from a previously sterile-filtered solution thereof.

Pharmaceutical Compositions for Topical (e.g. Transdermal) Delivery.

In some embodiments, the invention provides a pharmaceutical composition for transdermal delivery containing a compound of the present invention and a pharmaceutical excipient suitable for transdermal delivery.

Compositions of the present invention can be formulated into preparations in solid, semisolid, or liquid forms suitable for local or topical administration, such as gels, water soluble jellies, creams, lotions, suspensions, foams, powders, slurries, ointments, solutions, oils, pastes, suppositories, sprays, emulsions, saline solutions, dimethylsulfoxide (DMSO)-based solutions. In general, carriers with higher densities are capable of providing an area with a prolonged exposure to the active ingredients. In contrast, a solution formulation may provide more immediate exposure of the active ingredient to the chosen area.

The pharmaceutical compositions also may comprise suitable solid or gel phase carriers or excipients, which are compounds that allow increased penetration of, or assist in the delivery of, therapeutic molecules across the stratum corneum permeability barrier of the skin. There are many of these penetration-enhancing molecules known to those trained in the art of topical formulation.

Examples of such carriers and excipients include, but are not limited to, humectants (e.g., urea), glycols (e.g., propylene glycol), alcohols (e.g., ethanol), fatty acids (e.g., oleic acid), surfactants (e.g., isopropyl myristate and sodium lauryl sulfate), pyrrolidones, glycerol monolaurate, sulfoxides, terpenes (e.g., menthol), amines, amides, alkanes, alkanols, water, calcium carbonate, calcium phosphate, various sugars, starches, cellulose derivatives, gelatin, and polymers such as polyethylene glycols.

Another exemplary formulation for use in the methods of the present invention employs transdermal delivery devices ("patches"). Such transdermal patches may be used to provide continuous or discontinuous infusion of a compound of the present invention in controlled amounts, either with or without another agent.

The construction and use of transdermal patches for the delivery of pharmaceutical agents is well known in the art. See, e.g., U.S. Pat. Nos. 5,023,252, 4,992,445 and 5,001,139. Such patches may be constructed for continuous, pulsatile, or on demand delivery of pharmaceutical agents.

Pharmaceutical Compositions for Inhalation.

Compositions for inhalation or insufflation include solutions and suspensions in pharmaceutically acceptable, aqueous or organic solvents, or mixtures thereof, and powders. The liquid or solid compositions may contain suitable pharmaceutically acceptable excipients as described supra. Preferably the compositions are administered by the oral or nasal respiratory route for local or systemic effect. Compositions in preferably pharmaceutically acceptable solvents may be nebulized by use of inert gases. Nebulized solutions may be inhaled directly from the nebulizing device or the nebulizing device may be attached to a face mask tent, or intermittent positive pressure breathing machine. Solution, suspension, or powder compositions may be administered, preferably orally or nasally, from devices that deliver the formulation in an appropriate manner.

Other Pharmaceutical Compositions.

Pharmaceutical compositions may also be prepared from compositions described herein and one or more pharmaceutically acceptable excipients suitable for sublingual, buccal, rectal, intraosseous, intraocular, intranasal, epidural, or intraspinal administration. Preparations for such pharmaceutical compositions are well-known in the art. See, e.g., Anderson, Philip O.; Knoben, James E.; Troutman, William G, eds., Handbook of Clinical Drug Data, Tenth Edition, McGraw-Hill, 2002; Pratt and Taylor, eds., Principles of Drug Action, Third Edition, Churchill Livingston, New York, 1990; Katzung, ed., Basic and Clinical Pharmacology, Ninth Edition, McGraw Hill, 20037ybg; Goodman and Gilman, eds., The Pharmacological Basis of Therapeutics, Tenth Edition, McGraw Hill, 2001; Remingtons Pharmaceutical Sciences, 20th Ed., Lippincott Williams & Wilkins, 2000; Martindale, The Extra Pharmacopoeia, Thirty-Second Edition (The Pharmaceutical Press, London, 1999); all of which are incorporated by reference herein in their entirety.

Administration of the compounds or pharmaceutical composition of the present invention can be effected by any method that enables delivery of the compounds to the site of action. These methods include oral routes, intraduodenal routes, parenteral injection (including intravenous, intraarterial, subcutaneous, intramuscular, intravascular, intraperitoneal or infusion), topical (e.g. transdermal application), rectal administration, via local delivery by catheter or stent or through inhalation. Compounds can also be administered intraadiposally or intrathecally.

The amount of the compound administered will be dependent on the subject being treated, the severity of the disorder or condition, the rate of administration, the disposition of the compound and the discretion of the prescribing physician. However, an effective dosage is in the range of about 0.001 to about 100 mg per kg body weight per day, preferably about 1 to about 35 mg/kg/day, in single or divided doses. For a 70 kg human, this would amount to about 0.05 to 7 g/day, preferably about 0.05 to about 2.5 g/day. In some instances, dosage levels below the lower limit of the aforesaid range may be more than adequate, while in other cases still larger doses may be employed without causing any harmful side effect, e.g. by dividing such larger doses into several small doses for administration throughout the day.

In some embodiments, a compound of the invention is administered in a single dose.

Typically, such administration will be by injection, e.g., intravenous injection, in order to introduce the agent quickly. However, other routes may be used as appropriate. A single dose of a compound of the invention may also be used for treatment of an acute condition.

In some embodiments, a compound of the invention is administered in multiple doses. Dosing may be about once, twice, three times, four times, five times, six times, or more than six times per day. Dosing may be about once a month, once every two weeks, once a week, or once every other day. In another embodiment a compound of the invention and another agent are administered together about once per day to about 6 times per day. In another embodiment the administration of a compound of the invention and an agent continues for less than about 7 days. In yet another embodiment the administration continues for more than about 6, 10, 14, 28 days, two months, six months, or one year. In some cases, continuous dosing is achieved and maintained as long as necessary.

Administration of the compounds of the invention may continue as long as necessary. In some embodiments, a compound of the invention is administered for more than 1, 2, 3, 4, 5, 6, 7, 14, or 28 days. In some embodiments, a compound of the invention is administered for less than 28, 14, 7, 6, 5, 4, 3, 2, or 1 day. In some embodiments, a compound of the invention is administered chronically on an ongoing basis, e.g., for the treatment of chronic effects.

An effective amount of a compound of the invention may be administered in either single or multiple doses by any of the accepted modes of administration of agents having similar utilities, including rectal, buccal, intranasal and transdermal routes, by intra-arterial injection, intravenously, intraperitoneally, parenterally, intramuscularly, subcutaneously, orally, topically, or as an inhalant.

The compositions of the invention may also be delivered via an impregnated or coated device such as a stent, for example, or an artery-inserted cylindrical polymer. Such a method of administration may, for example, aid in the prevention or amelioration of restenosis following procedures such as balloon angioplasty. Without being bound by theory, compounds of the invention may slow or inhibit the migration and proliferation of smooth muscle cells in the arterial wall which contribute to restenosis. A compound of the invention may be administered, for example, by local delivery from the struts of a stent, from a stent graft, from grafts, or from the cover or sheath of a stent. In some embodiments, a compound of the invention is admixed with a matrix. Such a matrix may be a polymeric matrix, and may serve to bond the compound to the stent. Polymeric matrices suitable for such use, include, for example, lactone-based polyesters or copolyesters such as polylactide, polycaprolactonglycolide, polyorthoesters, polyanhydrides, polyaminoacids, polysaccharides, polyphosphazenes, poly (ether-ester) copolymers (e.g. PEO-PLLA); polydimethylsiloxane, poly(ethylene-vinylacetate), acrylate-based polymers or copolymers (e.g. polyhydroxyethyl methylmethacrylate, polyvinyl pyrrolidinone), fluorinated polymers such as polytetrafluoroethylene and cellulose esters. Suitable matrices may be nondegrading or may degrade with time, releasing the compound or compounds. Compounds of the invention may be applied to the surface of the stent by various methods such as dip/spin coating, spray coating, dip-coating, and/or brush-coating. The compounds may be applied in a solvent and the solvent may be allowed to evaporate, thus forming a layer of compound onto the stent. Alternatively, the compound may be located in the body of the stent or graft, for example in microchannels or micropores. When implanted, the compound diffuses out of the body of the stent to contact the arterial wall. Such stents may be prepared by dipping a stent manufactured to contain such micropores or microchannels into a solution of the compound of the invention in a suitable solvent, followed by evaporation of the solvent. Excess drug on the surface of the stent may be removed via an additional brief solvent wash. In yet other embodiments, compounds of the invention may be covalently linked to a stent or graft. A covalent linker may be used which degrades in vivo, leading to the release of the compound of the invention. Any bio-labile linkage may be used for such a purpose, such as ester, amide or anhydride linkages. Compounds of the invention may additionally be administered intravascularly from a balloon used during angioplasty. Extravascular administration of the compounds via the pericard or via advential application of formulations of the invention may also be performed to decrease restenosis.

A variety of stent devices which may be used as described are disclosed, for example, in the following references, all of which are hereby incorporated by reference: U.S. Pat. Nos. 5,451,233; 5,040,548; 5,061,273; 5,496,346; 5,292,331; 5,674,278; 3,657,744; 4,739,762; 5,195,984; 5,292,331; 5,674,278; 5,879,382; 6,344,053.

The compounds of the invention may be administered in dosages. It is known in the art that due to intersubject variability in compound pharmacokinetics, individualization of dosing regimen is necessary for optimal therapy. Dosing for a compound of the invention may be found by routine experimentation in light of the instant disclosure.

When a compound of the invention is administered in a composition that comprises one or more agents, and the agent has a shorter half-life than the compound of the invention unit dose forms of the agent and the compound of the invention may be adjusted accordingly.

The subject pharmaceutical composition may, for example, be in a form suitable for oral administration as a tablet, capsule, pill, powder, sustained release formulations, solution, suspension, for parenteral injection as a sterile solution, suspension or emulsion, for topical administration as an ointment or cream or for rectal administration as a suppository. The pharmaceutical composition may be in unit dosage forms suitable for single administration of precise dosages. The pharmaceutical composition will include a conventional pharmaceutical carrier or excipient and a compound according to the invention as an active ingredient. In addition, it may include other medicinal or pharmaceutical agents, carriers, adjuvants, etc.

Exemplary parenteral administration forms include solutions or suspensions of active compound in sterile aqueous solutions, for example, aqueous propylene glycol or dextrose solutions. Such dosage forms can be suitably buffered, if desired.

Methods of Use

The method typically comprises administering to a subject a therapeutically effective amount of a compound of the invention. The therapeutically effective amount of the subject combination of compounds may vary depending upon the intended application (in vitro or in vivo), or the subject and disease condition being treated, e.g., the weight and age of the subject, the severity of the disease condition, the manner of administration and the like, which can readily be determined by one of ordinary skill in the art. The term also applies to a dose that will induce a particular response in target cells, e.g., reduction of proliferation or downregulation of activity of a target protein. The specific dose will vary depending on the particular compounds chosen, the dosing regimen to be followed, whether it is administered in combination with other compounds, timing of administration, the tissue to which it is administered, and the physical delivery system in which it is carried.

As used herein, the term "$IC_{50}$" refers to the half maximal inhibitory concentration of an inhibitor in inhibiting biological or biochemical function. This quantitative measure indicates how much of a particular inhibitor is needed to inhibit a given biological process (or component of a process, i.e. an enzyme, cell, cell receptor or microorganism) by half. In other words, it is the half maximal (50%) inhibitory concentration (IC) of a substance (50% IC, or IC50). EC50 refers to the plasma concentration required for obtaining 50%> of a maximum effect in vivo.

In some embodiments, the subject methods utilize a PRMT5 inhibitor with an IC50 value of about or less than a predetermined value, as ascertained in an in vitro assay. In some embodiments, the PRMT5 inhibitor inhibits PRMT5 a with an IC50 value of about 1 nM or less, 2 nM or less, 5 nM or less, 7 nM or less, 10 nM or less, 20 nM or less, 30 nM or less, 40 nM or less, 50 nM or less, 60 nM or less, 70 nM or less, 80 nM or less, 90 nM or less, 100 nM or less, 120 nM or less, 140 nM or less, 150 nM or less, 160 nM or less, 170 nM or less, 180 nM or less, 190 nM or less, 200 nM or less, 225 nM or less, 250 nM or less, 275 nM or less, 300 nM or less, 325 nM or less, 350 nM or less, 375 nM or less, 400 nM or less, 425 nM or less, 450 nM or less, 475 nM or less, 500 nM or less, 550 nM or less, 600 nM or less, 650 nM or less, 700 nM or less, 750 nM or less, 800 nM or less, 850 nM or less, 900 nM or less, 950 nM or less, 1 µM or less, 1.1 µM or less, 1.2 µM or less, 1.3 µM or less, 1.4 µM or less, 1.5 µM or less, 1.6 µM or less, 1.7 µM or less, 1.8 µM or less, 1.9 µM or less, 2 µM or less, 5 µM or less, 10 µM or less, 15 µM or less, 20 µM or less, 25 µM or less, 30 µM or less, 40 µM or less, 50 µM, 60 µM, 70 µM, 80 µM, 90 µM, 100 µM, 200 µM, 300 µM, 400 µM, or 500 µM, or less, (or a number in the range defined by and including any two numbers above).

In some embodiments, the PRMT5 inhibitor selectively inhibits PRMT5 a with an IC50 value that is at least 2, 3, 4, 5, 6, 7, 8, 9, 10, 15, 20, 25, 30, 35, 40, 45, 50, 100, or 1000 times less (or a number in the range defined by and including any two numbers above) than its IC50 value against one, two, or three other PRMTs.

In some embodiments, the PRMT5 inhibitor selectively inhibits PRMT5 a with an IC50 value that is less than about 1 nM, 2 nM, 5 nM, 7 nM, 10 nM, 20 nM, 30 nM, 40 nM, 50 nM, 60 nM, 70 nM, 80 nM, 90 nM, 100 nM, 120 nM, 140 nM, 150 nM, 160 nM, 170 nM, 180 nM, 190 nM, 200 nM, 225 nM, 250 nM, 275 nM, 300 nM, 325 nM, 350 nM, 375 nM, 400 nM, 425 nM, 450 nM, 475 nM, 500 nM, 550 nM, 600 nM, 650 nM, 700 nM, 750 nM, 800 nM, 850 nM, 900 nM, 950 nM, 1 µM, 1.1 µM, 1.2 µM, 1.3 µM, 1.4 µM, 1.5 µM, 1.6 µM, 1.7 µM, 1.8 µM, 1.9 µM, 2 µM, 5 µM, 10 µM, 15 µM, 20 µM, 25 µM, 30 µM, 40 µM, 50 µM, 60 µM, 70 µM, 80 µM, 90 µM, 100 µM, 200 µM, 300 µM, 400 µM, or 500 µM (or in the range defined by and including any two numbers above), and said IC50 value is at least 2, 3, 4, 5, 6, 7, 8, 9, 10, 15, 20, 25, 30, 35, 40, 45, 50, 100, or 1000 times less (or a number in the range defined by and including any two numbers above) than its IC50 value against one, two or three other PRMTs.

The subject methods are useful for treating a disease or disorder associated with PRMT5. Any disease or disorder that results directly or indirectly from an abnormal activity or expression level of PRMT5 can be an intended disease or disorder.

Examples of diseases or disorders associated with PRMT5 that may be treated with compounds of the disclosure include lupus erythematosus, ankylosing spondylitis, hidradenitis suppurativa, C3 glomerulopathy, ANCA associated vasculitis, focal segmental glomerulosclerosis, chronic inflammatory demyelinating polyneuropathy, amyotrophic lateral sclerosis, relapsing polychondroitis, polymyositis, bullous dermatoses, bronchiectasis, pulmonary hypertension, cystic fibrosis, pulmonary fibrosis, transplanted organs or tissue; graft-versus-host diseases brought about by transplantation, acute respiratory distress syndrome; adult respiratory distress syndrome; influenza; COVID-19 (coronavirus disease); systemic erythematosus; Hashimoto's thyroiditis; lymphocytic thyroiditis; multiple sclerosis; myasthenia gravis, uveitis; posterior uveitis; uveitis associated with Behcet's disease; uveomeningitis syndrome; allergic encephalomyelitis; chronic allograft vasculopathy; hyperproliferative skin diseases, atopic dermatitis; osteomyelitis; contact dermatitis; eczematous dermatitis; seborrhoeic dermatitis; lichen planus; pemphigus; bullous pemphigoid; epidermolysis bullosa; urticaria; angioedema; vasculitis; erythema; cutaneous eosinophilia; acne; alopecia areata; keratoconjunctivitis; vernal conjunctivitis; keratitis; herpetic keratitis; dystrophia epithelialis corneae; corneal leukoma; ocular pemphigus; Mooren's ulcer; ulcerative keratitis; scleritis; Graves' ophthalmopathy; Vogt-Koyanagi-Harada syndrome; sarcoidosis; pollen allergies; reversible obstructive airway disease; bronchial asthma; allergic asthma; intrinsic asthma; extrinsic asthma; dust asthma; chronic or inveterate asthma; late asthma and airway hyper-responsiveness; bronchitis; gastric ulcers; ischemic bowel diseases, necrotizing enterocolitis; intestinal lesions associated with thermal burns; celiac diseases; proctitis; eosinophilic gastroenteritis, Crohn's disease; ulcerative colitis; vascular damage caused by ischemic diseases and thrombosis; atherosclerosis; fatty heart; myocarditis; cardiac infarction; arteriosclerosis, aortitis syndrome; cachexia due to viral disease; vascular thrombosis; migraine; rhinitis; interstitial nephritis; IgA-induced nephropathy; Goodpasture's syndrome; hemolytic-uremic syndrome; diabetic nephropathy; glomerulosclerosis; glomerulonephritis; multiple myositis; Guillain-Barre syndrome; Meniere's disease; polyneuritis; multiple neuritis; mononeuritis; radiculopathy; hyperthyroidism; Basedow's disease; thyrotoxicosis; pure red cell aplasia; aplastic anemia; hypoplastic anemia; idiopathic thrombocytopenic purpura; autoimmune hemolytic anemia; agranulocytosis; pernicious anemia; megaloblastic anemia; anerythroplasia; osteoporosis; sarcoidosis; fibroid lung; idiopathic interstitial pneumonia; dermatomyositis; leukoderma vulgaris; ichthyosis vulgaris; photoallergic sensitivity; polyarteritis nodosa; Huntington's chorea; Sydenham's chorea; myocardosis; Wegener's granuloma; Sjogren's syndrome; adiposis; eosinophilic fascitis; lesions of gingiva, periodontium, alveolar bone, substantia ossea dentis; male pattern alopecia or alopecia senilis; muscular dystrophy; pyoderma; Sezary's syndrome; chronic adrenal insufficiency; Addison's disease; ischemia-reperfusion injury of organs which occurs upon preservation; endotoxin shock; pseudomembranous colitis; colitis caused by drug or radiation; ischemic acute renal insufficiency; chronic renal insufficiency; inflammatory lung injury, pulmonary emphysema; cataracta; siderosis; retinitis pigmentosa, vitreal scarring; inflammatory eye disease; corneal alkali burn; dermatitis erythema; ballous dermatitis; cement dermatitis; gingivitis; periodontitis; sepsis; pancreatitis; autoimmune hepatitis, hypobaropathy; primary biliary cirrhosis; sclerosing cholangitis; partial liver resection; acute liver necrosis; cirrhosis; alcoholic cirrhosis; hepatic failure; fulminant hepatic failure; late-onset hepatic failure; "acute-on-chronic" liver failure, type I and II diabetes.

In some embodiments, the disease or disorder is inflammatory and hyperproliferative skin diseases, or cutaneous manifestations of immunologically-mediated disorders.

In yet further embodiments the disease or disorder is type I or type II diabetes.

In yet further embodiments, the disease or disorder is one or more of rejection of transplanted organs or tissue; graft-versus-host diseases brought about by transplantation; multiple sclerosis, myasthenia gravis; pollen allergies; type I diabetes; prevention of psoriasis; Crohn's disease; ulcerative colitis, acute respiratory distress syndrome; adult respiratory distress syndrome; influenza; COVID-19 (coronavirus disease); post-infectious autoimmune diseases including rheumatic fever and post-infectious glomerulonephritis.

In yet further embodiments the disease or disorder is one of influenza, COVID-19 (coronavirus disease); ulcerative colitis, multiple sclerosis, transplant rejection, acute respiratory distress syndrome or adult respiratory distress syndrome.

The examples and preparations provided below further illustrate and exemplify the compounds of the present invention and methods of preparing such compounds. It is to be understood that the scope of the present invention is not limited in any way by the scope of the following examples and preparations. In the following examples molecules with a single chiral center, unless otherwise noted, exist as a racemic mixture. Those molecules with two or more chiral centers, unless otherwise noted, exist as a racemic mixture of diastereomers. Single enantiomers/diastereomers may be obtained by methods known to those skilled in the art.

Compounds of the disclosure include, for example, the compounds identified in Table A.

TABLE A

| Ex. | Structures | MW | Chemical Names |
|---|---|---|---|
| 1A | | 388.81 | (2R,3R,4S,5S)-2-(4-amino-7H-pyrrolo[2,3-d]pyrimidin-7-yl)-5-((R)-5-chloro-1,3-dihydroisobenzofuran-1-yl)tetrahydrofuran-3,4-diol |
| 2A | | 386.83 | (1R,2S,3R,5S)-3-(4-amino-7H-pyrrolo[2,3-d]pyrimidin-7-yl)-5-((R)-5-chloro-1,3-dihydroisobenzofuran-1-yl)cyclopentane-1,2-diol |
| 3A | | 400.82 | (S)-3-((1S,2R,3S,4R)-4-(4-amino-7H-pyrrolo[2,3-d]pyrimidin-7-yl)-2,3-dihydroxycyclopentyl)-6-chloroisobenzofuran-1(3H)-one |
| 3B | | 400.82 | (R)-3-((1S,2R,3S,4R)-4-(4-amino-6H-7I4-pyrrolo[2,3-d]pyrimidin-7-yl)-2,3-dihydroxycyclopentyl)-6-chloroisobenzofuran-1(3H)-one |

TABLE A-continued

| Ex. | Structures | MW | Chemical Names |
|---|---|---|---|
| 1B | | 388.81 | (2R,3R,4S,5S)-2-(4-amino-7H-pyrrolo[2,3-d]pyrimidin-7-yl)-5-((S)-5-chloro-1,3-dihydroisobenzofuran-1-yl)tetrahydrofuran-3,4-diol |
| 2B | | 386.83 | (1R,2S,3R,5S)-3-(4-amino-7H-pyrrolo[2,3-d]pyrimidin-7-yl)-5-((S)-5-chloro-1,3-dihydroisobenzofuran-1-yl)cyclopentane-1,2-diol |
| 4 | | 390.34 | (2R,3R,4S,5S)-2-(4-amino-7H-pyrrolo[2,3-d]pyrimidin-7-yl)-5-((R)-5,6-difluoro-1,3-dihydroisobenzofuran-1-yl)tetrahydrofuran-3,4-diol |
| 5 | | 388.8 | (2R,3R,4S,5S)-2-(4-amino-7H-pyrrolo[2,3-d]pyrimidin-7-yl)-5-((R)-6-chloro-1,3-dihydroisobenzofuran-1-yl)tetrahydrofuran-3,4-diol |
| 6 | | 389.3588 | (2S,3S,4R,5R)-2-((R)-5,6-difluoro-1,3-dihydroisobenzofuran-1-yl)-5-(4-methyl-7H-pyrrolo[2,3-d]pyrimidin-7-yl)tetrahydrofuran-3,4-diol |

TABLE A-continued

| Ex. | Structures | MW | Chemical Names |
|---|---|---|---|
| 7 | | 431.4398 | (2R,3R,4S,5S)-2-(4-butyl-7H-pyrrolo[2,3-d]pyrimidin-7-yl)-5-((R)-5,6-difluoro-1,3-dihydroisobenzofuran-1-yl)tetrahydrofuran-3,4-diol |
| 8 | | 433.4118 | (2S,3S,4R,5R)-2-((R)-5,6-difluoro-1,3-dihydroisobenzofuran-1-yl)-5-(4-(ethoxymethyl)-7H-pyrrolo[2,3-d]pyrimidin-7-yl)tetrahydrofuran-3,4-diol |
| 9 | | 406.7984 | (2R,3R,4S,5S)-2-(4-amino-5-fluoro-7H-pyrrolo[2,3-d]pyrimidin-7-yl)-5-((R)-5-chloro-1,3-dihydroisobenzofuran-1-yl)tetrahydrofuran-3,4-diol |
| 10 | | 388.808 | (2R,3R,4S,5S)-2-(4-amino-7H-pyrrolo[2,3-d]pyrimidin-7-yl)-5-((R)-4-chloro-1,3-dihydroisobenzofuran-1-yl)tetrahydrofuran-3,4-diol |

TABLE A-continued

| Ex. | Structures | MW | Chemical Names |
|---|---|---|---|
| 11 | | 388.808 | (2R,3R,4S,5S)-2-(4-amino-7H-pyrrolo[2,3-d]pyrimidin-7-yl)-5-((R)-7-chloro-1,3-dihydroisobenzofuran-1-yl)tetrahydrofuran-3,4-diol |
| 12 | | 387.82 | (2S,3S,4R,5R)-2-((R)-5-chloro-1,3-dihydroisobenzofuran-1-yl)-5-(4-methyl-7H-pyrrolo[2,3-d]pyrimidin-7-yl)tetrahydrofuran-3,4-diol |
| 13 | | 387.82 | (2S,3S,4R,5R)-2-((R)-4-chloro-1,3-dihydroisobenzofuran-1-yl)-5-(4-methyl-7H-pyrrolo[2,3-d]pyrimidin-7-yl)tetrahydrofuran-3,4-diol |
| 14 | | 387.82 | (2S,3S,4R,5R)-2-((R)-7-chloro-1,3-dihydroisobenzofuran-1-yl)-5-(4-methyl-7H-pyrrolo[2,3-d]pyrimidin-7-yl)tetrahydrofuran-3,4-diol |
| 15 | | 387.82 | (2S,3S,4R,5R)-2-((R)-6-chloro-1,3-dihydroisobenzofuran-1-yl)-5-(4-methyl-7H-pyrrolo[2,3-d]pyrimidin-7-yl)tetrahydrofuran-3,4-diol |

TABLE A-continued

| Ex. | Structures | MW | Chemical Names |
|---|---|---|---|
| 16 | | 422.3642 | (2R,3R,4S,5S)-2-(4-amino-7H-pyrrolo[2,3-d]pyrimidin-7-yl)-5-((R)-5-(trifluoromethyl)-1,3-dihydroisobenzofuran-1-yl)tetrahydrofuran-3,4-diol |
| 17 | | 421.3762 | (2R,3R,4S,5S)-2-(4-methyl-7H-pyrrolo[2,3-d]pyrimidin-7-yl)-5-((R)-5-(trifluoromethyl)-1,3-dihydroisobenzofuran-1-yl)tetrahydrofuran-3,4-diol |
| 18 | | 402.835 | (2R,3S,4R,5R)-5-(4-amino-7H-pyrrolo[2,3-d]pyrimidin-7-yl)-2-((R)-5-chloro-1,3-dihydroisobenzofuran-1-yl)-3-methyltetrahydrofuran-3,4-diol |
| 19 | | 401.847 | (2R,3S,4R,5R)-2-((R)-5-chloro-1,3-dihydroisobenzofuran-1-yl)-3-methyl-5-(4-methyl-7H-pyrrolo[2,3-d]pyrimidin-7-yl)tetrahydrofuran-3,4-diol |

TABLE A-continued

| Ex. | Structures | MW | Chemical Names |
|---|---|---|---|
| 20 | | 402.835 | (2R,3R,4S,5S)-2-(4-amino-7H-pyrrolo[2,3-d]pyrimidin-7-yl)-5-((R)-5-chloro-1-methyl-1,3-dihydroisobenzofuran-1-yl)tetrahydrofuran-3,4-diol |
| 21 | | 401.847 | (2S,3S,4R,5R)-2-((R)-5-chloro-1-methyl-1,3-dihydroisobenzofuran-1-yl)-5-(4-methyl-7H-pyrrolo[2,3-d]pyrimidin-7-yl)tetrahydrofuran-3,4-diol |
| 22 | | 401.847 | (2S,3S,4R,5R)-2-((R)-6-chloroisochroman-1-yl)-5-(4-methyl-7H-pyrrolo[2,3-d]pyrimidin-7-yl)tetrahydrofuran-3,4-diol |
| 23 | | 423.8008 | (2S,3S,4R,5R)-2-((R)-5-chloro-3,3-difluoro-1,3-dihydroisobenzofuran-1-yl)-5-(4-methyl-7H-pyrrolo[2,3-d]pyrimidin-7-yl)tetrahydrofuran-3,4-diol |

TABLE A-continued

| Ex. | Structures | MW | Chemical Names |
|---|---|---|---|
| 24 | | 415.874 | (2S,3S,4R,5R)-2-((R)-5-chloro-3,3-dimethyl-1,3-dihydroisobenzofuran-1-yl)-5-(4-methyl-7H-pyrrolo[2,3-d]pyrimidin-7-yl)tetrahydrofuran-3,4-diol |
| 25 | | 403.881 | (2S,3S,4R,5R)-2-((R)-5-chloro-1,3-dihydrobenzo[c]thiophen-1-yl)-5-(4-methyl-7H-pyrrolo[2,3-d]pyrimidin-7-yl)tetrahydrofuran-3,4-diol |
| 26 | | 435.879 | (R)-5-chloro-1-((2S,3S,4R,5R)-3,4-dihydroxy-5-(4-methyl-7H-pyrrolo[2,3-d]pyrimidin-7-yl)tetrahydrofuran-2-yl)-1,3-dihydrobenzo[c]thiophene 2,2-dioxide |
| 27 | | 437.3752 | (2R,3R,4S,5S)-2-(4-methyl-7H-pyrrolo[2,3-d]pyrimidin-7-yl)-5-((R)-5-(trifluoromethoxy)-1,3-dihydroisobenzofuran-1-yl)tetrahydrofuran-3,4-diol |
| 28 | | 439.3666 | (2S,3S,4R,5R)-2-((R)-6-fluoro-5-(trifluoromethyl)-1,3-dihydroisobenzofuran-1-yl)-5-(4-methyl-7H-pyrrolo[2,3-d]pyrimidin-7-yl)tetrahydrofuran-3,4-diol |

TABLE A-continued

| Ex. | Structures | MW | Chemical Names |
|---|---|---|---|
| 29 | | 455.3656 | (2S,3S,4R,5R)-2-((R)-6-fluoro-5-(trifluoromethoxy)-1,3-dihydroisobenzofuran-1-yl)-5-(4-methyl-7H-pyrrolo[2,3-d]pyrimidin-7-yl)tetrahydrofuran-3,4-diol |
| 30 | | 400.863 | (2R,3S,4R,5R)-2-((R)-5-chloro-2-methylisoindolin-1-yl)-5-(4-methyl-7H-pyrrolo[2,3-d]pyrimidin-7-yl)tetrahydrofuran-3,4-diol |
| 31 | | 414.846 | (R)-6-chloro-3-((2R,3S,4R,5R)-3,4-dihydroxy-5-(4-methyl-7H-pyrrolo[2,3-d]pyrimidin-7-yl)tetrahydrofuran-2-yl)-2-methylisoindolin-1-one |
| 32 | | 354.366 | (2S,3S,4R,5R)-2-((R)-1,3-dihydrofuro[3,4-c]pyridin-1-yl)-5-(4-methyl-7H-pyrrolo[2,3-d]pyrimidin-7-yl)tetrahydrofuran-3,4-diol |

TABLE A-continued

| Ex. | Structures | MW | Chemical Names |
|---|---|---|---|
| 33 | | 388.808 | (2S,3S,4R,5R)-2-((R)-6-chloro-1,3-dihydrofuro[3,4-c]pyridin-1-yl)-5-(4-methyl-7H-pyrrolo[2,3-d]pyrimidin-7-yl)tetrahydrofuran-3,4-diol |
| 34 | | 360.388 | (2S,3S,4R,5R)-2-((R)-4,6-dihydrofuro[3,4-d]thiazol-4-yl)-5-(4-methyl-7H-pyrrolo[2,3-d]pyrimidin-7-yl)tetrahydrofuran-3,4-diol |
| 35 | | 394.83 | (2S,3S,4R,5R)-2-((R)-2-chloro-4,6-dihydrofuro[3,4-d]thiazol-4-yl)-5-(4-methyl-7H-pyrrolo[2,3-d]pyrimidin-7-yl)tetrahydrofuran-3,4-diol |
| 36 | | 359.4 | (2S,3S,4R,5R)-2-((R)-4,6-dihydrothieno[2,3-c]furan-4-yl)-5-(4-methyl-7H-pyrrolo[2,3-d]pyrimidin-7-yl)tetrahydrofuran-3,4-diol |
| 37 | | 393.842 | (2S,3S,4R,5R)-2-((R)-2-chloro-4,6-dihydrothieno[2,3-c]furan-4-yl)-5-(4-methyl-7H-pyrrolo[2,3-d]pyrimidin-7-yl)tetrahydrofuran-3,4-diol |

TABLE A-continued

| Ex. | Structures | MW | Chemical Names |
|---|---|---|---|
| 38 | | 343.343 | (2S,3S,4R,5R)-2-((R)-4,6-dihydro-1H-furo[3,4-c]pyrazol-4-yl)-5-(4-methyl-7H-pyrrolo[2,3-d]pyrimidin-7-yl)tetrahydrofuran-3,4-diol |
| 39 | | 357.37 | (2S,3S,4R,5R)-2-((R)-2-methyl-2,6-dihydro-4H-furo[3,4-c]pyrazol-4-yl)-5-(4-methyl-7H-pyrrolo[2,3-d]pyrimidin-7-yl)tetrahydrofuran-3,4-diol |
| 40 | | 386.84 | (2R,3S,4R,5R)-2-((R)-5-chloroisoindolin-1-yl)-5-(4-methyl-7H-pyrrolo[2,3-d]pyrimidin-7-yl)tetrahydrofuran-3,4-diol |
| 41 | | 400.82 | (R)-6-chloro-3-((2R,3S,4R,5R)-3,4-dihydroxy-5-(4-methyl-7H-pyrrolo[2,3-d]pyrimidin-7-yl)tetrahydrofuran-2-yl)isoindolin-1-one |

TABLE A-continued

| Ex. | Structures | MW | Chemical Names |
|---|---|---|---|
| 42 | | 432.86 | (2R,3R,4S,5S)-2-(4-amino-7H-pyrrolo[2,3-d]pyrimidin-7-yl)-5-((1R)-6-chloro-3-methoxyisochroman-1-yl)tetrahydrofuran-3,4-diol |
| 43 | | 418.83 | (2R,3R,4S,5S)-2-(4-amino-7H-pyrrolo[2,3-d]pyrimidin-7-yl)-5-((1R)-6-chloro-3-hydroxyisochroman-1-yl)tetrahydrofuran-3,4-diol |
| 44 | | 431.87 | (2S,3S,4R,5R)-2-((1R)-6-chloro-3-methoxyisochroman-1-yl)-5-(4-methyl-7H-pyrrolo[2,3-d]pyrimidin-7-yl)tetrahydrofuran-3,4-diol |
| 45 | | 399.83 | (2S,3S,4R,5R)-2-((R)-6-chloro-1H-isochromen-1-yl)-5-(4-methyl-7H-pyrrolo[2,3-d]pyrimidin-7-yl)tetrahydrofuran-3,4-diol |

TABLE A-continued

| Ex. | Structures | MW | Chemical Names |
|---|---|---|---|
| 46 | | 415.83 | (R)-6-chloro-1-((2S,3S,4R,5R)-3,4-dihydroxy-5-(4-methyl-7H-pyrrolo[2,3-d]pyrimidin-7-yl)tetrahydrofuran-2-yl)isochroman-3-one |
| 47 | | 429.90 | (2S,3S,4R,5R)-2-((R)-6-chloro-4,4-dimethylisochroman-1-yl)-5-(4-methyl-7H-pyrrolo[2,3-d]pyrimidin-7-yl)tetrahydrofuran-3,4-diol |
| 48 | | 407.87 | (2S,3S,4R,5R)-2-((S)-2-chloro-4,7-dihydro-5H-thieno[2,3-c]pyran-7-yl)-5-(4-methyl-7H-pyrrolo[2,3-d]pyrimidin-7-yl)tetrahydrofuran-3,4-diol |
| 49 | | 366.38 | (2R,3R,4S,5S)-2-(4-methyl-7H-pyrrolo[2,3-d]pyrimidin-7-yl)-5-((R)-1H-pyrano[3,4-c]pyridin-1-yl)tetrahydrofuran-3,4-diol |

TABLE A-continued

| Ex. | Structures | MW | Chemical Names |
|---|---|---|---|
| 50 | | 417.85 | (2S,3S,4R,5R)-2-((1R)-6-chloro-3-hydroxyisochroman-1-yl)-5-(4-methyl-7H-pyrrolo[2,3-d]pyrimidin-7-yl)tetrahydrofuran-3,4-diol |
| 51 | | 368.39 | (2S,3S,4R,5R)-2-((R)-3,4-dihydro-1H-pyrano[3,4-c]pyridin-1-yl)-5-(4-methyl-7H-pyrrolo[2,3-d]pyrimidin-7-yl)tetrahydrofuran-3,4-diol |
| 52 | | 437.83 | (2S,3S,4R,5R)-2-((R)-6-chloro-4,4-difluoroisochroman-1-yl)-5-(4-methyl-7H-pyrrolo[2,3-d]pyrimidin-7-yl)tetrahydrofuran-3,4-diol |
| 53 | | 403.82 | (2S,3S,4R,5R)-2-((R)-7-chloro-4H-benzo[d][1,3]dioxin-4-yl)-5-(4-methyl-7H-pyrrolo[2,3-d]pyrimidin-7-yl)tetrahydrofuran-3,4-diol |

TABLE A-continued

| Ex. | Structures | MW | Chemical Names |
|---|---|---|---|
| 54 | | 439.80 | (2S,3S,4R,5R)-2-((R)-7-chloro-2,2-difluoro-4H-benzo[d][1,3]dioxin-4-yl)-5-(4-methyl-7H-pyrrolo[2,3-d]pyrimidin-7-yl)tetrahydrofuran-3,4-diol |
| 55 | | 417.85 | (2S,3S,4R,5R)-2-((R)-7-chloro-1,5-dihydrobenzo[e][1,3]dioxepin-1-yl)-5-(4-methyl-7H-pyrrolo[2,3-d]pyrimidin-7-yl)tetrahydrofuran-3,4-diol |
| 56 | | 453.83 | (2S,3S,4R,5R)-2-((R)-7-chloro-3,3-difluoro-1,5-dihydrobenzo[e][1,3]dioxepin-1-yl)-5-(4-methyl-7H-pyrrolo[2,3-d]pyrimidin-7-yl)tetrahydrofuran-3,4-diol |
| 57 | | 431.83 | (R)-7-chloro-1-((2S,3S,4R,5R)-3,4-dihydroxy-5-(4-methyl-7H-pyrrolo[2,3-d]pyrimidin-7-yl)tetrahydrofuran-2-yl)-1,5-dihydrobenzo[e][1,3]dioxepin-3-one |
| 58 | | 431.87 | (2S,3S,4R,5R)-2-((R)-8-chloro-5,6-dihydro-1H-benzo[e][1,3]dioxocin-1-yl)-5-(4-methyl-7H-pyrrolo[2,3-d]pyrimidin-7-yl)tetrahydrofuran-3,4-diol |

TABLE A-continued

| Ex. | Structures | MW | Chemical Names |
|---|---|---|---|
| 59 | | 467.85 | (2S,3S,4R,5R)-2-((R)-8-chloro-3,3-difluoro-5,6-dihydro-1H-benzo[e][1,3]dioxocin-1-yl)-5-(4-methyl-7H-pyrrolo[2,3-d]pyrimidin-7-yl)tetrahydrofuran-3,4-diol |
| 60 | | 445.86 | (R)-8-chloro-1-((2S,3S,4R,5R)-3,4-dihydroxy-5-(4-methyl-7H-pyrrolo[2,3-d]pyrimidin-7-yl)tetrahydrofuran-2-yl)-5,6-dihydro-1H-benzo[e][1,3]dioxocin-3-one |
| 61 | | 400.86 | (2R,3S,4R,5R)-2-((R)-6-chloro-1,2,3,4-tetrahydroisoquinolin-1-yl)-5-(4-methyl-7H-pyrrolo[2,3-d]pyrimidin-7-yl)tetrahydrofuran-3,4-diol |
| 62 | | 469.85 | (2S,3S,4R,5R)-2-((1R)-6-chloro-4-(trifluoromethyl)isochroman-1-yl)-5-(4-methyl-7H-pyrrolo[2,3-d]pyrimidin-7-yl)tetrahydrofuran-3,4-diol |

TABLE A-continued

| Ex. | Structures | MW | Chemical Names |
|---|---|---|---|
| 63 | | 419.84 | (2S,3S,4R,5R)-2-((1R)-6-chloro-4-fluoroisochroman-1-yl)-5-(4-methyl-7H-pyrrolo[2,3-d]pyrimidin-7-yl)tetrahydrofuran-3,4-diol |
| 64 | | 417.85 | (2S,3S,4R,5R)-2-((1R)-6-chloro-4-hydroxyisochroman-1-yl)-5-(4-methyl-7H-pyrrolo[2,3-d]pyrimidin-7-yl)tetrahydrofuran-3,4-diol |
| 65 | | 415.87 | (2S,3S,4R,5R)-2-((1R)-6-chloro-4-methylisochroman-1-yl)-5-(4-methyl-7H-pyrrolo[2,3-d]pyrimidin-7-yl)tetrahydrofuran-3,4-diol |
| 66 | | 415.87 | (2S,3S,4R,5R)-2-((1R)-6-chloro-3-methylisochroman-1-yl)-5-(4-methyl-7H-pyrrolo[2,3-d]pyrimidin-7-yl)tetrahydrofuran-3,4-diol |

TABLE A-continued

| Ex. | Structures | MW | Chemical Names |
|---|---|---|---|
| 67 | | 403.86 | (2S,3S,4R,5R)-2-((R)-6-chloroisochroman-1-yl-4,4-d2)-5-(4-methyl-7H-pyrrolo[2,3-d]pyrimidin-7-yl)tetrahydrofuran-3,4-diol |
| 68 | | 402.84 | (2R,3R,4S,5S)-2-(4-amino-7H-pyrrolo[2,3-d]pyrimidin-7-yl)-5-((R)-6-chloroisochroman-1-yl)tetrahydrofuran-3,4-diol |
| 69 | | 416.86 | (2S,3S,4R,5R)-2-((R)-6-chloroisochroman-1-yl)-5-(4-(methylamino)-7H-pyrrolo[2,3-d]pyrimidin-7-yl)tetrahydrofuran-3,4-diol |
| 70 | | 401.85 | (2S,3S,4R,5R)-2-((R)-7-chloroisochroman-1-yl)-5-(4-methyl-7H-pyrrolo[2,3-d]pyrimidin-7-yl)tetrahydrofuran-3,4-diol |

TABLE A-continued

| Ex. | Structures | MW | Chemical Names |
|---|---|---|---|
| 71 | | 402.84 | (2R,3R,4S,5S)-2-(4-amino-7H-pyrrolo[2,3-d]pyrimidin-7-yl)-5-((R)-7-chloroisochroman-1-yl)tetrahydrofuran-3,4-diol |
| 72 | | 402.84 | (2R,3R,4S,5S)-2-(4-amino-7H-pyrrolo[2,3-d]pyrimidin-7-yl)-5-((R)-5-chloroisochroman-1-yl)tetrahydrofuran-3,4-diol |
| 73 | | 404.37 | (2R,3R,4S,5S)-2-(4-amino-7H-pyrrolo[2,3-d]pyrimidin-7-yl)-5-((R)-6,7-difluoroisochroman-1-yl)tetrahydrofuran-3,4-diol |
| 74 | | 403.39 | (2S,3S,4R,5R)-2-((R)-6,7-difluoroisochroman-1-yl)-5-(4-methyl-7H-pyrrolo[2,3-d]pyrimidin-7-yl)tetrahydrofuran-3,4-diol |

TABLE A-continued

| Ex. | Structures | MW | Chemical Names |
|-----|------------|-----|----------------|
| 75 | | 401.85 | (2S,3S,4R,5R)-2-((R)-5-chloroisochroman-1-yl)-5-(4-methyl-7H-pyrrolo[2,3-d]pyrimidin-7-yl)tetrahydrofuran-3,4-diol |
| 76 | | 403.39 | (2S,3S,4R,5R)-2-((R)-4,4-difluoroisochroman-1-yl)-5-(4-methyl-7H-pyrrolo[2,3-d]pyrimidin-7-yl)tetrahydrofuran-3,4-diol |
| 77 | | 404.37 | (2R,3R,4S,5S)-2-(4-amino-7H-pyrrolo[2,3-d]pyrimidin-7-yl)-5-((R)-5,6-difluoroisochroman-1-yl)tetrahydrofuran-3,4-diol |
| 78 | | 404.37 | (2R,3R,4S,5S)-2-(4-amino-7H-pyrrolo[2,3-d]pyrimidin-7-yl)-5-((R)-4,4-difluoroisochroman-1-yl)tetrahydrofuran-3,4-diol |

TABLE A-continued

| Ex. | Structures | MW | Chemical Names |
|---|---|---|---|
| 79 | | 403.39 | (2S,3S,4R,5R)-2-((R)-5,6-difluoroisochroman-1-yl)-5-(4-methyl-7H-pyrrolo[2,3-d]pyrimidin-7-yl)tetrahydrofuran-3,4-diol |
| 80 | | 401.85 | (2S,3S,4R,5R)-2-((S)-6-chloroisochroman-1-yl)-5-(4-methyl-7H-pyrrolo[2,3-d]pyrimidin-7-yl)tetrahydrofuran-3,4-diol |
| 81 | | 418.83 | (2R,3R,4S,5S)-2-(4-amino-7H-pyrrolo[2,3-d]pyrimidin-7-yl)-5-((R)-7-chloro-1,5-dihydrobenzo[e][1,3]dioxepin-1-yl)tetrahydrofuran-3,4-diol |
| 82 | | 416.82 | (R)-1-((2S,3S,4R,5R)-5-(4-amino-7H-pyrrolo[2,3-d]pyrimidin-7-yl)-3,4-dihydroxytetrahydrofuran-2-yl)-6-chloroisochroman-3-one |

TABLE A-continued

| Ex. | Structures | MW | Chemical Names |
|---|---|---|---|
| 83 | | 419.84 | (2S,3S,4R,5R)-2-((R)-6-chloro-5-fluoroisochroman-1-yl)-5-(4-methyl-7H-pyrrolo[2,3-d]pyrimidin-7-yl)tetrahydrofuran-3,4-diol |
| 84 | | 420.83 | (2R,3R,4S,5S)-2-(4-amino-7H-pyrrolo[2,3-d]pyrimidin-7-yl)-5-((R)-6-chloro-5-fluoroisochroman-1-yl)tetrahydrofuran-3,4-diol |
| 85 | | 419.84 | (2S,3S,4R,5R)-2-((R)-6-chloroisochroman-1-yl)-5-(5-fluoro-4-methyl-7H-pyrrolo[2,3-d]pyrimidin-7-yl)tetrahydrofuran-3,4-diol |
| 86 | | 420.83 | (2R,3R,4S,5S)-2-(4-amino-5-fluoro-7H-pyrrolo[2,3-d]pyrimidin-7-yl)-5-((R)-6-chloroisochroman-1-yl)tetrahydrofuran-3,4-diol |

TABLE A-continued

| Ex. | Structures | MW | Chemical Names |
|---|---|---|---|
| 87 | | 436.29 | (2S,3S,4R,5R)-2-((R)-6,7-dichloroisochroman-1-yl)-5-(4-methyl-7H-pyrrolo[2,3-d]pyrimidin-7-yl)tetrahydrofuran-3,4-diol |
| 88 | | 437.28 | (2R,3R,4S,5S)-2-(4-amino-7H-pyrrolo[2,3-d]pyrimidin-7-yl)-5-((R)-6,7-dichloroisochroman-1-yl)tetrahydrofuran-3,4-diol |
| 89 | | 408.88 | (2S,3S,4R,5R)-2-((S)-2-chloro-4,7-dihydro-5H-thieno[2,3-c]pyran-7-yl)-5-(4-methyl-7H-pyrrolo[2,3-d]pyrimidin-7-yl)tetrahydrofuran-3,4-diol |
| 90 | | 409.87 | (2R,3R,4S,5S)-2-(4-amino-7H-pyrrolo[2,3-d]pyrimidin-7-yl)-5-((S)-2-chloro-4,7-dihydro-5H-thieno[2,3-c]pyran-7-yl)tetrahydrofuran-3,4-diol |

TABLE A-continued

| Ex. | Structures | MW | Chemical Names |
|---|---|---|---|
| 91 | | 409.87 | (2R,3R,4S,5S)-2-(4-amino-7H-pyrrolo[2,3-d]pyrimidin-7-yl)-5-((R)-2-chloro-4,7-dihydro-5H-thieno[2,3-c]pyran-7-yl)tetrahydrofuran-3,4-diol |
| 92 | | 419.84 | (2S,3S,4R,5R)-2-((1R,4S)-6-chloro-4-fluoroisochroman-1-yl)-5-(4-methyl-7H-pyrrolo[2,3-d]pyrimidin-7-yl)tetrahydrofuran-3,4-diol |
| 93 | | 420.83 | (2R,3R,4S,5S)-2-(4-aminopyrrolo[2,3-d]pyrimidin-7-yl)-5-[(1R,4S)-6-chloro-4-fluoro-isochroman-1-yl]tetrahydrofuran-3,4-diol |
| 94 | | 419.84 | (2R,3R,4S,5S)-2-(4-methylpyrrolo[2,3-d]pyrimidin-7-yl)-5-[(1R,4R)-6-chloro-4-fluoro-isochroman-1-yl]tetrahydrofuran-3,4-diol |

TABLE A-continued

| Ex. | Structures | MW | Chemical Names |
|---|---|---|---|
| 95 | | 420.83 | (2R,3R,4S,5S)-2-(4-amino-7H-pyrrolo[2,3-d]pyrimidin-7-yl)-5-((1R,4R)-6-chloro-4-fluoroisochroman-1-yl)tetrahydrofuran-3,4-diol |
| 97 | | 405.36 | (2S,3S,4R,5R)-2-((R)-7,8-difluoro-4H-benzo[d][1,3]dioxin-4-yl)-5-(4-methyl-7H-pyrrolo[2,3-d]pyrimidin-7-yl)tetrahydrofuran-3,4-diol |
| 98 | | 400.86 | (2R,3S,4R,5R)-2-[(1R)-6-chloro-1,2,3,4-tetrahydroisoquinolin-1-yl]-5-(4-methylpyrrolo[2,3-d]pyrimidin-7-yl)tetrahydrofuran-3,4-diol |
| 99 | | 415.87 | (2S,3S,4R,5R)-2-((R)-6-chloro-7-methylisochroman-1-yl)-5-(4-methyl-7H-pyrrolo[2,3-d]pyrimidin-7-yl)tetrahydrofuran-3,4-diol |

TABLE A-continued

| Ex. | Structures | MW | Chemical Names |
|---|---|---|---|
| 100 | | 416.86 | (2R,3R,4S,5S)-2-(4-amino-7H-pyrrolo[2,3-d]pyrimidin-7-yl)-5-((R)-6-chloro-7-methylisochroman-1-yl)tetrahydrofuran-3,4-diol |
| 101 | | 415.87 | (2S,3S,4R,5R)-2-((R)-7-chloro-1,3,4,5-tetrahydrobenzo[c]oxepin-1-yl)-5-(4-methyl-7H-pyrrolo[2,3-d]pyrimidin-7-yl)tetrahydrofuran-3,4-diol |
| 102 | | 416.86 | (2R,3R,4S,5S)-2-(4-amino-6H-7I4-pyrrolo[2,3-d]pyrimidin-7-yl)-5-((R)-7-chloro-1,3,4,5-tetrahydrobenzo[c]oxepin-1-yl)tetrahydrofuran-3,4-diol |
| 103 | | 406.4 | (2S,3S,4R,5R)-2-((R)-6,7-difluoroisochroman-1-yl)-5-(4-(methyl-d3)-7H-pyrrolo[2,3-d]pyrimidin-7-yl)tetrahydrofuran-3,4-diol |

EXPERIMENTAL PROCEDURES
Example 1A. Synthesis of (2R,3R,4S,5S)-2-(4-amino-7H-pyrrolo[2,3-d]pyrimidin-7-yl)-5-((R)-5-chloro-1,3-dihydroisobenzofuran-1-yl)tetrahydrofuran-3,4-diol (Ex. 1A)
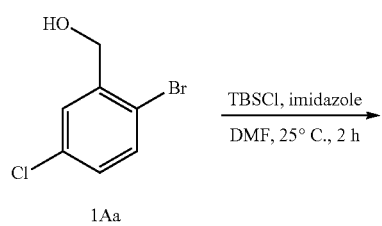
1Aa
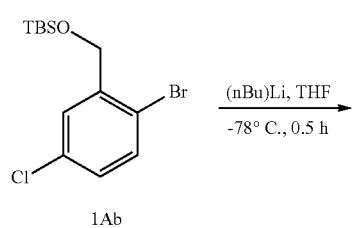
1Ab
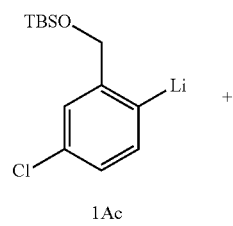
1Ac
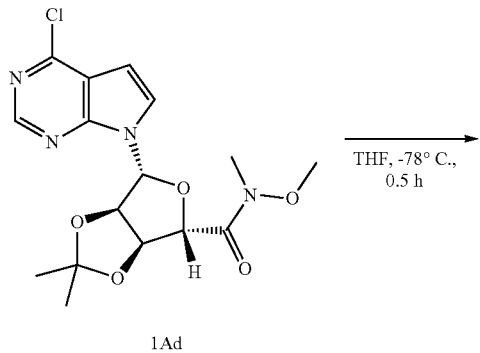
1Ad
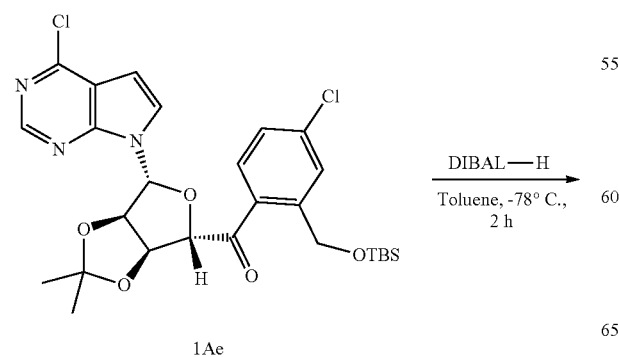
1Ae
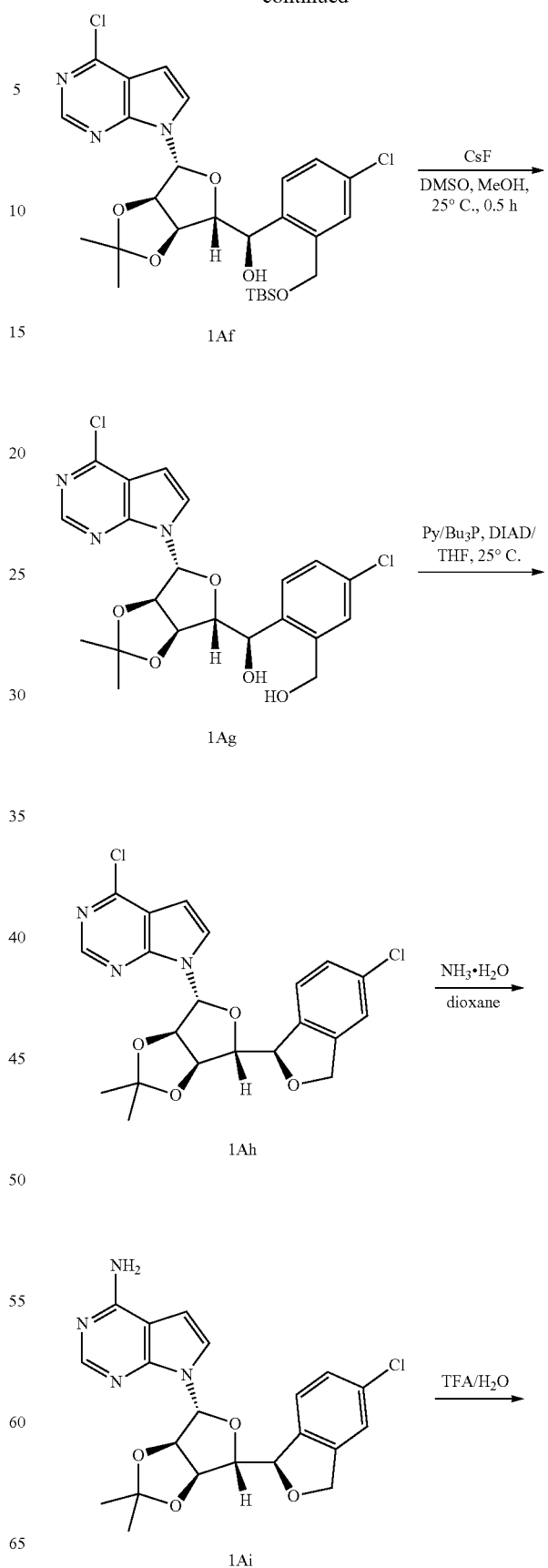

-continued

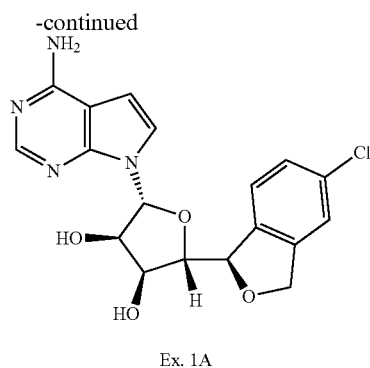

Ex. 1A

Step 1. Synthesis of (2-bromo-5-chloro-phenyl) methoxy-tert-butyl-dimethyl-silane (1Ab)

To a solution of (2-bromo-5-chloro-phenyl)methanol (1Aa, 5.0 g, 22.58 mmol) in DMF (10 mL) was added TBSCl (10.21 g, 67.73 mmol) and imidazole (3073.9 mg, 45.15 mmol). The reaction mixture was stirred at 25° C. for 16 h. TLC (PE:EA=10:1, $R_f$=0.8) showed the reaction was completed. The reaction mixture was diluted with water (100 mL) and the mixture was extracted with EA (50 mL×3), then the organic layers were washed with brine (100 mL×3), dried over $Na_2SO_4$ and concentrated in vacuum to give the crude product which was purified by silica chromatography column (100-200 mesh size, PE:EA=200:1 to 100:1) to give (2-bromo-5-chloro-phenyl)methoxy-tert-butyl-dimethyl-silane (5.0 g, 14.9 mmol, 66% yield) as a colorless oil.

Step 2. Synthesis of [(3aR,4R,6S,6aS)-4-(4-chloro-pyrrolo[2,3-d]pyrimidin-7-yl)-2,2-dimethyl-3a,4,6,6a-tetrahydrofuro[3,4-d][1,3]dioxol-6-yl]-[2-[[tert-butyl(dimethyl)silyl]oxymethyl]-4-chloro-phenyl] methanone (1Ae)

To a solution of (2-bromo-5-chloro-phenyl)methoxy-tert-butyl-dimethyl-silane (1Ab, 4.3 g, 12.80 mmol) in THF (50 mL) was added butyllithium (0.6 g, 9.10 mmol) at −78° C. under $N_2$. The mixture was stirred at −78° C. for 10 min to yield 1Ac. A solution of the (3aR,4R,6S,6aS)-4-(4-chloropyrrolo[2,3-d] pyrimidin-7-yl)-N-methoxy-N,2,2-trimethyl-3a,4,6,6a-tetrahydrofuro[3,4-d][1,3]dioxole-6-carboxamide (1Ad, 1.4 g, 3.70 mmol) in THF (50 mL) was added. The mixture was stirred at −78° C. for 30 min. LCMS showed the reaction was complete. The reaction mixture was quenched with saturated $NH_4Cl$ solution (50 mL). The mixture was extracted with ethyl acetate (100 mL×3). The combined organic layers were washed with brine (40 mL×3), dried over $Na_2SO_4$ and concentrated in vacuum to give the crude product which was purified by silica chromatography column (100-200 mesh size, PE:EA=20:1 to 10:1) to give [(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]-[2-[[tert-butyl(dimethyl)silyl]oxymethyl]-4-chloro-phenyl]methanone (1Ae, 1.3 g, 2.20 mmol, 61.4% yield) as a pale yellow oil. LCMS [M+H]: 578.2.

Step 3. Synthesis of (R)-[(3aR,4R,6R,6aR)-4-(4-chloropyrrolo [2,3-d]pyrimidin-7-yl)-2,2-dimethyl-3a,4,6,6a-tetrahydrofuro[3,4-d][1,3]dioxol-6-yl]-[2-[[tert-butyl(dimethyl)silyl]oxymethyl]-4-chloro-phenyl]methanol (1Af)

To a solution of [(3aR,4R,6S,6aS)-4-(4-chloropyrrolo[2,3-d]pyrimidin-7-yl)-2,2-dimethyl-3a,4,6,6a-tetrahydrofuro [3,4-d][1,3]dioxol-6-yl]-[2-[[tert-butyl(dimethyl)silyl] oxymethyl]-4-chloro-phenyl]methanone (1Ae, 50 mg, 0.11 mmol) in toluene (5 mL) was added diisobutylaluminum hydride (24.6 mg, 0.20 mmol). The reaction mixture was stirred at −78° C. for 0.5 h under $N_2$. TLC (PE:EA=3:1, $R_f$=0.3) showed the reaction was complete. The reaction mixture was washed with water (10 mL×3) brine (10 mL×3). The organic layer was dried over $Na_2SO_4$, filtered and concentrated to afford the crude product which was purified silica chromatography column (100-200 mesh size, PE:EA=10:1 to 5:1) to give (R)-[(3aR,4R,6R,6aR)-4-(4-chloropyrrolo [2,3-d]pyrimidin-7-yl)-2,2-dimethyl-3a,4,6,6a-tetrahydrofuro[3,4-d][1,3]dioxol-6-yl]-[2-[[tert-butyl(dimethyl)silyl]oxymethyl]-4-chloro-phenyl]methanol (1Af, 50 mg, 0.10 mmol, 99.7% yield) as a pale yellow solid.

Step 4. Synthesis of (R)-[(3aR,4R,6R,6aR)-4-(4-chloropyrrolo [2,3-d]pyrimidin-7-yl)-2,2-dimethyl-3a,4,6,6a-tetrahydrofuro [3,4-d][1,3]dioxol-6-yl]-[4-chloro-2-(hydroxymethyl)phenyl]methanol (1Ag)

To a solution of (R)-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]-[2-[[tert-butyl(dimethyl)silyl]oxymethyl]-4-chloro-phenyl]methanol (1Af, 50 mg, 0.10 mmol) in DMSO (12 mL) and methanol (0.2 mL) was added CsF (39.3 mg, 0.3 mmol) and the reaction mixture was stirred at 25° C. for 0.5 h. LCMS showed the reaction was completed. The reaction mixture was filtered and purified by reversed-phase combi-flash, eluted with $CH_3CN$ in $H_2O$ (neutral condition) from 10% to 55% to give (R)-[(3aR,4R,6R,6aR)-4-(4-chloropyrrolo [2,3-d]pyrimidin-7-yl)-2,2-dimethyl-3a,4,6,6a-tetrahydrofuro [3,4-d][1,3]dioxol-6-yl]-[4-chloro-2-(hydroxymethyl)phenyl]methanol (1Ag, 30 mg, 0.1 mmol, 71.7% yield) as a pale yellow oil. LCMS [M+H]: 466.1.

Step 5. Synthesis of 7-[(3aR,4R,6R,6aR)-6-[(1R)-5-chloro-1,3-dihydroisobenzofuran-1-yl]-2,2-dimethyl-3a,4,6,6a-tetrahydrofuro[3,4-d][1,3]dioxol-4-yl]-4-chloro-pyrrolo[2,3-d]pyrimidine (1Ah)

To a solution of (R)-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]-[4-chloro-2-(hydroxymethyl)phenyl]methanol (100.0 mg, 0.21 mmol) in THF (20 mL) was added Pyridine (0.02 mL, 0.21 mmol) at 25° C., Tributylphosphine (0.1 mL, 0.42 mmol) was added followed by DIAD (0.1 mL, 0.52 mmol) at 25° C. The reaction was stirred at 25° C. under $N_2$ for 4 h. TLC (PE:EA=1:1, $R_f$=0.4) showed the reaction was completed. The mixture was concentrated in vacuum to give crude product which was purified by silica chromatography column (100-200 mesh size, PE:EA=10:1 to 1:1) to give to give 7-[(3aR,4R,6R,6aR)-6-[(1R)-5-chloro-1,3-dihydroisobenzofuran-1-yl]-2,2-dimethyl-3a,4,6,6a-tetrahydrofuro[3,4-d][1,3]dioxol-4-yl]-4-chloro-pyrrolo[2,3-d]pyrimidine (1Ah, 80.0 mg, 0.2 mmol, 83.2% yield) as a pale yellow oil.

Step 6. Synthesis of 7-[(3aR,4R,6R,6aR)-6-[(1R)-5-chloro-1,3-dihydroisobenzofuran-1-yl]-2,2-dimethyl-3a,4,6,6a-tetrahydrofuro[3,4-d][1,3]dioxol-4-yl]pyrrolo[2,3-d]pyrimidin-4-amine (1Ai)

A solution of 7-[(3aR,4R,6R,6aR)-6-[(1R)-5-chloro-1,3-dihydroisobenzofuran-1-yl]-2,2-dimethyl-3a,4,6,6a-tetrahydrofuro[3,4-d][1,3]dioxol-4-yl]-4-chloro-pyrrolo[2,3-d]pyrimidine (1Ah, 80.0 mg, 0.2 mmol) in 1,4-dioxane (3 mL) and NH$_3$·H$_2$O (3 mL, 77.9 mmol) was stirred at 120° C. for 16 h in an autoclave. LCMS showed the reaction was complete. The mixture was concentrated in vacuum to give the crude product which was purified by reversed-phase combi-flash, eluted with CH$_3$CN in H$_2$O (neutral condition) from 10% to 95% to give 7-[(3aR,4R,6R,6aR)-6-[(1R)-5-chloro-1,3-dihydroisobenzofuran-1-yl]-2,2-dimethyl-3a,4,6,6a-tetrahydrofuro[3,4-d][1,3]dioxol-4-yl]pyrrolo[2,3-d]pyrimidin-4-amine (1Ai, 45.0 mg, 0.11 mmol, 58.8% yield) as a pale yellow solid. LCMS [M+H]: 429.1.

Step 7. Synthesis of (Ex. 1A)

A solution of 7-[(3aR,4R,6R,6aR)-6-[(1R)-5-chloro-1,3-dihydroisobenzofuran-1-yl]-2,2-dimethyl-3a,4,6,6a-tetrahydrofuro[3,4-d][1,3]dioxol-4-yl]pyrrolo[2,3-d]pyrimidin-4-amine (1Ai, 45.0 mg, 0.10 mmol) in water (3 mL) and TFA (3 mL, 33.30 mmol) was stirred at 25° C. for 1 h. LCMS showed the reaction was completed. The reaction mixture was concentrated and purified by prep-HPLC, (0.1% NH$_3$·H$_2$O), eluted with CH$_3$CN in H$_2$O from 10% to 95% to give (2R,3R,4S,5S)-2-(4-aminopyrrolo[2,3-d]pyrimidin-7-yl)-5-[(1R)-5-chloro-1,3-dihydroisobenzofuran-1-yl]tetrahydrofuran-3,4-diol (Ex. 1A, 6.0 mg, 0.02 mmol, 14.5% yield) as a white solid. LCMS [M+H]: 389.1. $^1$H NMR (400 M Hz, DMSO-d$_6$): δ 8.06 (s, 1H), 7.42 (s, 1H), 7.34-7.35 (d, J=4.0 Hz, 1H), 7.29-7.32 (m, 1H), 7.22-7.24 (m, 1H), 7.03 (s, 2H), 6.64 (d, J=3.6 Hz, 1H), 6.14-6.16 (d, J=7.6 Hz, 1H), 5.34-5.36 (m, 1H), 5.27-5.28 (d, J=6.4 Hz, 1H), 5.19-5.20 (d, J=4.0 Hz, 1H), 5.04-5.12 (m, 2H), 4.51-4.56 (m, 1H), 4.05-4.06 (m, 1H), 3.93-3.95 (m, 1H). $^1$H NMR (400 M Hz, DMSO-d6+D2O): δ 8.07 (s, 1H), 7.43 (s, 1H), 7.34-7.35 (d, J=3.6 Hz, 1H), 7.30-7.33 (m, 1H), 7.23-7.25 (m, 1H), 6.65-6.66 (d, J=3.6 Hz, 1H), 6.14-6.16 (d, J=7.6 Hz, 1H), 5.35-5.36 (m, 1H), 5.08-5.10 (m, 2H), 4.51-4.54 (m, 1H), 4.07-4.09 (m, 1H), 3.93-3.94 (m, 1H).

Example 1B. Synthesis of (2R,3R,4S,5S)-2-(4-amino-7H-pyrrolo[2,3-d]pyrimidin-7-yl)-5-((S)-5-chloro-1,3-dihydroisobenzofuran-1-yl)tetrahydrofuran-3,4-diol (Ex. 1B)

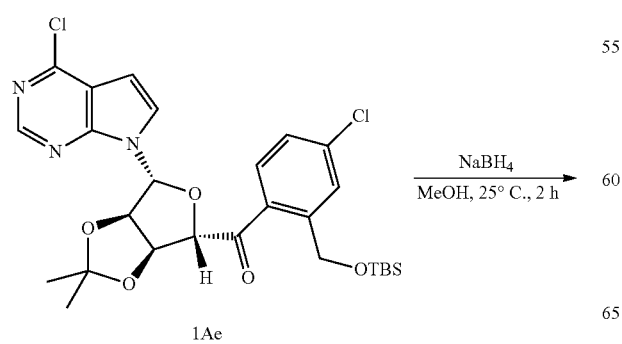

1Ae

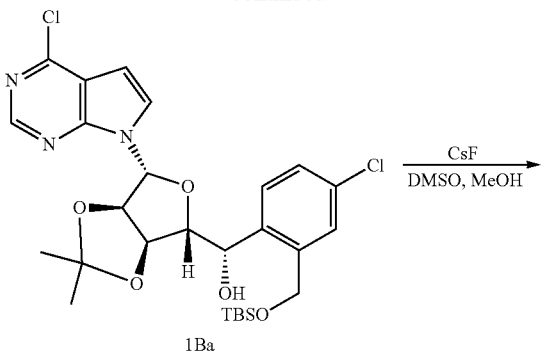

1Ba

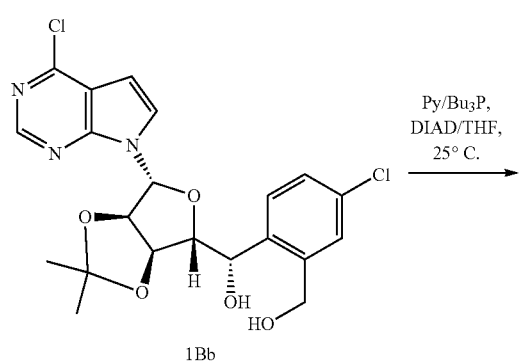

1Bb

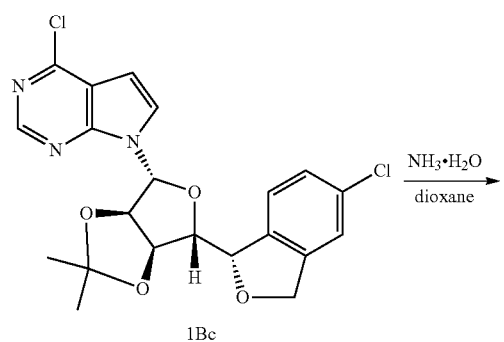

1Bc

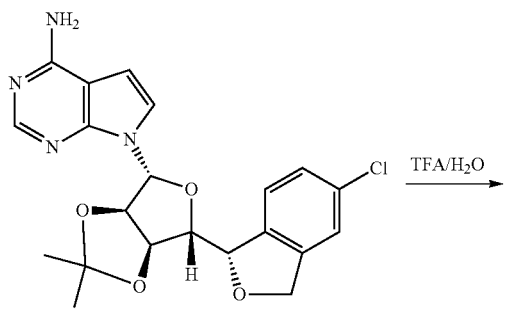

1Bd

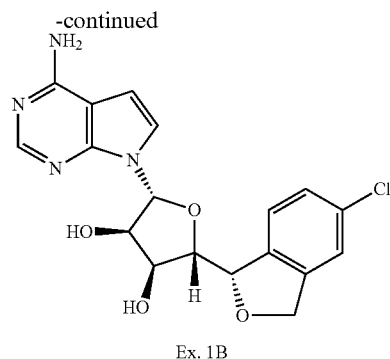

Ex. 1B

Step 1. Synthesis of (1Ba)

To a solution of [(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]-[2-[[tert-butyl(dimethyl)silyl]oxymethyl]-4-chloro-phenyl]methanone (1Ae, 630 mg, 1.10 mmol) in methanol (5 mL) was added NaBH$_4$ (82.4 mg, 2.20 mmol), and the mixture was stirred at 25° C. for 1 h. TLC (PE:EA=1:1, R$_f$=0.4) showed the starting material was consumed. LCMS showed the reaction was complete. The reaction mixture was quenched with saturated NH$_4$Cl solution (50 mL). The mixture was extracted with ethyl acetate (100 mL×3). The combined organic layers were washed with brine (40 mL×3), dried over Na$_2$SO$_4$ and concentrated in vacuum to give the crude product which was purified by silica chromatography column (100-200 mesh size, PE:EA=10:1 to 5:1) to give (R)-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]-[2-[[tert-butyl(dimethyl)silyl]oxymethyl]-4-chloro-phenyl]methanol (1Af, 10.0 mg, 0.02 mmol, 1.6% yield) and (S)-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]-[2-[[tert-butyl(dimethyl)silyl]oxymethyl]-4-chloro-phenyl]methanol (1Ba, 520 mg, 0.9 mmol, 82.3% yield) as a pale yellow oil.

Step 2. Synthesis of (S)-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]-[4-chloro-2-(hydroxymethyl)phenyl]methanol (1Bb)

To a solution of (S)-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]-[2-[[tert-butyl(dimethyl)silyl]oxymethyl]-4-chloro-phenyl]methanol (1Ba, 520 mg, 0.90 mmol) in DMSO (5 mL) and methanol (0.1 mL) was added CsF (408.2 mg, 2.70 mmol) and the reaction mixture was stirred at 25° C. for 1 h. LCMS showed the reaction was complete. The reaction mixture was filtered and purified by reversed-phase combi-flash, eluted with CH$_3$CN in H$_2$O (neutral condition) from 10% to 95% to give (S)-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]-[4-chloro-2-(hydroxymethyl)phenyl]methanol (1Bb, 300 mg, 0.64 mmol, 71.8% yield) as a white solid. LCMS [M+H]: 466.1.

Step 3. Synthesis of 7-[(3aR,4R,6R,6aR)-6-[(1S)-5-chloro-1,3-dihydroisobenzofuran-1-yl]-2,2-dimethyl-3a,4,6,6a-tetrahydrofuro[3,4-d][1,3]dioxol-4-yl]-4-chloro-pyrrolo[2,3-d]pyrimidine (1Bc)

To a solution of (S)-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]-[4-chloro-2-(hydroxymethyl)phenyl]methanol (1Bb, 250 mg, 0.5 mmol) in THF (5 mL) and was added pyridine (0.04 mL, 0.50 mmol), tributylphosphine (0.3 mL, 1.10 mmol) and DIAD (0.2 mL, 1.10 mmol). The reaction mixture was stirred at 25° C. for 16 h. TLC (PE:EA=3:1, R$_f$=0.4) showed the reaction was complete. The mixture was concentrated in vacuum to give the crude product which was purified by silica chromatography column (100-200 mesh size, PE:EA=50:1 to 20:1) to give 7-[(3aR,4R,6R,6aR)-6-[(1S)-5-chloro-1,3-dihydroisobenzofuran-1-yl]-2,2-dimethyl-3a,4,6,6a-tetrahydrofuro[3,4-d][1,3]dioxol-4-yl]-4-chloro-pyrrolo[2,3-d]pyrimidine (1Bc, 180.0 mg, 0.4 mmol, 74.9% yield) as a white solid.

Step 4. Synthesis of 7-[(3aR,4R,6R,6aR)-6-[(1S)-5-chloro-1,3-dihydroisobenzofuran-1-yl]-2,2-dimethyl-3a,4,6,6a-tetrahydrofuro[3,4-d][1,3]dioxol-4-yl]pyrrolo[2,3-d]pyrimidin-4-amine (1Bd)

To a solution of 7-[(3aR,4R,6R,6aR)-6-[(1S)-5-chloro-1,3-dihydroisobenzofuran-1-yl]-2,2-dimethyl-3a,4,6,6a-tetrahydrofuro[3,4-d][1,3]dioxol-4-yl]-4-chloro-pyrrolo[2,3-d]pyrimidine (1Bc, 180 mg, 0.40 mmol) in 1,4-dioxane (5 mL) and was added NH$_3$·H$_2$O (5 mL, 129.81 mmol) and the reaction mixture was stirred at 25° C. for 16 h in a autoclave. LCMS showed the reaction was complete. The mixture was concentrated in vacuum to give the crude product which was purified by reversed-phase combi-flash, eluted with CH$_3$CN in H$_2$O (neutral condition) from 10% to 90% to give 7-[(3aR,4R,6R,6aR)-6-[(1S)-5-chloro-1,3-dihydroisobenzofuran-1-yl]-2,2-dimethyl-3a,4,6,6a-tetrahydrofuro[3,4-d][1,3]dioxol-4-yl]pyrrolo[2,3-d]pyrimidin-4-amine (1Bd, 140 mg, 0.32 mmol, 81.3% yield) as a white solid. LCMS [M+H]: 429.1.

Step 5. Synthesis of (2R,3R,4S,5S)-2-(4-aminopyrrolo[2,3-d]pyrimidin-7-yl)-5-[(1S)-5-chloro-1,3-dihydroisobenzofuran-1-yl]tetrahydrofuran-3,4-diol hydrochloride (Ex. 1B)

A solution of 7-[(3aR,4R,6R,6aR)-6-[(1S)-5-chloro-1,3-dihydroisobenzofuran-1-yl]-2,2-dimethyl-3a,4,6,6a-tetrahydrofuro[3,4-d][1,3]dioxol-4-yl]pyrrolo[2,3-d]pyrimidin-4-amine (1Bd, 180 mg, 0.40 mmol) in water (5 mL) and TFA (5 mL, 67.31 mmol) was stirred at 25° C. for 1 h. LCMS showed the reaction was complete. The reaction mixture was concentrated and purified by prep-HPLC, (0.1% NH$_3$·H$_2$O), eluted with CH$_3$CN in H$_2$O from 10% to 95% and added 1 mL of HCl (1 M) and lyophilized to obtain (2R,3R,4S,5S)-2-(4-aminopyrrolo[2,3-d]pyrimidin-7-yl)-5-[(1S)-5-chloro-1,3-dihydroisobenzofuran-1-yl]tetrahydrofuran-3,4-diol hydrochloride (Ex. 1B, 45.1 mg, 0.10 mmol, 25.1% yield) as pale yellow solid. LCMS [M+H]: 389.1. $^1$H NMR (400 M Hz, DMSO-d$_6$): δ 13.89 (s, 1H), 9.45 (s, 1H), 8.50 (s, 1H), 8.36 (s, 1H), 7.54-7.55 (d, J=3.6 Hz, 1H), 7.30-7.39 (m, 3H), 7.01-7.02 (d, J=3.6 Hz, 1H), 6.08-6.09 (d, J=4.8 Hz, 1H), 5.39 (s, 1H), 4.97-5.05 (m, 2H), 4.32-4.38 (m, 3H). $^1$H NMR (400 M Hz, DMSO-d$_6$+D$_2$O): δ 8.37 (s, 1H), 7.55-7.56 (d, J=3.6 Hz, 1H), 7.37-7.39 (m, 1H), 7.30-7.33 (m, 2H), 7.01-7.02 (d, J=3.6 Hz, 1H), 6.08-6.10 (d, J=7.2 Hz, 1H), 5.39 (s, 1H), 5.00-5.05 (m, 2H), 4.32-4.39 (m, 3H).

Example 2A. Synthesis of (1R,2S,3R,5S)-3-(4-amino-7H-pyrrolo[2,3-d]pyrimidin-7-yl)-5-((R)-5-chloro-1,3-dihydroisobenzofuran-1-yl)cyclopentane-1,2-diol (Ex. 2A)

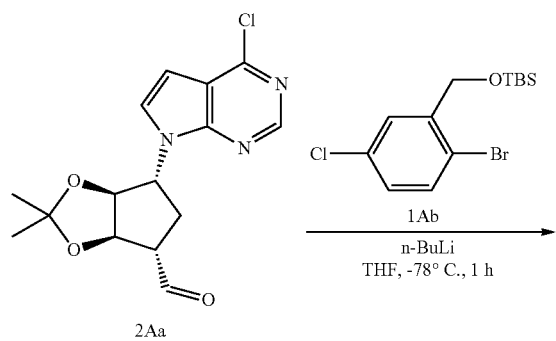

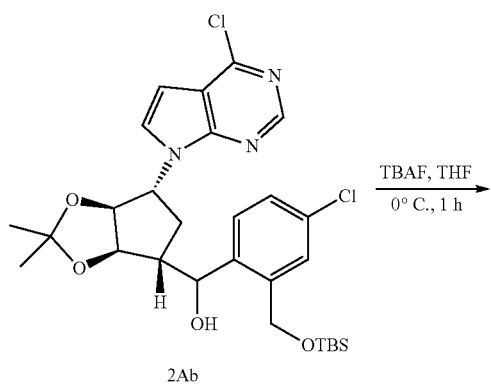

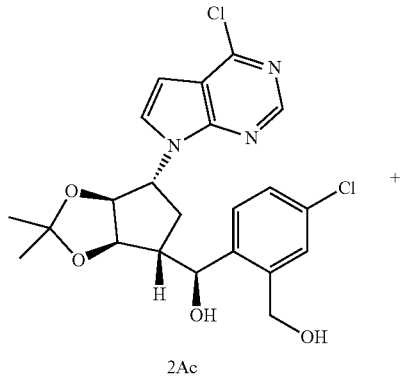

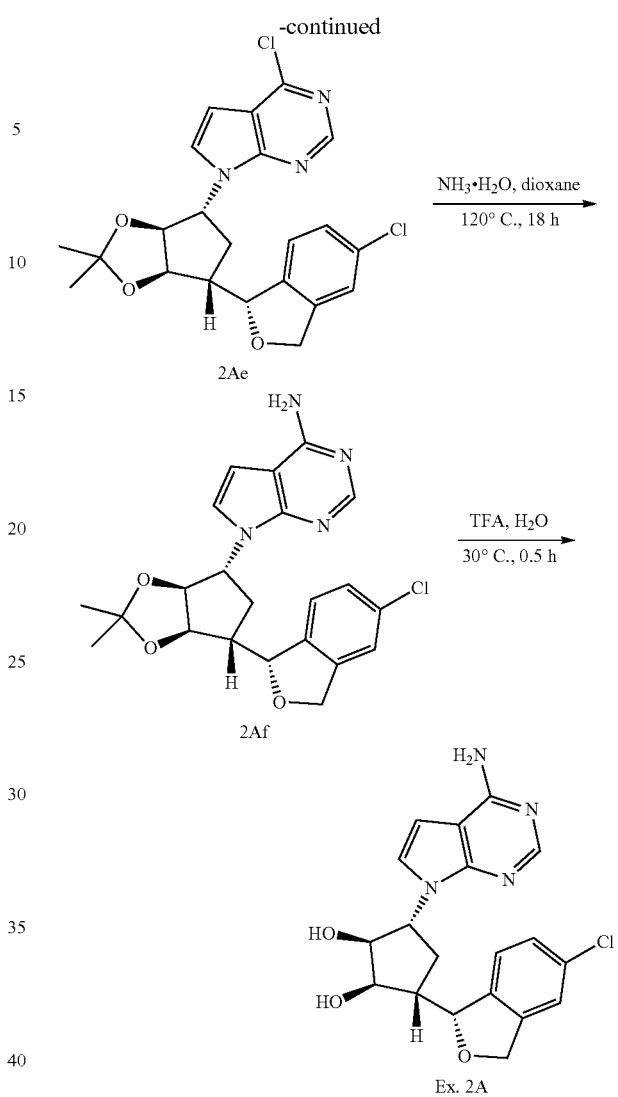

Step 1. Synthesis of [(3aS,4R,6R,6aR)-4-(4-chloro-pyrrolo[2,3-d]pyrimidin-7-yl)-2,2-dimethyl-4,5,6,6a-tetrahydro-3aH-cyclopenta[d][1,3]dioxol-6-yl]-[2-[[tert-butyl(dimethyl)silyl]oxymethyl]-4-chloro-phenyl]methanol (2Ab)

To a solution of (2-bromo-5-chloro-phenyl)methoxy-tert-butyl-dimethyl-silane (1Ab, 1826.0 mg, 5.44 mmol) in THF (20 mL) was added butyllithium (2.8 mL, 5.44 mmol) at −78° C. The reaction mixture was stirred at −78° C. for 0.5 h. Then, (3aS,4R,6S,6aR)-4-(4-chloropyrrolo[2,3-d]pyrimidin-7-yl)-2,2-dimethyl-4,5,6,6a-tetrahydro-3aH-cyclopenta[d][1,3]dioxole-6-carbaldehyde (2Aa, 1750 mg, 5.44 mmol) was added to the mixture. The reaction mixture was stirred at −78° C. for 1 h. LCMS showed the reaction was complete. The reaction was quenched with H$_2$O (30 mL) and extracted with ethyl acetate (60 mL). The organic layer was dried over Na$_2$SO$_4$, filtered, and concentrated in vacuum to give the crude product which was purified by silica chromatography column (PE:EA=3:1) to give [(3aS,4R,6R,6aR)-4-(4-chloropyrrolo[2,3-d]pyrimidin-7-yl)-2,2-dimethyl-4,5,6,6a-tetrahydro-3aH-cyclopenta[d][1,3]dioxol-6-yl]-[2-[[tert-butyl (dimethyl)silyl]oxymethyl]-4-chloro-phenyl]methanol (2Ab, 360.0 mg, 0.62 mmol, 11.4% yield). LCMS [M+H]: 578.2.

Step 2. Synthesis of (2Ac) and (2Ad)

To a solution of [(3aS,4R,6R,6aR)-4-(4-chloropyrrolo[2,3-d]pyrimidin-7-yl)-2,2-dimethyl-4,5,6,6a-tetrahydro-3aH-cyclopenta[d][1,3]dioxol-6-yl]-[2-[[tert-butyl(dimethyl)silyl]oxymethyl]-4-chloro-phenyl]methanol (2Ab, 360 mg, 0.62 mmol) in THF (5 mL) was added TBAF (0.62 mL, 1 N in THF, 0.62 mmol) at 0° C. The mixture was stirred at 0° C. for 1 h. LCMS showed the reaction was complete. To the mixture was added ethyl acetate (50 mL) which was washed with H$_2$O (20 mL×3) and brine (30 mL). The organic layer was dried over Na$_2$SO$_4$, concentrated in vacuum to give the crude product which was purified by prep-TLC (PE:EA=3:1) to give (S)-[(3aS,4R,6R,6aR)-4-(4-chloropyrrolo-[2,3-d]pyrimidin-7-yl)-2,2-dimethyl-4,5,6,6a-tetrahydro-3aH-cyclopenta[d][1,3]dioxol-6-yl]-[4-chloro-2-(hydroxymethyl)phenyl]methanol (2Ac, 42.0 mg, 0.09 mmol, 14.5% yield) and (R)-[(3aS,4R,6R,6aR)-4-(4-chloropyrrolo[2,3-d]pyrimidin-7-yl)-2,2-dimethyl-4,5,6,6a-tetrahydro-3aH-cyclopenta[d][1,3]dioxol-6-yl]-[4-chloro-2-(hydroxymethyl)phenyl]methanol (2Ad, 55.0 mg, 0.12 mmol, 19.0% yield). LCMS [M+H]: 464.1.

Step 3. Synthesis of 7-[(3aS,4R,6R,6aR)-6-[(1R)-5-chloro-1,3-dihydroisobenzofuran-1-yl]-2,2-dimethyl-4,5,6,6a-tetrahydro-3aH-cyclopenta[d][1,3]dioxol-4-yl]-4-chloro-pyrrolo[2,3-d]pyrimidine (2Ae)

To a solution of (R)-[(3aS,4R,6R,6aR)-4-(4-chloropyrrolo[2,3-d]pyrimidin-7-yl)-2,2-dimethyl-4,5,6,6a-tetrahydro-3aH-cyclopenta[d][1,3]dioxol-6-yl]-[4-chloro-2-(hydroxymethyl)phenyl]methanol (2Ad, 100 mg, 0.22 mmol) in THF (5 mL) was added PPh$_3$ (56.5 mg, 0.22 mmol), then added DIAD (0.04 mL, 0.22 mmol), the mixture was stirred at 25° C. for 16 h. The reaction mixture was concentrated in vacuum to give crude product which was purified by prep-TLC (PE:EA=3:1) to give 7-[(3aS,4R,6R,6aR)-6-[(1R)-5-chloro-1,3-dihydroisobenzofuran-1-yl]-2,2-dimethyl-4,5,6,6a-tetrahydro-3aH-cyclopenta[d][1,3]dioxol-4-yl]-4-chloro-pyrrolo[2,3-d]pyrimidine (2Ae, 70 mg, 0.16 mmol, 72.8% yield). LCMS [M+H]: 446.2.

Step 4. Synthesis of 7-[(3aS,4R,6R,6aR)-6-[(1R)-5-chloro-1,3-dihydroisobenzofuran-1-yl]-2,2-dimethyl-4,5,6,6a-tetrahydro-3aH-cyclopenta[d][1,3]dioxol-4-yl]pyrrolo[2,3-d]pyrimidin-4-amine (2Af)

To a solution of 7-[(3aS,4R,6R,6aR)-6-[(1R)-5-chloro-1,3-dihydroisobenzofuran-1-yl]-2,2-dimethyl-4,5,6,6a-tetrahydro-3aH-cyclopenta[d][1,3]dioxol-4-yl]-4-chloro-pyrrolo[2,3-d]pyrimidine (2Ae, 90 mg, 0.20 mmol) in 1,4-dioxane (3 mL) was added ammonia hydrate (3 mL, 0.60 mmol), then the mixture was sealed and stirred at 120° C. for 16 h. LCMS showed the mixture was complete. The reaction mixture was concentrated in vacuum, added ethyl acetate (100 mL), and washed with brine (60 mL). The organic layer was dried over Na$_2$SO$_4$, concentrated in vacuum to give 7-[(3aS,4R,6R,6aR)-6-[(1R)-5-chloro-1,3-dihydroisobenzofuran-1-yl]-2,2-dimethyl-4,5,6,6a-tetrahydro-3aH-cyclopenta[d][1,3]dioxol-4-yl]pyrrolo[2,3-d]pyrimidin-4-amine (2Af, 90 mg, 0.18 mmol, 92.0% yield). LCMS [M+H]: 427.1.

Step 5. Synthesis of (1R,2S,3R,5S)-3-(4-aminopyrrolo[2,3-d]pyrimidin-7-yl)-5-[(1R)-5-chloro-1,3-dihydroisobenzofuran-1-yl]cyclopentane-1,2-diol (Ex. 2A)

To a solution of 7-[(3aS,4R,6R,6aR)-6-[(1R)-5-chloro-1,3-dihydroisobenzofuran-1-yl]-2,2-dimethyl-4,5,6,6a-tetrahydro-3aH-cyclopenta[d][1,3]dioxol-4-yl]pyrrolo[2,3-d]pyrimidin-4-amine (2Af, 70 mg, 0.16 mmol) in water (2 mL) was added TFA (0.9 mL, 11.45 mmol) and the reaction mixture was stirred at 30° C. for 0.5 h. LCMS showed the reaction was complete. The mixture was purified by prep-HPLC, eluted with CH$_3$CN in H$_2$O (0.1% NH$_4$OH) from 5% to 95% to give (1R,2S,3R,5S)-3-(4-aminopyrrolo[2,3-d]pyrimidin-7-yl)-5-[(1R)-5-chloro-1,3-dihydroisobenzofuran-1-yl]cyclopentane-1,2-diol (Ex. 2A, 30 mg, 0.08 mmol, 47% yield) as a white solid. LCMS [M+H]: 387.3. $^1$H NMR (400 MHz, DMSO-d$_6$+D$_2$O): δ 8.00 (s, 1H), 7.31-7.37 (m, 3H), 7.15-7.16 (m, 1H), 6.52-6.53 (m, 1H), 5.41-5.42 (m, 1H), 5.10-5.14 (m, 1H), 4.99-5.03 (m, 1H), 4.78-4.85 (m, 1H), 4.18-4.21 (m, 1H), 4.04-4.06 (m, 1H), 2.47-2.50 (m, 1H), 1.71-1.79 (m, 1H), 1.33-1.40 (m, 1H).

Example 2B. Synthesis of (1R,2S,3R,5S)-3-(4-amino-7H-pyrrolo[2,3-d]pyrimidin-7-yl)-5-((S)-5-chloro-1,3-dihydroisobenzofuran-1-yl)cyclopentane-1,2-diol (Ex. 2B)

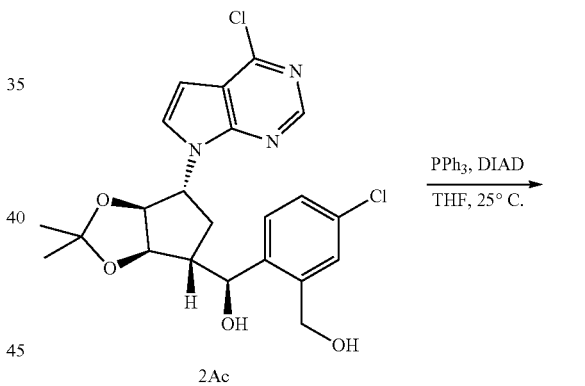

2Ac

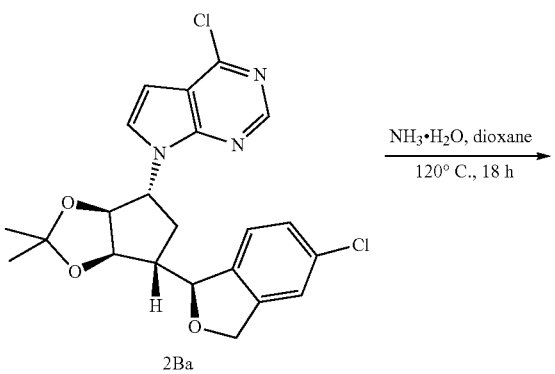

2Ba

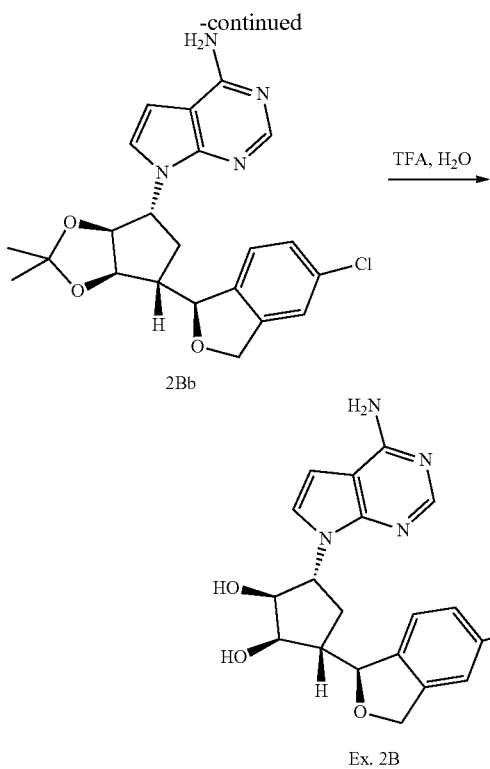

Step 3. Synthesis of (1R,2S,3R,5S)-3-(4-aminopyrrolo[2,3-d]pyrimidin-7-yl)-5-[(1S)-5-chloro-1,3-dihydroisobenzofuran-1-yl]cyclopentane-1,2-diol (Ex. 2B)

To a solution of 7-[(3aS,4R,6R,6aR)-6-[(1S)-5-chloro-1,3-dihydroisobenzofuran-1-yl]-2,2-dimethyl-4,5,6,6a-tetrahydro-3aH-cyclopenta[d][1,3]dioxol-4-yl]pyrrolo[2,3-d]pyrimidin-4-amine (2Bb, 60 mg, 0.09 mmol) in water (2 mL) was added TFA (1 mL, 13.0 mmol). The reaction mixture was stirred at 30° C. for 0.5 h. LCMS showed the reaction was complete. The reaction mixture was purified by prep-HPLC (0.1% NH$_3$·H$_2$O), eluted with CH$_3$CN in H$_2$O from 10% to 95% to give (1R,2S,3R,5S)-3-(4-aminopyrrolo[2,3-d]pyrimidin-7-yl)-5-[(1S)-5-chloro-1,3-dihydroisobenzofuran-1-yl]cyclopentane-1,2-diol (Ex. 2B, 27 mg, 0.07 mmol, 76.1% yield) as a white solid. LCMS [M+H]: 387.1. $^1$H NMR (400 MHz, DMSO-d$_6$+D$_2$O): δ 8.03 (s, 1H), 7.41-7.42 (m, 1H), 7.34-7.36 (m, 2H), 7.21-7.22 (m, 1H), 6.57-6.58 (m, 1H), 5.21-5.22 (m, 1H), 4.97-5.07 (m, 2H), 4.86-4.91 (m, 1H), 4.16-4.191 (m, 1H), 3.65-3.66 (m, 1H), 2.38-2.43 (m, 1H), 2.25-2.32 (m, 1H), 1.75-1.83 (m, 1H).

Example 3A. Synthesis of (S)-3-((1S,2R,3S,4R)-4-(4-amino-7H-pyrrolo[2,3-d]pyrimidin-7-yl)-2,3-dihydroxycyclopentyl)-6-chloroisobenzofuran-1(3H)-one (Ex. 3A)

Step 1. Synthesis of 7-[(3aS,4R,6R,6aR)-6-[(1R)-5-chloro-1,3-dihydroisobenzofuran-1-yl]-2,2-dimethyl-4,5,6,6a-tetrahydro-3aH-cyclopenta[d][1,3]dioxol-4-yl]-4-chloro-pyrrolo[2,3-d]pyrimidine (2Ba)

To a solution of (S)-[(3aS,4R,6R,6aR)-4-(4-chloropyrrolo[2,3-d]pyrimidin-7-yl)-2,2-dimethyl-4,5,6,6a-tetrahydro-3aH-cyclopenta[d][1,3]dioxol-6-yl]-[4-chloro-2-(hydroxymethyl)phenyl]methanol (2Ac, 90 mg, 0.19 mmol) in THF (4 mL) was added PPh$_3$ (101.7 mg, 0.39 mmol) and DIAD (0.11 mL, 0.39 mmol). The mixture was stirred at 25° C. for 16 h under N$_2$. TLC (PE:EA=3:1, R$_f$=0.4) showed the reaction was complete. The mixture was concentrated in vacuum to give the crude product which was purified by pre-TLC (PE:EA=3:1) to give 7-[(3aS,4R,6R,6aR)-6-[(1R)-5-chloro-1,3-dihydroisobenzofuran-1-yl]-2,2-dimethyl-4,5,6,6a-tetrahydro-3aH-cyclopenta[d][1,3]dioxol-4-yl]-4-chloro-pyrrolo[2,3-d]pyrimidine (2Ba, 70 mg, 0.16 mmol, 80.9% yield). LCMS [M+H]: 446.2.

Step 2. Synthesis of 7-[(3aS,4R,6R,6aR)-6-[(1S)-5-chloro-1,3-dihydroisobenzofuran-1-yl]-2,2-dimethyl-4,5,6,6a-tetrahydro-3aH-cyclopenta[d][1,3]dioxol-4-yl]pyrrolo[2,3-d]pyrimidin-4-amine (2Bb)

To a solution of 7-[(3aS,4R,6R,6aR)-6-[(1S)-5-chloro-1,3-dihydroisobenzofuran-1-yl]-2,2-dimethyl-4,5,6,6a-tetrahydro-3aH-cyclopenta[d][1,3]dioxol-4-yl]-4-chloro-pyrrolo[2,3-d]pyrimidine (2Ba, 70 mg, 0.16 mmol) in 1,4-dioxane (3.5 mL) was added ammonia hydrate (3.5 mL, 0.47 mmol). The mixture was sealed and stirred at 120° C. for 16 h. LCMS showed the reaction was complete. The mixture was concentrated in vacuum to give 7-[(3aS,4R,6R,6aR)-6-[(1S)-5-chloro-1,3-dihydroisobenzofuran-1-yl]-2,2-dimethyl-4,5,6,6a-tetrahydro-3aH-cyclopenta[d][1,3]dioxol-4-yl]pyrrolo[2,3-d]pyrimidin-4-amine (2Bb, 60 mg, 0.09 mmol, 59.2% yield). LCMS [M+H]: 427.1.

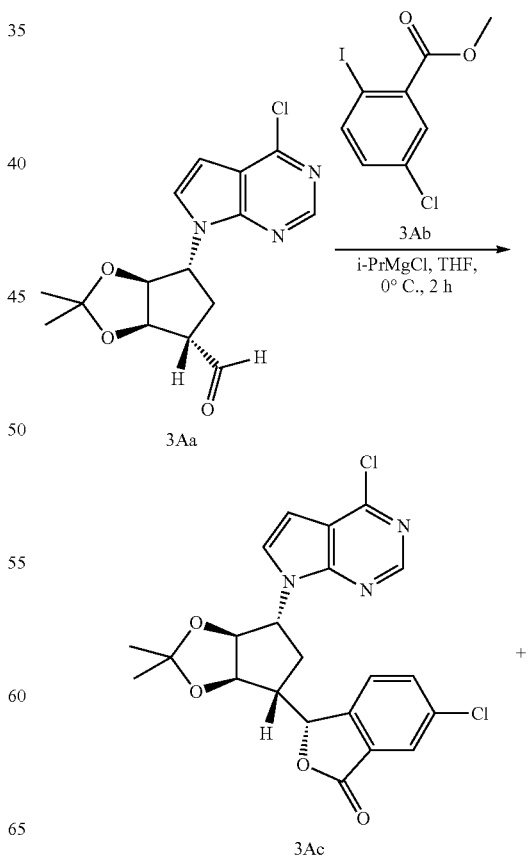

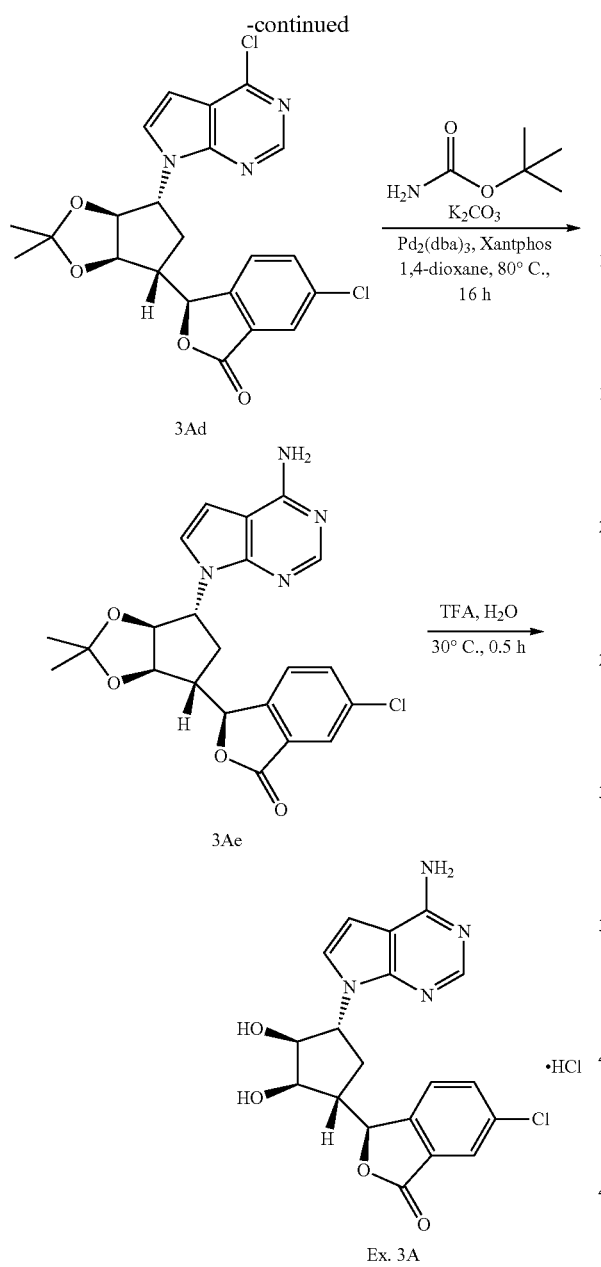

Ex. 3A

Step 1. Synthesis of (3R)-3-[(3aS,4R,6R,6aR)-4-(4-chloropyrrolo[2,3-d]pyrimidin-7-yl)-2,2-dimethyl-4, 5,6,6a-tetrahydro-3aH-cyclopenta[d][1,3]dioxol-6-yl]-6-chloro-3H-isobenzofuran-1-one (3Ac) and (3S)-3-[(3aS,4R,6R,6aR)-4-(4-chloropyrrolo [2,3-d] pyrimidin-7-yl)-2,2-dimethyl-4,5,6,6a-tetrahydro-3aH-cyclopenta[d][1,3]dioxol-6-yl]-6-chloro-3H-isobenzofuran-1-one (3Ad)

To a solution of methyl 5-chloro-2-iodo-benzoate (3Ab, 829.3 mg, 2.80 mmol) in THF (15 mL) was added isopropyl magnesium chloride (2.2 mL, 2.80 mmol) at −20° C., and the solution was stirred at −20° C. for 2 h. (3aS,4R,6S,6aR)-4-(4-chloropyrrolo[2,3-d]pyrimidin-7-yl)-2,2-dimethyl-4,5, 6,6a-tetrahydro-3aH-cyclopenta[d][1,3]dioxole-6-carbaldehyde (3Aa, 900 mg, 2.80 mmol) in THF (10 mL) was added to the mixture and stirred at 0° C. for 2 h. LCMS showed the reaction was complete. The reaction mixture was added H₂O (30 mL) and ethyl acetate (60 mL). The organic layer was washed with H₂O (30 mL) and brine (30 mL), dried over Na₂SO₄, filtered and concentrated in vacuum to give the crude product which was purified by silica chromatography column (PE:EA=6:1) to give (3R)-3-[(3aS,4R,6R,6aR)-4-(4-chloropyrrolo[2,3-d]pyrimidin-7-yl)-2,2-dimethyl-4,5,6, 6a-tetrahydro-3aH-cyclopenta[d][1,3]dioxol-6-yl]-6-chloro-3H-isobenzofuran-1-one (3Ac, 330 mg, 0.72 mmol, 25.6% yield) and (3S)-3-[(3aS,4R,6R,6aR)-4-(4-chloropyrrolo [2,3-d]pyrimidin-7-yl)-2,2-dimethyl-4,5,6,6a-tetrahydro-3aH-cyclopenta[d][1,3]dioxol-6-yl]-6-chloro-3H-isobenzofuran-1-one (3Ad, 270.0 mg, 0.59 mmol, 21.0% yield). LCMS [M+H]: 460.0.

Step 2. Synthesis of (3S)-3-[(3aS,4R,6R,6aR)-4-(4-aminopyrrolo[2,3-d] pyrimidin-7-yl)-2,2-dimethyl-4, 5,6,6a-tetrahydro-3aH-cyclopenta[d][1,3]dioxol-6-yl]-6-chloro-3H-isobenzofuran-1-one (3Ae)

To a solution of (3S)-3-[(3aS,4R,6R,6aR)-4-(4-chloropyrrolo[2,3-d]pyrimidin-7-yl)-2,2-dimethyl-4,5,6,6a-tetrahydro-3aH-cyclopenta[d][1,3]dioxol-6-yl]-6-chloro-3H-isobenzofuran-1-one (3Ad, 170 mg, 0.37 mmol) in 1,4-dioxane (5 mL) was added tert-butyl carbamate (86.5 mg, 0.74 mmol), Xantphos (32.1 mg, 0.06 mmol) and Pd₂(dba)₃ (13.5 mg, 0.01 mmol). The mixture was stirred at 80° C. 16 h under N₂. LCMS showed the reaction was complete. The reaction mixture was filtered and concentrated in vacuum to give the crude product which was purified by silica chromatography column (DCM:CH₃OH=30:1) to give (3S)-3-[(3aS,4R,6R,6aR)-4-(4-aminopyrrolo[2,3-d] pyrimidin-7-yl)-2,2-dimethyl-4,5,6,6a-tetrahydro-3aH-cyclopenta[d][1, 3]dioxol-6-yl]-6-chloro-3H-isobenzofuran-1-one (3Ae, 100 mg, 0.23 mmol, 61.4% yield). LCMS [M+H]: 441.2.

Step 3. Synthesis of (3S)-3-[(1S,2R,3S,4R)-4-(4-aminopyrrolo[2,3-d]pyrimidin-7-yl)-2,3-dihydroxy-cyclopentyl]-6-chloro-3H-isobenzofuran-1-one hydrochloride (Ex. 3A)

To a solution of (3S)-3-[(3aS,4R,6R,6aR)-4-(4-aminopyrrolo[2,3-d]pyrimidin-7-yl)-2,2-dimethyl-4,5,6,6a-tetrahydro-3aH-cyclopenta[d][1,3]dioxol-6-yl]-6-chloro-3H-isobenzofuran-1-one (3Ae, 100 mg, 0.23 mmol) in water (3 mL) was added TFA (1.5 mL, 19.47 mmol). The reaction mixture was stirred at 30° C. for 0.5 h. LCMS showed the reaction was complete. The mixture was purified by prep-HPLC, eluted with CH₃CN in H₂O (0.10% TFA) from 5% to 9%, added HCl (1 mL, 2N), and lyophilized to give (3S)-3-[(1S,2R,3S,4R)-4-(4-aminopyrrolo[2,3-d]pyrimidin-7-yl)-2,3-dihydroxy-cyclopentyl]-6-chloro-3H-isobenzofuran-1-one hydrochloride (Ex. 3A, 15 mg, 0.03 mmol, 15.1% yield) as a white solid. LCMS [M+H]: 401.1. ¹H NMR (400 MHz, DMSO-d₆+D₂O): δ 8.35 (s, 1H), 7.94-7.95 (m, 1H), 7.86-7.88 (m, 1H), 7.74-7.76 (m, 1H), 7.65-7.66 (m, 1H), 6.98-6.99 (m, 1H), 5.78-5.79 (m, 1H), 4.93-5.00 (m, 1H), 4.14-4.18 (m, 1H), 3.54-3.56 (m, 1H), 2.68-2.69 (m, 1H), 2.38-2.46 (m, 1H), 1.95-2.03 (m, 1H).

Example 3B. Synthesis of (R)-3-((1S,2R,3S,4R)-4-(4-amino-6H-7l4-pyrrolo[2,3-d]pyrimidin-7-yl)-2,3-dihydroxycyclopentyl)-6-chloroisobenzofuran-1(3H)-one (Ex. 3B)

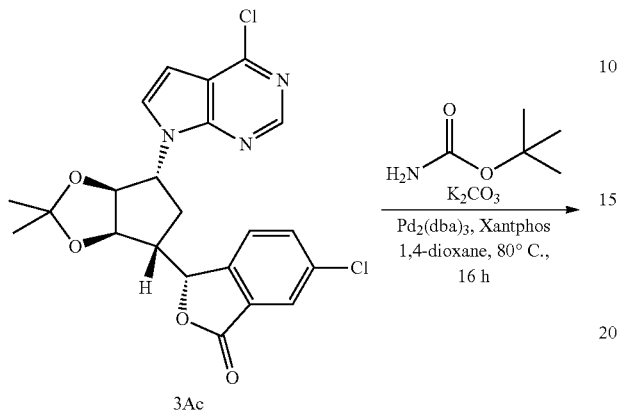

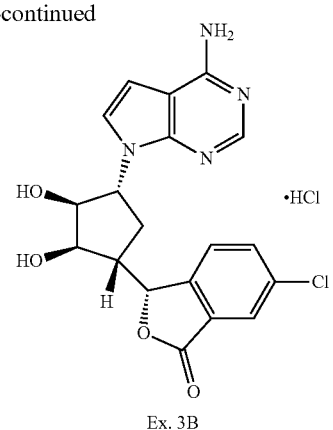

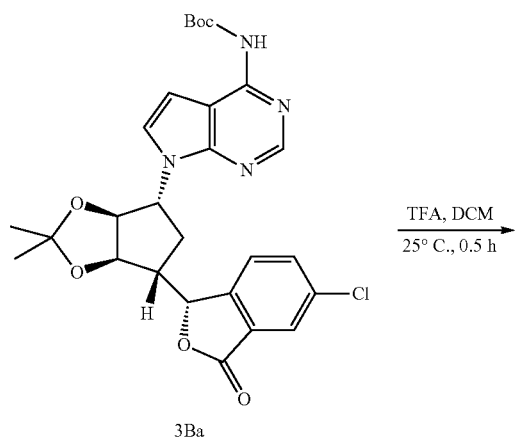

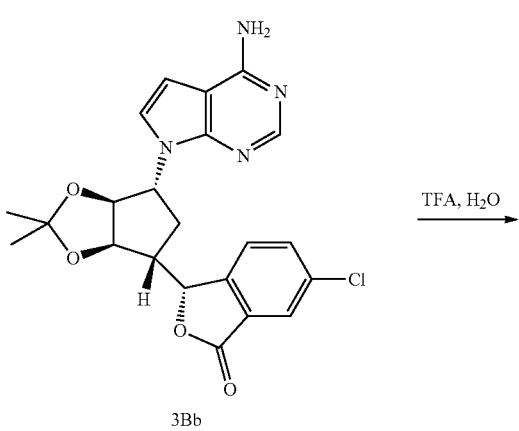

Step 1. Synthesis of tert-butyl N-[7-[(3aS,4R,6R,6aR)-6-[(1R)-5-chloro-3-oxo-1H-isobenzofuran-1-yl]-2,2-dimethyl-4,5,6,6a-tetrahydro-3aH-cyclopenta[d][1,3]dioxol-4-yl]pyrrolo[2,3-d]pyrimidin-4-yl]carbamate (3Ba)

To a solution of (3R)-3-[(3aS,4R,6R,6aR)-4-(4-chloropyrrolo[2,3-d]pyrimidin-7-yl)-2,2-dimethyl-4,5,6,6a-tetrahydro-3aH-cyclopenta[d][1,3]dioxol-6-yl]-6-chloro-3H-isobenzofuran-1-one (3Ac, 230 mg, 0.50 mmol) in 1,4-dioxane (6 mL) was added tert-butyl carbamate (117.1 mg, 1.00 mmol), Xantphos (43.4 mg, 0.07 mmol) and $Pd_2(dba)_3$ (18.3 mg, 0.02 mmol). The mixture was stirred at 80° C. for 16 h under $N_2$. LCMS showed the reaction was complete. The reaction mixture was filtered and concentrated in vacuum to give the crude product which was purified by silica chromatography column ($DCM:CH_3OH=30:1$) to give tert-butyl N-[7-[(3aS,4R,6R,6aR)-6-[(1R)-5-chloro-3-oxo-1H-isobenzofuran-1-yl]-2,2-dimethyl-4,5,6,6a-tetrahydro-3aH-cyclopenta[d][1,3]dioxol-4-yl]pyrrolo[2,3-d]pyrimidin-4-yl]carbamate (3Ba, 100 mg, 0.18 mmol, 37% yield). LCMS [M+H]: 541.2.

Step 2. Synthesis of (3R)-3-[(3aS,4R,6R,6aR)-4-(4-aminopyrrolo[2,3-d]pyrimidin-7-yl)-2,2-dimethyl-4,5,6,6a-tetrahydro-3aH-cyclopenta[d][1,3]dioxol-6-yl]-6-chloro-3H-isobenzofuran-1-one (3Bb)

To a solution of tert-butyl N-[7-[(3aS,4R,6R,6aR)-6-[(1R)-5-chloro-3-oxo-1H-isobenzofuran-1-yl]-2,2-dimethyl-4,5,6,6a-tetrahydro-3aH-cyclopenta[d][1,3]dioxol-4-yl]pyrrolo[2,3-d]pyrimidin-4-yl]carbamate (3Ba, 100 mg, 0.18 mmol) in DCM (3 mL) and was added TFA (3 mL, 38.94 mmol). The reaction mixture was stirred at 25° C. 0.5 h. LCMS showed the reaction was complete. The reaction mixture was concentrated in vacuum to give crude (3R)-3-[(3aS,4R,6R,6aR)-4-(4-aminopyrrolo[2,3-d]pyrimidin-7-yl)-2,2-dimethyl-4,5,6,6a-tetrahydro-3aH-cyclopenta[d][1,3]dioxol-6-yl]-6-chloro-3H-isobenzofuran-1-one (3Bb) which was used in the next step directly. LCMS [M+H]: 441.1.

Step 3. Synthesis of (3R)-3-[(1S,2R,3S,4R)-4-(4-aminopyrrolo[2,3-d]pyrimidin-7-yl)-2,3-dihydroxycyclopentyl]-6-chloro-3H-isobenzofuran-1-one hydrochloride (Ex. 3B)

To a solution of (3R)-3-[(3aS,4R,6R,6aR)-4-(4-aminopyrrolo[2,3-d]pyrimidin-7-yl)-2,2-dimethyl-4,5,6,6a-tetrahydro-3aH-cyclopenta[d][1,3]dioxol-6-yl]-6-chloro-3H-isobenzofuran-1-one (3Bb, 70 mg, 0.16 mmol) in water (3 mL) was added TFA (1.4 mL, 18.2 mmol). The reaction mixture was stirred at 30° C. for 0.5 h. LCMS showed the reaction was complete. The mixture was purified by prep-HPLC, eluted with CH$_3$CN in H$_2$O (0.1% TFA) from 5% to 95%, added HCl (1 mL, 2 N), and lyophilized to give (3R)-3-[(1S,2R,3S,4R)-4-(4-aminopyrrolo[2,3-d]pyrimidin-7-yl)-2,3-dihydroxy-cyclopentyl]-6-chloro-3H-isobenzofuran-1-one hydrochloride (Ex. 3B, 14.0 mg, 0.03 mmol, 19.0% yield) as a white solid. LCMS [M+H]: 401.3. $^1$H NMR (400 MHz, DMSO-d$_6$+D$_2$O): δ 8.30 (s, 1H), 7.80-7.90 (m, 3H), 7.48-7.49 (m, 1H), 6.93-6.94 (m, 1H), 5.94-5.95 (m, 1H), 4.83-4.89 (m, 1H), 4.24-4.27 (m, 1H), 4.15-4.18 (m, 1H), 2.68-2.76 (m, 1H), 1.73-1.80 (m, 1H), 1.18-1.26 (m, 1H).

Example 5. Synthesis of (2R,3R,4S,5S)-2-(4-amino-7H-pyrrolo[2,3-d]pyrimidin-7-yl)-5-((R)-6-chloro-1,3-dihydroisobenzofuran-1-yl)tetrahydrofuran-3,4-diol (Ex. 5)

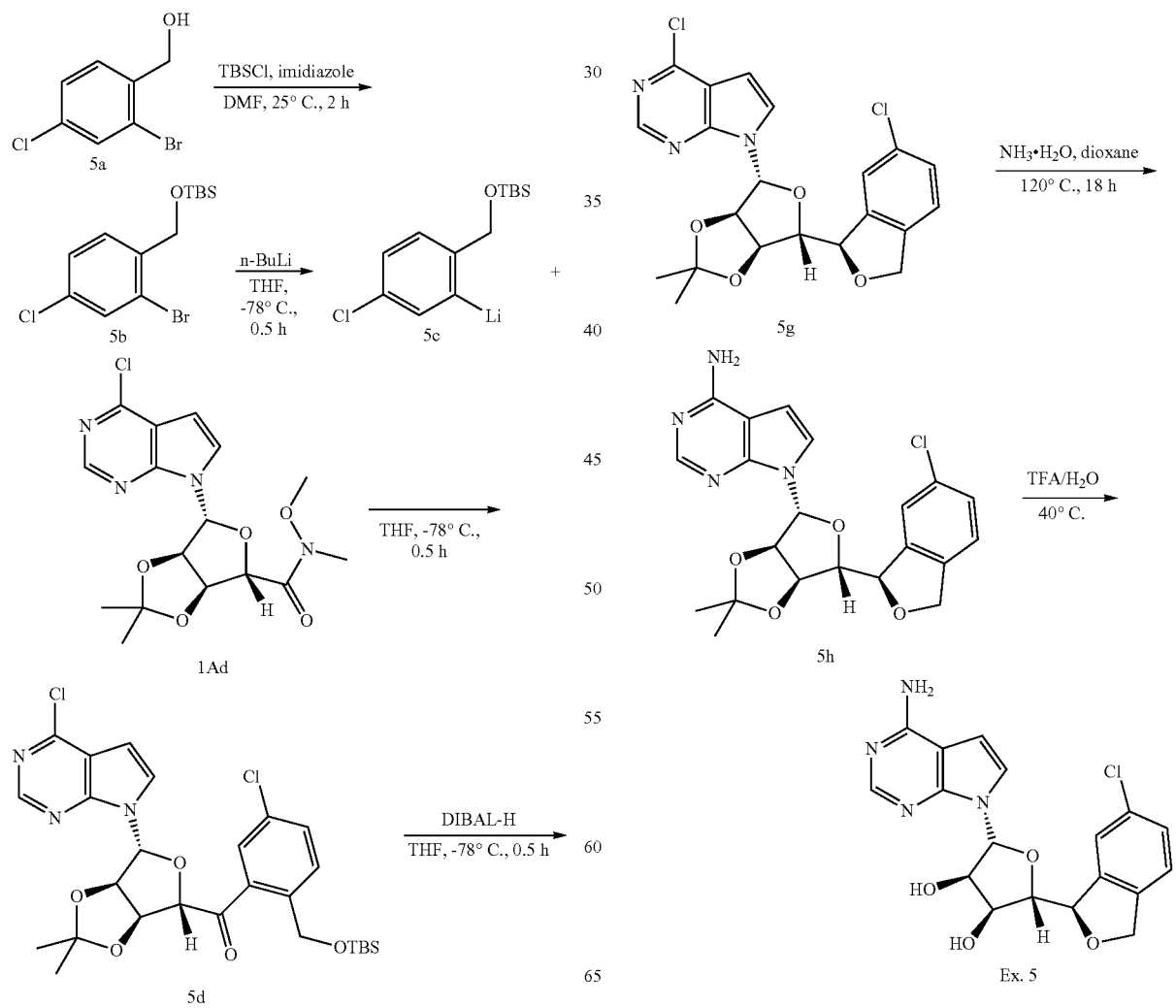

Step 1. Synthesis of (2-bromo-4-chloro-phenyl) methoxy-tert-butyl-dimethyl-silane (5b)

To a mixture of (2-bromo-4-chloro-phenyl)methanol (5a, 5.0 g, 22.58 mmol) and imidazole (3.07 g, 45.15 mmol) in DMF (10 mL) was added TBSCl (5.10 g, 33.86 mmol) at 0° C. The mixture stirred at rt for 2 h. TCL (PE:EA=10:1, $R_f$=0.7) showed the reaction was complete. The reaction mixture was diluted with water (100 mL) and the mixture was extracted with ethyl acetate (50 mL×3), then the organic layers were washed with brine (100 mL×3), dried over $Na_2SO_4$ and concentrated in vacuum to give crude product which was purified on a silica chromatography column (100-200 mesh size, PE:EA=200:1 to 100:1) to give (2-bromo-4-chloro-phenyl)methoxy-tert-butyl-dimethyl-silane (5b, 6.80 g, 18.23 mmol, 80.7% yield) as a colorless oil. $^1$H NMR (400 M Hz, DMSO-d6): δ 7.70 (s, 1H), 7.49 (s, 2H), 4.66 (s, 2H), 0.91 (s, 9H), 0.10 (s, 6H).

Step 2. Synthesis of [(3aR,4R,6S,6aS)-4-(4-chloro-pyrrolo[2,3-d]pyrimidin-7-yl)-2,2-dimethyl-3a,4,6,6a-tetrahydrofuro[3,4-d][1,3]dioxol-6-yl]-[2-[[tert-butyl(dimethyl)silyl]oxymethyl]-5-chloro-phenyl] methanone (5d)

To a solution of (2-bromo-4-chloro-phenyl)methoxy-tert-butyl-dimethyl-silane (5b, 6.74 g, 20.06 mmol) in THF (50 mL) was added butyllithium (8.6 mL, 13.79 mmol) at −78° C. under $N_2$. The resulting solution of 5c was stirred at −78° C. for 10 min under $N_2$. A solution of the (3aR,4R,6S,6aS)-4-(4-chloropyrrolo[2,3-d]pyrimidin-7-yl)-N-methoxy-N,2,2-trimethyl-3a,4,6,6a-tetrahydrofuro[3,4-d][1,3]dioxole-6-carboxamide (1Ad, 2.4 g, 6.27 mmol) in THF (50 mL) was added and the mixture was stirred at −78° C. for 30 min under $N_2$. LCMS showed the reaction was complete. The reaction mixture was quenched with saturated $NH_4Cl$ solution (50 mL). The mixture was extracted with ethyl acetate (100 mL×3). The combined organic layers were washed with brine (40 mL×3), dried over $Na_2SO_4$, concentrated in vacuum to give the crude product which was purified by silica chromatography column (100-200 mesh size, PE:EA=20:1 to 10:1) to give [(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]-[2-[[tert-butyl(dimethyl)silyl]oxymethyl]-5-chloro-phenyl]methanone (5d, 3.36 g, 5.81 mmol, 92.6% yield) as a pale yellow oil. LCMS [M+H]: 578.1.

Step 3. Synthesis of (R)-[(3aR,4R,6R,6aR)-4-(4-chloropyrrolo [2,3-d]pyrimidin-7-yl)-2,2-dimethyl-3a,4,6,6a-tetrahydrofuro[3,4-d][1,3]dioxol-6-yl]-[2-[[tert-butyl(dimethyl)silyl]oxymethyl]-5-chloro-phenyl]methanol (5e)

To a solution of [(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]-[2-[[tert-butyl(dimethyl)silyl]oxymethyl]-5-chloro-phenyl]methanone (5d, 3.3 g, 5.71 mmol) in toluene (100 mL) was added diisobutylaluminum hydride (9.5 mL, 14.26 mmol) at −78° C. under $N_2$. The reaction mixture was stirred at −78° C. for 0.5 h under $N_2$. TLC (PE:EA=3:1, $R_f$=0.3) showed the reaction was complete. The reaction mixture was washed with water (10 mL×3) and brine (10 mL×3). The organic layer was dried over $Na_2SO_4$, filtered and concentrated to afford crude product which was purified silica chromatography column (100-200 mesh size, PE:EA=10:1 to 8:1) to give (R)-[(3aR,4R,6R,6aR)-4-(4-chloropyrrolo [2,3-d]pyrimidin-7-yl)-2,2-dimethyl-3a,4,6,6a-tetrahydrofuro[3,4-d][1,3]dioxol-6-yl]-[2-[[tert-butyl(dimethyl)silyl]oxymethyl]-5-chloro-phenyl] methanol (5e, 1.8 g, 2.67 mmol, 46.7% yield) as a white solid. LCMS [M+H]: 580.2.

Step 4. Synthesis of (R)-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]-[5-chloro-2-(hydroxymethyl)phenyl]methanol (5f)

To a solution of (R)-[(3aR,4R,6R,6aR)-4-(4-chloropyrrolo[2,3-d]pyrimidin-7-yl)-2,2-dimethyl-3a,4, 6,6a-tetrahydrofuro[3,4-d][1,3]dioxol-6-yl]-[2-[[tert-butyl(dimethyl)silyl]oxymethyl]-5-chloro-phenyl]methanol (5e, 1.8 g, 3.10 mmol) in DMSO (12 mL) and methanol (0.2 mL) was added CsF (1.2 g, 9.3 mmol). The reaction mixture was stirred at 25° C. for 4 h. LCMS showed the reaction was complete. The reaction mixture was filtered and purified by reversed-phase combi-flash, eluted with $CH_3CN$ in $H_2O$ (neutral condition) from 10% to 95% to give (R)-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]-[5-chloro-2-(hydroxymethyl)phenyl]methanol (5f, 560 mg, 1.19 mmol, 38.3% yield) as a white solid. LCMS [M+H]: 466.1.

Step 5. Synthesis of 7-[(3aR,4R,6R,6aR)-6-[(1R)-6-chloro-1,3-dihydroisobenzofuran-1-yl]-2,2-dimethyl-3a,4,6,6a-tetrahydrofuro[3,4-d][1,3]dioxol-4-yl]-4-chloro-pyrrolo[2,3-d]pyrimidine (5 g)

To a solution of (R)-[(3aR,4R,6R,6aR)-4-(4-chloropyrrolo[2,3-d]pyrimidin-7-yl)-2,2-dimethyl-3a,4, 6,6a-tetrahydrofuro[3,4-d][1,3]dioxol-6-yl]-[5-chloro-2-(hydroxymethyl)phenyl]methanol (5f, 510 mg, 1.09 mmol) in THF (15.0 mL) was added pyridine (0.1 mL, 1.09 mmol), tributylphosphine (0.6 mL, 2.19 mmol) and DIAD (0.2 mL, 2.3 mmol). The reaction mixture was stirred at 25° C. for 2 h. TLC (PE:EA=3:1, $R_f$=0.4) showed the reaction was complete. The mixture was concentrated in vacuum to give the crude product which was purified by silica chromatography column (100-200 mesh size, PE:EA=20:1 to 10:1) to give 7-[(3aR,4R,6R,6aR)-6-[(1R)-6-chloro-1,3-dihydroisobenzofuran-1-yl]-2,2-dimethyl-3a,4,6,6a-tetrahydrofuro[3,4-d][1,3]dioxol-4-yl]-4-chloro-pyrrolo[2,3-d]pyrimidine (5 g, 350 mg, 0.78 mmol, 71.4% yield) as a white solid. LCMS [M+H]: 448.1.

Step 6. Synthesis of 7-[(3aR,4R,6R,6aR)-6-[(1R)-6-chloro-1,3-dihydroisobenzofuran-1-yl]-2,2-dimethyl-3a,4,6,6a-tetrahydrofuro[3,4-d][1,3]dioxol-4-yl]-4-chloro-pyrrolo[2,3-d]pyrimidine (5h)

A mixture of 7-[(3aR,4R,6R,6aR)-6-[(1R)-6-chloro-1,3-dihydroisobenzofuran-1-yl]-2,2-dimethyl-3a,4,6,6a-tetrahydrofuro[3,4-d][1,3]dioxol-4-yl]-4-chloro-pyrrolo[2,3-d]pyrimidine (5 g, 48.1 mg, 0.11 mmol), 1,4-dioxane (0.5 mL) and $NH_3H_2O$ (0.5 mL, 12.98 mmol) was stirred at 120° C. for 16 h in a autoclave. LCMS showed the reaction was complete. The mixture was concentrated in vacuum to give 7-[(3aR,4R,6R,6aR)-6-[(1R)-6-chloro-1,3-dihydroisobenzofuran-1-yl]-2,2-dimethyl-3a,4,6,6a-tetrahydrofuro[3,4-d][1,3]dioxol-4-yl]-4-chloro-pyrrolo[2,3-d]pyrimidine (5h, 50 mg, 0.10 mmol, 94.6% yield) as a white solid. LCMS [M+H]: 429.1.

Step 7. Synthesis of (2R,3R,4S,5S)-2-(4-aminopyr-rolo[2,3-d]pyrimidin-7-yl)-5-[(1R)-6-chloro-1,3-dihydroisobenzofuran-1-yl]tetrahydrofuran-3,4-diol (Ex. 5)

A mixture of 7-[(3aR,4R,6R,6aR)-6-[(1R)-6-chloro-1,3-dihydroisobenzofuran-1-yl]-2,2-dimethyl-3a,4,6,6a-tetrahydrofuro[3,4-d][1,3]dioxol-4-yl]pyrrolo[2,3-d]pyrimidin-4-amine (5h, 50 mg, 0.12 mmol), water (0.5 mL) and TFA (0.8 mL, 9.06 mmol) was stirred at 40° C. for 16 h. LCMS showed the reaction was complete. The reaction mixture was concentrated and purified by prep-HPLC, (0.1% NH$_3$·H$_2$O), eluted with CH$_3$CN in H$_2$O from 10% to 95% to give (2R,3R,4S,5S)-2-(4-aminopyrrolo[2,3-d]pyrimidin-7-yl)-5-[(1R)-6-chloro-1,3-dihydroisobenzofuran-1-yl]tetrahydrofuran-3,4-diol (Ex. 5, 19.5 mg, 0.05 mmol, 42.9% yield) as a white solid. LCMS [M+H]: 389.1. $^1$H NMR (400 M Hz, DMSO-d$_6$): δ 8.07 (s, 1H), 7.37 (s, 3H), 7.30 (s, 1H), 7.03 (br, 2H), 6.65 (d, J=3.6 Hz, 1H), 6.16 (d, J=7.6 Hz, 1H), 5.36 (d, J=2.0 Hz, 1H), 5.26 (d, J=7.2 Hz, 1H), 5.19 (d, J=4.0 Hz, 1H), 5.04-5.13 (m, 2H), 4.52 (dd, J$_1$=7.2 Hz, J$_2$=5.2 Hz, 1H), 4.11 (d, J=4.8 Hz, 1H), 3.93 (t, J=4.4 Hz, 1H). $^1$H NMR (400 M Hz, DMSO-d$_6$+D$_2$O): δ 8.07 (s, 1H), 7.37 (s, 3H), 7.29 (s, 1H), 6.66 (d, J=3.6 Hz, 1H), 6.15 (d, J=3.6 Hz, 1H), 5.37 (br, 1H), 5.04-5.13 (m, 2H), 4.52 (dd, J$_1$=2.0 Hz, J$_2$=5.2 Hz, 1H), 4.11 (d, J=5.2 Hz, 1H), 3.93 (d, J=4.8 Hz, 1H).

Example 15. Synthesis of (2S,3S,4R,5R)-2-((R)-6-chloro-1,3-dihydroisobenzofuran-1-yl)-5-(4-methyl-7H-pyrrolo[2,3-d]pyrimidin-7-yl)tetrahydrofuran-3,4-diol (Ex. 15)

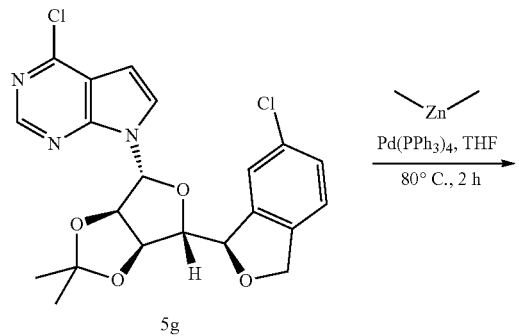

5g

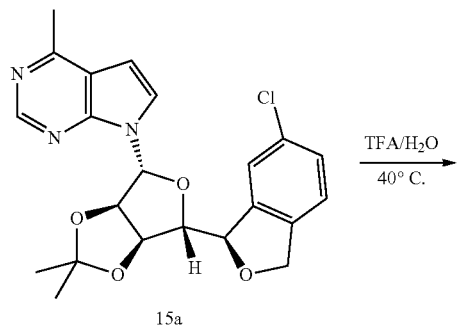

15a

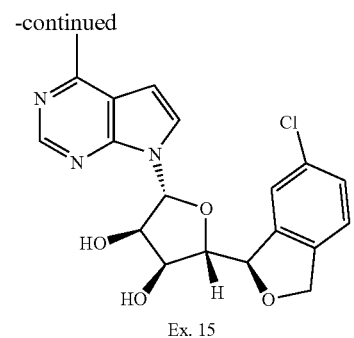

Ex. 15

Step 1. Synthesis of 7-[(3aR,4R,6R,6aR)-6-[(1R)-6-chloro-1,3-dihydroisobenzofuran-1-yl]-2,2-dimethyl-3a,4,6,6a-tetrahydrofuro[3,4-d][1,3]dioxol-4-yl]-4-methyl-pyrrolo[2,3-d]pyrimidine (15a)

To a solution of 7-[(3aR,4R,6R,6aR)-6-[(1R)-6-chloro-1,3-dihydroisobenzofuran-1-yl]-2,2-dimethyl-3a,4,6,6a-tetrahydrofuro[3,4-d][1,3]dioxol-4-yl]-4-chloro-pyrrolo[2,3-d]pyrimidine (5 g, 200.0 mg, 0.45 mmol) in THF (5 mL) was added dimethylzine (4.5 mL, 4.46 mmol) at 25° C. The reaction mixture was stirred at 80° C. for 2 h. LCMS showed the reaction was complete. The mixture was cooled to room temperature and quenched with saturated NaHCO$_3$ (aq) and extracted with ethyl acetate (100 mL×3). The organic layer was washed with brine (50 mL×3), dried over anhydrous Na$_2$SO$_4$, filtered and concentrated in vacuum to give 7-[(3aR,4R,6R,6aR)-6-[(1R)-6-chloro-1,3-dihydroisobenzofuran-1-yl]-2,2-dimethyl-3a,4,6,6a-tetrahydrofuro[3,4-d][1,3]dioxol-4-yl]-4-methyl-pyrrolo[2,3-d]pyrimidine (15a, 206 mg, 0.40 mmol, 90.6% yield) as a brown solid. LCMS [M+H]: 428.1.

Step 2. Synthesis of (2S,3S,4R,5R)-2-[(1R)-6-chloro-1,3-dihydroisobenzofuran-1-yl]-5-(4-methylpyrrolo[2,3-d]pyrimidin-7-yl)tetrahydrofuran-3,4-diol (Ex. 15)

A mixture of 7-[(3aR,4R,6R,6aR)-6-[(1R)-6-chloro-1,3-dihydroisobenzofuran-1-yl]-2,2-dimethyl-3a,4,6,6a-tetrahydrofuro[3,4-d][1,3]dioxol-4-yl]-4-methyl-pyrrolo[2,3-d]pyrimidine (15a, 106 mg, 0.25 mmol), water (0.5 mL) and TFA (0.8 mL, 8.33 mmol), was stirred at 40° C. for 2 h. LCMS showed the reaction was complete. The reaction mixture was filtered and purified by prep-HPLC (0.1% NH$_3$·H$_2$O), eluted with CH$_3$CN in H$_2$O from 10% to 95% to give (2S,3S,4R,5R)-2-[(1R)-6-chloro-1,3-dihydroisobenzofuran-1-yl]-5-(4-methylpyrrolo[2,3-d]pyrimidin-7-yl)tetrahydrofuran-3,4-diol (Ex. 15, 36.6 mg, 0.09 mmol, 37.1% yield) as a white solid. LCMS [M+H]: 388.1. $^1$H NMR (400 M Hz, DMSO-d$_6$): δ 8.67 (s, 1H), 7.78 (d, J=3.6 Hz, 1H), 7.38 (s, 2H), 7.31 (s, 1H), 6.83 (d, J=3.6 Hz, 1H), 6.29 (d, J=7.2 Hz, 1H), 5.33-5.40 (m, 3H), 5.06-5.15 (m, 2H), 4.55-4.58 (m, 1H), 4.18 (d, J=4.8 Hz, 1H), 3.93 (d, J=4.8 Hz, 1H), 2.68 (s, 3H). $^1$H NMR (400 M Hz, DMSO-d$_6$+D$_2$O): δ 8.67 (s, 1H), 7.77 (d, J=4.0 Hz, 1H), 7.38 (s, 2H), 7.31 (s, 1H), 6.84 (d, J=4.0 Hz, 1H), 6.29 (d, J=3.2 Hz, 1H), 5.39 (br, 1H), 5.06-5.16 (m, 2H), 4.55-4.58 (m, 1H), 4.18 (d, J=4.0 Hz, 1H), 3.93 (d, J=3.2 Hz, 1H), 2.68 (s, 3H).

121

Example 22. Synthesis of (2S,3S,4R,5R)-2-((R)-6-chloroisochroman-1-yl)-5-(4-methyl-7H-pyrrolo[2,3-d]pyrimidin-7-yl)tetrahydrofuran-3,4-diol (Ex. 22)

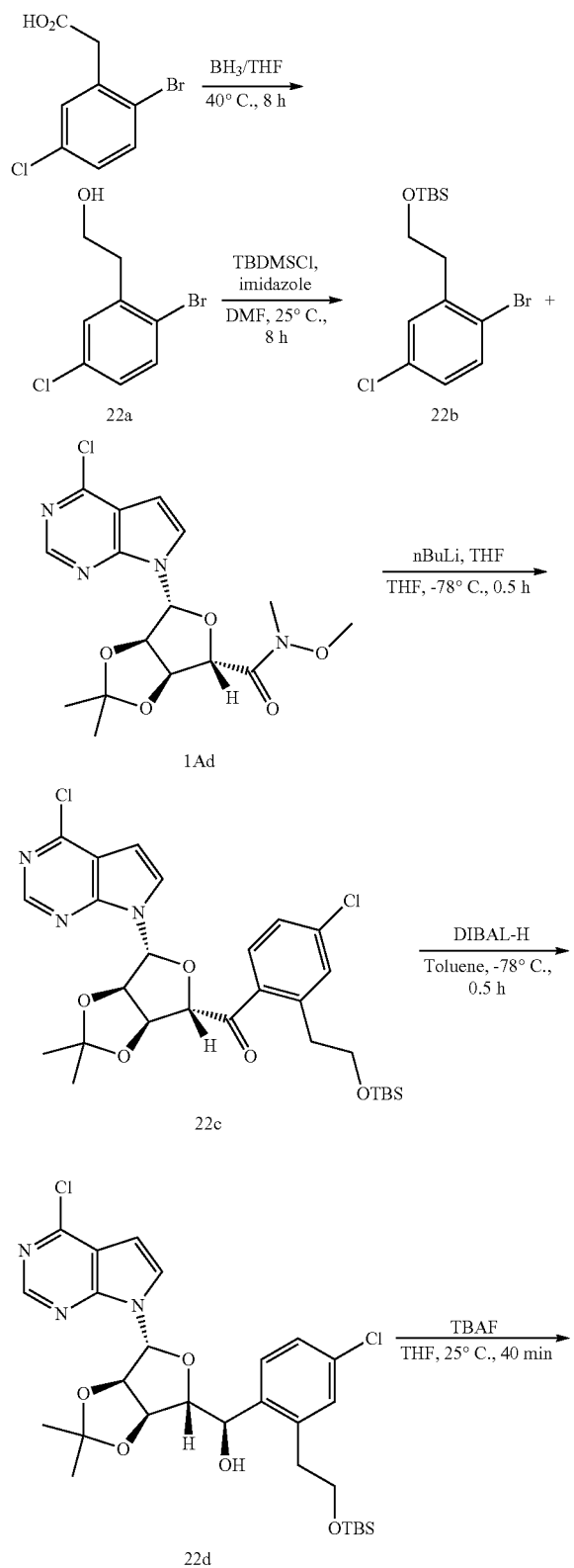

122

-continued

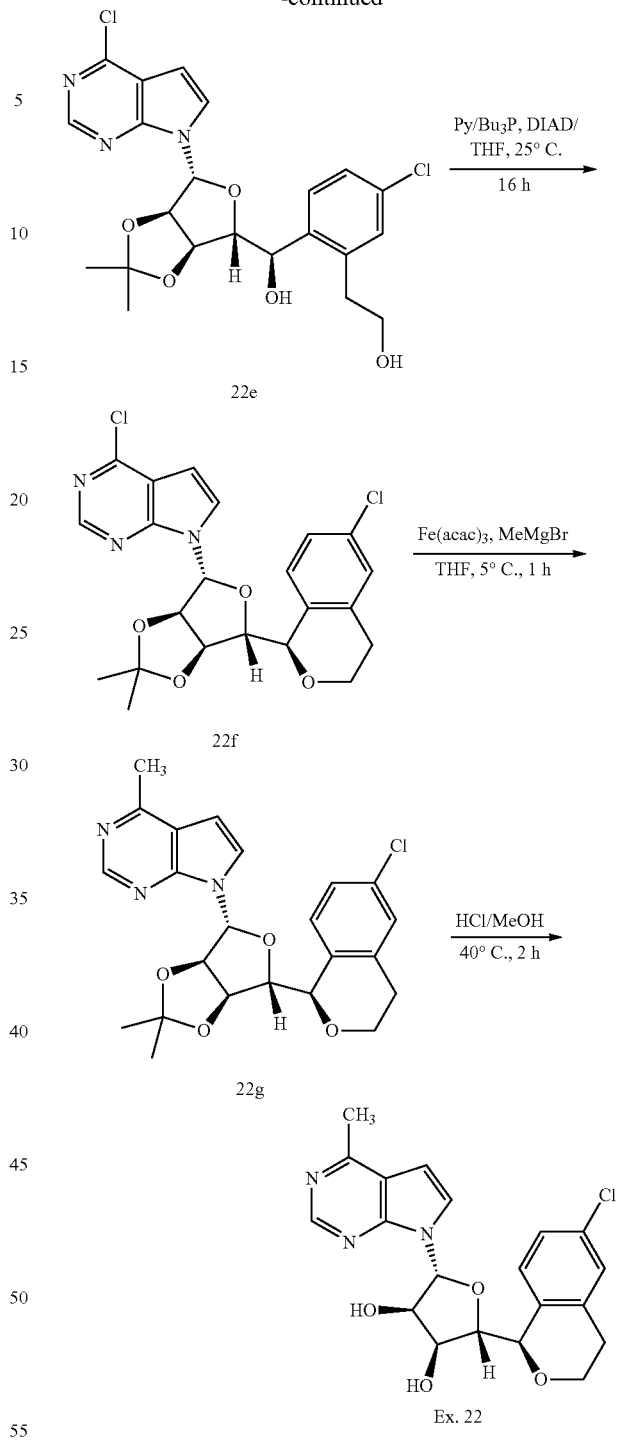

Step 1. Synthesis of 2-(2-bromo-5-chloro-phenyl)ethanol (22a)

To a solution of 2-(2-bromo-5-chloro-phenyl)acetic acid (20.0 g, 80.16 mmol) in THF (200 mL), borane in THF (240.49 mL, 240.49 mmol) was added, and the mixture was stirred at 40° C. for 8 h. The mixture was quenched with MeOH at 0° C., concentrated, and extracted with EA (400 mL×2). The combined organic layers were dried, concentrated and purified by combi flash eluting with $CH_3CN/H_2O$

Step 2. Synthesis of 2-(2-bromo-5-chloro-phenyl) ethoxy-tert-butyl-dimethyl-silane (22b)

To a solution of 22a (18.1 g, 76.85 mmol) in DMF (200 mL), imidazole (7.85 g, 115.28 mmol) and TBDMSCl (13.9 g, 92.23 mmol) were added and the mixture was stirred at 25° C. for 8 h. EA (800 mL) was added and the mixture was washed with brine (400 mL×2). The organic layer was concentrated and purified by flash column (PE) to give 22b (26.7 g, 76.34 mmol, 99.3% yield) as a colorless oil.

Step 3. Synthesis of [2-[2-[tert-butyl(dimethyl)silyl] oxyethyl]-4-chloro-phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl] methanone (22c)

To a solution of 22b (8.91 g, 25.6 mmol) in dry THF (50 mL) was added n-BuLi (12.8 mL, 20.48 mmol) at −78° C. and the mixture was stirred for 10 min under nitrogen. A solution of 1Ad (4.0 g, 10.24 mmol) in dry THF (20 mL) was added and the mixture was stirred for 5 min at −78° C. TLC (PE:EA=8:1) showed the reaction was complete. The reaction was poured into dilute HCl (pH=6; pH kept <8 during the process of quenching.) The mixture was extracted with EA (200 mL×2), the combined organic layers were dried, concentrated and purified by combi-flash eluting with $CH_3CN/H_2O$ (neutral) from 5/95 to 95/5 to give 22c (5.1 g, 8.60 mmol, 84% yield) as yellow solid.

Step 4. Synthesis of (R)-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]-[2-[[tert-butyl(dimethyl)silyl]oxymethyl]-5-chloro-phenyl]methanol (22d)

To a solution of 22c (5.0 g, 8.44 mmol) in THF (30 mL) at −78° C., DIBAL-H (16.88 mL, 25.31 mmol) was added and the mixture was stirred at −78° C. for 30 min. TLC (PE/EA=8/1) showed SM Rf=0.5 has been completely consumed with the main product Rf=0.4. The reaction was poured into dilute HCl (pH=6, 400 mL, keeping the pH<8 during the process of quenching.) The mixture was extracted with EA (300 mL×2) and the combined organic layers were dried and concentrated to give the crude 22d (5.0 g) as a yellow solid.

Step 5. Synthesis of 2-[5-chloro-2-[(R)-hydroxy-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methyl]phenyl]ethanol (22e)

To a solution of 22d (3.0 g, 5.17 mmol) in THF (50 mL) was added tetrabutylammonium fluoride (5.17 mL, 5.17 mmol). The mixture solution was stirred at 25° C. for 40 min. The reaction mixture was poured into aqueous $NH_4Cl$ and extracted with EA (100 mL). The combined organic layers were washed with brine, dried over anhydrous $Na_2SO_4$ and the solvent was concentrated under reduced pressure. The crude product was purified by flash column (PE:EA=15:1 to 3:1) to give 22e (2 g, 4.08 mmol, 79% yield) as a white solid. LCMS [M+H]: 480.1.

Step 6. Synthesis of 4-chloro-7-[(3aR,4R,6R,6aR)-2,2-dimethyl-6-[(1R)-6-chloroisochroman-1-yl]-3a,4,6,6a-tetrahydrofuro[3,4-d][1,3]dioxol-4-yl]pyrrolo[2,3-d]pyrimidine (22f)

To a solution of 22e (2.0 g, 4.16 mmol) in THF (100 mL) and was added tributylphosphine (2.1 mL, 8.33 mmol), isopropyl (NE)-N-isopropoxycarbonyliminocarbamate (1.72 mL, 8.74 mmol) and pyridine (0.34 mL, 4.16 mmol), and the reaction mixture was stirred at 25° C. for 16 h.

TLC (PE/EA=3/1, Rf=0.4) showed that the starting material was consumed. The solvent was removed in vacuo and the crude product was purified by column chromatography on silica gel using petroleum ether/EtOAc (10:1-5:1) as eluent to give 22f (1.7 g, 3.68 mmol, 88% yield) as a yellow oil. LCMS [M+H]: 462.1.

Step 7. Synthesis of 4-methyl-7-[(3aR,4R,6R,6aR)-2,2-dimethyl-6-[(1R)-6-chloroisochroman-1-yl]-3a,4,6,6a-tetrahydrofuro[3,4-d][1,3]dioxol-4-yl]pyrrolo[2,3-d]pyrimidine (22 g)

Methyl magnesium bromide (3.68 mL, 11.04 mmol) was added dropwise to a solution of ferric acetylacetonate (0.13 g, 0.37 mmol) and 22f (1.7 g, 3.68 mmol) in THF (100 mL) at 5° C. under nitrogen. The reaction mixture was warmed to rt and stirred for 1 h. TLC (EA:PE=1:1, Rf=0.3) showed the reaction was complete. Saturated $NH_4Cl$ was added dropwise to quench the reaction, which was extracted with EA (200 mL×2), then dried over $Na_2SO_4$ and concentrated. The residue was purified by flash column (PE:EA=10:1 to 1:1) to give 22 g (900 mg, 1.93 mmol, 52.6% yield) as a white solid.

Step 8. Synthesis of (2R,3R,4S,5S)-2-(4-methylpyrrolo[2,3-d]pyrimidin-7-yl)-5-[(1R)-6-chloroisochroman-1-yl]tetrahydrofuran-3,4-diol (Ex. 22)

To a solution of HCl (6.0 mL, 12 mmol) in methanol (10 mL) and was added 22 g (900 mg, 2.04 mmol) and the reaction mixture was stirred at 40° C. for 2 h. The reaction mixture was concentrated, and the residue was stirred with EA (50 ml) and filtered. The solid was purified by prep-HPLC eluting with $CH_3CN/H_2O$ (0.1% $NH_4OH$) from 5/95 to 95/5. The product fractions were extracted with EA (100 ml×2) and the extracts concentrated to yield Ex. 22 (550 mg, 1.34 mmol, 66% yield) as a white solid. LCMS [M+H]: 402.3. 1H NMR (400 M Hz, DMSO-d6): δ 8.67 (s, 1H), 7.76 (d, J=4.0 Hz, 1H), 7.22-7.31 (m, 3H), 6.81 (d, J=3.6 Hz, 1H), 6.31 (d, J=7.6 Hz, 1H), 5.26 (d, J=7.2 Hz, 1H), 5.13 (d, J=4.0 Hz, 1H), 4.90 (d, J=3.6 Hz, 1H), 4.48-4.54 (m, 1H), 4.42-4.43 (m, 1H), 4.23-4.27 (m, 1H), 3.84-3.86 (m, 1H), 3.66-3.72 (m, 1H), 2.91-2.99 (m, 1H), 2.70-2.74 (m, 1H), 2.67 (s, 3H). 1H NMR (400 M Hz, DMSO-d6+D2O): δ 8.86 (s, 1H), 7.77 (d, J=4 Hz, 1H), 7.22-7.31 (m, 3H), 6.82 (d, J=3.6 Hz, 1H), 6.31 (d, J=7.6 Hz, 1H), 4.90 (d, J=3.6 Hz, 1H), 4.49-4.53 (m, 1H), 4.42-4.43 (m, 1H), 4.24-4.28 (m, 1H), 3.83-3.85 (m, 1H), 3.66-3.72 (m, 1H), 2.91-2.99 (m, 1H), 2.70-2.75 (m, 1H), 2.69 (s, 3H).

(neutral) from 5/95 to 95/5 to give 22b (18.1 g, 76.854 mmol, 95.9% yield) as a colorless oil. LCMS [M-18]: 217.0/219.0.

Example 44. Synthesis of (2S,3S,4R,5R)-2-((1R)-6-chloro-3-methoxyisochroman-1-yl)-5-(4-methyl-7H-pyrrolo[2,3-d]pyrimidin-7-yl)tetrahydrofuran-3,4-diol (Ex. 44)

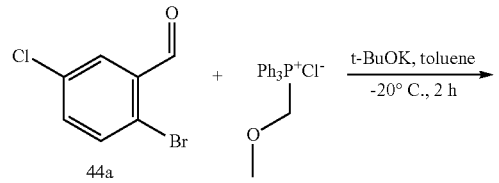

44a

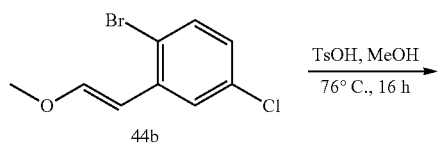

44b

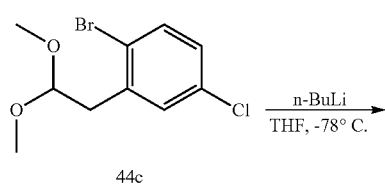

44c

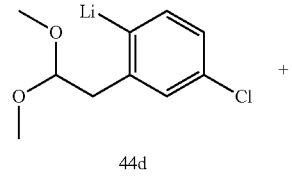

44d

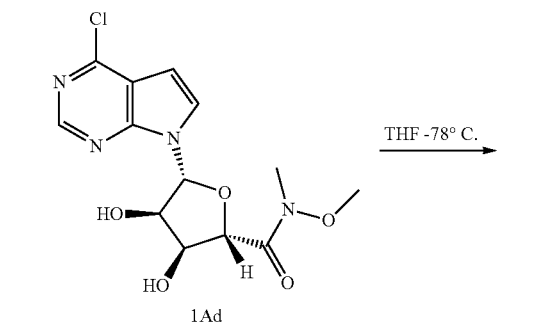

1Ad

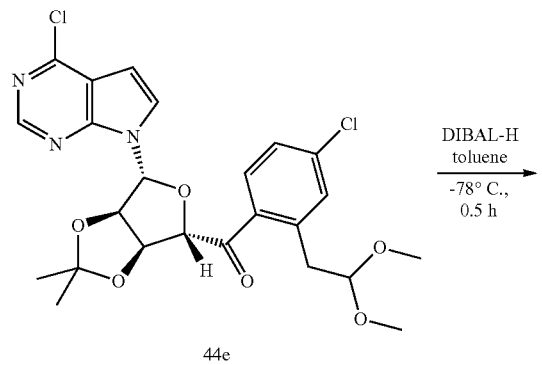

44e

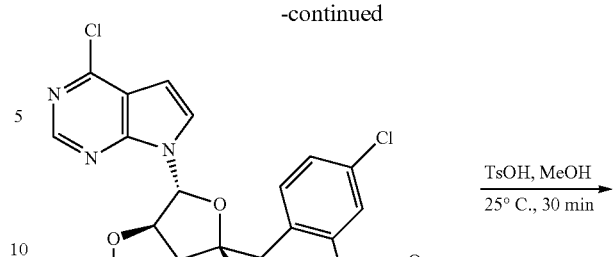

44f

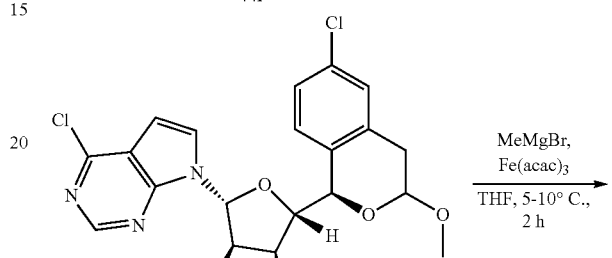

44g

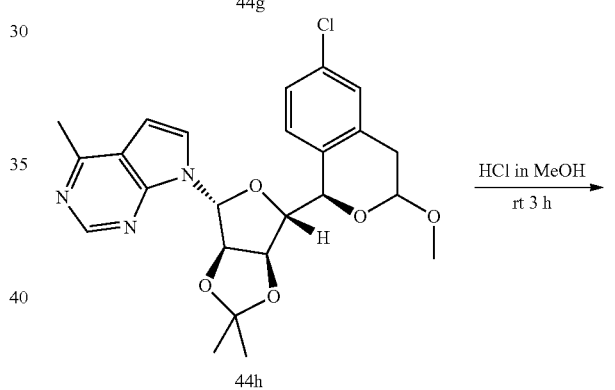

44h

Ex. 44

Step 1. Synthesis of 1-bromo-4-chloro-2-(2-methoxyvinyl)benzene (44b)

To a solution of (methoxymethyl)triphenylphosphonium chloride (22.96 g, 66.98 mmol) in THF (100 mL) was added potassium tert-butoxide (7.16 g, 63.79 mmol) under $N_2$ at −10° C. After 5 minutes, 2-bromo-5-chloro-benzaldehyde (44a; 7.0 g, 31.9 mmol) was added. The solution was stirred at −10° C. for 2 h. TLC (PE=100%, $R_f$=0.8) showed the reaction was complete. The reaction mixture was poured into H$_2$O (200 mL). The mixture was extracted with EA (200 mL), washed with water (60 mL) and brine (60 mL), dried over Na$_2$SO$_4$, filtered and concentrated. The crude product was purified by silica gel column chromatography, eluting with PE (100%) to give 44b (7.2 g, 29.09 mmol, 91.2% yield, mixture of E and Z isomers) as a yellow oil. $^1$H NMR (400 MHz, DMSO-d6) δ 7.99 (d, J=2.8 Hz, 1H), 7.61-7.56 (m, 2H), 7.43-7.40 (m, 1H), 7.15-7.10 (m, 2H), 6.58 (d, J=6.8 Hz, 1H), 5.93 (d, J=12.8 Hz, 2H), 5.44 (d, J=7.2 Hz), 3.84 (s, 3H), 3.71 (s, 3H).

Step 2. Synthesis of
1-bromo-4-chloro-2-(2-methoxyvinyl)benzene (44c)

To a mixture of p-toluenesulfonic acid (537 mg, 2.83 mmol) in methanol (70 mL) was added 44b (7.0 g, 28.28 mmol). The mixture was stirred at 66° C. for 16 h. TLC (PE=100%, R$_f$=0.4) showed the reaction was complete. The reaction mixture was poured into H$_2$O (200 mL). The mixture was extracted with EA (200 mL), washed with water (60 mL) and brine (60 mL), dried over Na$_2$SO$_4$, filtered and concentrated. The crude product was purified by silica gel column chromatography, eluting with PE (100%) to give 44c (7.2 g, 25.7 mmol, 91% yield) as a yellow oil. $^1$H NMR (400 MHz, CDCl$_3$) δ 7.62 (d, J=8.8 Hz, 1H), 7.43 (d, J=2.4 Hz, 1H), 7.25 (dd, J=8.4, 2.8 Hz, 1H), 4.62 (t, J=5.2 Hz, 1H), 3.26 (s, 6H), 2.99 (d, J=5.6 Hz, 2H).

Step 3. Synthesis of [4-chloro-2-(2,2-dimethoxy-ethyl)phenyl]-[(3aR,4R,6S,6aS)-4-(4-chloropyrrolo[2,3-d]pyrimidin-7-yl)-2,2-dimethyl-3a,4,6,6a-tetra-hydrofuro[3,4-d][1,3]dioxol-6-yl]methanone (44e)

To a mixture of 44c (3.0 g, 10.73 mmol) in THF (30 mL) was added n-BuLi (2.04 g, 10.73 mmol) at −78° C. The resulting solution of 44d was stirred at −78° C. for 1 min, and 1Ad (3.24 g, 8.46 mmol) in THF (20 mL) was added at −78° C. The reaction mixture was stirred at −78° C. for 30 min. TLC (PE:EA=5:1, R$_f$=0.5) showed the reaction was complete. The reaction was quenched with NH$_4$Cl (aq, 100 mL) and water (100 mL). The aqueous layer was extracted with EA (300 mL×3). The organic layers were concentrated to give a crude product which was purified by silica gel column chromatography, eluting with PE:EA=10:1 to give 44e (3 g, 5.74 mmol, 53.5% yield) as a yellow oil. LCMS [M+H]: 522.3

Step 4. Synthesis of (S)-[4-chloro-2-(2,2-dime-thoxyethyl)phenyl]-[(3aR,4R,6R,6aR)-4-(4-chloro-pyrrolo[2,3-d]pyrimidin-7-yl)-2,2-dimethyl-3a,4,6,6a-tetrahydrofuro[3,4-d][1,3]dioxol-6-yl]methanol (44f)

To a mixture of 44e (3.0 g, 5.74 mmol) in toluene (30 mL) was added DIBAL-H (1.33 mL, 11.49 mmol) at −78° C. The mixture was stirred at −78° C. for 30 min. LCMS showed the reaction was complete. The reaction mixture was poured into H$_2$O (100 mL) and extracted with DCM (200 mL), dried over Na$_2$SO$_4$, filtered, and concentrated. The crude product was purified by silica gel column chromatography, eluting with DCM:MeOH=5:1 to give 44f (3 g, 5.72 mmol, 99.6% yield) as a yellow oil. LCMS [M+H]: 524.4 Step 5. Synthesis of 4-chloro-7-[(3aR,4R,6R,6aR)-2,2-dimethyl-6-[(1R)-6-chloro-3-methoxy-isochroman-1-yl]-3a,4,6,6a-tet-rahydrofuro[3,4-d][1,3]dioxol-4-yl]pyrrolo[2,3-d]pyrimidine (44 g)

To a mixture of (S)-[4-chloro-2-(2,2-dimethoxyethyl)phe-nyl]-[(3aR,4R,6R,6aR)-4-(4-chloropyrrolo[2,3-d]pyrimi-din-7-yl)-2,2-dimethyl-3a,4,6,6a-tetrahydrofuro[3,4-d][1,3]dioxol-6-yl]methanol (2.0 g, 3.81 mmol) in methanol (20 mL) was added TsOH (0.03 mL, 5.72 mmol at 0° C. The mixture was stirred at 25° C. for 2 h. TLC (PE:EA=5:1, R$_f$=0.5) showed the reaction was complete. The reaction mixture was poured into H$_2$O (30 mL) and extracted with DCM (50 mL×3). The organic phase was washed with saturated NaCl (100 mL), dried over Na$_2$SO$_4$, filtered and concentrated. The crude product which was purified by silica gel column chromatography, eluting with PE:EA=10:1 to give 44 g (1.36 g, 2.76 mmol, 72% yield) as a yellow oil. LCMS [M+H]: 492.2

Step 6. Synthesis of 4-methyl-7-[(3aR,4R,6R,6aR)-2,2-dimethyl-6-[(1R)-6-chloro-3-methoxy-isochro-man-1-yl]-3a,4,6,6a-tetrahydrofuro[3,4-d][1,3]di-oxol-4-yl]pyrrolo[2,3-d]pyrimidine (44h)

To a mixture of 44 g (200 mg, 0.41 mmol) and ferric acetylacetonate (71.73 mg, 0.20 mmol) in THF (2 mL) was added MeMgBr (484 mg, 4.06 mmol) at −10° C. The reaction mixture was warmed to 0° C. and stirred for 1 h. TLC (PE:EA=5:1, R$_f$=0.7) showed the reaction was complete. The reaction mixture was poured into H$_2$O (10 mL), extracted with DCM (10 mL×3), washed with saturated NaCl (20 mL), dried over Na$_2$SO$_4$, filtered, and concentrated. The crude product was purified by silica gel column chromatography, eluting with PE:EA=7:1 to give 44h (110 mg, 0.23 mmol, 57.4% yield) as a yellow oil. LCMS [M+H]: 472.4

Step 7. Synthesis of (2R,3R,4S,5S)-2-(4-methylpyr-rolo[2,3-d]pyrimidin-7-yl)-5-[(1R)-6-chloro-3-methoxy-isochroman-1-yl]tetrahydrofuran-3,4-diol (Ex. 44)

To a mixture of 44h (110 mg, 0.23 mmol) in methanol (2 mL) was added HCl (42 mg, 1.17 mmol). The mixture was stirred at 25° C. for 1 h. TLC (PE:EA=5:1, R$_f$=0.7) and LCMS showed the reaction was complete. The reaction mixture was poured into H$_2$O (10 mL), extracted with DCM (10 mL×3), washed with saturated NaCl (20 mL), dried over Na$_2$SO$_4$, filtered, and concentrated. The crude product was purified by silica gel column chromatography, eluting with PE:EA=7:1 to give a crude product which was further purified by prep-HPLC, eluting with CH$_3$CN in H$_2$O (0.1% NH$_3$·H$_2$O) from 10% to 95%) to give Ex. 44 (25 mg, 0.047 mmol, 20% yield) as a white solid. LCMS [M+H]: 432.4 $^1$H NMR (400 MHz, DMSO-d6) δ 8.67 (s, 1H), 7.79-7.81 (d, 1H), 7.22-7.32 (m, 3H), 6.82-6.84 (m, 1H), 6.31-6.34 (m, 1H), 5.15-5.30 (m, 3H), 4.82 (d, 1H), 4.46-4.58 (m, 2H), 3.89-3.91 (t, 1H), 3.38 (s, 3H), 3.08-3.13 (m, 1H), 2.77 (d, 1H), 2.67 (s, 3H). $^1$H NMR (400 MHz, DMSO-d6+D$_2$O) δ8.68 (s, 1H), 7.81 (d, 1H), 7.22-7.32 (m, 3H), 6.83 (d, 1H), 6.32 (d, 1H), 5.26 (d, 1H), 4.83 (d, 1H), 4.78-4.57 (m, 2H), 3.89 (d, 1H), 3.08 (d, 1H), 2.77 (d, 1H), 2.67 (s, 3H).

Example 46. Synthesis of (1R)-6-chloro-1-[(2S,3S, 4R,5R)-3,4-dihydroxy-5-(4-methylpyrrolo[2,3-d]pyrimidin-7-yl)tetrahydrofuran-2-yl]isochroman-3-one (Ex. 46)
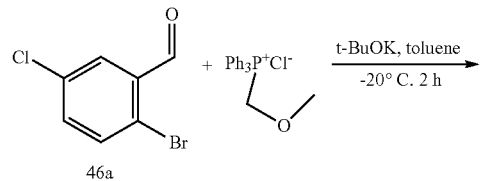
46a
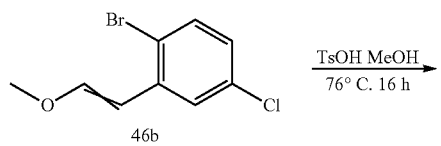
46b
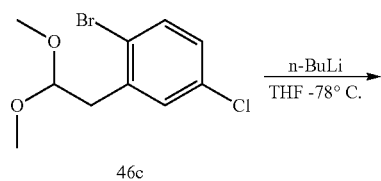
46c
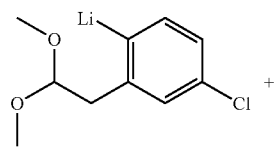
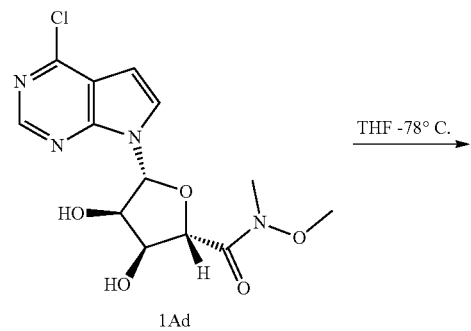
1Ad
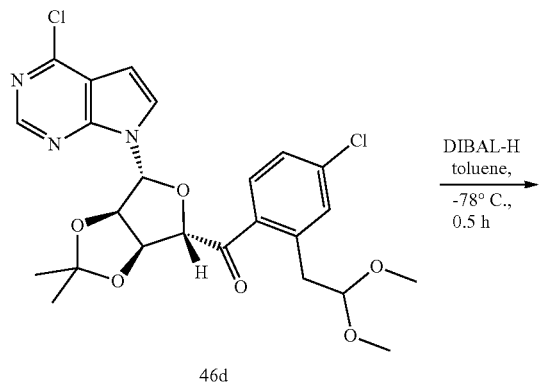
46d
-continued
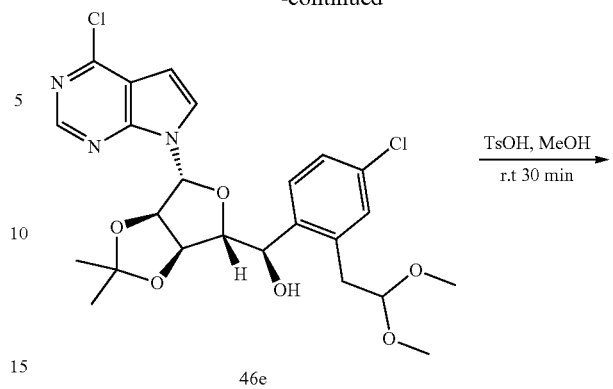
46e
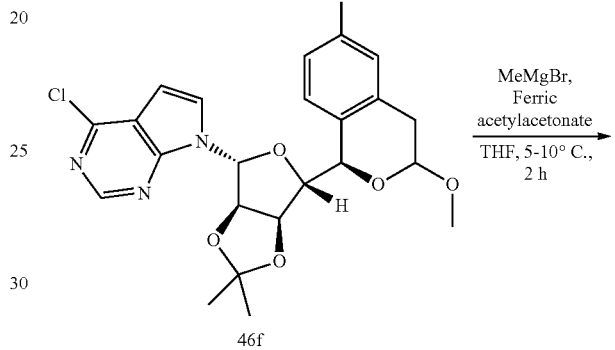
46f
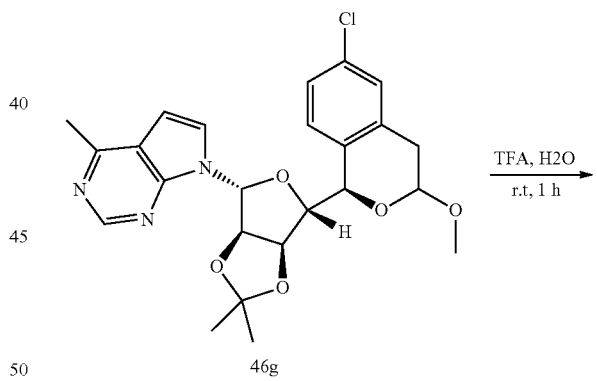
46g
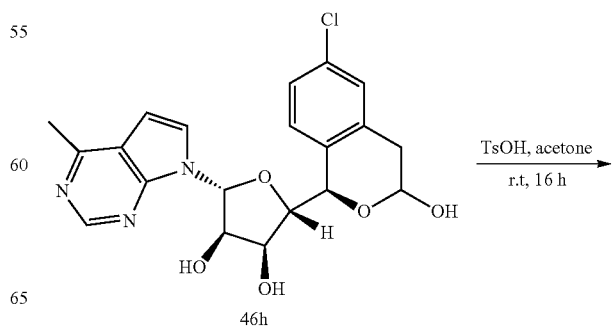
46h

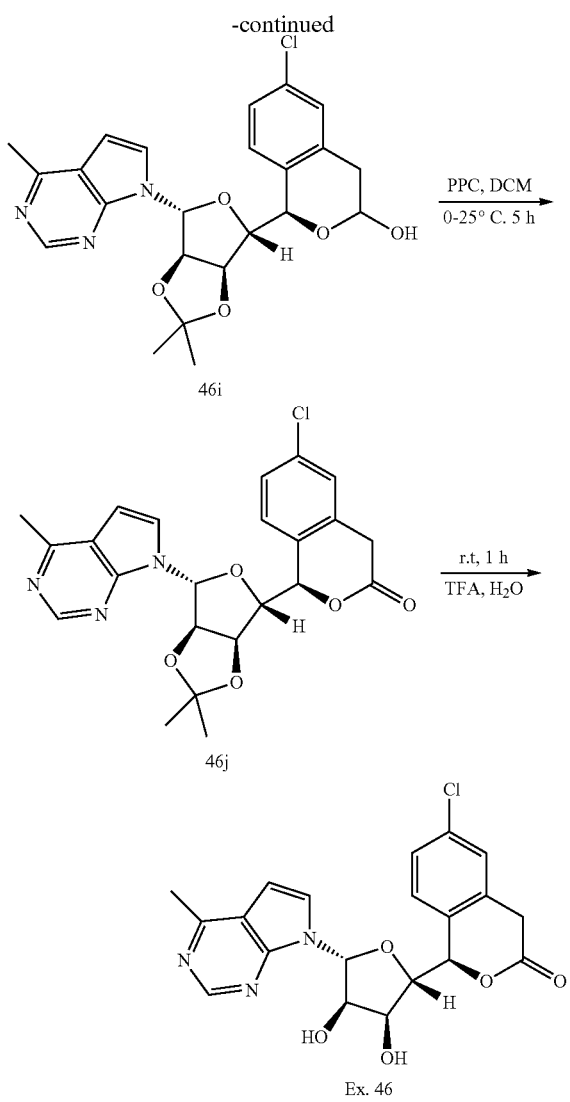

Step 1. Synthesis of 1-bromo-4-chloro-2-(2-methoxyvinyl)benzene (46b)

To a solution of (methoxymethyl)-triphenylphosphonium chloride (26.24 g, 76.55 mmol) in THF (70 mL) was added potassium tert-butoxide (4.65 mL, 72.91 mmol) at −25° C. under N$_2$. A few minutes later, 2-bromo-5-chloro-benzaldehyde (46a, 8.0 g, 36.45 mmol) was added. The solution was stirred at −25° C. for 2 h. The reaction was monitored by TLC (petroleum ether=100%, R$_f$=0.8). The reaction mixture was poured into water (200 mL). Ethyl acetate (200 mL) was added and the organic phase was separated. The solution was washed with water (100 mL) and brine (100 mL), dried (Na$_2$SO$_4$), filtered, and concentrated in vacuum to give the crude product which was purified by column chromatography on silica gel with petroleum ether (100%) to give 1-bromo-4-chloro-2-(2-methoxyvinyl)benzene (46b, 8.75 g, 35.351 mmol, 97% yield) as a yellow oil. LCMS [M+H]: 247.1.

Step 2. Synthesis of 1-bromo-4-chloro-2-(2,2-dimethoxyethyl)benzene (46c)

To a mixture of TsOH (672 mg, 3.54 mmol) in methanol (70 mL) was added 1-bromo-4-chloro-2-(2-methoxyvinyl)benzene (46b, 8.75 g, 35.35 mmol) and the mixture was stirred at 75° C. for 16 h. TLC (petroleum ether=100%, R$_f$=0.4) showed the reaction was complete. The reaction mixture was poured into water (200 mL) and ethyl acetate (200 mL) was added. The organic layer was washed with saturated NaCl (100 mL), dried over Na$_2$SO$_4$, filtered and concentrated in vacuum to give the crude product which was purified by column chromatography on silica gel with petroleum ether (100%) to give 1-bromo-4-chloro-2-(2,2-dimethoxyethyl)benzene (46c, 5.5 g, 19.674 mmol, 56% yield) as a yellow oil. LCMS [M+H]: 279.1.

Step 3. Synthesis of [4-chloro-2-(2,2-dimethoxyethyl)phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (46d)

To a mixture of 1-bromo-4-chloro-2-(2,2-dimethoxyethyl)benzene (46c, 5.5 g, 19.7 mmol) in THF (30 mL), BuLi (3.74 g, 19.7 mmol) was added at −78° C. and stirred for 1 min. (3aR,4R,6S,6aS)-4-(4-chloropyrrolo[2,3-d]pyrimidin-7-yl)-N-methoxy-N,2,2-trimethyl-3a,4,6,6a-tetrahydrofuro[3,4-d][1,3]dioxole-6-carboxamide (1Ad, 5.94 g, 15.52 mmol) was added at −78° C. and the reaction was stirred for 30 min at −78° C. TLC (petroleum ether:ethyl acetate=5:1, R$_f$=0.5) showed the reaction was complete. The reaction was quenched with NH$_4$Cl (100 mL) and water (100 mL). The aqueous layer was extracted with ethyl acetate (300 mL×3), dried over Na$_2$SO$_4$, and concentrated in vacuum. The crude product was purified by column chromatography on silica gel with petroleum ether:ethyl acetate (10:1) to give [4-chloro-2-(2,2-dimethoxyethyl)phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (46d, 2.0 g, 3.8286 mmol, 19.5% yield) as a yellow oil. LCMS [M+H]: 522.3.

Step 4. Synthesis of (S)-[4-chloro-2-(2,2-dimethoxyethyl)phenyl]-[(3aR,4R,6R,6aR)-4-(4-chloropyrrolo-[2,3-d]pyrimidin-7-yl)-2,2-dimethyl-3a,4,6,6a-tetrahydrofuro[3,4-d][1,3]dioxol-6-yl]methanol (46e)

To a mixture of [4-chloro-2-(2,2-dimethoxyethyl)phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (46d, 2.0 g, 3.83 mmol) in toluene (30 mL) was added DIBAL-H (0.89 mL, 7.66 mmol) at −78° C. The mixture was stirred at −78° C. for 30 min. The reaction was poured into water (100 mL) and extracted with DCM (200 mL). The aqueous layer was extracted with DMC (300 mL×3), dried over Na$_2$SO$_4$, and concentrated in vacuum. The crude product was purified by column chromatography on silica gel with DCM:MeOH=5:1 to give (S)-[4-chloro-2-(2,2-dimethoxyethyl)phenyl]-[(3aR,4R,6R,6aR)-4-(4-chloropyrrolo-[2,3-d]pyrimidin-7-yl)-2,2-dimethyl-3a,4,6,6a-tetrahydrofuro[3,4-d][1,3]dioxol-6-yl]methanol (46e, 2 g, 3.81 mmol, 100% yield) as a yellow oil. LCMS [M+H]: 524.3.

Step 5. Synthesis of 4-chloro-7-[(3aR,4R,6R,6aR)-2,2-dimethyl-6-[(1R)-6-chloro-3-methoxy-isochroman-1-yl]-3a,4,6,6a-tetrahydrofuro[3,4-d][1,3]dioxol-4-yl]pyrrolo[2,3-d]pyrimidine (46f)

To a mixture of (S)-[4-chloro-2-(2,2-dimethoxyethyl)phenyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (46e, 2.0 g, 3.81 mmol) in methanol (20 mL) was added TsOH (0.03 mL, 5.72 mmol) at 0° C., then the mixture was stirred at 25° C. for 2 h. TLC (petroleum ether:ethyl acetate=5:1, $R_f$=0.5) and LCMS showed the reaction was complete. The reaction mixture was poured into water (30 mL) and extracted with DCM (50 mL×3). The organic layers were dried over $Na_2SO_4$ and concentrated in vacuum. The crude product was purified by column chromatography on silica gel with petroleum ether:ethyl acetate=10:1 to give 4-chloro-7-[(3aR,4R,6R,6aR)-2,2-dimethyl-6-[(1R)-6-chloro-3-methoxy-isochroman-1-yl]-3a,4,6,6a-tetrahydrofuro[3,4-d][1,3]dioxol-4-yl]pyrrolo[2,3-d]pyrimidine (46f, 1.6 g, 3.25 mmol, 85% yield) as a yellow oil. LCMS [M+H]: 492.0.

Step 6. Synthesis of 4-methyl-7-[(3aR,4R,6R,6aR)-2,2-dimethyl-6-[(1R)-6-chloro-3-methoxy-isochroman-1-yl]-3a,4,6,6a-tetrahydrofuro[3,4-d][1,3]dioxol-4-yl]pyrrolo[2,3-d]pyrimidine (46 g)

To a mixture of 4-chloro-7-[(3aR,4R,6R,6aR)-2,2-dimethyl-6-[(1R)-6-chloro-3-methoxy-isochroman-1-yl]-3a,4,6,6a-tetrahydrofuro[3,4-d][1,3]dioxol-4-yl]pyrrolo[2,3-d]pyrimidine (46f, 800 mg, 1.62 mmol) and ferric acetylacetonate (287 mg, 0.81 mmol) in THF (10 mL), was added methylmagnesium bromide (1937.48 mg, 16.25 mmol) at −10° C. The mixture was warmed to 0° C. and stirred for 1 h. TLC (petroleum ether:ethyl acetate=5:1, $R_f$=0.7) showed the reaction was complete. The reaction mixture was poured into water (30 mL) and extracted with DCM (50 mL×3). The organic layers were dried over $Na_2SO_4$ and concentrated in vacuum. The crude product was purified by column chromatography on silica gel with petroleum ether:ethyl acetate=7:1 to give 4-methyl-7-[(3aR,4R,6R,6aR)-2,2-dimethyl-6-[(1R)-6-chloro-3-methoxy-isochroman-1-yl]-3a,4,6,6a-tetrahydrofuro[3,4-d][1,3]dioxol-4-yl]pyrrolo[2,3-d]pyrimidine (46 g, 610 mg, 1.29 mmol, 80% yield) as a yellow oil. LCMS [M+H]: 472.1.

Step 7. Synthesis of (2R,3R,4S,5S)-2-(4-methylpyrrolo[2,3-d]pyrimidin-7-yl)-5-[(1R)-6-chloro-3-hydroxy-isochroman-1-yl]tetrahydrofuran-3,4-diol (46h)

To a mixture of 4-methyl-7-[(3aR,4R,6R,6aR)-2,2-dimethyl-6-[(1R)-6-chloro-3-methoxy-isochroman-1-yl]-3a,4,6,6a-tetrahydrofuro[3,4-d][1,3]dioxol-4-yl]pyrrolo[2,3-d]pyrimidine (46 g, 590 mg, 1.25 mmol) in water (6 mL) was added trifluoroacetic acid (228 mg, 2 mmol). The mixture was stirred at 25° C. for 1 h. TLC (petroleum ether:ethyl acetate=2:1, $R_f$=0.3) showed the reaction was complete. The reaction mixture was poured into water (30 mL) and extracted with ethyl acetate (50 mL×3). The organic layers was dried over $Na_2SO_4$, and concentrated in vacuum to give the crude product which was purified by column chromatography on silica gel with petroleum ether:ethyl acetate=7:1 to give (2R,3R,4S,5S)-2-(4-methylpyrrolo[2,3-d]pyrimidin-7-yl)-5-[(1R)-6-chloro-3-hydroxy-isochroman-1-yl]tetrahydrofuran-3,4-diol (46h, 280 mg, 0.54 mmol, 43% yield) as a yellow oil. LCMS [M+H]: 418.1.

Step 8. Synthesis of (1R)-6-chloro-1-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]isochroman-3-ol (46i)

To a mixture of (2R,3R,4S,5S)-2-(4-methylpyrrolo[2,3-d]pyrimidin-7-yl)-5-[(1R)-6-chloro-3-hydroxy-isochroman-1-yl]tetrahydrofuran-3,4-diol (46h, 50 mg, 0.12 mmol) in acetone (10 mL) was added TsOH (8.24 mg, 0.05 mmol) at 0° C. The mixture was stirred at 25° C. for 3 h. TLC (petroleum ether:ethyl acetate=5:1, $R_f$=0.3) showed the reaction was complete. The reaction mixture was poured into water (30 mL) and extracted with DCM (50 mL×3). The organic layers was dried over $Na_2SO_4$, concentrated in vacuum to give the crude product which was purified by column chromatography on silica gel with petroleum ether:ethyl acetate=(7:1) to give (1R)-6-chloro-1-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]isochroman-3-ol (46i, 76 mg, 0.13 mmol, 112% yield) as a white solid. LCMS [M+H]: 458.1.

Step 9. Synthesis of 6-chloro-1-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]isochroman-3-one (46j)

To a mixture of 6-chloro-1-[(3aR,4R,6R,6aR)-2,2-dimethyl-4-(4-methylpyrrolo-[2,3-d]pyrimidin-7-yl)-3a,4,6,6a-tetrahydrofuro[3,4-d][1,3]dioxol-6-yl]isochroman-3-ol (46i, 75 mg, 0.16 mmol) in DCM (3 mL) was added PCC (0.09 mL, 0.49 mmol) at 0° C. and the mixture was stirred at 0° C. for 30 min. Then the reaction was warmed to 25° C. until the reaction was complete. The reaction mixture was poured into water (30 mL) and extracted with DCM (3×50 mL). The organic layers was dried over $Na_2SO_4$ and concentrated in vacuum to give 6-chloro-1-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]isochroman-3-one (46j, 79 mg, 0.172 mmol, 100% yield) as a white solid which was used without further purification in the next step. LCMS [M+H]: 456.3.

Step 10. Synthesis of (1R)-6-chloro-1-[(2S,3S,4R,5R)-3,4-dihydroxy-5-(4-methylpyrrolo[2,3-d]pyrimidin-7-yl)tetrahydrofuran-2-yl]isochroman-3-one (Ex. 46)

To a mixture of (1R)-6-chloro-1-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]isochroman-3-one (46j, 78 mg, 0.17 mmol) in water (2 mL), trifluoroacetic acid (31.19 mg, 0.27 mmol) was added and the mixture was stirred at 25° C. for 1 h. LCMS showed the reaction was complete. The reaction was neutralized with $NaHCO_3$ and purified by prep-HPLC, eluting with $CH_3CN$ in water (0.1% TFA) from 10% to 95%) to give (1R)-6-chloro-1-[(2S,3S,4R,5R)-3,4-dihydroxy-5-(4-methylpyrrolo[2,3-d]pyrimidin-7-yl)tetrahydrofuran-2-yl]isochroman-3-one (Ex. 46, 3.4 mg, 0.0078 mmol, 4.6% yield) as an off white solid. LCMS [M+H]: 416.0. $^1$H NMR (400 MHz, DMSO-d6) δ 8.74 (s, 1H), 7.58 (s, 1H), 7.30 (m, 3H), 6.86 (s, 1H), 6.23 (d, J=5.6 Hz, 1H), 5.73 (d, J=4.8 Hz, 1H), 4.48 (m, 2H), 4.26 (s, 1H), 3.77 (d, J=4.8 Hz, 2H), 2.72 (s, 3H). 1H NMR (400

MHz, DMSO-$d_6$+$D_2O$) δ 8.82 (s, 1H), 7.62 (d, J=3.2 Hz, 1H), 7.29 (m, 3H), 6.93 (d, J=3.2 Hz, 1H), 6.24 (d, J=5.6 Hz, 1H), 5.73 (d, J=5.2 Hz, 1H), 4.49 (m, 2H), 4.26 (s, 1H), 3.76 (s, 2H), 2.76 (s, 3H).

Example 50. Synthesis of (2R,3R,4S,5S)-2-(4-methylpyrrolo[2,3-d]pyrimidin-7-yl)-5-[(1R)-6-chloro-3-hydroxy-isochroman-1-yl]tetrahydrofuran-3,4-diol (Ex. 50)

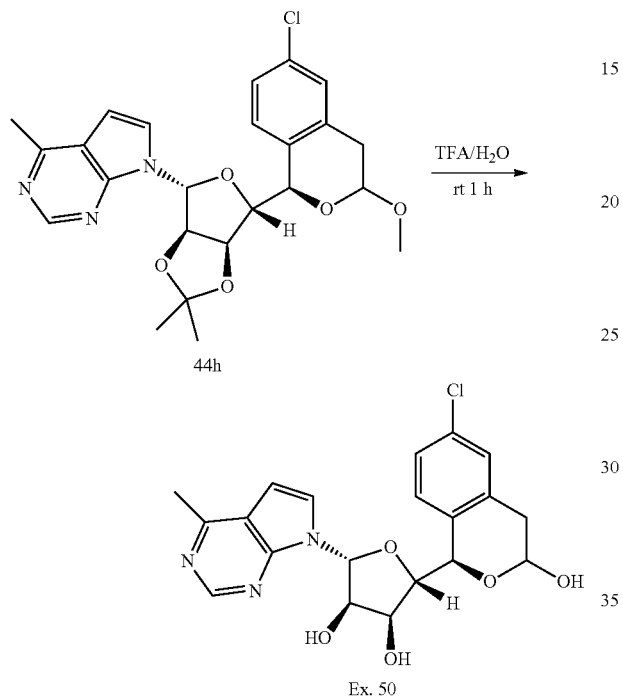

To a mixture of 44h (100 mg, 0.21 mmol) in water (2 mL) was added trifluoroacetic acid (38.63 mg, 0.34 mmol). The mixture was stirred at 25° C. for 1 h. TLC (PE:EA=5:1, $R_f$=0.7) and LCMS showed the reaction was complete. The reaction mixture was poured into $H_2O$ (10 mL), extracted with DCM (10 mL×3), washed with saturated NaCl (20 mL), dried over $Na_2SO_4$, filtered, and concentrated. The crude product was purified by silica gel column chromatography, eluting with PE:EA=7:1 to give a crude product which was further purified by prep-HPLC, eluted with $CH_3CN$ in $H_2O$ (0.1% $NH_3$·$H_2O$) from 10% to 95%) to give Ex. 50 as a mixture of diastereomers (10 mg, 0.019 mmol, 9% yield) as white solid. [M+H]: 418.3. $^1$H NMR (400 MHz, DMSO-d6) δ 8.67 (s, 1H), 8.00 (d, 1H), 7.21-7.35 (m, 3H), 6.75-6.82 (m, 1H), 6.30-6.36 (m, 1H), 5.05-5.25 (m, 2H), 4.98-5.04 (m, 2H), 4.45-4.59 (m, 2H), 3.74-3.87 (m, 1H), 2.91-3.05 (m, 1H), 2.72-2.81 (m, 1H), 2.50-2.51 (m, 3H). $^1$H NMR (400 MHz, DMSO-d6+$D_2O$) δ 8.66 (s, 1H), 7.81-8.00 (q, 1H), 7.22-7.34 (m, 3H), 6.79-6.81 (t, 1H), 6.30-6.34 (q, 1H), 4.98-5.05 (q, 2H), 4.45-4.59 (m, 2H), 3.74-3.87 (m, 1H), 2.79-2.91 (m, 1H), 2.72 (s, 1H), 2.68 (s, 3H).

Example 55. Synthesis (2R,3R,4S,5S)-2-(4-methylpyrrolo[2,3-d]pyrimidin-7-yl)-5-[(1R)-7-chloro-1,5-dihydro-2,4-benzodioxepin-1-yl]tetrahydrofuran-3,4-diol of (Ex. 55)

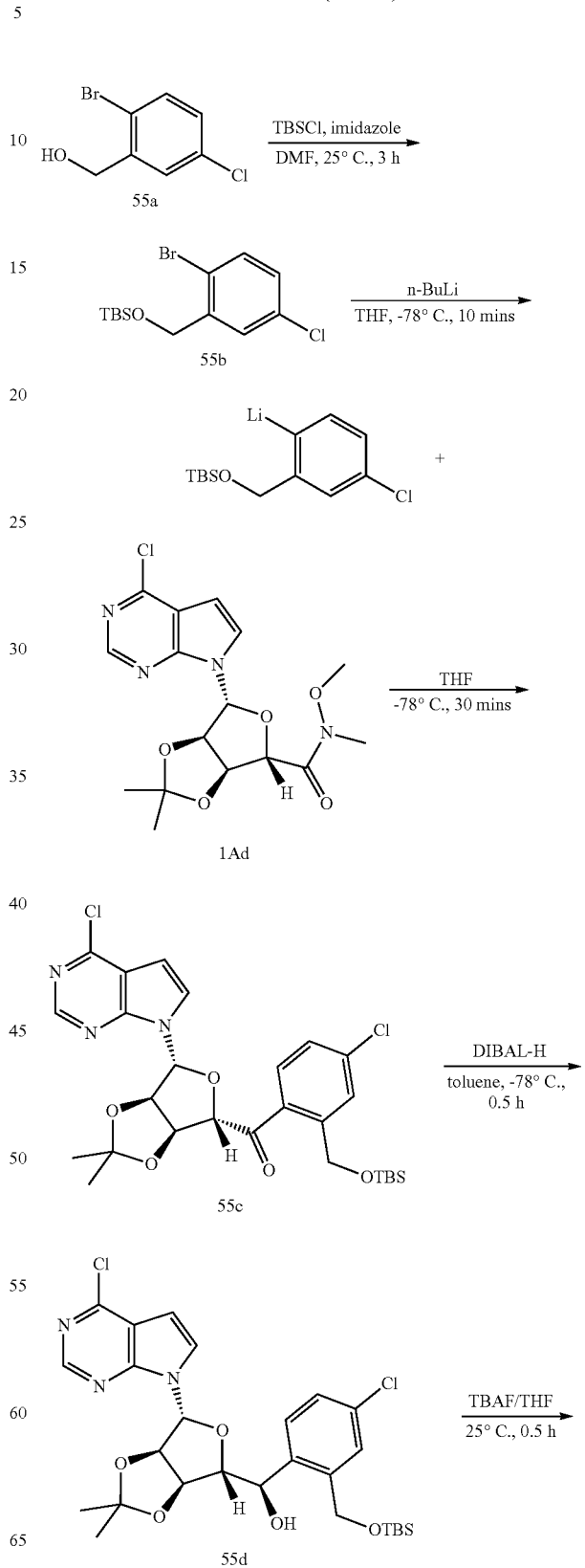

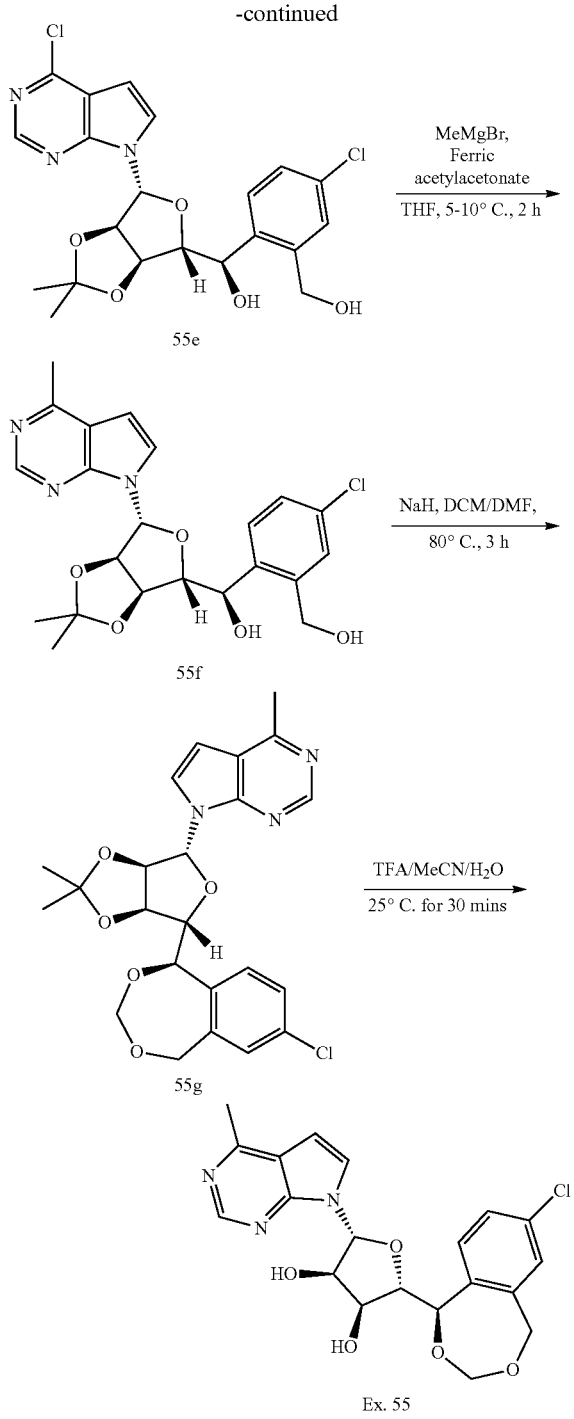

Step 1. Synthesis of (2-bromo-5-chloro-phenyl)methoxy-tert-butyl-dimethyl-silane (55b)

To a solution of (2-bromo-5-chlorophenyl)methanol (55a, 6.0 g, 27.09 mmol) and imidazole (3.69 g, 54.18 mmol) in DCM (50 mL) was slowly added t-butylchlorodiphenylsilane (4.9 g, 32.51 mmol) at rt. The mixture was stirred at 30° C. for 3 h. TLC (petroleum ether, $R_f$=0.4) showed the reaction was complete. The reaction mixture was concentrated in vacuum to give the crude product which was purified by silica gel column chromatography (petroleum ether) to give (2-bromo-5-chloro-phenyl)methoxy-tert-butyl-dimethyl-silane (55b, 9.0 g, 26.81 mmol, 99% yield) as colorless oil. $^1$H NMR (400 MHz, DMSO-d6): δ 7.51 (d, J=8.4, 1H), 7.81 (d, J=2.8, 1H), 7.22-7.19 (m, 1H), 4.57 (s, 1H), 0.83-0.81 (m, 9H), 0.02-0.01 (m, 6H).

Step 2. Synthesis of [2-[[tert-butyl(dimethyl)-silyl]oxymethyl]-4-chloro-phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (55c)

To a solution of (2-bromo-5-chloro-phenyl)methoxy-tert-butyl-dimethyl-silane (55b, 9 g, 26.8 mmol) in dry THF (50 mL) was stirred at −78° C. under Ar. n-BuLi (12.02 mL, 30.04 mmol) was added and stirred at −78° C. for 10 mins. (3aR,4R,6S,6aS)-4-(4-chloropyrrolo-[2,3-d]pyrimidin-7-yl)-N-methoxy-N,2,2-trimethyl-3a,4,6,6a-tetrahydrofuro[3,4-d][1,3]dioxole-6-carboxamide (1Ad, 4.6 g, 12.02 mmol) in anhydrous THF (50 mL) was added, then the reaction mixture was stirred at −78° C. for 30 mins. TLC (petroleum ether:ethyl acetate=5:1) and LCMS showed the reaction was complete. The mixture was adjusted to pH=6 with HCl (1N). The reaction was extracted with EtOAc (2×100 mL) and the organics washed with water (100 mL×2), then brine (50 mL×2). The organic layers were dried over MgSO$_4$, filtered, and concentrated. The crude product was purified by silica gel column chromatography (petroleum ether:ethyl acetate=10:1 to 5:1) to give [2-[[tert-butyl(dimethyl)-silyl]oxymethyl]-4-chloro-phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (55c, 4.03 g, 6.97 mmol, 58% yield). LCMS [M+H]: 578.2. $^1$H NMR (400 MHz, DMSO-d$_6$): δ 8.67 (s, 1H), 7.68 (d, J=3.6, 1H), 7.62 (d, J=8.4, 1H), 7.47-7.46 (m, 2H), 7.35 (d, J=8.0, 1H), 7.26-7.20 (m, 2H), 6.49 (d, J=3.6, 1H), 6.42 (s, 1H), 5.53-5.51 (m, 2H), 5.42 (d, J=5.6, 1H), 5.27-5.25 (m, 1H), 4.54-4.44 (m, 3H), 1.52 (s, 3H), 1.31 (s, 3H), 0.69 (s, 9H), 0.01--0.070 (m, 6H).

Step 3. Synthesis of (R)-[2-[[tert-butyl(dimethyl)silyl]oxymethyl]-4-chloro-phenyl]-[(3aR,6R,6aR)-2,2-dimethyl-4-[(7S)-4-chloropyrrolo[2,3-d]pyrimidin-7-yl]-3a,4,6,6a-tetrahydrofuro[3,4-d][1,3]dioxol-6-yl]methanol (55d)

To a solution of [2-[[tert-butyl(dimethyl)silyl]oxymethyl]-4-chloro-phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (55c, 4.39 g, 7.59 mmol) in toluene (10 mL) was added diisobutylaluminum hydride dropwise (3.23 g, 22.77 mmol, 1M in toluene) at −78° C. The reaction was stirred at −78° C. for 30 mins. The mixture was quenched with NH$_4$Cl (50 mL). The reaction mixture was concentrated in vacuum and extracted with ethyl acetate (2×100 mL). The combined organic layers were dried over MgSO$_4$. The solvent was removed in vacuum to afforded crude (R)-[2-[[tert-butyl(dimethyl)silyl]oxymethyl]-4-chloro-phenyl]-[(3aR,6R,6aR)-2,2-dimethyl-4-[(7S)-4-chloropyrrolo[2,3-d]pyrimidin-7-yl]-3a,4,6,6a-tetrahydrofuro[3,4-d][1,3]dioxol-6-yl]methanol (55d, 4.2 g) which was used without further purification in the next step. LCMS [M+H]: 580.2.

Step 4. Synthesis of (R)-[4-chloro-2-(hydroxymethyl)phenyl]-[(3aR,6R,6aR)-2,2-dimethyl-4-[(7S)-4-chloropyrrolo[2,3-d]pyrimidin-7-yl]-3a,4,6,6a-tetrahydrofuro[3,4-d][1,3]dioxol-6-yl]methanol (55e)

To a solution of (R)-[2-[[tert-butyl(dimethyl)silyl]oxymethyl]-4-chloro-phenyl]-[(3aR,6R,6aR)-2,2-dimethyl-4-

[(7S)-4-chloropyrrolo[2,3-d]pyrimidin-7-yl]-3a,4,6,6a-tetrahydrofuro[3,4-d][1,3]dioxol-6-yl]methanol (55d, 4.2 g, 7.23 mmol) in THF (5 mL) was added TBAF (1M) (3.78 mL, 14.47 mmol). The mixture was stirred at 25° C. for 2 h in $N_2$. The mixture was quenched with $NH_4Cl$ (50 mL). The reaction mixture was concentrated in vacuum and purified by silica gel column chromatography (petroleum ether:ethyl acetate=3:1) to give (R)-[4-chloro-2-(hydroxymethyl)phenyl]-[(3aR,6R,6aR)-2,2-dimethyl-4-[(7S)-4-chloropyrrolo[2,3-d]pyrimidin-7-yl]-3a,4,6,6a-tetrahydrofuro[3,4-d][1,3]dioxol-6-yl]methanol (55e, 1.8 g, 3.78 mmol, 52% yield). $^1$H NMR (400 MHz, DMSO-$d_6$): δ 8.69 (d, J=3.2, 1H), 8.03 (d, J=3.6, 1H), 7.53 (d, J=8, 1H), 7.39-7.29 (m, 2H), 6.79 (d, J=3.6, 1H), 6.32 (d, J=3.6, 1H), 5.96 (d, J=4.4, 1H), 5.27-5.17 (m, 3H), 4.94-4.91 (m, 1H), 4.46-4.41 (m, 1H), 4.26-4.19 (m, 1H), 1.51 (s, 3H), 1.30 (s, 3H). LCMS [M+H]: 466.1.

Step 5. Synthesis of (R)-[4-chloro-2-(hydroxymethyl)phenyl]-[(6R)-2,2-dimethyl-4-(4-methylpyrrolo[2,3-d]pyrimidin-7-yl)-3a,4,6,6a-tetrahydrofuro[3,4-d][1,3]dioxol-6-yl]methanol (55f)

To a solution of ferric acetylacetonate (22.72 mg, 0.06 mmol) and (R)-[4-chloro-2-(hydroxymethyl)phenyl]-[(6R)-4-(4-chloropyrrolo[2,3-d]pyrimidin-7-yl)-2,2-dimethyl-3a,4,6,6a-tetrahydrofuro[3,4-d][1,3]dioxol-6-yl]methanol (55e, 300 mg, 0.64 mmol) in THF (5 mL) was added methylmagnesium bromide (721.9 mg, 6.43 mmol)) at 0° C. under $N_2$. The reaction mixture was warmed to rt and stirred for 1 h. TLC (ethyl acetate: petroleum ether=5:1, $R_f$=0.6) showed the reaction was complete. Sat. $NH_4Cl$ was added dropwise to quench the reaction. The reaction mixture was extracted with ethyl acetate (2×50 mL), dried over $Na_2SO_4$ and concentrated in vacuum. The crude product was purified by silica gel column chromatography (petroleum ether:ethyl acetate=10:1 to 5:1) to give (R)-[4-chloro-2-(hydroxymethyl)phenyl]-[(6R)-2,2-dimethyl-4-(4-methylpyrrolo[2,3-d]pyrimidin-7-yl)-3a,4,6,6a-tetrahydrofuro[3,4-d][1,3]dioxol-6-yl]methanol (55f, 105 mg, 0.23 mmol, 37% yield) as a colorless oil. $^1$H NMR (400 MHz, DMSO-$d_6$): δ 8.74 (s, 1H), 7.82 (d, J=3.6, 1H), 7.53 (d, J=8, 1H), 7.39-7.35 (m, 2H), 6.81 (d, J=3.6, 1H), 6.27 (d, J=4, 1H), 6.00 (d, J=4.4, 1H), 5.25-5.15 (m, 3H), 4.92-4.90 (m, 1H), 4.47-4.41 (m, 1H), 4.24-4.19 (m, 2H), 2.68-2.62 (m, 3H), 1.51 (s, 3H), 1.30 (s, 3H). LCMS [M+H]: 446.1.

Step 6. Synthesis of 4-methyl-7-[(3aR,4R,6R,6aR)-2,2-dimethyl-6-[(1R)-7-chloro-1,5-dihydro-2,4-benzodioxepin-1-yl]-3a,4,6,6a-tetrahydrofuro[3,4-d][1,3]dioxol-4-yl]pyrrolo[2,3-d]pyrimidine (55 g)

To a solution of (R)-[4-chloro-2-(hydroxymethyl)phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methanol (55f, 150 mg, 0.34 mmol) in DCM (1.2 mL) and DMF (2.5 mL) was added sodium hydride (80.74 mg, 3.36 mmol). The mixture solution was stirred at 80° C. for 2 h. LCMS showed the reaction was complete. The reaction mixture was quenched with $NH_4Cl$ (50 mL). The solvent was removed in vacuum to give the crude product which was purified by silica gel column chromatography (DCM:MeOH=50:1) to give 4-methyl-7-[(3aR,4R,6R,6aR)-2,2-dimethyl-6-[(1R)-7-chloro-1,5-dihydro-2,4-benzodioxepin-1-yl]-3a,4,6,6a-tetrahydrofuro[3,4-d][1,3]dioxol-4-yl]pyrrolo[2,3-d]pyrimidine (55 g, 160 mg, 0.33 mmol, 97% yield) as a yellow oil. $^1$H NMR (400 MHz, DMSO-$d_6$): δ 8.73 (s, 1H), 7.71 (d, J=3.6, 1H), 7.38 (d, J=1.6, 1H), 73.31-7.30 (m, 2H), 6.80 (d, J=3.6, 1H), 6.48 (d, J=4, 1H), 5.33-5.31 (m, 1H), 5.20-5.14 (m, 2H), 5.05-5.01 (m, 2H), 4.83-4.78 (m, 3H), 2.68-2.62 (m, 3H), 1.60 (s, 3H), 1.34 (s, 3H). LCMS [M+H]: 458.1.

Step 7. Synthesis of (2R,3R,4S,5S)-2-(4-methylpyrrolo[2,3-d]pyrimidin-7-yl)-5-[(1R)-7-chloro-1,5-dihydro-2,4-benzodioxepin-1-yl]tetrahydrofuran-3,4-diol (Ex. 55)

To a solution of 4-methyl-7-[(3aR,4R,6R,6aR)-2,2-dimethyl-6-[(1R)-7-chloro-1,5-dihydro-2,4-benzodioxepin-1-yl]-3a,4,6,6a-tetrahydrofuro[3,4-d][1,3]dioxol-4-yl]pyrrolo[2,3-d]pyrimidine (55 g, 160 mg, 0.35 mmol) in water (1 mL) was added 2,2,2-trifluoroacetic acid (2.0 mL, 2 mmol) and the mixture was stirred at 25° C. for 30 mins. $NH_3$water was added until pH=7 and the mixture was concentrated in vacuum. The residue was purified by prep-HPLC, eluting with MeCN in water (0.1% $NH_3$-water) from 10% to 90% to give (2R,3R,4S,5S)-2-(4-methylpyrrolo[2,3-d]pyrimidin-7-yl)-5-[(1R)-7-chloro-1,5-dihydro-2,4-benzodioxepin-1-yl]tetrahydrofuran-3,4-diol (Ex. 55, 31 mg, 0.073 mmol, 21% yield) as a white solid. LCMS [M+H]: 418.1. $^1$H NMR (400 MHz, DMSO-$d_6$): δ 8.68 (s, 1H), 7.64 (d, J=4, 1H), 7.41 (s, 1H), 7.32 (d, J=1.2, 2H), 6.78 (d, J=3.6, 1H), 6.32 (d, J=8.0, 1H), 5.51 (d, J=4.4, 1H), 5.41 (d, J=7.2, 1H), 5.34-5.31 (m, 1H), 5.09 (d, J=4.8, 1H), 5.04 (d, J=6.4, 1H), 4.99-4.95 (m, 1H), 4.85-4.81 (m, 1H), 4.62-4.56 (m, 2H), 4.19-4.17 (m, 1H), 2.66 (s, 3H).

Example 69. Synthesis of (2S,3S,4R,5R)-2-((R)-6-chloroisochroman-1-yl)-5-(4-(methylamino)-7H-pyrrolo[2,3-d]pyrimidin-7-yl)tetrahydrofuran-3,4-diol (Ex. 69)

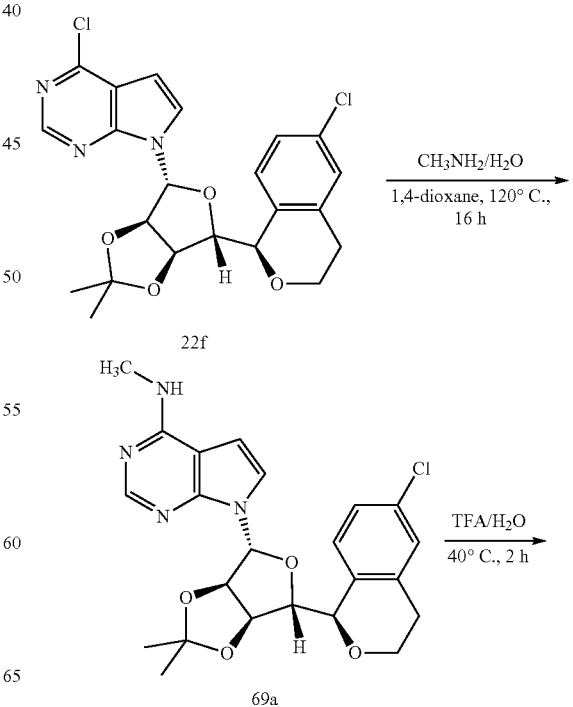

-continued

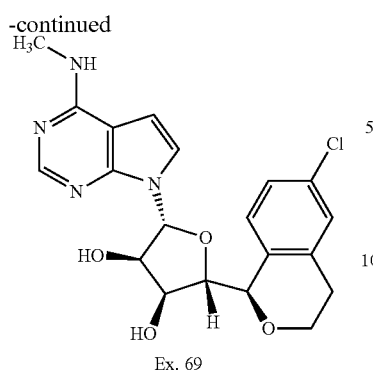

Ex. 69

Step 1. Synthesis of N-methyl-7-[(3aR,4R,6R,6aR)-2,2-dimethyl-6-[(1R)-6-chloroisochroman-1-yl]-3a,4,6,6a-tetrahydrofuro[3,4-d][1,3]dioxol-4-yl]pyrrolo[2,3-d]pyrimidin-4-amine (69a)

To a solution of 22f (100 mg, 0.22 mmol) in 1,4-dioxane (2 mL), methylamine in water (2.0 mL, 0.09 mmol) was added. The mixture was stirred at 120° C. for 16 h. The mixture was purified by prep-HPLC eluting with $CH_3CN/H_2O$ (neutral) from 5/95 to 95/5. The product fractions were lyophilized to give 69a (75 mg, 0.16 mmol, 75% yield) as a yellow solid. LCMS [M+H]: 457.1.

Step 2. Synthesis of (2S,3S,4R,5R)-2-((R)-6-chloroisochroman-1-yl)-5-(4-(methylamino)-7H-pyrrolo[2,3-d]pyrimidin-7-yl)tetrahydrofuran-3,4-diol (Ex. 69)

To a solution of 69a (75 mg, 0.16 mmol) in MeCN (1 mL), $TFA/H_2O$ (0.97 mL, 0.39 mmol) was added. The mixture was stirred at 40° C. for 2 h. The mixture was purified by prep-HPLC eluting with $CH_3CN/H_2O$ (0.1% $NH_4OH$) from 5/95 to 95/5 and lyophilized to give Ex. 69 (36.5 mg, 0.087 mmol, 53% yield) as a white solid. LCMS [M+H]: 417.3. 1H NMR (400 M Hz, DMSO-d6): δ 8.15 (s, 1H), 7.48-7.49 (m, 1H), 7.36-7.37 (m, 1H), 7.28-7.30 (m, 2H), 7.21-7.23 (m, 1H), 6.63 (d, J=3.2 Hz, 1H), 6.18 (d, J=7.6 Hz, 1H), 5.16 (d, J=7.6 Hz, 1H), 5.04 (d, J=4.0 Hz, 1H), 4.86-4.87 (m, 1H), 4.42-4.48 (m, 1H), 4.35-4.36 (m, 1H), 4.20-4.24 (m, 1H), 3.83-3.86 (m, 1H), 3.65-3.71 (m, 1H), 2.96 (d, J=7.6 Hz, 3H), 2.89-2.94 (m, 1H), 2.69-2.74 (m, 1H).

Example 76. Synthesis of (Ex. 76)

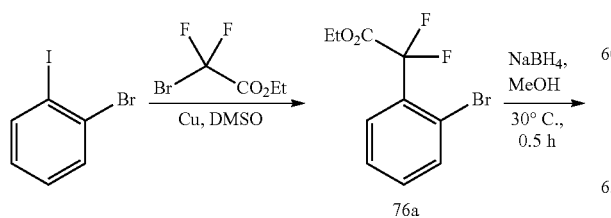

76a

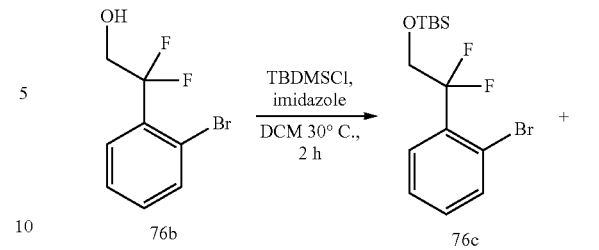

76b → 76c

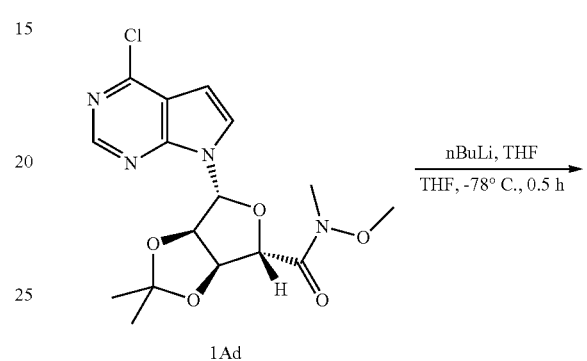

1Ad

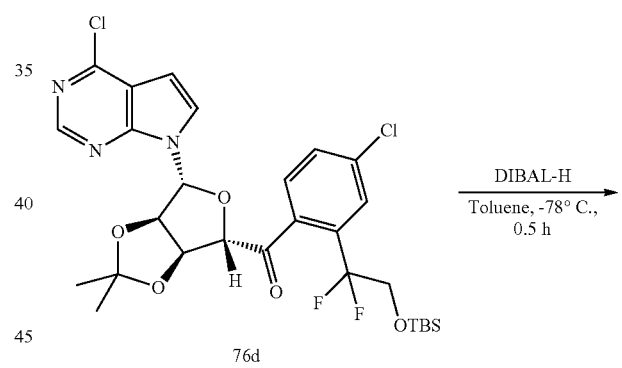

76d

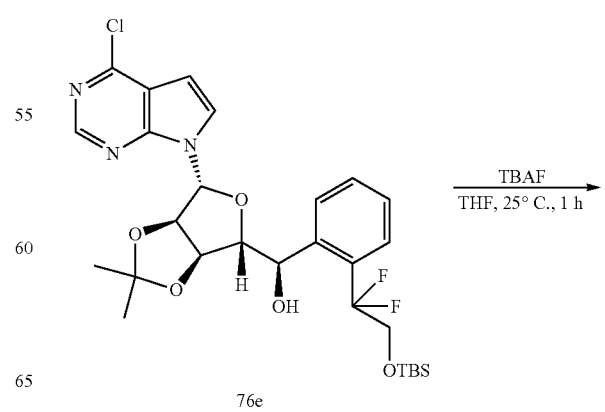

76e

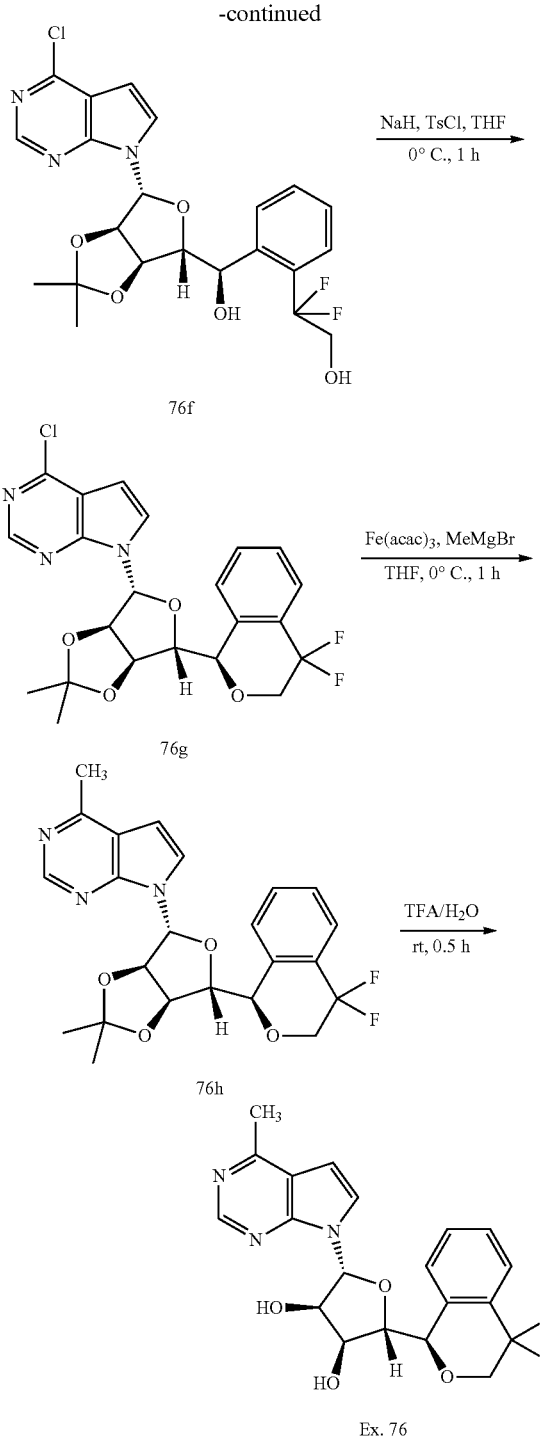

Step 1. Synthesis of ethyl 2-(2-bromophenyl)-2,2-difluoro-acetate (76a)

To a solution of copper (898.6 mg, 14.14 mmol) in DMSO (10 mL) was added ethyl 2-bromo-2,2-difluoro-acetate (5739.98 mg, 28.28 mmol) and the mixture was stirred at rt under nitrogen. 1-bromo-2-iodo-benzene (2000 mg, 7.07 mmol) was added to the mixture 1 h later. After 16 h, added aqueous NH₄Cl (50 mL) to the mixture and extracted with EA (50.0 mL×3). The organic phases were combined, washed with water (100 mL) and brine (100 mL), dried over Na₂SO₄, filtered and concentrated under vacuum. The residue was purified by flash column (PE:EA=40:1) to give 76a (750 mg, 2.66 mmol, 38% yield). 1H NMR (400 M Hz, CDCl₃): δ 7.75-7.73 (m, 1H), 7.65-7.62 (m, 1H), 7.46-7.42 (m, 1H), 7.38-7.34 (m, 1H), 4.36 (q, J=7.2 Hz, 2H), 1.32 (t, J=7.2 Hz, 3H).

Step 2. Synthesis of 2-(2-bromophenyl)-2,2-difluoro-ethanol (76b)

To a solution of 76a (5.8 g, 20.78 mmol) in methanol (50 mL) was added NaBH₄ (1.57 g, 41.57 mmol) at 0° C., and the reaction mixture was stirred at rt for 30 mins. TLC (PE:EA=10:1, Rf=0.1) showed the reaction was complete. The reaction was concentrated and HCl (1 M) was added. The mixture was extracted with EA (30.0 mL×3). The organic phases were combined, washed with water (50 mL) and brine (50 mL), dried over Na₂SO₄, filtered and concentrated. The residue was purified by flash column (PE:EA=10:1) to give 76b (5.1 g, 19.36 mmol, 93% yield) as an oil. 1H NMR (400 M Hz, CDCl₃): δ 7.67-7.633 (m, 2H), 7.40 (t, J=7.6 Hz, 1H), 7.33-7.26 (m, 1H), 4.21 (t, J=13.8 Hz, 2H).

Step 3. Synthesis of [2-(2-bromophenyl)-2,2-difluoro-ethoxy]-tert-butyl-dimethyl-silane (76c)

To a solution of 76b (5.1 g, 21.52 mmol) and imidazole (2.93 g, 43.03 mmol) in DCM (20 mL) was slowly added t-butylchlorodiphenylsilane (4.86 g, 32.27 mmol), and the reaction mixture was stirred for 2 h at rt. TLC (PE, Rf=0.7) showed a new spot and the SM was consumed. The solvent was removed in vacuo and the crude product was purified by column chromatography on silica gel (PE) to give 76c (6.2 g, 15.88 mmol, 74% yield) as white-off oil. 1H NMR (400 M Hz, CDCl₃): δ 7.67-7.633 (m, 2H), 7.39 (t, J=7.6 Hz, 1H), 7.32-7.29 (m, 1H), 4.23 (t, J=13.0 Hz, 2H), 0.82 (s, 9H), 0.0 (s, 6H).

Step 4. Synthesis of [2-[2-[tert-butyl(dimethyl)silyl]oxy-1,1-difluoro-ethyl]phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (76d)

To a solution of 76b (1.03 g, 2.95 mmol) in dry THF (10 mL) was added n-BuLi (1.5 mL, 2.4 mmol) at −78° C., and the mixture was stirred for 10 min under nitrogen. 1Ad (720 mg, 1.84 mmol) in dry THF (5 mL) was added and the mixture was stirred for 30 min at −78° C. TLC (PE:EA=10:1, starting material Rf=0.3, product Rf=0.4) showed the reaction was complete. The reaction was poured into dilute HCl (0.05 M), keeping the pH<8 during the process of quenching. The mixture was extracted with EA (200 mL×2), the combined organic layers were dried, concentrated and purified by silica gel column (PE:EA=100 to 10:1) to give 76d (610 mg, 1.02 mmol, 55% yield) as yellow oil. LCMS [M+H]: 594.3.

Step 5. Synthesis of (R)-[2-[2-[tert-butyl(dimethyl)silyl]oxy-1,1-difluoro-ethyl]phenyl]-[(3aR,6R,6aR)-2,2-dimethyl-4-[(7S)-4-chloropyrrolo[2,3-d]pyrimidin-7-yl]-3a,4,6,6a-tetrahydrofuro[3,4-d][1,3]dioxol-6-yl]methanol (76e)

To a solution of 76d (610 mg, 1.03 mmol) in toluene (20 mL) was added diisobutylaluminium hydride (2.05 mL, 3.08 mmol) at −78° C. under nitrogen and the reaction mixture was stirred for 30 min at −78° C. The reaction mixture was diluted with saturated NH₄Cl (aq) and the mixture was extracted with EA and washed with brine. The organic layer was dried with anhydrous Na₂SO₄ and the solvent was removed in vacuo to give 76e (600 mg, 0.93622 mmol, 91% yield) as a crude product which was used without further purification.

Step 6. Synthesis of 2,2-difluoro-2-[2-[(R)-hydroxy-[(3aR,4R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methyl]phenyl]ethanol (76f)

To a solution of 76e (270 mg, 0.45 mmol) in THF (0.03 mL) was added TBAF (0.24 mL, 0.91 mmol) and the reaction mixture was stirred at rt for 1 h. The reaction mixture was diluted with saturated NH₄Cl solution (100 mL), the mixture was extracted with EA (50 mL×3), and the combined organics were washed with saturated NaCl (100 mL). The organics were dried with anhydrous Na₂SO₄ and the solvent was removed in vacuo. The residue was purified by silica gel chromatorgraphy (PE:EA=50:1 to 10:1) to give 76f (120 mg, 0.2291 mmol, 51% yield) as a solid. LCMS [M+H]: 482.3.

Step 7. Synthesis of 4-chloro-7-[(3aR,4R,6aR)-2,2-dimethyl-6-[(1R)-4,4-difluoroisochroman-1-yl]-3a,4,6,6a-tetrahydrofuro[3,4-d][1,3]dioxol-4-yl]pyrrolo[2,3-d]pyrimidine (76 g)

To a solution of 76f (100 mg, 0.21 mmol) in THF (4 mL) was added NaH (33.2 mg, 0.83 mmol) and stirred for 10 min. TSCl (39.56 mg, 0.21 mmol) was added and the reaction was stirred for 1 h. The reaction mixture was poured into saturated NH₄Cl solution, extracted with EA the organics were washed with saturated NaCl. The organic phase was dried over anhydrous Na₂SO₄ and the solvent was concentrated under reduced pressure to give a crude product which was purified by prep-TLC (PE:EA=5:1, Rf=0.3) to give 76 g (50 mg, 0.10 mmol, 48% yield) as a white solid. LCMS [M+H]: 464.2.

Step 8. Synthesis of 4-methyl-7-[(3aR,4R,6R,6aR)-2,2-dimethyl-6-[(1R)-4,4-difluoroisochroman-1-yl]-3a,4,6,6a-tetrahydrofuro[3,4-d][1,3]dioxol-4-yl]pyrrolo[2,3-d]pyrimidine (76h)

To a solution of 76 g (50 mg, 0.11 mmol) and ferric acetylacetonate (3.81 mg, 0.01 mmol) in THF (6 mL) was added methylmagnesium bromide, 3.2 M in MeTHF (0.36 mL, 1.08 mmol) at 0° C. under nitrogen. The reaction was stirred at rt for 1 hour. The mixture was poured into aqueous NH₄Cl (30 mL) and extracted with EA (30.0 mL×3). The organic phases were combined, dried over Na₂SO₄, filtered and concentrated under vacuum. The residue was purified by flash column (PE:EA=8:1-PE:EA=3:1) to give 76h (45 mg, 0.10148 mmol, 94% yield). LCMS [M+H]: 444.3.

Step 9. Synthesis of (2R,3R,4S,5S)-2-(4-methylpyrrolo[2,3-d]pyrimidin-7-yl)-5-[(1R)-4,4-difluoroisochroman-1-yl]tetrahydrofuran-3,4-diol (Ex. 76)

To a solution of 76h (45 mg, 0.10 mmol) in water (1 mL) was added TFA (0.5 mL, 6.49 mmol) and the mixture was stirred at rt for 30 mins. The residue was purified by pre-HPLC, eluted with CH₃CN in H₂O (0.1% NH₄OH) from 5.0% to 95.0% to give Ex. 76 (8.58 mg, 0.021 mmol, 20.5% yield) as a white solid. LCMS [M+H]: 404.3. 1H NMR (400 MHz, DMSO-d6) δ 8.68 (s, 1H), 7.75-7.72 (m, 2H), 7.57-7.48 (m, 3H), 6.81 (d, J=3.6 Hz, 1H), 6.34 (d, J=8 Hz, 1H), 5.35 (d, J=6.8 Hz, 1H), 5.20 (d, J=4 Hz, 1H), 5.09 (m, 1H), 4.61 (d, J=3.2 Hz, 1H), 4.56-4.46 (m, 2H), 4.16-4.07 (m, 1H), 3.82 (t, J=4.4 Hz, 1H), 2.68 (s, 3H). 1H NMR (400 MHz, DMSO-d6+D2O) δ 8.66 (s, 1H), 7.74-7.71 (m, 2H), 7.55-7.46 (m, 3H), 6.81 (d, J=3.6 Hz, 1H), 6.32 (d, J=8 Hz, 1H), 5.08 (m, 1H), 4.60 (d, J=3.2 Hz, 1H), 4.55-4.46 (m, 2H), 4.14-4.04 (m, 1H), 3.80 (d, J=5.2 Hz, 1H), 2.66 (s, 3H).

Example 81. Synthesis of (2R,3R,4S,5S)-2-(4-aminopyrrolo[2,3-d]pyrimidin-7-yl)-5-[(1R)-7-chloro-1,5-dihydro-2,4-benzodioxepin-1-yl]tetrahydrofuran-3,4-diol (Ex. 81)

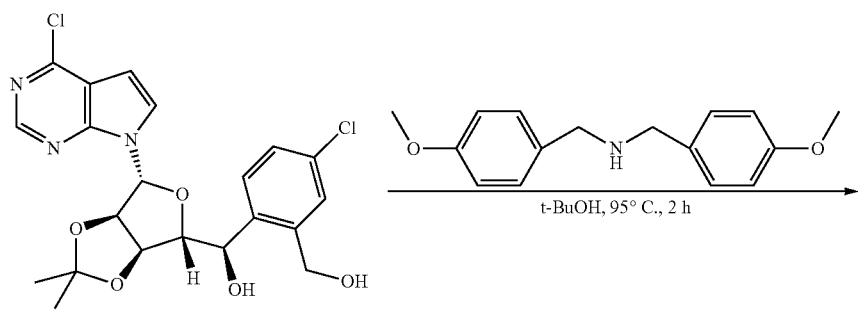

55e

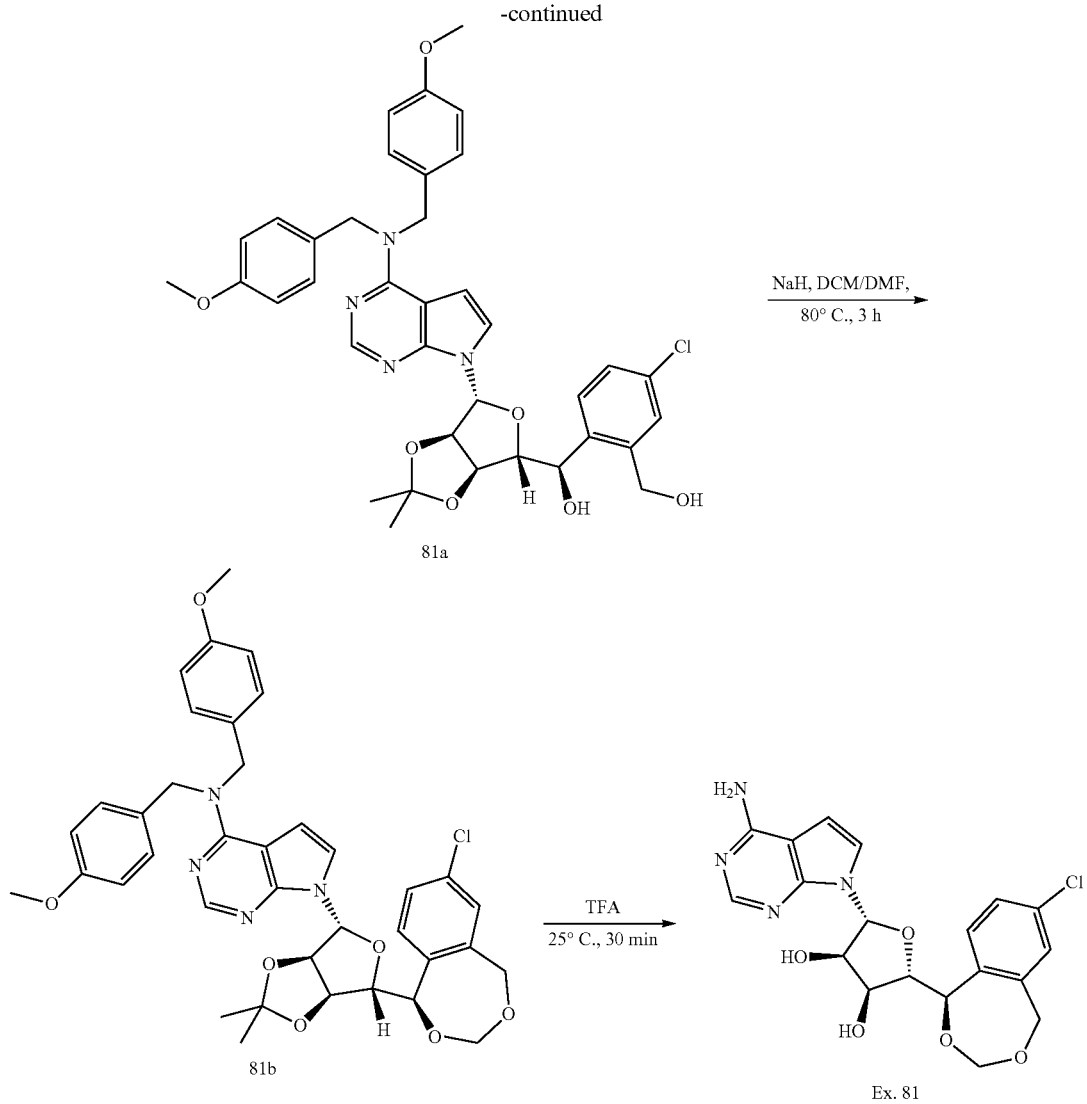

Step 1. Synthesis of (R)-[4-chloro-2-(hydroxymethyl)phenyl]-[(3aR,4R,6R,6aR)-4-[4-[bis[(4-methoxyphenyl)methyl]amino]pyrrolo[2,3-d]pyrimidin-7-yl]-2,2-dimethyl-3a,4,6,6a-tetrahydrofuro[3,4-d][1,3]dioxol-6-yl]methanol (81a)

A mixture of K₂CO₃ (292.98 mg, 2.12 mmol), (R)-[4-chloro-2-(hydroxymethyl)phenyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (55e, 300 mg, 0.64 mmol) and bis-(4-methoxybenzyl)amine (331 mg, 1.29 mmol) in tert-butanol (5 mL) was stirred at 95° C. for 2 h under N₂. LCMS showed the reaction was complete. The reaction was concentrated in vacuum to dryness and the residue was extracted with EtOAc (2×50 mL) and the organic layers were washed with water (2×10 mL), then brine (2×10 mL). The organics layers were dried with MgSO₄, filtered, and concentrated in vacuum. The crude product was purified by silica gel column chromatography (ethyl acetate: petroleum ether=1:1) to give (R)-[4-chloro-2-(hydroxymethyl)phenyl]-[(3aR,4R,6R,6aR)-4-[4-[bis[(4-methoxyphenyl)methyl]amino]pyrrolo[2,3-d]pyrimidin-7-yl]-2,2-dimethyl-3a,4,6,6a-tetrahydrofuro[3,4-d][1,3]dioxol-6-yl]methanol (81a, 80 mg, 0.10 mmol, 16% yield) as a white solid. LCMS [M+H]: 687.2.

Step 2. Synthesis of N,N-bis[(4-methoxyphenyl)methyl]-7-[(3aR,4R,6R,6aR)-2,2-dimethyl-6-[(1R)-7-chloro-1,5-dihydro-2,4-benzodioxepin-1-yl]-3a,4,6,6a-tetrahydrofuro[3,4-d][1,3]dioxol-4-yl]pyrrolo[2,3-d]pyrimidin-4-amine (81b)

To a solution of (R)-[4-chloro-2-(hydroxymethyl)phenyl]-[(3aR,4R,6R,6aR)-4-[4-[bis[(4-methoxyphenyl)methyl]amino]pyrrolo[2,3-d]pyrimidin-7-yl]-2,2-dimethyl-3a,4,6,6a-tetrahydrofuro[3,4-d][1,3]dioxol-6-yl]methanol (81a, 80 mg, 0.12 mmol) in DCM (1.2 mL) and DMF (2.5 mL) was added sodium hydride (28 mg, 1.16 mmol). The mixture was stirred at 80° C. for 2 h. The reaction mixture was quenched with NH₄Cl (50 mL). The solvent was removed in vacuum to give N,N-bis[(4-methoxyphenyl)methyl]-7-[(3aR,4R,6R,6aR)-2,2-dimethyl-6-[(1R)-7-chloro-1,5-dihydro-2,4-benzodioxepin-1-yl]-3a,4,6,6a-tetrahydrofuro[3,4-d][1,3]dioxol-4-yl]pyrrolo[2,3-d]

pyrimidin-4-amine (81b, 90 mg, 0.10 mmol, 87% yield) as yellow oil. LCMS [M+H]: 699.3.

Step 3. Synthesis of (2R,3R,4S,5S)-2-(4-aminopyrrolo[2,3-d]pyrimidin-7-yl)-5-[(1R)-7-chloro-1,5-dihydro-2,4-benzodioxepin-1-yl]tetrahydrofuran-3,4-diol (Ex. 81)

To a solution of N,N-bis[(4-methoxyphenyl)methyl]-7-[(3aR,4R,6R,6aR)-2,2-dimethyl-6-[(1R)-7-chloro-1,5-dihydro-2,4-benzodioxepin-1-yl]-3a,4,6,6a-tetrahydrofuro[3,4-d][1,3]dioxol-4-yl]pyrrolo[2,3-d]pyrimidin-4-amine (81b, 90 mg, 0.13 mmol) in water (1 mL) was added 2,2,2-trifluoroacetic acid (0.74 mL, 0.74 mmol). The reaction mixture was stirred at 25° C. for 30 mins. NH₃-water was added until pH=7 and the mixture was concentrated in vacuum. The residue was purified by prep-HPLC, eluting with MeCN in water (0.1% NH₃-water) from 10% to 90% to give crude product. The crude product was further purified by prep-HPLC, eluted with MeCN in water (0.1% TFA) from 10% to 90% to give (2R,3R,4S,5S)-2-(4-aminopyrrolo[2,3-d]pyrimidin-7-yl)-5-[(1R)-7-chloro-1,5-dihydro-2,4-benzodioxepin-1-yl]tetrahydrofuran-3,4-diol (Ex. 81, 2.7 mg, 0.0063 mmol, 5% yield) as a white solid. LCMS [M+H]: 419.1. ¹H NMR (400 MHz, DMSO-d₆+D₂O) δ: 8.33 (s, 1H), 7.51 (d, J=3.6, 1H), 7.45 (s, 1H), 7.42 (d, J=1.6, 2H), 6.94 (d, J=3.2, 1H), 6.32 (d, J=8.0, 1H), 5.33 (d, J=6, 1H), 5.07-5.03 (m, 2H), 4.97 (d, J=1.2, 1H), 4.83 (d, J=14.4, 1H), 4.61 (d, J=4.8, 1H), 4.54-4.51 (m, 1H), 4.17 (d, J=4.8, 1H).

Example 82. Synthesis of (1R)-6-chloro-1-[(2S,3S,4R,5R)-5-(4-aminopyrrolo[2,3-d]pyrimidin-7-yl)-3,4-dihydroxy-tetrahydrofuran-2-yl]isochroman-3-one; 2,2,2-trifluoroacetic acid (Ex. 82)

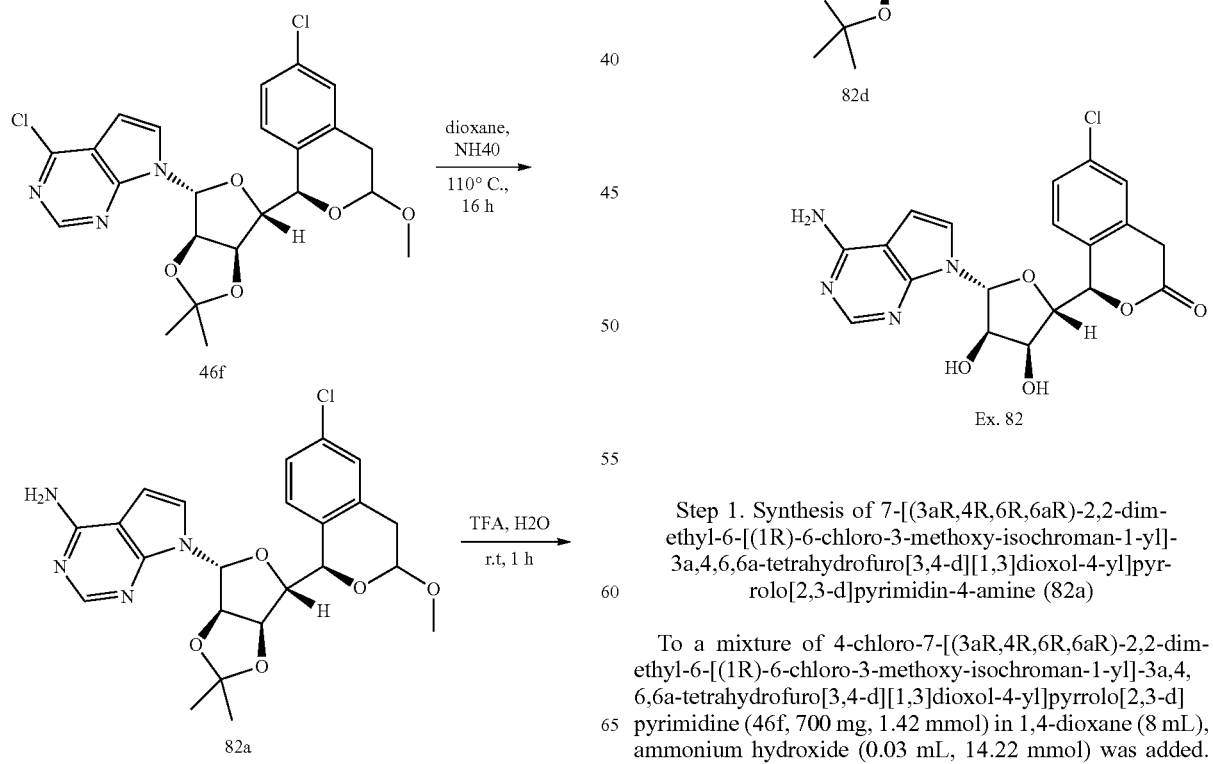

Step 1. Synthesis of 7-[(3aR,4R,6R,6aR)-2,2-dimethyl-6-[(1R)-6-chloro-3-methoxy-isochroman-1-yl]-3a,4,6,6a-tetrahydrofuro[3,4-d][1,3]dioxol-4-yl]pyrrolo[2,3-d]pyrimidin-4-amine (82a)

To a mixture of 4-chloro-7-[(3aR,4R,6R,6aR)-2,2-dimethyl-6-[(1R)-6-chloro-3-methoxy-isochroman-1-yl]-3a,4,6,6a-tetrahydrofuro[3,4-d][1,3]dioxol-4-yl]pyrrolo[2,3-d]pyrimidine (46f, 700 mg, 1.42 mmol) in 1,4-dioxane (8 mL), ammonium hydroxide (0.03 mL, 14.22 mmol) was added. The mixture was stirred at 120° C. overnight. TLC (petroleum ether:ethyl acetate=5:1, $R_f$=0.5) and LCMS showed the reaction was complete. The reaction mixture was poured into water (30 mL) and extracted with DCM (50 mL×3). The organic layers were washed with saturated NaCl (100 mL), dried over $Na_2SO_4$, filtered, concentrated in vacuum to give the crude product which was purified by column chromatography on silica gel with petroleum ether:ethyl acetate=7:1 to give 7-[(3aR,4R,6R,6aR)-2,2-dimethyl-6-[(1R)-6-chloro-3-methoxy-isochroman-1-yl]-3a,4,6,6a-tetrahydrofuro[3,4-d][1,3]dioxol-4-yl]pyrrolo[2,3-d]pyrimidin-4-amine (82a, 460 mg, 0.97 mmol, 68% yield) as a yellow solid. LCMS [M+H]: 458.1.

Step 2. Synthesis of (2R,3R,4S,5S)-2-(4-aminopyrrolo[2,3-d]pyrimidin-7-yl)-5-[(1R)-6-chloro-3-hydroxy-isochroman-1-yl]tetrahydrofuran-3,4-diol (82b)

To a mixture of 7-[(3aR,4R,6R,6aR)-2,2-dimethyl-6-[(1R)-6-chloro-3-methoxy-isochroman-1-yl]-3a,4,6,6a-tetrahydrofuro[3,4-d][1,3]dioxol-4-yl]pyrrolo[2,3-d]pyrimidin-4-amine (82a, 460 mg, 0.97 mmol) in water (5 mL) was added trifluoroacetic acid (177 mg, 1.56 mmol). The reaction mixture was stirred at 25° C. for 1 h. TLC (petroleum ether:ethyl acetate=3:1, $R_f$=0.3) and LCMS showed the reaction was complete. The reaction was neutralized with $NaHCO_3$ and purified by column chromatography on silica gel with petroleum ether:ethyl acetate=7:1 to give the crude product which was further purified by prep-HPLC, eluted with $CH_3CN$ in water (0.1% $NH_3$/water) from 10% to 95%) to give (2R,3R,4S,5S)-2-(4-aminopyrrolo[2,3-d]pyrimidin-7-yl)-5-[(1R)-6-chloro-3-hydroxy-isochroman-1-yl]tetrahydrofuran-3,4-diol (82b, 50 mg, 0.11 mmol, 12% yield) as an off-white solid. LCMS [M+H]: 419.1.

Step 3. Synthesis of (1R)-6-chloro-1-[(3aR,4R,6R,6aR)-4-(4-aminopyrrolo[2,3-d]pyrimidin-7-yl)-2,2-dimethyl-3a,4,6,6a-tetrahydrofuro[3,4-d][1,3]dioxol-6-yl]isochroman-3-ol (82c)

To a mixture of (2R,3R,4S,5S)-2-(4-aminopyrrolo[2,3-d]pyrimidin-7-yl)-5-[(1R)-6-chloro-3-hydroxy-isochroman-1-yl]tetrahydrofuran-3,4-diol (82b, 230.5 mg, 0.55 mmol) in acetone (10 mL), TsOH (38 mg, 0.22 mmol) was added at 0° C. The reaction mixture was stirred at 25° C. for 3 h. TLC (petroleum ether:ethyl acetate=5:1, $R_f$=0.3) and LCMS showed the reaction was complete. The reaction mixture was poured into water (10 mL) and extracted with DCM (10 mL×3). The organic layers were washed with saturated NaCl (100 mL), dried over $Na_2SO_4$, filtered, and concentrated in vacuum. The crude product was purified by column chromatography on silica gel with petroleum ether:ethyl acetate=7:1) to give (1R)-6-chloro-1-[(3aR,4R,6R,6aR)-4-(4-aminopyrrolo[2,3-d]pyrimidin-7-yl)-2,2-dimethyl-3a,4,6,6a-tetrahydrofuro[3,4-d][1,3]dioxol-6-yl]isochroman-3-ol (82c, 180 mg, 0.32 mmol, 58% yield) as a white solid. LCMS [M+H]: 458.1.

Step 4. Synthesis of 6-chloro-1-[(3aR,4R,6R,6aR)-4-(4-aminopyrrolo-[2,3-d]pyrimidin-7-yl)-2,2-dimethyl-3a,4,6,6a-tetrahydrofuro[3,4-d][1,3]dioxol-6-yl]isochroman-3-one (82d)

To a mixture of 6-chloro-1-[(3aR,4R,6R,6aR)-4-(4-aminopyrrolo[2,3-d]pyrimidin-7-yl)-2,2-dimethyl-3a,4,6,6a-tetrahydrofuro[3,4-d][1,3]dioxol-6-yl]isochroman-3-ol (82c, 44 mg, 0.10 mmol) in DCM (10 mL) was added PCC (0.05 mL, 0.29 mmol) at 0° C. The mixture was stirred at 0° C. for 30 min, then warmed to 25° C. until the reaction was complete. The reaction mixture was poured into water (10 mL) and extracted with DCM (2×10 mL). The organics were concentrated in vacuum to give 6-chloro-1-[(3aR,4R,6R,6aR)-4-(4-aminopyrrolo-[2,3-d]pyrimidin-7-yl)-2,2-dimethyl-3a,4,6,6a-tetrahydrofuro[3,4-d][1,3]dioxol-6-yl]isochroman-3-one (82d, 35 mg, 0.076 mmol, 79.5% yield) as a white solid. The crude product was used without further purification in the next step. LCMS [M+H]: 457.1.

Step 5. Synthesis of (1R)-6-chloro-1-[(2S,3S,4R,5R)-5-(4-aminopyrrolo[2,3-d]pyrimidin-7-yl)-3,4-dihydroxy-tetrahydrofuran-2-yl]isochroman-3-one; 2,2,2-trifluoroacetic acid (Ex. 82)

To a mixture of (1R)-6-chloro-1-[(3aR,4R,6R,6aR)-4-(4-aminopyrrolo-[2,3-d]pyrimidin-7-yl)-2,2-dimethyl-3a,4,6,6a-tetrahydrofuro[3,4-d][1,3]dioxol-6-yl]isochroman-3-one (82d, 35 mg, 0.08 mmol) in water (2 mL) was added trifluoroacetic acid (14 mg, 0.12 mmol) and the mixture was stirred at 25° C. for 1 h. TLC (petroleum ether:ethyl acetate=3:1, $R_f$=0.3) and LCMS showed the reaction was complete. The reaction was neutralized with $NaHCO_3$ and extracted with DCM (3×3 mL), the organics were washed with saturated NaCl (20 mL), dried over $Na_2SO_4$, filtered, concentrated in vacuum. The crude product was purified by column chromatography on silica gel with petroleum ether:ethyl acetate=7:1 and further purified by prep-HPLC, eluted with $CH_3CN$ in water (0.1% TFA) from 10% to 95% to give (1R)-6-chloro-1-[(2S,3S,4R,5R)-5-(4-aminopyrrolo[2,3-d]pyrimidin-7-yl)-3,4-dihydroxy-tetrahydrofuran-2-yl]isochroman-3-one; 2,2,2-trifluoroacetic acid (Ex. 82, 3 mg, 0.0052 mmol, 7% yield) as a white solid. LCMS [M+H]: 417.1. $^1$H NMR (400 MHz, DMSO-$d_6$) δ: 8.50-8.64 (m, 2H), 8.30 (s, 1H), 7.30-7.44 (m, 4H), 6.91 (s, 1H), 6.10 (s, 1H), 5.83 (s, 1H), 5.55-5.67 (m, 2H), 4.37-4.41 (m, 3H), 3.74 (m, 2H). $^1$H NMR (400 MHz, DMSO-$d_6$+$D_2O$) δ8.30 (s, 1H), 7.31-7.42 (m, 4H), 6.93 (s, 1H), 6.10 (d, J=4 Hz, 1H), 5.83 (s, 1H), 4.38-4.43 (m, 3H), 3.74 (m, 2H).

Example 83. Synthesis of (2R,3R,4S,5S)-2-(4-methylpyrrolo[2,3-d]pyrimidin-7-yl)-5-[(1R)-6-chloro-5-fluoro-isochroman-1-yl]tetrahydrofuran-3,4-diol (Ex. 83)

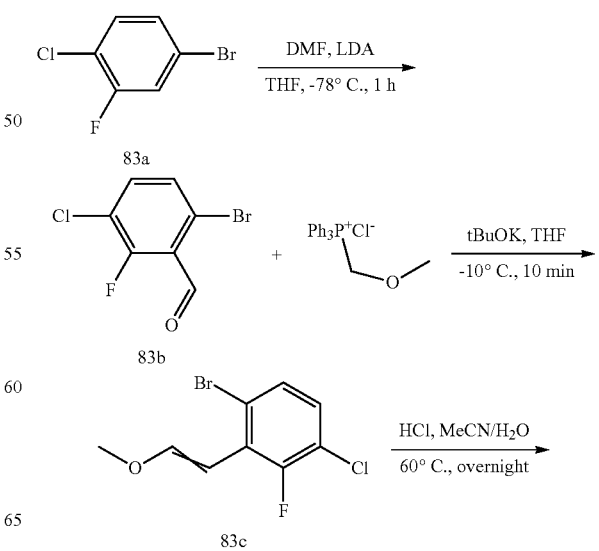

-continued
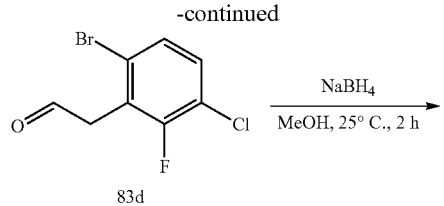
83d
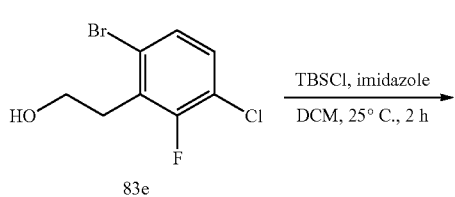
83e
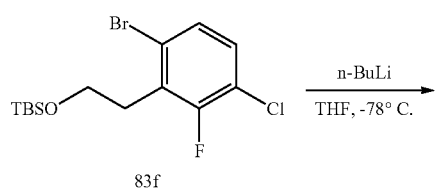
83f
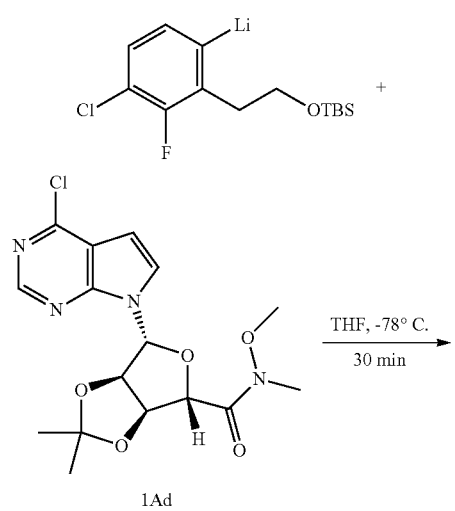
1Ad
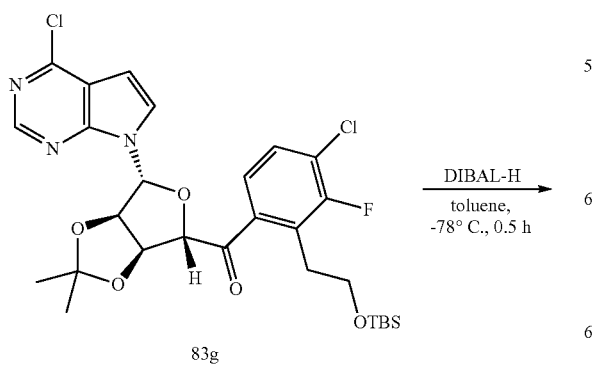
83g
-continued
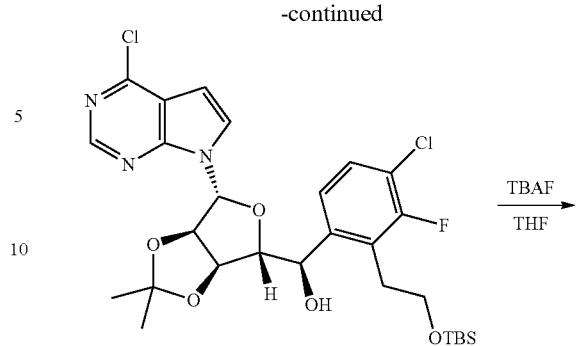
83h
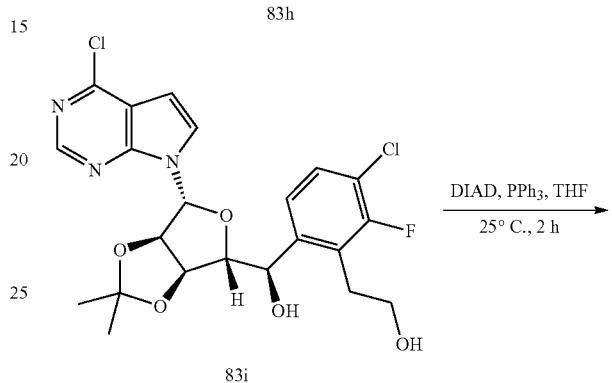
83i
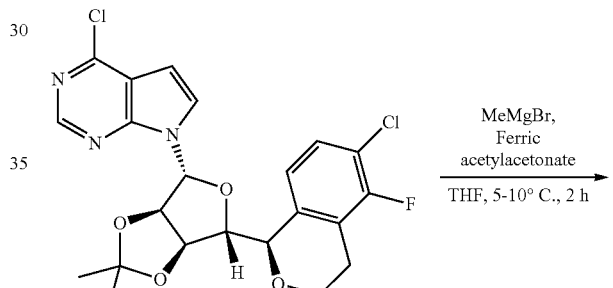
83j
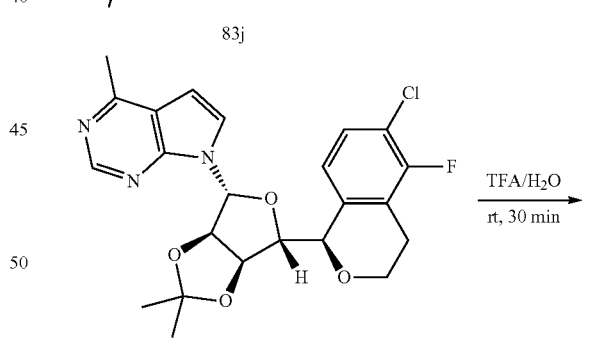
83k
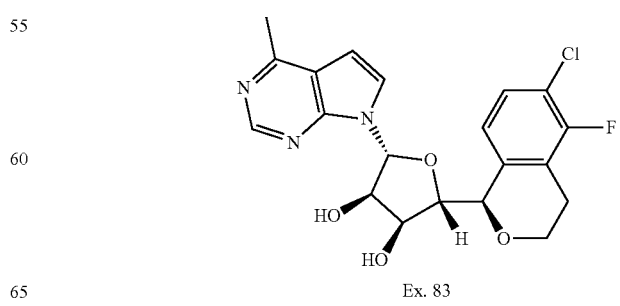
Ex. 83

Step 1. Synthesis of 6-bromo-3-chloro-2-fluorobenzaldehyde (83b)

To a solution of 4-bromo-1-chloro-2-fluoro-benzene (83a, 10 g, 47.75 mmol) in THF (60 mL) was added LDA (30 mL, 57.3 mmol) at −78° C. The reaction mixture was stirred at −78° C. for 1 h, then DMF (7.4 mL, 95.5 mmol) was added to the mixture and the reaction was stirred at −78° C. for 1 h. The reaction was quenched with $NH_4Cl$ (aq, 100 mL) and water (100 mL). The aqueous layer was extracted with ethyl acetate (3×300 mL). The organic layers were concentrated in vacuum to give the crude product which was purified by silica gel column chromatography, eluted with petroleum ether:ethyl acetate=10:1 to give 6-bromo-3-chloro-2-fluorobenzaldehyde (83b, 6.1 g, 25.69 mmol, 54% yield) as a yellow oil. $^1H$ NMR (400 MHz, $CDCl_3$) 10.39 (s, 1H), 7.86 (s, 1H), 7.56 (dd, J=8 Hz, 1H).

Step 2. Synthesis of 1-bromo-4-chloro-3-fluoro-2-[(E)-2-methoxyvinyl]benzene (83c)

To a solution of (methoxymethyl)triphenylphosphonium chloride (83b, 18.2 g, 53.06 mmol) in THF (60 mL) was added potassium t-butoxide 1.0M in THF (5.67 g, 50.54 mmol) at −10° C. The reaction was stirred at −10° C. for 10 mins. The reaction was diluted with water (150 mL) and extracted with ethyl acetate (150 mL). The organic layer was concentrated in vacuum and the residue was purified by silica gel column chromatography, eluted with petroleum ether:ethyl acetate=10:1 to give 1-bromo-4-chloro-3-fluoro-2-[(E)-2-methoxyvinyl]benzene (83c, 4.50 g, 16.1 mmol, 64% yield) as a white solid. $^1H$ NMR (400 MHz, DMSO-$d_6$) 7.64 (s, 1H), 7.51 (dd, J=10.8 Hz, 1H), 7.24 (dd, J=13.2 Hz, 1H), 5.73 (d, J=13.2 Hz, 1H), 3.71 (s, 3H).

Step 3. Synthesis of 2-(6-bromo-3-chloro-2-fluoro-phenyl)acetaldehyde (83d)

To a solution of 1-bromo-4-chloro-3-fluoro-2-[(E)-2-methoxyvinyl]benzene (83c, 4.5 g, 16.95 mmol) in acetone (45 mL) was added HCl (1.86 g, 50.85 mmol) and the mixture was stirred at 60° C. overnight. TLC (petroleum ether) showed the reaction was complete. The reaction mixture was concentrated in vacuum and extracted with ethyl acetate (50 mL). The organic layer was concentrated in vacuum to afford 2-(6-bromo-3-chloro-2-fluoro-phenyl)acetaldehyde (83d, 4.0 g, 14.32 mmol, 84.5% yield) as a yellow solid. $^1H$ NMR (400 MHz, DMSO-$d_6$) 9.72 (s, 1H), 7.71 (s, 1H), 7.58 (d, J=11.2 Hz, 1H), 4.02 (d, J=8.4 Hz, 2H).

Step 4. Synthesis of 2-(6-bromo-3-chloro-2-fluoro-phenyl)ethanol (83e)

To a solution of 2-(6-bromo-3-chloro-2-fluoro-phenyl) acetaldehyde (83d, 3.3 g, 13.12 mmol) in methanol (30 mL) was added sodium borohydride (1.5 g, 39.37 mmol) at 0° C. The reaction mixture was stirred at rt. for 1 h. TLC (petroleum ether) showed the reaction was complete. The mixture was concentrated in vacuum and the residue was extracted with ethyl acetate (50 mL), washed with brine (50 mL) and the organic layer was concentrated in vacuum to obtain 2-(6-bromo-3-chloro-2-fluoro-phenyl)ethanol (83e, 3.20 g, 11.99 mmol, 91% yield) as a yellow oil. $^1H$ NMR (400 MHz, DMSO-$d_6$) 7.62 (s, 1H), 7.48 (dd, J=9.2 Hz, 1H), 4.85 (t, J=5.6 Hz, 1H), 7.52 (dd, J=12.8 Hz, 2H), 2.88 (dd, J=7.2 Hz, 2H).

Step 5. Synthesis of tert-butyl-[2-(3-chloro-2,6-difluoro-phenyl)ethoxy]-dimethyl-silane (83f)

To a solution of 2-(3-chloro-2,6-difluoro-phenyl)ethanol (83e, 3.20 g, 16.62 mmol) in DCM (30 mL) was added tert-butyldimethylchlorosilane (3.01 g, 19.94 mmol) and imidazole (2.26 g, 33.23 mmol). The reaction was stirred at 25° C. for 2 h. The reaction mixture was concentrated in vacuum and the residue was extracted with ethyl acetate (3×50 mL) and washed with brine (3×50 mL). The organic layers were concentrated in vacuum to give the crude product which was purified by silica gel column chromatography, to yield tert-butyl-[2-(3-chloro-2,6-difluoro-phenyl)ethoxy]-dimethyl-silane (83f, 3.9 g, 12.07 mmol, 73% yield) as an colorless oil. LCMS [M+H]: 306.8.

Step 6. Synthesis of [2-[2-[tert-butyl(dimethyl)silyl]oxyethyl]-4-chloro-3-fluoro-phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (83 g)

To a solution of 2-(6-bromo-3-chloro-2-fluoro-phenyl) ethoxy-tert-butyl-dimethyl-silane (83f, 3074 mg, 8.36 mmol) in THF (20 mL) was added n-BuLi (535.5 mg, 8.36 mmol) at −78° C. The mixture was stirred for 10 min under $N_2$. (3aR,4R,6S,6aS)-4-(4-chloropyrrolo[2,3-d]pyrimidin-7-yl)-N-methoxy-N,2,2-trimethyl-3a,4,6,6a-tetrahydrofuro[3,4-d][1,3]dioxole-6-carboxamide (1Ad, 1.6 g, 4.18 mmol) in THF (10 mL) was added. The mixture was stirred for 30 min at −78° C. TLC (petroleum ether:ethyl acetate=10:1) showed the reaction was complete. The reaction was added to dilute HCl (0.05 mol/L) and kept the pH<8 during the process of quenching. The mixture was extracted with ethyl acetate (2×200 mL), the combined organic layers were dried, concentrated in vacuum and purified by silica gel column chromatography (petroleum ether: ethyl acetate=100% to 10:1) to give [2-[2-[tert-butyl(dimethyl)silyl]oxyethyl]-4-chloro-3-fluoro-phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl] methanone (83 g, 1.2 g, 1.87 mmol, 45% yield) as a yellow oil. LCMS [M+H]: 610.1.

Step 7. Synthesis of (R)-[2-[2-[tert-butyl(dimethyl)silyl]oxyethyl]-4-chloro-3-fluoro-phenyl]-[(3aR,6R,6aR)-2,2-dimethyl-4-[(7S)-4-chloropyrrolo[2,3-d]pyrimidin-7-yl]-3a,4,6,6a-tetrahydrofuro[3,4-d][1,3]dioxol-6-yl]methanol (83h)

To a solution of [2-[2-[tert-butyl(dimethyl)silyl]oxyethyl]-4-chloro-3-fluoro-phenyl]-[(3aR,6S,6aS)-2,2-dimethyl-4-[(7S)-4-chloropyrrolo[2,3-d]pyrimidin-7-yl]-3a,4,6,6a-tetrahydrofuro[3,4-d][1,3]dioxol-6-yl]methanone (83 g, 1.1 g, 1.8 mmol) in toluene (15 mL) was added diisobutylaluminium hydride (3.6 mL, 5.4 mmol) at −78° C. under $N_2$. The reaction mixture was stirred at −78° C. for 30 min. Water (50 mL) was added, and the mixture was extracted with ethyl acetate (100 mL) and washed with saturated NaCl (2×50 mL). The organic layers were dried over anhydrous $Na_2SO_4$ and the solvent was removed in vacuum to give (R)-[2-[2-[tert-butyl(dimethyl)silyl]oxyethyl]-4-chloro-3-fluoro-phenyl]-[(3aR,6R,6aR)-2,2-dimethyl-4-[(7S)-4-chloropyrrolo[2,3-d]pyrimidin-7-yl]-3a,4,6,6a-tetrahydrofuro[3,4-d][1,3]dioxol-6-yl]methanol (83h, 1.0 g, 1.55 mmol, 86% yield) which was used for the next step directly. LCMS [M+H]: 612.2.

Step 8. Synthesis of 2-[3-chloro-2-fluoro-6-[(R)-hydroxy-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methyl]phenyl]ethanol (83i)

To a solution of (R)-[2-[2-[tert-butyl(dimethyl)silyl]oxyethyl]-4-chloro-3-fluoro-phenyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (83h, 1.0 g, 1.63 mmol) in THF (3 mL) was added TBAF (0.85 mL, 3.26 mmol). The reaction mixture was stirred at rt for 1 h. TLC (petroleum ether: ethyl acetate=10:1) showed the reaction was complete. The mixture was concentrated in vacuum and purified by silica gel column chromatography (petroleum ether:ethyl acetate=50:1 to 10:1) to give 2-[3-chloro-2-fluoro-6-[(R)-hydroxy-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methyl]phenyl]ethanol (83i, 670 mg, 1.30 mmol, 80% yield) as a white solid. LCMS [M+H]: 498.1.

Step 9. Synthesis of 4-chloro-7-[(3aR,4R,6R,6aR)-2,2-dimethyl-6-[(1R)-6-chloro-5-fluoro-isochroman-1-yl]-3a,4,6,6a-tetrahydrofuro[3,4-d][1,3]dioxol-4-yl]pyrrolo[2,3-d]pyrimidine (83j)

To a solution of 2-[3-chloro-2-fluoro-6-[(R)-hydroxy-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methyl]phenyl]ethanol (83i, 500 mg, 1 mmol) in THF (5 mL) was added PPh$_3$ (526 mg, 2.01 mmol), DIAD (0.56 mL, 2.01 mmol) under Ar. The reaction mixture was stirred at 25° C. for 1 h. The mixture was concentrated in vacuum and the residue was purified by silica gel column chromatography to yield 4-chloro-7-[(3aR,4R,6R,6aR)-2,2-dimethyl-6-[(1R)-6-chloro-5-fluoro-isochroman-1-yl]-3a,4,6,6a-tetrahydrofuro[3,4-d][1,3]dioxol-4-yl]pyrrolo[2,3-d]pyrimidine (83j, 390 mg, 0.77 mmol, 77% yield). LCMS [M+H]: 480.1.

Step 10. Synthesis of 4-methyl-7-[(3aR,4R,6R,6aR)-2,2-dimethyl-6-[(1R)-6-chloro-5-fluoro-isochroman-1-yl]-3a,4,6,6a-tetrahydrofuro[3,4-d][1,3]dioxol-4-yl]pyrrolo[2,3-d]pyrimidine (83k)

To a solution of 4-chloro-7-[(3aR,4R,6R,6aR)-2,2-dimethyl-6-[(1R)-6-chloro-5-fluoro-isochroman-1-yl]-3a,4,6,6a-tetrahydrofuro[3,4-d][1,3]dioxol-4-yl]pyrrolo[2,3-d]pyrimidine (83j, 100 mg, 0.21 mmol) in THF (2 mL) was added ferric acetylacetonate (7.35 mg, 0.02 mmol) and methylmagnesium bromide (0.21 mL, 0.63 mmol) dropwise under N$_2$. The reaction was stirred at rt for 30 min. The mixture was extracted with ethyl acetate (3×10 mL) and washed with water (2×10 mL). The organic layer was concentrated in vacuum to yield 4-methyl-7-[(3aR,4R,6R,6aR)-2,2-dimethyl-6-[(1R)-6-chloro-5-fluoro-isochroman-1-yl]-3a,4,6,6a-tetrahydrofuro[3,4-d][1,3]dioxol-4-yl]pyrrolo[2,3-d]pyrimidine (83k, 90 mg, 0.19 mmol, 89% yield) as a yellow oil. LCMS [M+H]: 460.2.

Step 11. Synthesis of (2R,3R,4S,5S)-2-(4-methylpyrrolo[2,3-d]pyrimidin-7-yl)-5-[(1R)-6-chloro-5-fluoro-isochroman-1-yl]tetrahydrofuran-3,4-diol (Ex. 83)

To a solution of 4-methyl-7-[(3aR,4R,6R,6aR)-2,2-dimethyl-6-[(1R)-6-chloro-5-fluoro-isochroman-1-yl]-3a,4,6,6a-tetrahydrofuro[3,4-d][1,3]dioxol-4-yl]pyrrolo[2,3-d]pyrimidine (83k, 100 mg, 0.22 mmol) in water (2 mL) was added TFA (1.1 mL, 12.34 mmol). The mixture was stirred at rt for 30 mins. The residue was purified by pre-HPLC, eluted with CH$_3$CN in water (0.1% NH$_4$OH) from 5% to 95% to give (2R,3R,4S,5S)-2-(4-methylpyrrolo[2,3-d]pyrimidin-7-yl)-5-[(1R)-6-chloro-5-fluoro-isochroman-1-yl]tetrahydrofuran-3,4-diol (Ex. 83, 18 mg, 0.042 mmol, 19% yield) as a white solid. $^1$H NMR (400 MHz, DMSO-d$_6$) 8.67 (s, 1H), 7.78 (d, J=4 Hz, 1H), 7.32-7.28 (m, 2H), 6.82 (d, J=4 Hz, 1H), 6.31 (d, J=7.6 Hz, 1H), 5.31 (d, J=6.8 Hz, 1H), 5.20 (d, J=4 Hz, 1H), 4.91 (d, J=7.2 Hz, 1H), 4.52-4.46 (m, 2H), 4.32 (s, 1H), 3.88 (t, J=4 Hz, 1H), 3.69 (s, 1H), 2.73 (s, 2H), 2.67 (d, J=8 Hz, 3H). $^1$H NMR (400 MHz, DMSO-d$_6$+D$_2$O) 8.67 (s, 1H), 7.78 (d, J=4 Hz, 1H), 7.32-7.28 (m, 2H), 6.82 (d, J=4 Hz, 1H), 6.31 (d, J=7.6 Hz, 1H), 4.91 (d, J=7.2 Hz, 1H), 4.52-4.46 (m, 2H), 4.32 (s, 1H), 3.88 (t, J=4 Hz, 1H), 3.69 (s, 1H), 2.73 (s, 2H), 2.67 (d, J=8 Hz, 3H).

Example 86. Synthesis of (2R,3R,4S,5S)-2-(4-amino-5-fluoro-pyrrolo[2,3-d]pyrimidin-7-yl)-5-[(1R)-6-chloroisochroman-1-yl]tetrahydrofuran-3,4-diol (Ex. 86)

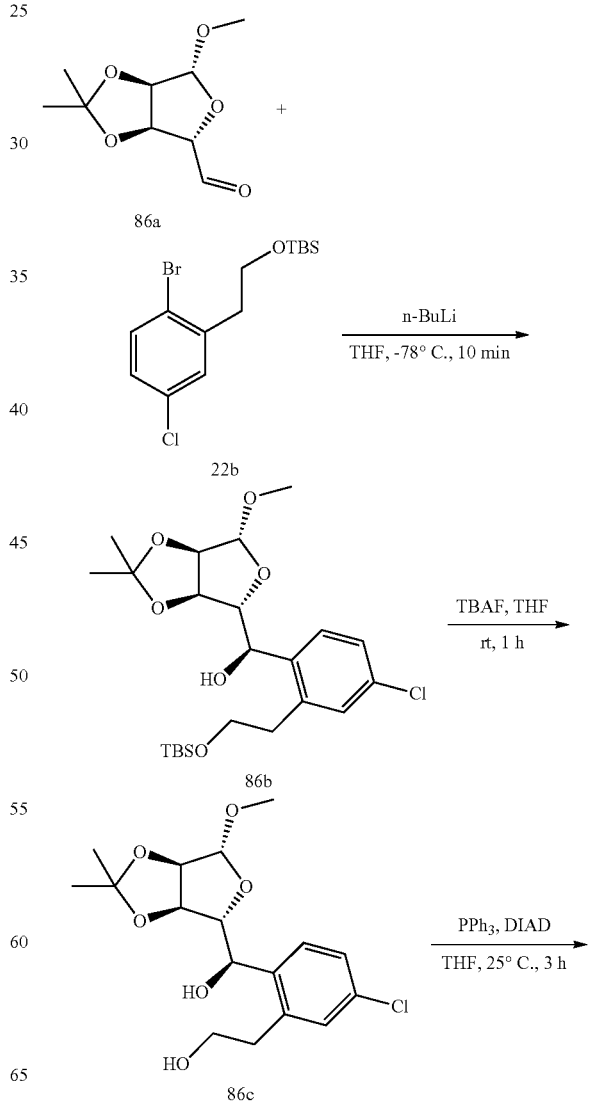

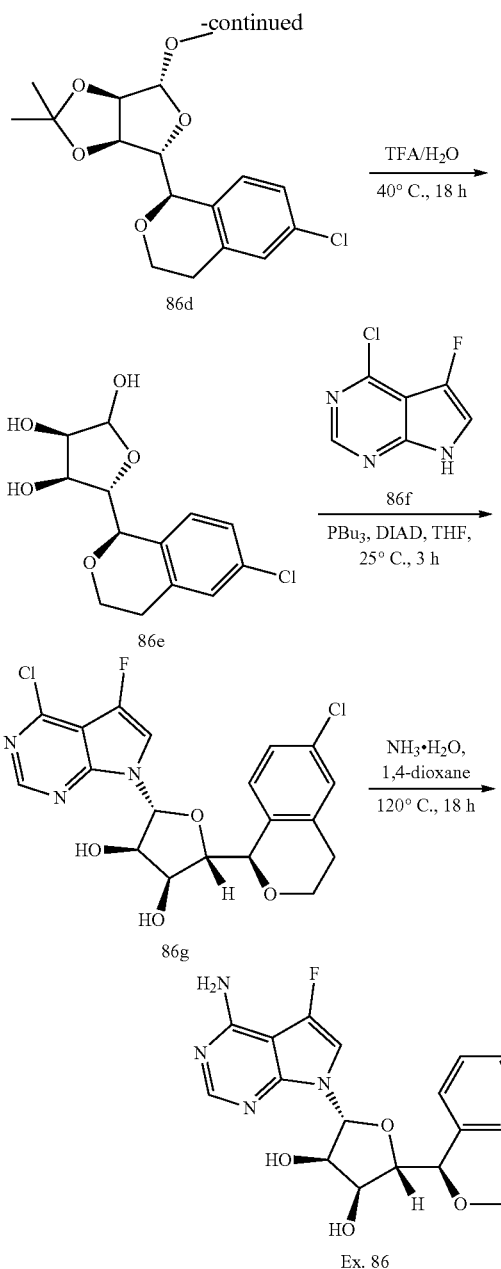

Step 1. Synthesis of (R)-[2-[2-[tert-butyl(dimethyl) silyl] oxyethyl]-4-chloro-phenyl]-[(3aR,4R,6R,6aR)-4-methoxy-2,2-dimethyl-3a,4,6,6atetrahydrofuro[3,4-d][1,3]dioxol-6-yl]methanol (86b)

To a solution of 2-(2-bromo-5-chloro-phenyl)ethoxy-tert-butyl-dimethyl-silane (22b, 23.6 g, 68 mmol) in dry THF (50 mL) was added n-BuLi (34 mL, 54.4 mmol) at −78° C. The reaction mixture was stirred at −78° C. for 10 min under N₂. (3aR,4R,6S,6aR)-4-methoxy-2,2-dimethyl-3a,4,6,6a-tetrahydrofuro [3,4-d][1,3]dioxole-6-carbaldehyde (86a, 5.5 g, 27.2 mmol) in dry THF (10 mL) was added to the mixture. The mixture was stirred for 5 min at −78° C. The reaction was added into dilute HCl (300 mL, 0.6 M), and maintaining pH=6. The mixture was concentrated in vacuum to give the crude product which was purified was purified by silica gel column chromatography, eluting with petroleum ether:ethyl acetate=5:1 to give (R)-[2-[2-[tert-butyl(dimethyl)silyl] oxyethyl]-4-chloro-phenyl]-[(3aR,4R,6R,6aR)-4-methoxy-2,2-dimethyl-3a,4,6,6atetrahydrofuro[3,4-d][1,3]dioxol-6-yl]methanol (86b, 5.8 g, 11.6 mmol, 43% yield) as a yellow oil. ¹H NMR (400 MHz, CDCl₃) δ 7.54 (d, J=8.4 Hz, 1H), 7.22-7.29 (m, 2H), 5.36 (s, 2H), 4.95 (d, J=6.0 Hz, 1H), 4.68 (d, J=5.6 Hz, 1H), 4.50 (s, 1H), 4.31 (s, 1H), 3.83-3.90 (m, 2H), 3.43 (s, 3H), 2.78-2.99 (m, 2H), 1.47 (s, 3H), 1.30 (s, 3H), 0.87 (s, 9H), 0.02 (s, 6H).

Step 2. Synthesis 2-[5-chloro-2-[(R)-hydroxy-[(3aR, 4R,6R,6aR)-4-methoxy-2,2-dimethyl-3a,4,6,6a-tetrahydrofuro[3,4-d][1,3]dioxol-6-yl]methyl]phenyl] ethanol (86c)

To a solution of (R)-[2-[2-[tert-butyl(dimethyl)silyl]oxyethyl]-4-chloro-phenyl]-[(3aR,4R,6R,6aR)-4-methoxy-2,2-dimethyl-3a,4,6,6a-tetrahydrofuro[3,4-d][1,3]dioxol-6-yl] methanol (86b, 4.8 g, 10.1 mmol) in THF (10 mL) was added tetrabutylammonium fluoride (10.1 mL, 10.1 mmol) at rt. The mixture was stirred at rt for 1 h. The mixture was poured into 50 ml of NH₄Cl (aq) and extracted with ethyl acetate (2×50 mL). The organic layers were concentrated in vacuum to give the crude product which was purified by silica gel column chromatography, eluting with petroleum ether to petroleum ether:ethyl acetate=5:1) to give 2-[5-chloro-2-[(R)-hydroxy-[(3aR,4R,6R,6aR)-4-methoxy-2,2-dimethyl-3a,4,6,6a-tetrahydrofuro[3,4-d][1,3]dioxol-6-yl] methyl]phenyl]ethanol (86c, 3.8 g, 9.5 mmol, 94% yield) as a colorless oil. ¹H NMR (400 MHz, CDCl₃) δ 7.54 (d, J=8.4 Hz, 1H), 7.22-7.29 (m, 2H), 5.01 (s, 2H), 4.95 (d, J=6.0 Hz, 1H), 4.65 (d, J=6.0 Hz, 1H), 4.55 (s, 1H), 4.33 (br, 1H), 3.85-3.96 (m, 2H), 3.41 (s, 3H), 2.78-3.06 (m, 2H), 1.47 (s, 3H), 1.30 (s, 3H).

Step 3. Synthesis of (1R)-6-chloro-1-[(3aR,4R,6R, 6aR)-4-methoxy-2,2-dimethyl-3a,4,6,6a-tetrahydrofuro[3,4-d][1,3]dioxol-6-yl]isochromane (86d)

To a solution of 2-[5-chloro-2-[(R)-hydroxy-[(3aR,4R, 6R,6aR)-4-methoxy-2,2-dimethyl-3a,4,6,6atetrahydrofuro [3,4-d][1,3]dioxol-6-yl]methyl]phenyl]ethanol (86c, 2.3 g, 6.4 mmol) in THF (50 mL was added isopropyl(NE)-N-isopropoxycarbonyliminocarbamate (2.5 mL, 12.8 mmol) and triphenylphosphine (3.3 g, 12.8 mmol), and the reaction mixture was stirred at 25° C. for 16 h. The mixture was concentrated in vacuum to give a crude product which was purified by silica gel column chromatography, eluting with petroleum ether:ethyl acetate=20:1 to 5:1 to give (1R)-6-chloro-1-[(3aR,4R,6R,6aR)-4-methoxy-2,2-dimethyl-3a,4, 6,6a-tetrahydrofuro[3,4-d][1,3]dioxol-6-yl]isochromane (86d, 2.1 g, 6.1 mmol, 96% yield) as a white solid. ¹H NMR (400 MHz, CDCl₃) δ 7.58 (d, J=8.4 Hz, 1H), 7.12-7.17 (m, 2H), 5.09 (s, 2H), 4.56-4.62 (m, 2H), 4.14-4.28 (m, 2H), 3.71-3.77 (m, 1H), 3.70 (s, 3H), 2.65-3.01 (m, 2H), 1.47 (s, 3H), 1.25 (s, 3H).

Step 4. Synthesis of (3R,4S,5S)-5-[(1R)-6-chloroisochroman-1-yl]tetrahydrofuran-2,3,4-triol (86e)

To a solution of (1R)-6-chloro-1-[(3aR,4R,6R,6aR)-4-methoxy-2,2-dimethyl-3a,4,6,6a-tetrahydrofuro[3,4-d][1,3] dioxol-6-yl]isochromane (86d, 1.6 g, 4.7 mmol) in trifluoroacetic acid (16 mL, 215.4 mmol) was added water (10 mL) at rt. The mixture was stirred at 40° C. for 24 h. The reaction mixture was concentrated in vacuum and purified by silica gel column chromatography, eluting with petroleum ether: ethyl acetate=5:1 to 1:1 to give (3R,4S,5S)-5-[(1R)-6-chloroisochroman-1-yl]tetrahydrofuran-2,3,4-triol (86e, 700 mg, 2.4 mmol, 42% yield) as a colorless oil. LCMS [M+H]: 286.1.

Step 5. Synthesis of (2R,3R,4S,5S)-2-(4-chloro-5-fluoro-pyrrolo[2,3-d]pyrimidin-7-yl)-5-[(1R)-6-chloroisochroman-1-yl]tetrahydrofuran-3,4-diol (86 g)

To a solution of 4-chloro-5-fluoro-7H-pyrrolo[2,3-d]pyrimidine (86f, 461 mg, 2.7 mmol) and pyridine (0.8 mL, 9.8 mmol) in dry THF (10 mL) was added tributylphosphane (1.2 mL, 4.9 mmol) and DIAD (1.0 mL, 5.1 mmol) under N$_2$. (3R,4S,5S)-5-[(1R)-6-chloroisochroman-1-yl]tetrahydrofuran-2,3,4-triol (86e, 700 mg, 2.4 mmol) and pyridine (0.8 mL, 9.8 mmol) was added at once. The reaction mixture was stirred at 30° C. for 1.5 h under N$_2$. The reaction mixture was concentrated in vacuum and the residue was purified by silica gel column chromatography, eluting with petroleum ether:ethyl acetate=5:1 to 1:1) to give (2R,3R,4S,5S)-2-(4-chloro-5-fluoro-pyrrolo [2,3-d]pyrimidin-7-yl)-5-[(1R)-6-chloroisochroman-1-yl]tetrahydrofuran-3,4-diol (86 g, 160 mg, 0.4 mmol, 15% yield) as a yellow oil. LCMS [M+H]: 440.1.

Step 6. Synthesis of (2R,3R,4S,5S)-2-(4-amino-5-fluoro-pyrrolo[2,3-d]pyrimidin-7-yl)-5-[(1R)-6-chloroisochroman-1-yl]tetrahydrofuran-3,4-diol (Ex. 86)

A mixture solution of (2R,3R,4S,5S)-2-(4-chloro-5-fluoro-pyrrolo[2,3-d]pyrimidin-7-yl)-5-[(1R)-6-chloroisochroman-1-yl]tetrahydrofuran-3,4-diol (86 g, 156 mg, 0.35 mmol) in ammonium hydroxide (10 mL, 260 mmol) and 1,4-dioxane (10 mL) was stirred at 105° C. in a sealed tube overnight. The mixture solution was concentrated in vacuum and the residue was purified by prep-HPLC, eluting with CH$_3$CN in water from 5% to 95%. The product fraction were extracted with ethyl acetate (2×50 ml) and concentrated in vacuum to give a yellow solid which was triturated with petroleum ether:ethyl acetate=100:1 (50 ml), filtered, and dried in vacuum to afford (2R,3R,4S,5S)-2-(4-amino-5-fluoro-pyrrolo [2,3-d]pyrimidin-7-yl)-5-[(1R)-6-chloroisochroman-1-yl]tetrahydrofuran-3,4-diol (Ex. 86, 74 mg, 0.17 mmol, 49% yield) as a white solid. LCMS [M+H]: 421.1. $^1$H NMR (400 MHz, DMSO-d6) δ 8.08 (s, 1H), 7.23-7.31 (m, 4H), 7.01 (s, 2H), 6.23 (d, J=7.6 Hz, 1H), 5.23 (d, J=6.8 Hz, 1H), 5.08 (s, 1H), 4.87 (s, 1H), 4.35-4.39 (m, 2H), 4.23-4.26 (m, 1H), 3.79-3.82 (m, 1H), 3.66-3.71 (m, 1H), 2.89-2.96 (m, 1H), 2.70-2.74 (m, 1H). $^1$H NMR (400 MHz, DMSO-d6+D$_2$O) δ 8.08 (s, 1H), 7.23-7.30 (m, 4H), 6.23 (d, J=6.0 Hz, 1H), 4.87 (s, 1H), 4.35-4.39 (m, 2H), 4.23-4.26 (m, 1H), 3.79-3.81 (m, 1H), 3.65-3.71 (m, 1H), 2.89-2.96 (m, 1H), 2.70-2.74 (m, 1H). $^{19}$F NMR (377 MHz, DMSO-d6) δ −166.8.

Example 88. Synthesis of (2R,3R,4S,5S)-2-(4-aminopyrrolo[2,3-d]pyrimidin-7-yl)-5-[(1R)-6,7-dichloroisochroman-1-yl]tetrahydrofuran-3,4-diol (Ex. 88)

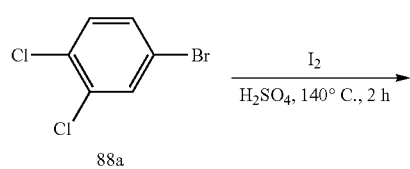

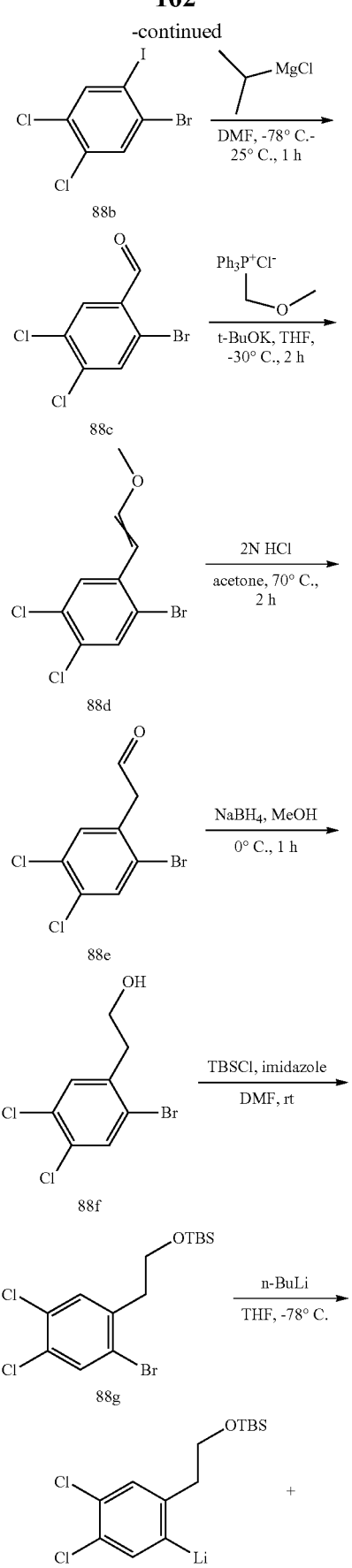

163
-continued

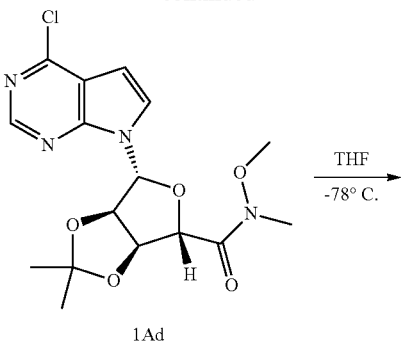
1Ad

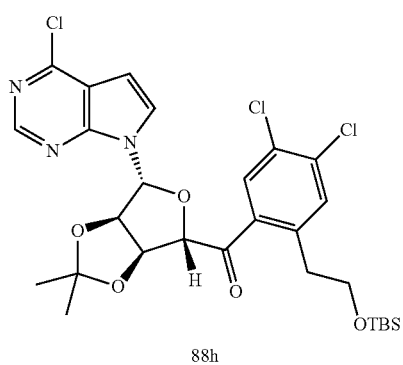
88h

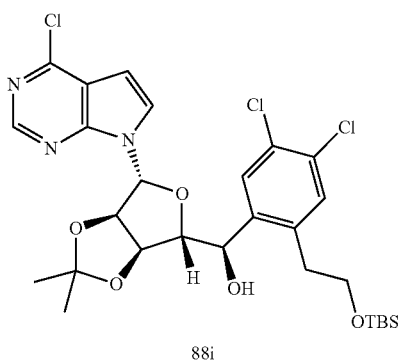
88i

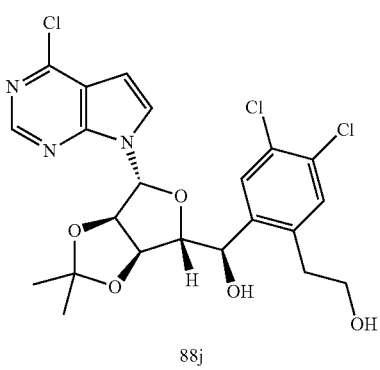
88j

164
-continued

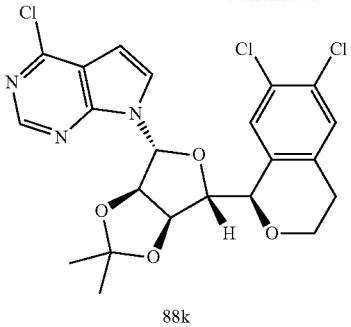
88k

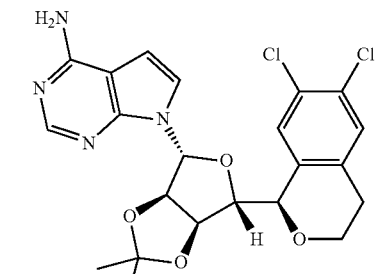
88l

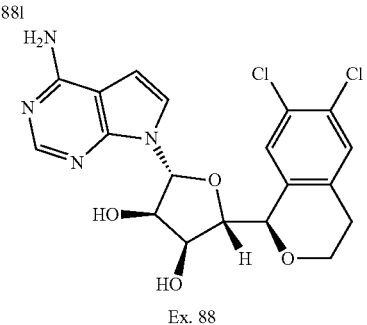
Ex. 88

Step 1. Synthesis of 1-bromo-4,5-dichloro-2-iodo-benzene (88b)

To a solution of 4-bromo-1,2-dichlorobenzene (88a, 25 g, 110.67 mmol), 12 (42.13 g, 166 mmol) in H2SO4 (353.95 mL, 6640.1 mmol) was stirred at 140° C. for 72 h under Ar. The reaction was diluted with water (5000 mL), extracted with EtOAc (1500 ml), washed with Na$_2$SO$_3$ (aq, 2×100 mL) and saturated brine (800 ml×1). The crude product was dried over MgSO$_4$, filtered and concentrated in vacuum to give the crude product which was then purified by silica gel column chromatography, eluted with 2% EtOAc in petroleum ether to give 1-bromo-4,5-dichloro-2-iodo-benzene (88b, 40 g, 113.7 mmol, 100% yield) as a white solid. $^1$H NMR (400 MHz, CDCl$_3$) δ 7.84 (s, 1H), 7.62 (s, 1H).

Step 2. Synthesis of 2-bromo-4,5-dichloro-benzaldehyde (88c)

To a solution of 1-bromo-4,5-dichloro-2-iodo-benzene (88b, 5 g, 14.21 mmol) in THF (20 mL) was stirred at −78° C. for 15 min under Ar. Isopropylmagnesium bromide [1M solution in THF] (15.6 mL, 15.63 mmol) was added slowly and stirred for 15 min. DMF (1.2 mL, 15.63 mmol) was added and stirred for 1 h at rt. The reaction mixture was extracted with EtOAc (80 mL), washed with Na$_2$SO$_3$ (aq, 2×30 mL) and saturated brine (2×30 mL), dried over MgSO$_4$, filtered, and concentrated in vacuum. The crude product was then purified by silica gel column chromatography, eluting with 0.1% of EtOAc in petroleum ether to give 2-bromo-4,5-dichloro-benzaldehyde (88c, 2.7 g, 10.6 mmol, 75% yield) as a white solid. $^1$H NMR (400 MHz, CDCl$_3$) δ 10.16 (d, J=4.0 Hz, 1H), 7.89 (d, J=4.0 Hz, 1H), 7.10 (d, J=4.0 Hz, 1H).

Step 3. Synthesis of 1-bromo-4,5-dichloro-2-[(E)-2-methoxyvinyl]benzene (88d)

A solution of (methoxymethyl)triphenylphosphonium chloride (7.29 g, 21.27 mmol) and t-BuOK (2.39 g, 21.27 mmol) in THF (10 mL) was stirred at −25° C. under Ar for 15 min. 2-bromo-4,5-dichloro-benzaldehyde (88c, 2.7 g, 10.63 mmol) in THF was added and stirred at −25° C. for 1.5 h. The reaction mixture was extracted with EtOAc (100 mL), washed with water (2×30 mL), then saturated brine (30 mL), dried over MgSO$_4$, filtered, and concentrated in vacuum. The crude product was purified by silica gel column chromatography, eluting with 0.1% EtOAc in petroleum ether to give 1-bromo-4,5-dichloro-2-[(E)-2-methoxyvinyl]benzene (88d, 1.1 g, 0.0039 mmol, 75% yield) as a white solid. $^1$H NMR (400 MHz, CDCl$_3$) δ 7.54-7.53 (d, J=4.0 Hz, 1H), 7.37-7.35 (d, J=8.0 Hz, 1H), 6.94-6.89 (m, 1H), 5.88-5.85 (d, J=12.0 Hz, 1H), 3.66 (s, 3H).

Step 4. Synthesis of 2-(2-bromo-4,5-dichloro-phenyl)acetaldehyde (88e)

A solution of 1-bromo-4,5-dichloro-2-[(E)-2-methoxyvinyl]benzene (88d, 1.1 g, 3.9 mmol) and hydrochloric acid 2N (aq) (0.7 g, 19.51 mmol) in acetone (5 mL) was stirred at 70° C. for 2 h under Ar. The reaction was concentrated in vacuum to give 2-(2-bromo-4,5-dichloro-phenyl)acetaldehyde (88e, 830 mg, 3.09 mmol, 79% yield) as a colorless oil. LCMS [M+H]: 267.1.

Step 5. Synthesis of 2-(2-bromo-4,5-dichloro-phenyl)ethanol (88f)

A solution of 2-(2-bromo-4,5-dichloro-phenyl)acetaldehyde (88e, 830 mg, 3.1 mmol) in methanol (5 mL) was stirred at 0° C. for 15 min under Ar. NaBH$_4$ (352 mg, 9.29 mmol) was added and stirred at 0° C. for 30 min. The reaction mixture was extracted with EtOAc (50 mL), washed with water (2×20 mL) and saturated brine (10 mL), dried over MgSO$_4$, filtered, and concentrated in vacuum to give 2-(2-bromo-4,5-dichloro-phenyl)ethanol (88f, 800 mg, 3.0 mmol, 96% yield) as a colorless oil. $^1$H NMR (400 MHz, CDCl$_3$) δ 7.71 (s, 1H), 7.39 (s, 1H), 3.90-3.86 (m, 2H), 2.99-2.95 (m, 2H), 1.46-1.43 (m, 1H).

Step 6. Synthesis of 2-(2-bromo-4,5-dichloro-phenyl)ethoxy-tert-butyl-dimethyl-silane (88 g)

To a solution of 2-(2-bromo-4,5-dichloro-phenyl)ethanol (88f, 810 mg, 3 mmol) in DCM (10 mL) was added imidazole (409 mg, 6.0 mmol) followed by t-butylchlorodiphenylsilane (678 mg, 4.5 mmol) and the reaction was stirred at 25° C. for 2 h. The reaction mixture was diluted with EtOAc (50 mL), washed with water (2×20 mL) and saturated brine (10 mL), dried over MgSO$_4$, filtered, concentrated in vacuum. The crude product was purified by flash column chromatography eluting with 10% EtOAc in PE to give 2-(2-bromo-4,5-dichloro-phenyl)ethoxy-tert-butyl-dimethyl-silane (88 g, 910 mg, 2.37 mmol, 79% yield) as a colorless oil. $^1$H NMR (400 MHz, CDCl$_3$) δ 7.66 (s, 1H), 7.40 (s, 1H), 3.83 (m, 2H), 2.93 (t, 2H), 7.40 (s, 9H), 0.00 (s, 6H).

Step 7. Synthesis of [2-[2-[tert-butyl(dimethyl)silyl]oxyethyl]-4,5-dichloro-phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (88h)

A solution of [2-(2-bromo-4,5-dichloro-phenyl)-2,2-difluoro-ethoxy]-tert-butyl-dimethyl-silane (88 g, 713.49 mg, 1.7 mmol in THF (6.5 mL) was stirred at −78° C. for 20 min under Ar. n-BuLi (83.67 mg, 1.31 mmol) was added and stirred at −78° C. for 5 min. (3aR,4R,6S,6aS)-4-(4-chloropyrrolo[2,3-d]pyrimidin-7-yl)-N-methoxy-N,2,2-trimethyl-3a,4,6,6a-tetrahydrofuro[3,4-d][1,3]dioxole-6-carboxamide (1Ad, 250 mg, 0.65 mmol) in THF (3 mL) was added and stirred for 5 min. TLC showed the reaction was complete. The reaction was quenched with ethyl acetate (25 mL). The reaction mixture was extracted with EtOAc (25 mL), washed with water (2×10 mL) and saturated brine (10 mL), dried over MgSO$_4$, filtered, and concentrated in vacuum. The crude product was then purified by silica gel column chromatography, eluting with 20% EtOAc in petroleum ether to give [2-[2-[tert-butyl(dimethyl)silyl]oxyethyl]-4,5-dichloro-phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (88h, 210 mg, 0.33 mmol, 51% yield) as a yellow oil. LCMS [M+H]: 626.2.

Step 8. Synthesis of give (R)-[2-[2-[tert-butyl(dimethyl)silyl]oxyethyl]-4,5-dichloro-phenyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (88i)

A solution of [2-[2-[tert-butyl(dimethyl)silyl]oxyethyl]-4,5-dichloro-phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (88h, 250 mg, 0.39 mmol) in toluene (5 mL) was stirred at −78° C. for 5 min under Ar. DIBAL-H (0.13 mL, 1.1 mmol) was added and stirred for 2.5 h. The mixture was purified by prep-HPLC to give (R)-[2-[2-[tert-butyl(dimethyl)silyl]oxyethyl]-4,5-dichloro-phenyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (88i, 195 mg, 0.31 mmol, 80% yield) as a white solid. LCMS [M+H]: 628.2.

Step 9. Synthesis of 2-[4,5-dichloro-2-[(R)-hydroxy-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methyl]phenyl]ethanol (88j)

A solution of (R)-[2-[2-[tert-butyl(dimethyl)silyl]oxy-1,1-difluoro-ethyl]-4,5-dichloro-phenyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (88i, 205 mg, 0.31 mmol) in THF (8 mL) was stirred at 25° C. for 5 min under Ar. Tetrabutylammonium fluoride (0.17 mL, 0.62 mmol) was added and stirred for 2.5 h. The mixture was purified by prep-HPLC (MeCN in water, from 10% to 90%) to give 2-[4,5-dichloro-2-[(R)-hydroxy-[(3aR,4R,6R,6aR)-4-(4-chloropyrrolo[2,3-d]pyrimidin-7-yl)-2,2-dimethyl-3a, 4,6,6a-tetrahydrofuro[3,4-d][1,3]dioxol-6-yl]methyl]phenyl]ethanol (88j, 100 mg, 0.19 mmol, 63% yield) as a white solid. LCMS [M+H]: 514.2.

Step 10. Synthesis of 4-chloro-7-[(3aR,4R,6R,6aR)-2,2-dimethyl-6-[(1R)-6,7-dichloroisochroman-1-yl]-3a,4,6,6a-tetrahydrofuro[3,4-d][1,3]dioxol-4-yl]pyrrolo[2,3-d]pyrimidine (88k)

A solution of 2-[4,5-dichloro-2-[(R)-hydroxy-[(3aR,4R,6R,6aR)-4-(4-chloropyrrolo-[2,3-d]pyrimidin-7-yl)-2,2-dimethyl-3a,4,6,6a-tetrahydrofuro[3,4-d][1,3]dioxol-6-yl]methyl]phenyl]ethanol (88j, 100 mg, 0.19 mmol) and PPh₃ (101.9 mg, 0.39 mmol) in THF (3 mL) was stirred at 25° C. for 5 min under Ar. DIAD (0.11 mL, 0.39 mmol) was added and stirred for 2 h. The reaction mixture was extracted with EtOAc (200 mL), washed with water (2×100 mL) and saturated brine (100 mL), dried over MgSO₄, filtered, and concentrated in vacuum. The crude product was then purified by silica gel column chromatography, eluting with 50% EtOAc in petroleum ether to give 4-chloro-7-[(3aR,4R,6R,6aR)-2,2-dimethyl-6-[(1R)-6,7-dichloroisochroman-1-yl]-3a,4,6,6a-tetrahydrofuro[3,4-d][1,3]dioxol-4-yl]pyrrolo[2,3-d]pyrimidine (88k, 70 mg, 0.14 mmol, 72.5% yield) as a white solid. LCMS [M+H]: 496.1.

Step 11. Synthesis of 7-[(3aR,4R,6R,6aR)-2,2-dimethyl-6-[(1R)-6,7-dichloroisochroman-1-yl]-3a,4,6,6a-tetrahydrofuro[3,4-d][1,3]dioxol-4-yl]pyrrolo[2,3-d]pyrimidin-4-amine (88l)

A solution of 4-chloro-7-[(3aR,4R,6R,6aR)-2,2-dimethyl-6-[(1R)-6,7-dichloroisochroman-1-yl]-3a,4,6,6a-tetrahydrofuro[3,4-d][1,3]dioxol-4-yl]pyrrolo[2,3-d]pyrimidine (88k, 70 mg, 0.14 mmol) and NH₃·water (0.54 mL, 14.09 mmol) in 1,4-dioxane (2 mL) was stirred at 120° C. for 16 h. The mixture was concentrated in vacuum to give 7-[(3aR,4R,6R,6aR)-2,2-dimethyl-6-[(1R)-6,7-dichloroisochroman-1-yl]-3a,4,6,6a-tetrahydrofuro[3,4-d][1,3]dioxol-4-yl]pyrrolo[2,3-d]pyrimidin-4-amine (88l, 65 mg, 0.14 mmol, 97% yield) as a white solid. LCMS [M+H]: 477.2.

Step 12. Synthesis of (2R,3R,4S,5S)-2-(4-aminopyrrolo[2,3-d]pyrimidin-7-yl)-5-[(1R)-6,7-dichloroisochroman-1-yl]tetrahydrofuran-3,4-diol (Ex. 88)

A solution of 7-[(3aR,4R,6R,6aR)-2,2-dimethyl-6-[(1R)-6,7-dichloroisochroman-1-yl]-3a,4,6,6a-tetrahydrofuro[3,4-d][1,3]dioxol-4-yl]pyrrolo[2,3-d]pyrimidin-4-amine (88l, 70 mg, 0.15 mmol) and TFA (502 mg, 4.4 mmol) in water (2 mL) was stirred at 25° C. for 1.5 h. LCMS showed the reaction was complete. The mixture was concentrated in vacuum to give the crude product which was purified by prep-HPLC, eluted with water:CH₃CN (0.1% NH₄OH, from 90:10 to 5:95) to give (2R,3R,4S,5S)-2-(4-aminopyrrolo[2,3-d]pyrimidin-7-yl)-5-[(1R)-6,7-dichloroisochroman-1-yl]tetrahydrofuran-3,4-diol (Ex. 88, 5.1 mg, 0.011 mmol, 8% yield) as a white solid. LCMS [M+H]: 437.2. ¹H NMR (400 MHz, DMSO-d₆) δ 8.26 (s, 1H), 7.97-8.07 (m, 1.4H), 7.58 (m, 2H), 7.52 (s, 1H), 6.85 (s, 1H), 6.18-6.20 (d, J=8 Hz, 1H), 5.17-5.30 (m, 2H), 4.88-4.89 (d, J=2.8 Hz, 1H), 4.43-4.47 (m, 2H), 4.23-4.24 (m, 1H), 3.84-3.85 (d, J=4 Hz, 1H), 3.64-3.65 (m, 1H), 2.88-2.95 (m, 1H), 2.67-2.75 (m, 1H). ¹H NMR (400 MHz, DMSO-d₆+D₂O) δ8.25 (s, 1H), 7.59-7.60 (d, J=6.8 Hz, 1H), 7.54 (s, 1H), 6.87-6.88 (d, J=3.2 Hz, 1H), 6.19-6.20 (d, J=7.6 Hz, 1H), 4.90 (s, 1H), 4.47-4.50 (m, 1H), 4.42-4.43 (d, J=4 Hz, 1H), 4.22-4.26 (m, 1H), 3.86-3.87 (d, J=5.2 Hz, 2H), 2.93-2.90 (m, 1H), 2.70-2.75 (m, 1H).

Example 89. Synthesis of (2R,3R,4S,5S)-2-(4-methylpyrrolo[2,3-d]pyrimidin-7-yl)-5-[(7S)-2-chloro-5,7-dihydro-4H-thieno[2,3-c]pyran-7-yl]tetrahydrofuran-3,4-diol; 2,2,2-trifluoroacetic acid (Ex. 89)

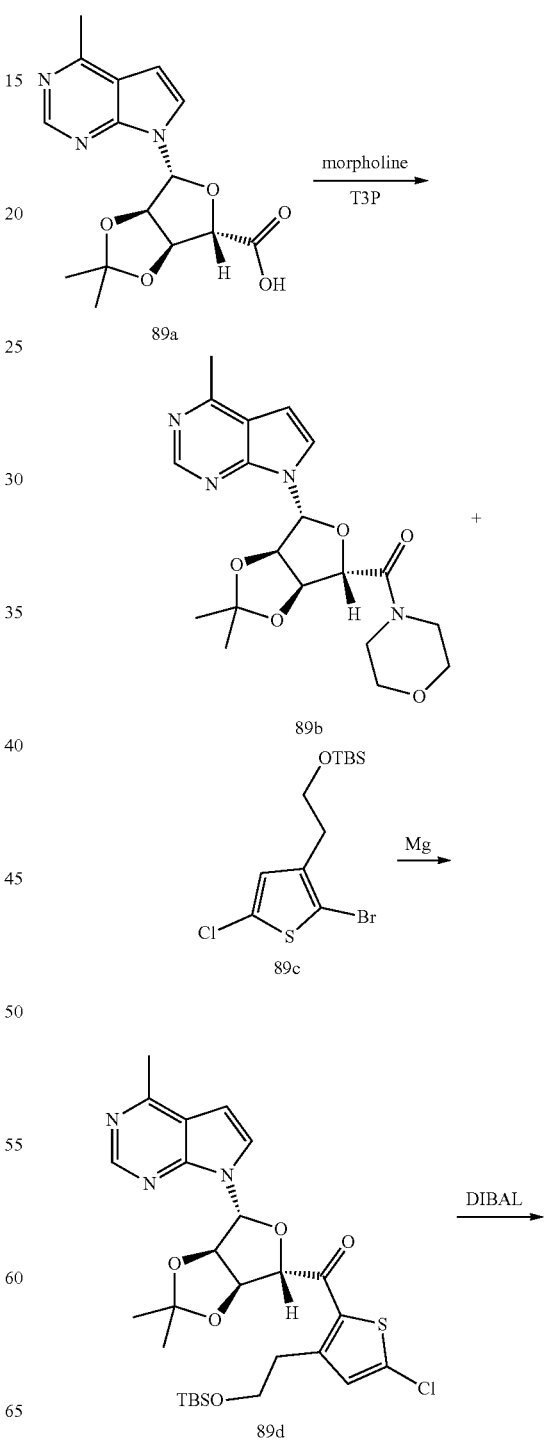

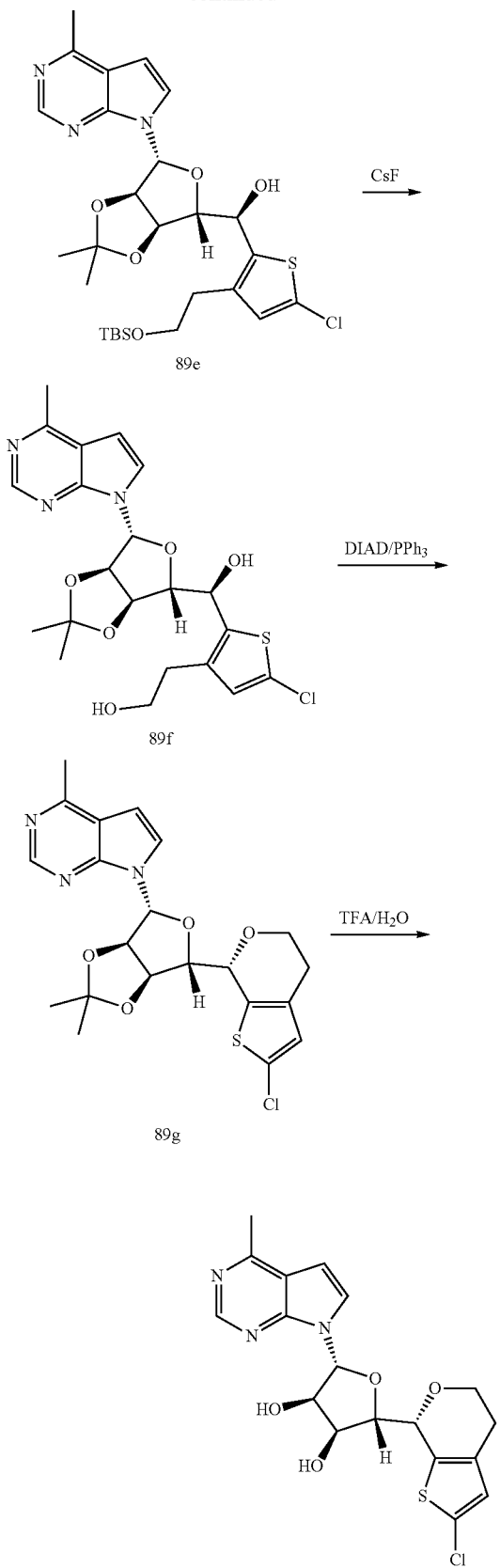

Step 1. Synthesis of morpholino-[(3aR,4R,6S,6aS)-2,2-dimethyl-4-(4-methylpyrrolo[2,3-d]pyrimidin-7-yl)-3a,4,6,6a-tetrahydrofuro[3,4-d][1,3]dioxol-6-yl]methanone (89b)

To a solution of (3aR,4R,6S,6aS)-2,2-dimethyl-4-(4-methylpyrrolo[2,3-d]pyrimidin-7-yl)-3a,4,6,6a-tetrahydrofuro[3,4-d][1,3]dioxole-6-carboxylic acid (89a, 9.0 g, 28.19 mmol) in ethyl acetate (100 mL) was added morpholine (2.46 g, 28.19 mmol) and T3P (35 mL, 28.19 mmol) under ice bath. then the reaction was stirred at rt for 3h. To the solution was added NaHCO$_3$ (aq), adjusting the pH to 8. The mixture was extracted with EA (200 mL×3). The combined organics were concentrated, and the residue was purified by flash column chromatography (PE:EA=5:1 to 1:1) to give morpholino-[(3aR,4R,6S,6aS)-2,2-dimethyl-4-(4-methylpyrrolo[2,3-d]pyrimidin-7-yl)-3a,4,6,6a-tetrahydrofuro[3,4-d][1,3]dioxol-6-yl]methanone (89b, 9.5 g, 24.2 mmol, 86% yield) as a yellow oil. LCMS [M+H]: 389.3.

Step 2. Synthesis of 3-[2-[tert-butyl(dimethyl)silyl]oxyethyl]-5-chloro-2-thienyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone 89d)

Magnesium (123 mg, 5.06 mmol) in a 20 mL vial was etched with a spatula and stirred vigorously, then heat-gun dried under vacuum and back-filled with nitrogen when cool. A solution of 2-(2-bromo-5-chloro-3-thienyl)ethoxy-tert-butyl-dimethyl-silane (89c, 1.5 g, 4.22 mmol) in THF (1 mL) was added, followed by diisobutylaluminum hydride, 1M in toluene (0.05 mL, 0.05 mmol). After 4 h the solution was dark and most of the magnesium was consumed, and was used as 0.82 M solution of bromo-[3-[2-[tert-butyl(dimethyl)silyl]oxyethyl]-5-chloro-2-thienyl]magnesium.
Into a dry flask was placed morpholino-[(3aR,4R,6S,6aS)-2,2-dimethyl-4-(4-methylpyrrolo[2,3-d]pyrimidin-7-yl)-3a,4,6,6a-tetrahydrofuro[3,4-d][1,3]dioxol-6-yl]methanone (89b, 578.37 mg, 1.49 mmol), which had been dried under vacuum, and 3 mL THF. The solution was cooled in an ice bath and bromo-[3-[2-[tert-butyl(dimethyl)silyl]oxyethyl]-5-chloro-2-thienyl]magnesium (2.72 mL, 2.23 mmol) added dropwise via syringe. The ice bath was removed, and the reaction stirred for 1 h. An additional portion of bromo-[3-[2-[tert-butyl(dimethyl)silyl]oxyethyl]-5-chloro-2-thienyl]magnesium (0.91 mL, 0.75 mmol) was added and stirred 1 h before quenching with EtOAc. The reaction was poured into NH$_4$Cl, the organics were separated, and the aqueous layer extracted with EtOAc. The organic layers were combined, washed with water followed by brine and dried over Na$_2$SO$_4$. The solvent was evaporated in vacuo and the residue purified by flash column chromatography to give [3-[2-[tert-butyl(dimethyl)silyl]oxyethyl]-5-chloro-2-thienyl]-[(3aR,4R,6S,6aS)-2,2-dimethyl-4-(4-methylpyrrolo[2,3-d]pyrimidin-7-yl)-3a,4,6,6a-tetrahydrofuro[3,4-d][1,3]dioxol-6-yl]methanone (89d, 320 mg, 0.553 mmol, 37% yield).

Step 3. Synthesis of (R)-[3-[2-[tert-butyl(dimethyl)silyl]oxyethyl]-5-chloro-2-thienyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methanol (89e)

A 50 mL round bottom flask containing a solution of [3-[2-[tert-butyl(dimethyl)silyl]oxyethyl]-5-chloro-2-thienyl]-[(3aR,4R,6S,6aS)-2,2-dimethyl-4-(4-methylpyrrolo[2,3-d]pyrimidin-7-yl)-3a,4,6,6a-tetrahydrofuro[3,4-d][1,3]dioxol-6-yl]methanone (89d, 328 mg, 0.57 mmol) in toluene (6 mL) was sparged with nitrogen for 5 min then cooled to −78° C. and charged with diisobutylaluminum hydride, 1M in toluene (1.18 mL, 1.42 mmol) dropwise over 5 min. The yellow solution was stirred at −78° C. for 75 min. The reaction mixture was warmed to 0° C., slowly charged with water (80 μL), 15% sodium hydroxide (80 μL), and water (200 μL), and stirred at rt for 15 min. The mixture was then diluted with ether, dried with MgSO₄, stirred for 15 min, and filtered. The filtrate was concentrated under reduced pressure and purified by flash column chromatography (0 to 45% EtOAc in hexanes, wet-loaded in DCM/hexanes) to yield (S)-[3-[2-[tert-butyl(dimethyl)silyl]oxyethyl]-5-chloro-2-thienyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methanol (61 mg, 0.105 mmol, 18.5% yield) and (R)-[3-[2-[tert-butyl(dimethyl)silyl]oxyethyl]-5-chloro-2-thienyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methanol (89e, 120 mg, 0.207 mmol, 36.5% yield) as fluffy white solids. ¹H NMR (500 MHz, methanol-d4) δ 8.59 (d, J=5.0 Hz, 1H), 7.92 (d, J=3.8 Hz, 1H), 6.83 (d, J=0.8 Hz, 1H), 6.70 (dd, J=3.8, 6.2 Hz, 1H), 6.50-6.25 (m, 1H), 5.26-5.11 (m, 1H), 5.09-5.02 (m, 1H), 4.45 (ddd, J=2.5, 4.5, 15.6 Hz, 1H), 3.75 (q, J=6.6 Hz, 2H), 2.72 (dt, J=6.5, 19.3 Hz, 2H), 2.01 (s, 2H), 1.61 (d, J=4.9 Hz, 3H), 1.35 (d, J=7.4 Hz, 3H), 0.83 (d, J=9.7 Hz, 8H), −0.06 (d, J=4.5 Hz, 5H).

Step 4. Synthesis of 2-[5-chloro-2-[(R)-hydroxy-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methyl]-3-thienyl]ethanol (89f)

Into a round bottom flask was placed (R)-[3-[2-[tert-butyl(dimethyl)silyl]oxyethyl]-5-chloro-2-thienyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methanol (89e, 123 mg, 0.21 mmol), DMSO (5 mL), and cesium fluoride (98 mg, 0.64 mmol). The mixture was stirred for 1 h, then purified directly by reverse-phase chromatography (10%-70% MeCN/water/0.1% TFA). Product fractions were lyophilized to give 2-[5-chloro-2-[(R)-hydroxy-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methyl]-3-thienyl]ethanol; 2,2,2-trifluoroacetic acid (89f, 70 mg, 0.120 mmol, 56% yield). ¹H NMR (500 MHz, Methanol-d4) δ 8.96 (d, J=9.5 Hz, 1H), 8.33 (dd, J=3.9, 28.5 Hz, 1H), 7.15 (dd, J=3.9, 8.6 Hz, 1H), 6.61 (dd, J=3.7, 18.7 Hz, 1H), 5.27 (d, J=3.4 Hz, 1H), 5.18 (ddd, J=3.0, 5.9, 8.5 Hz, 1H), 5.12 (dd, J=1.9, 5.9 Hz, 1H), 4.58-4.44 (m, 1H), 3.79-3.63 (m, 2H), 2.96 (d, J=4.9 Hz, 3H), 2.86-2.66 (m, 2H), 1.63 (s, 3H), 1.39 (s, 3H). LCMS: LCMS [M+H]: 466.0.

Step 5. Synthesis of 4-methyl-7-[(3aR,4R,6S,6aR)-2,2-dimethyl-6-[(7S)-2-chloro-5,7-dihydro-4H-thieno[2,3-c]pyran-7-yl]-3a,4,6,6a-tetrahydrofuro[3,4-d][1,3]dioxol-4-yl]pyrrolo[2,3-d]pyrimidine (89 g)

Into a vial was placed 2-[5-chloro-2-[(R)-hydroxy-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methyl]-3-thienyl]ethanol (89f, 110 mg, 0.19 mmol) in THF (2 mL). Pyridine (0.03 mL, 0.38 mmol) was added and the mixture stirred for 20 minutes then triphenylphosphine (99.5 mg, 0.38 mmol) and diisopropyl azodicarboxylate (0.07 mL, 0.38 mmol) was added and stirred for 2.5 h. Additional diisopropyl azodicarboxylate (0.07 mL, 0.38 mmol) and triphenylphosphine (99.5 mg, 0.38 mmol) were added. After 1 h, the solvent was evaporated and the residue purified by flash column chromatography (0-60% EtOAc/hexane) to yield 4-methyl-7-[(3aR,4R,6S,6aR)-2,2-dimethyl-6-[(7S)-2-chloro-5,7-dihydro-4H-thieno[2,3-c]pyran-7-yl]-3a,4,6,6a-tetrahydrofuro[3,4-d][1,3]dioxol-4-yl]pyrrolo[2,3-d]pyrimidine (89 g, 94.5 mg, 0.21 mmol, 111% yield). LCMS [M+H]: 448.1.

Step 6. Synthesis of (2R,3R,4S,5S)-2-(4-methylpyrrolo[2,3-d]pyrimidin-7-yl)-5-[(7S)-2-chloro-5,7-dihydro-4H-thieno[2,3-c]pyran-7-yl]tetrahydrofuran-3,4-diol; 2,2,2-trifluoroacetic acid (Ex. 89)

Into a vial was placed 4-methyl-7-[(3aR,4R,6S,6aR)-2,2-dimethyl-6-[(7S)-2-chloro-5,7-dihydro-4H-thieno[2,3-c]pyran-7-yl]-3a,4,6,6a-tetrahydrofuro[3,4-d][1,3]dioxol-4-yl]pyrrolo[2,3-d]pyrimidine (89 g, 94.5 mg, 0.21 mmol) in water (0.50 mL) and 2,2,2-trifluoroacetic acid (0.16 mL, 2.11 mmol) added. The reaction was stirred for 3 h, then diluted with EtOAc and NaHCO₃. The organics were separated and washed with water and brine. The solvent was evaporated in vacuo, and the residue was purified by reverse phase chromatography (0-70% MeCN/water/0.1% TFA) to yield (2R,3R,4S,5S)-2-(4-methylpyrrolo[2,3-d]pyrimidin-7-yl)-5-[(7S)-2-chloro-5,7-dihydro-4H-thieno[2,3-c]pyran-7-yl]tetrahydrofuran-3,4-diol; 2,2,2-trifluoroacetic acid (Ex. 89, 2.3 mg, 0.0042 mmol, 2% yield). ¹H NMR (500 MHz, Methanol-d4) δ 8.78 (s, 1H), 7.92 (s, 1H), 6.97 (s, 1H), 6.76 (s, 1H), 6.46 (d, J=7.5 Hz, 1H), 4.22 (dd, J=5.4, 12.1 Hz, 2H), 3.98-3.76 (m, 1H), 2.84 (s, 5H). LCMS [M+H]: 408.0.

Example 90. Synthesis of (2R,3R,4S,5S)-2-(4-aminopyrrolo[2,3-d]pyrimidin-7-yl)-5-[(7S)-2-chloro-5,7-dihydro-4H-thieno[2,3-c]pyran-7-yl]tetrahydrofuran-3,4-diol; 2,2,2-trifluoroacetic acid (Ex. 90)

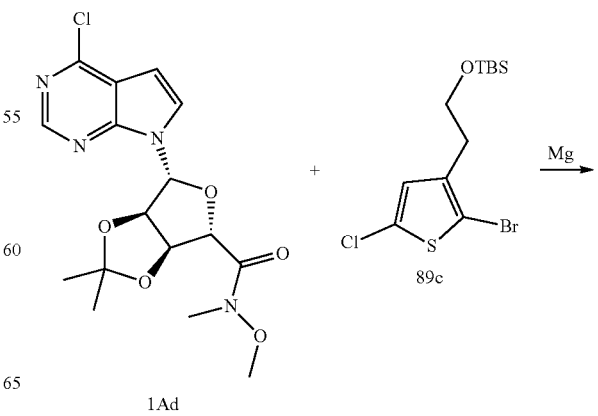

173
-continued
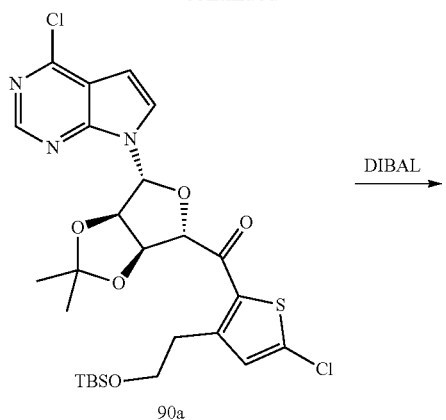
90a
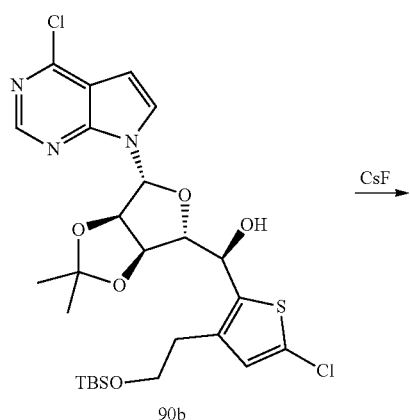
90b
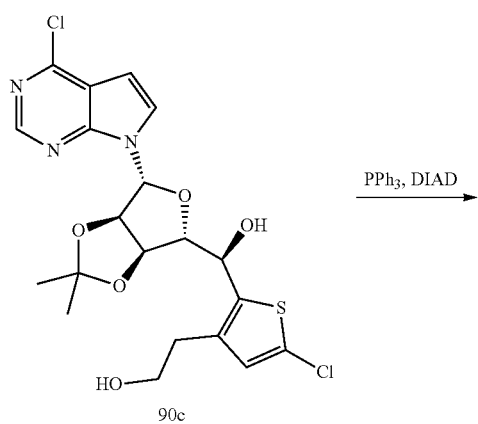
90c
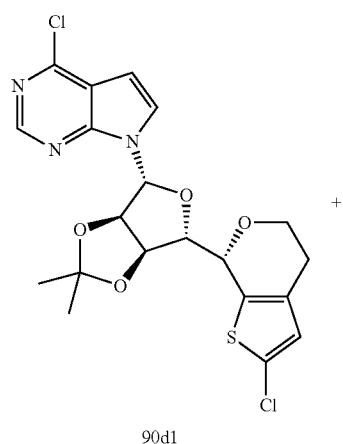
90d1
DIBAL →
CsF →
PPh₃, DIAD →
+
174
-continued
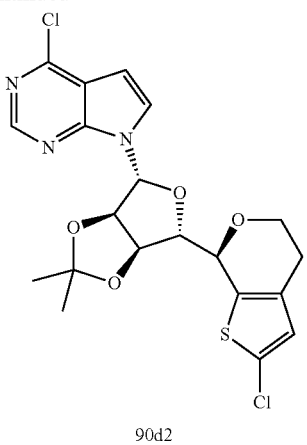
90d2
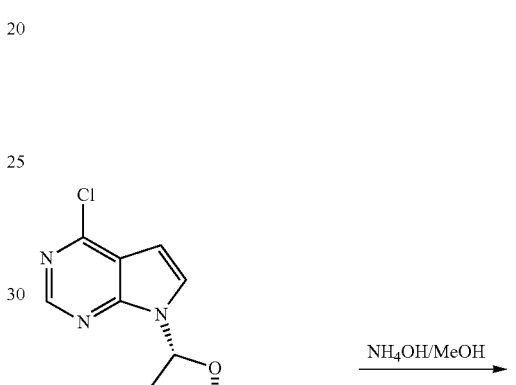
90d1
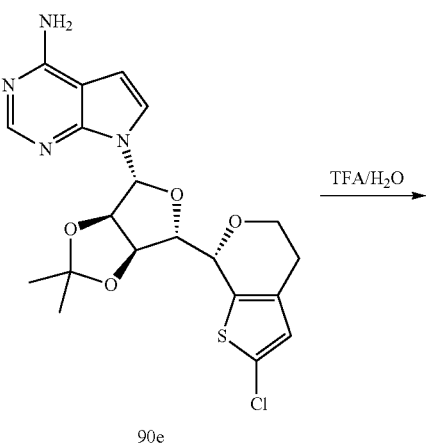
90e
NH₄OH/MeOH →
TFA/H₂O →

-continued

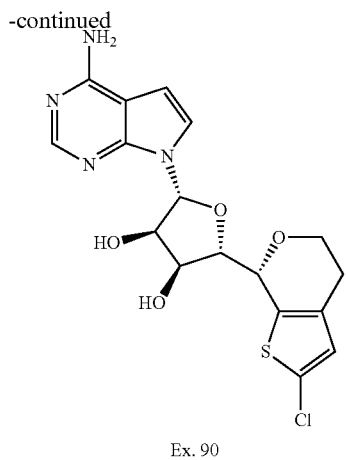

Ex. 90

Step 1. Synthesis of [3-[2-[tert-butyl(dimethyl)silyl]oxyethyl]-5-chloro-2-thienyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (90a)

A 20 mL vial containing magnesium (43.52 mg, 1.79 mmol) and a stir bar was heat-gun dried under vacuum and back-filled with nitrogen when cool. A solution of 2-(2-bromo-5-chloro-3-thienyl)ethoxy-tert-butyl-dimethyl-silane (89c, 0.07 mL, 1.79 mmol) in 2 mL THF was added, followed by diisobutylalumanylium hydride (0.02 mL, 0.02 mmol). The reaction was stirred for 5 h at room temperature until most of the magnesium was consumed. The solution was cooled to −78° C. and (3aR,4R,6S,6aS)-4-(4-chloropyrrolo[2,3-d]pyrimidin-7-yl)-N-methoxy-N,2,2-trimethyl-3a,4,6,6a-tetrahydrofuro[3,4-d][1,3]dioxole-6-carboxamide (1Ad, 527 mg, 1.38 mmol) in THF (3 mL) was added and stirred cold 30 minutes before warming to room temperature. The reaction was stirred at rt for 3 h, then cooled back to −78° C. and quenched with EtOAc followed by NH₄Cl. The mixture was warmed to room temperature. The organics were separated, washed with water and brine and dried over Na₂SO₄. The residue was purified twice by flash column chromatography (0-70% EtOAc/hexane) to give [3-[2-[tert-butyl(dimethyl)silyl]oxyethyl]-5-chloro-2-thienyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (90a, 104 mg, 0.17 mmol, 13% yield). LCMS [M+H]: 599.8.

Step 2. Synthesis of (R)-[3-[2-[tert-butyl(dimethyl)silyl]oxyethyl]-5-chloro-2-thienyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (90b)

A solution of [3-[2-[tert-butyl(dimethyl)silyl]oxyethyl]-5-chloro-2-thienyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (90a, 104 mg, 0.17 mmol) in toluene (2 mL) was sparged with Ar for 5 min, cooled to −78° C., and then charged with diisobutylaluminum hydride, 1M in toluene (0.36 mL, 0.44 mmol) dropwise over 5 min. The yellow solution was stirred at −78° C. for 75 min. The reaction mixture was warmed up to 0° C., slowly charged with water (80 μL), 15% sodium hydroxide (80 μL), and water (200 μL), and stirred at rt for 15 min. The mixture was then diluted with EtOAc, the organics were separated, and the aqueous phase extracted again with EtOAc. The organics were combined, washed with water and brine, dried with MgSO₄, and filtered. The filtrate was concentrated under reduced pressure and purified by flash column chromatography (0-45% EtOAc/hexanes, wet-loaded in DCM+hexanes) to yield (R)-[3-[2-[tert-butyl(dimethyl)silyl]oxyethyl]-5-chloro-2-thienyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (90b, 97 mg, 0.162 mmol, 93% yield) as a fluffy white solid. ¹H NMR (500 MHz, Methanol-d4) δ 8.59 (d, J=5.0 Hz, 1H), 7.92 (d, J=3.8 Hz, 1H), 6.83 (d, J=0.8 Hz, 1H), 6.70 (dd, J=3.8, 6.2 Hz, 1H), 6.50-6.25 (m, 1H), 5.26-5.11 (m, 1H), 5.09-5.02 (m, 1H), 4.45 (ddd, J=2.5, 4.5, 15.6 Hz, 1H), 3.75 (q, J=6.6 Hz, 2H), 2.72 (dt, J=6.5, 19.3 Hz, 2H), 1.61 (d, J=4.9 Hz, 3H), 1.35 (d, J=7.4 Hz, 3H), 0.83 (d, J=9.7 Hz, 9H), −0.06 (d, J=4.5 Hz, 6H).

Step 3. Synthesis of 2-[5-chloro-2-[(R)-hydroxy-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methyl]-3-thienyl]ethanol (90c)

To a solution of (R)-[3-[2-[tert-butyl(dimethyl)silyl]oxyethyl]-5-chloro-2-thienyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (90b, 202 mg, 0.34 mmol) in DMSO (5 mL), cesium fluoride (154 mg, 1.01 mmol) added and the reaction stirred for 1 h. The mixture was purified directly by reverse phase chromatography (10%-70% MeCN/water/0.1% TFA) to give 2-[5-chloro-2-[(R)-hydroxy-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methyl]-3-thienyl]ethanol; 2,2,2-trifluoroacetic acid (90c, 62 mg, 0.103 mmol, 31% yield). LCMS [M+H]: 487.5.

Step 4. Synthesis of 4-chloro-7-[(3aR,4R,6S,6aR)-2,2-dimethyl-6-[(7R)-2-chloro-5,7-dihydro-4H-thieno[2,3-c]pyran-7-yl]-3a,4,6,6a-tetrahydrofuro[3,4-d][1,3]dioxol-4-yl]pyrrolo[2,3-d]pyrimidine (90d1) and (90d2)

To a solution of 2-[5-chloro-2-[(R)-hydroxy-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methyl]-3-thienyl]ethanol (90c, 58 mg, 0.12 mmol) in THF (2 mL), was added triphenylphosphine (61.86 mg, 0.24 mmol) and diisopropyl azodicarboxylate (0.05 mL, 0.24 mmol). After 2.5 h diisopropyl azodicarboxylate (0.05 mL, 0.24 mmol) and triphenylphosphine (61.86 mg, 0.24 mmol) were added. After 1 h, the reaction was cooled to room temperature and partitioned between EtOAc and water. The layers were separated, and the aqueous layer again extracted with EtOAc and the organics were combined, washed with water and brine, dried over MgSO₄, filtered, and concentrated in vacuo. The residue was purified by flash column chromatography (0-80% EtOAc/DCM). Fractions containing product were collected and a second set containing trifluoromethyl ester of the primary alcohol were also collected separately. Those containing the ester were combined and taken up in THF, NaHCO₃ was added and stirred for 2 h after which they were diluted with EtOAc, the organics washed with water, brine and the solvent evaporated to give 90c, 2-[5-chloro-2-[(R)-hydroxy-[(3aR,4R,6R,6aR)-4-(4- chloropyrrolo[2,3-d]pyrimidin-7-yl)-2,2-dimethyl-3a,4,6,6a-tetrahydrofuro[3,4-d][1,3]dioxol-6-yl]methyl]-3-thienyl]ethanol. This was then subjected to the original reaction conditions for 3 h, worked up and purified as described above, and combined with the product previously obtained to give 4-chloro-7-[(3aR,4R,6S,6aR)-2,2-dimethyl-6-[(7S)-2-chloro-5,7-dihydro-4H-thieno[2,3-c]pyran-7-yl]-3a,4,6,6a-tetrahydrofuro[3,4-d][1,3]dioxol-4-yl]pyrrolo[2,3-d]pyrimidine (90d1, 15 mg, 0.032 mmol, 27% yield); LCMS (M+H): 468.1, and 4-chloro-7-((3aR,4R,6S,6aR)-6-((7R)-2-chloro-4,7-dihydro-5H-thieno[2,3-c]pyran-7-yl)-2,2-dimethyltetrahydrofuro[3,4-d][1,3]dioxol-4-yl)-7H-pyrrolo[2,3-d]pyrimidine (90d2, 6 mg, 12%).

Step 5. Synthesis of 7-[(3aR,4R,6S,6aR)-2,2-dimethyl-6-[(7S)-2-chloro-5,7-dihydro-4H-thieno[2,3-c]pyran-7-yl]-3a,4,6,6a-tetrahydrofuro[3,4-d][1,3]dioxol-4-yl]pyrrolo[2,3-d]pyrimidin-4-amine (90e)

To a solution of 4-chloro-7-[(3aR,4R,6S,6aR)-2,2-dimethyl-6-[(7S)-2-chloro-5,7-dihydro-4H-thieno[2,3-c]pyran-7-yl]-3a,4,6,6a-tetrahydrofuro[3,4-d][1,3]dioxol-4-yl]pyrrolo[2,3-d]pyrimidine (90d1, 15 mg, 0.03 mmol) in 1,4-dioxane (1 mL), ammonium hydroxide (0.1 mL, 2.4 mmol) was added, the vial capped and placed in the microwave for 14 h at 120° C. The solvent was evaporated in vacuo, EtOAc (1 mL) added and the mixture was evaporated in vacuo twice to give 7-[(3aR,4R,6S,6aR)-2,2-dimethyl-6-[(7S)-2-chloro-5,7-dihydro-4H-thieno[2,3-c]pyran-7-yl]-3a,4,6,6a-tetrahydrofuro[3,4-d][1,3]dioxol-4-yl]pyrrolo[2,3-d]pyrimidin-4-amine (90e, 14 mg, 0.031 mmol, 97% yield). LCMS [M+H]: 449.0/450.9.

Step 6. Synthesis of (2R,3R,4S,5S)-2-(4-aminopyrrolo[2,3-d]pyrimidin-7-yl)-5-[(7S)-2-chloro-5,7-dihydro-4H-thieno[2,3-c]pyran-7-yl]tetrahydrofuran-3,4-diol; 2,2,2-trifluoroacetic acid (Ex. 90)

A solution of 7-[(3aR,4R,6S,6aR)-2,2-dimethyl-6-[(7S)-2-chloro-5,7-dihydro-4H-thieno[2,3-c]pyran-7-yl]-3a,4,6,6a-tetrahydrofuro[3,4-d][1,3]dioxol-4-yl]pyrrolo[2,3-d]pyrimidin-4-amine (90e, 6.0 mg, 0.01 mmol) in water (1 mL) and 2,2,2-trifluoroacetic acid; TFA (0.0 mL, 0.01 mmol was stirred for 2 h and purified by reverse phase HPLC to yield (2R,3R,4S,5S)-2-(4-aminopyrrolo[2,3-d]pyrimidin-7-yl)-5-[(7S)-2-chloro-5,7-dihydro-4H-thieno[2,3-c]pyran-7-yl]tetrahydrofuran-3,4-diol; 2,2,2-trifluoroacetic acid (Ex. 90, 1.1 mg, 0.0021 mmol, 16% yield). $^1$H NMR (500 MHz, Methanol-d4) δ 8.26 (s, 1H), 7.80-7.56 (m, 1H), 6.96 (d, J=3.7 Hz, 1H), 6.77 (s, 1H), 6.37 (d, J=7.6 Hz, 1H), 4.65 (dd, J=5.1, 7.5 Hz, 1H), 4.31 (dd, J=5.9, 11.1 Hz, 1H), 4.25-4.17 (m, 2H), 3.83 (td, J=3.6, 11.1 Hz, 1H), 2.91-2.75 (m, 1H), 2.59 (d, J=16.2 Hz, 1H). Water peak at 5 ppm obscuring multiplet. LCMS [M+H]: 409.1.

Example 91. Synthesis of (2R,3R,4S,5S)-2-(4-aminopyrrolo[2,3-d]pyrimidin-7-yl)-5-[(7R)-2-chloro-5,7-dihydro-4H-thieno[2,3-c]pyran-7-yl]tetrahydrofuran-3,4-diol; 2,2,2-trifluoroacetic acid (Ex. 91)

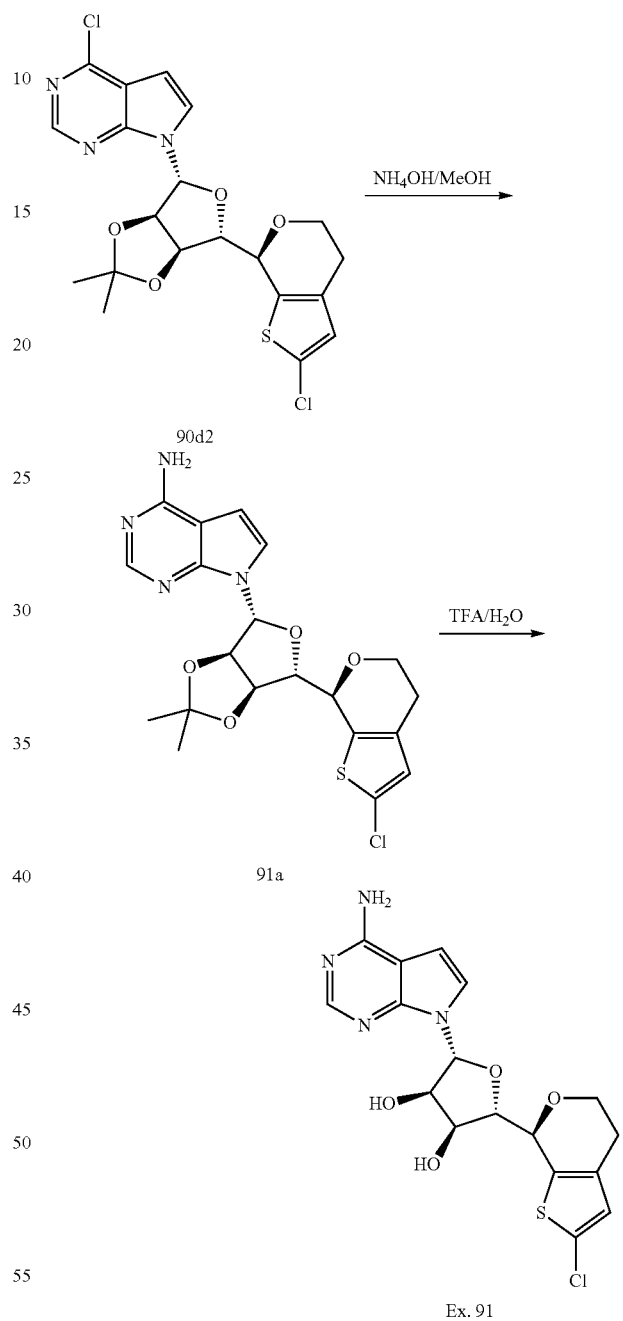

Starting from 4-chloro-7-((3aR,4R,6S,6aR)-6-((7R)-2-chloro-4,7-dihydro-5H-thieno[2,3-c]pyran-7-yl)-2,2-dimethyltetrahydrofuro[3,4-d][1,3]dioxol-4-yl)-7H-pyrrolo[2,3-d]pyrimidine (90d2) and following the same procedures used for Ex. 90, (2R,3R,4S,5S)-2-(4-amino-7H-pyrrolo[2,3-d]pyrimidin-7-yl)-5-((S)-2-chloro-4,7-dihydro-5H-thieno[2,3-c]pyran-7-yl)tetrahydrofuran-3,4-diol (Ex. 91, 1.1 mg, 7% yield) was obtained. LCMS [M+H]: 409.0. $^1$H NMR (500 MHz, Methanol-d4) δ 8.22 (s, 1H), 7.70 (d, J=3.8 Hz, 1H), 6.90 (d, J=3.8 Hz, 1H), 6.71 (s, 1H), 6.31 (d, J=6.1 Hz, 1H), 4.98 (d, J=2.4 Hz, 1H), 4.50 (t, J=5.7 Hz, 1H), 4.41 (dd, J=3.1, 5.2 Hz, 1H), 4.39-4.28 (m, 2H), 3.85 (td, J=3.5, 11.2 Hz, 1H), 2.78 (d, J=17.0 Hz, 1H), 2.55 (d, J=16.1 Hz, 1H).
Example 94. Synthesis of (2R,3R,4S,5S)-2-(4-methylpyrrolo [2,3-d] pyrimidin-7-yl)-5-[(1R,4R)-6-chloro-4-fluoro-isochroman-1-yl]tetrahydrofuran-3,4-diol; 2,2,2-trifluoroacetic acid (Ex. 94)
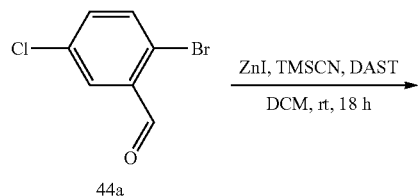
44a
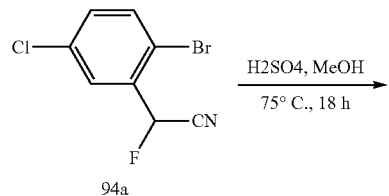
94a
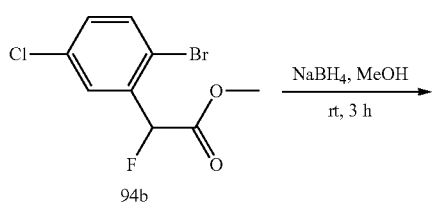
94b
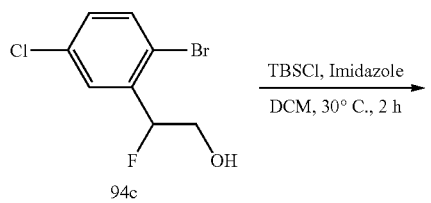
94c
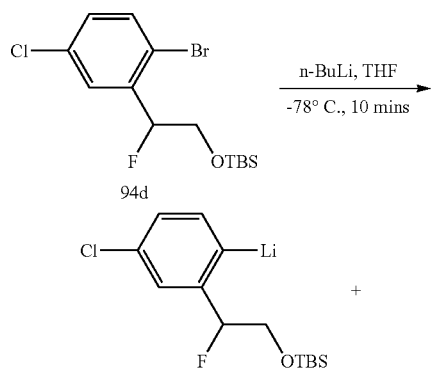
94d
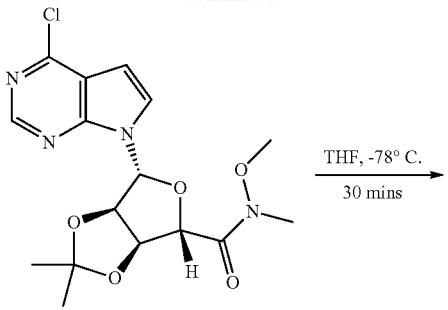
1Ad
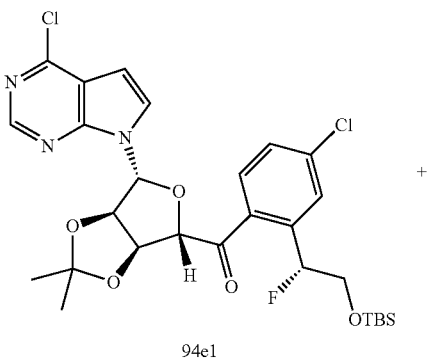
94e1
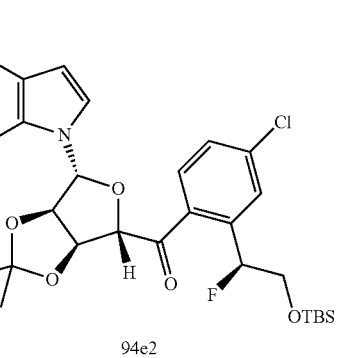
94e2
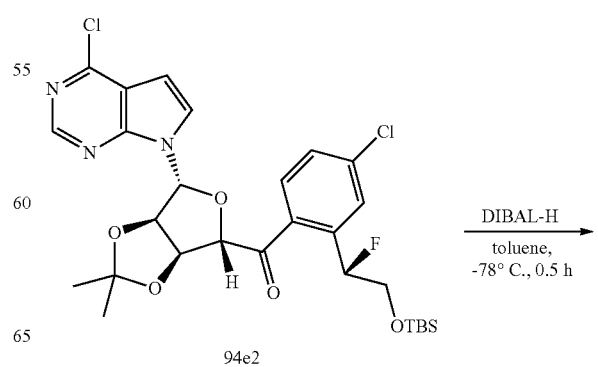
94e2

-continued

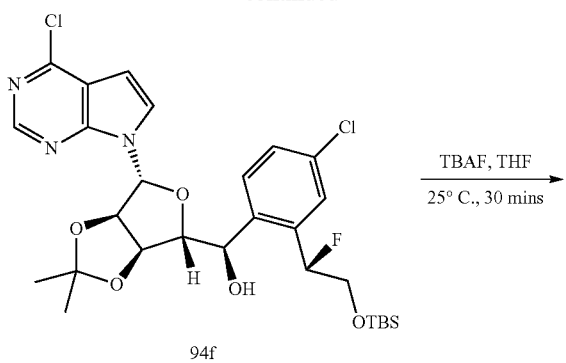
94f

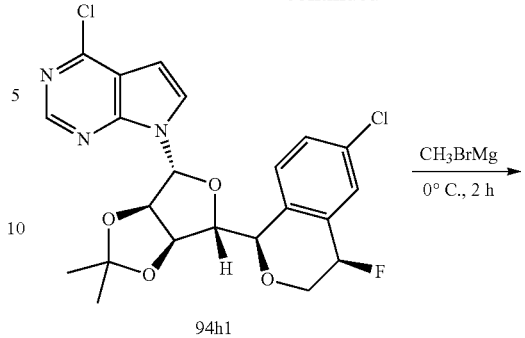
94h1

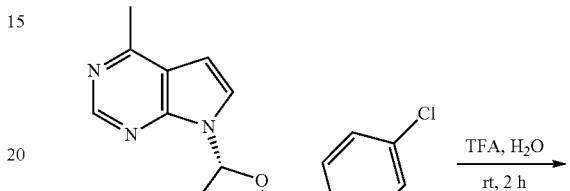
94i

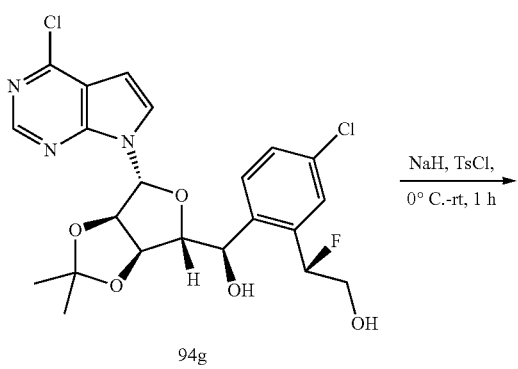
94g

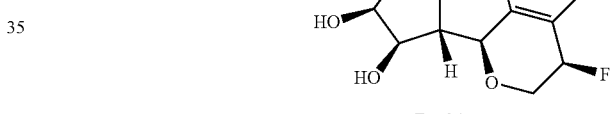

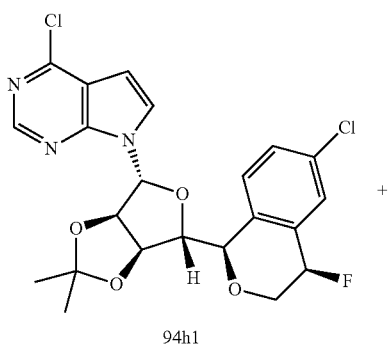
94h1

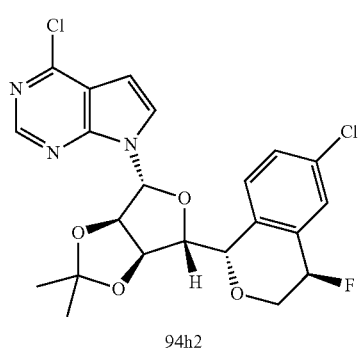
94h2

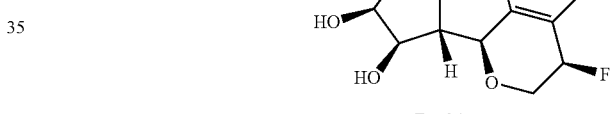
Ex. 94

Step 1. Synthesis of 2-(2-bromo-5-chloro-phenyl)-2-fluoro-acetonitrile (94a)

To a solution of 2-bromo-5-chloro-benzaldehyde (44a, 8000 mg, 31.9 mmol) and zinc iodide (21 mg, 0.07 mmol) in DCM (100 mL) was added trimethylsilylformonitrile (3360 mg, 33.9 mmol) at 0° C. The mixture was stirred at 25° C. for 18 h. Then DAST (5600 mg, 34.7 mmol) in DCM (80 mL) was added and the mixture was cooled to 0° C. The mixture was stirred at 25° C. for 18 h. The mixture was washed with HCl (50 mL, 1M), $H_2O$ (50 mL) and $NaHCO_3$ (50 mL, aq). The reaction mixture was dried over $MgSO_4$, filtered, and concentrated in vacuum. The crude product was purified by silica gel column chromatography to give 2-(2-bromo-5-chloro-phenyl)-2-fluoro-acetonitrile (94a, 4670 mg, 16.10 mmol, 50.5% yield). $^1H$ NMR (400 MHz, DMSO-$d_6$): δ 7.87-7.84 (m, 1H), 7.81 (s, 1H), 7.63-7.61 (m, 1H), 6.55 (d, J=43.6, 1H).

Step 2. Synthesis of 2-(2-bromo-5-chloro-phenyl)-2-fluoro-acetate (94b)

To a solution of 2-(2-bromo-5-chloro-phenyl)-2-fluoro-acetonitrile (94a, 4.47 g, 17.99 mmol) in methanol (50 mL) was added, dropwise, sulfuric acid (10 mL, 187.6 mmol) at 75° C. The reaction was stirred at 75° C. for 18 h. TLC (PE, $R_f$=0.3) showed the reaction was complete. The mixture was quenched with NaHCO$_3$ (aq). The mixture was concentrated in vacuum and extracted with EA (2×100 mL). The combined organic layers were dried over MgSO$_4$. The solvent was removed in vacuum to afforded methyl 2-(2-bromo-5-chloro-phenyl)-2-fluoro-acetate (94b, 4.8 g, 14.7 mmol, 73% yield). $^1$H NMR (400 MHz, DMSO-d$_6$): δ 7.67 (d, J=8.8, 1H), 7.60 (d, J=2, 1H), 7.53-7.50 (m, 1H), 6.36 (d, J=45, 1H), 3.752 (s, 3H).

Step 3. Synthesis of 2-(2-bromo-5-chloro-phenyl)-2-fluoro-ethanol (94c)

To a solution of methyl 2-(2-bromo-5-chloro-phenyl)-2-fluoro-acetate (94b, 4.8 g, 17.05 mmol) in methanol (40 mL) was added NaBH$_4$ (1.29 g, 34.1 mmol). The reaction was stirred at 25° C. for 2 h. TLC (PE:EA=4:1, $R_f$=0.5) showed the reaction was complete. The mixture was quenched with HCl (1N). Then, the mixture was concentrated in vacuum and extracted with EA (2×100 mL). The combined organic layers were dried over MgSO$_4$. The solvent was removed in vacuum to afford 2-(2-bromo-5-chloro-phenyl)-2-fluoro-ethanol (94c, 3.8 g, 15 mmol, 80% yield). $^1$H NMR (400 MHz, DMSO-d$_6$): δ 7.69 (d, J=8.4, 1H), 7.60 (d, J=2.8, 1H), 7.43-7.40 (m, 1H), 5.78-5.76 (m, 1H), 5.40-5.37 (m, 1H), 3.83-3.65 (m, 2H).

Step 4. Synthesis of [2-(2-bromo-5-chloro-phenyl)-2-fluoro-ethoxy]-tert-butyl-dimethyl-silane (94d)

To a solution of 2-(2-bromo-5-chloro-phenyl)-2-fluoro-ethanol (94c, 3.8 g, 14.99 mmol) and imidazole (2.04 g, 29.98 mmol) in DCM (50 mL) was slowly added t-butyl-chlorodiphenylsilane (2.71 g, 17.99 mmol). The reaction mixture was stirred at 30° C. for 2 h. TLC (PE, $R_f$=0.4) showed the reaction was complete. The solvent was removed in vacuum and the crude product was purified by silica gel column chromatography (PE) to give [2-(2-bromo-5-chloro-phenyl)-2-fluoro-ethoxy]-tert-butyl-dimethyl-silane (94d, 5 g, 13.6 mmol, 91% yield) as a pale yellow oil. $^1$H NMR (400 MHz, DMSO-d$_6$): δ 7.69 (d, J=8.4, 1H), 7.48-7.41 (m, 2H), 5.82-5.71 (m, 1H), 4.05-3.85 (m, 2H), 0.82 (s, 9H), 0.00-0.06 (m, 6H).

Step 5. Synthesis of [4-chloro-2-[(1R)-2-[tert-butyl(dimethyl)silyl]oxy-1-fluoro-ethyl]-phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (94e1) and [4-chloro-2-[(1S)-2-[tert-butyl(dimethyl)silyl]oxy-1-fluoro-ethyl]phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (94e2)

To a solution of [2-(2-bromo-5-chloro-phenyl)-2-fluoro-ethoxy]-tert-butyl-dimethyl-silane (3.63 g, 9.87 mmol) in dry THF (8 mL) was stirred at −78° C. under Ar. The n-BuLi (4.7 mL, 11.76 mmol) was added and the reaction mixture was stirred for 10 mins. Then (3aR,4R,6S,6aS)-4-(4-chloropyrrolo2,3-d]pyrimidin-7-yl)-N-methoxy-N,2,2-trimethyl-3a,4,6,6a-tetrahydrofuro[3,4-d][1,3]dioxole-6-carboxamide (1Ad, 1.8 g, 4.7 mmol) in anhydrous THF (2.00 mL) was added. The mixture was stirred at −78° C. for 30 mins. TLC (PE:EA=5:1, $R_f$=0.5) showed the reaction was complete. The reaction was quenched with CH$_3$COOH. The mixture was combined with another batch to work up. The reaction was extracted in EtOAc (100 mL×3) and the organics were washed with water (50 mL×3), then saturated brine (50 mL×3). The organics were dried over MgSO$_4$, filtered, and concentrated in vacuum to give crude product which was further purified by SFC to give [4-chloro-2-[(1S)-2-[tert-butyl(dimethyl)silyl]oxy-1-fluoro-ethyl]phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (94e2, 300 mg, 0.49 mmol, 10.5% yield). LCMS [M+H]: 610.2. $^1$H NMR (400 MHz, DMSO-d$_6$): δ 8.59 (s, 1H), 8.09-8.02 (m, 2H), 7.85-7.75 (m, 2H), 6.84 (d, J=3.6, 1H), 6.69 (s, 1H), 5.62-5.54 (m, 2H), 5.50-5.37 (m, 1H), 3.97-3.74 (m, 2H), 1.74 (s, 3H), 1.46 (s, 3H), 0.90 (s, 9H), −0.02 (d, J=13.6, 6H) and [4-chloro-2-[(1R)-2-[tert-butyl(dimethyl)silyl]oxy-1-fluoro-ethyl]-phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (94e1, 800 mg, 1.31 mmol, 28% yield). LCMS [M+H]: 610.2. $^1$H NMR (400 MHz, DMSO-d$_6$): δ 8.52 (s, 1H), 7.77 (d, J=9.2, 1H), 7.69 (d, J=3.6, 1H), 7.28-7.26 (m, 1H), 6.48-6.46 (m, 2H), 5.77 (s, 1H), 5.71-5.51 (m, 2H), 5.44-5.31 (m, 1H), 3.97-3.33 (m, 2H), 1.59 (s, 3H), 1.42 (s, 3H), 0.83 (s, 9H), 0.01-0.01 (m, 6H).

Step 6. Synthesis of (R)-[4-chloro-2-[(1S)-2-[tert-butyl(dimethyl) silyl]oxy-1-fluoro-ethyl] phenyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (94f)

To a solution of [4-chloro-2-[(1S)-2-[tert-butyl(dimethyl)silyl]oxy-1-fluoro-ethyl]phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (94e2, 300 mg, 0.49 mmol) in toluene (7 mL) was added DIBAL-H (0.17 mL, 1.47 mmol). The mixture was stirred at −78° C. for 30 min under N$_2$. The solution was quenched with CH$_3$COOH. The mixture was combined with another batch to work up. The mixture was extracted with EtOAc (15 mL×3) and the organic layers were washed with water (20 mL×3), then brine (20 mL×3). The organic layers were dried over MgSO$_4$, filtered, and concentrated in vacuum. The crude product was purified by flash column chromatography on silica gel (PE:EA=5:1) to give (R)-[4-chloro-2-[(1S)-2-[tert-butyl(dimethyl) silyl]oxy-1-fluoro-ethyl] phenyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (94f, 300 mg, 0.49 mmol). LCMS [M+H]: 612.2. $^1$H NMR (400 MHz, DMSO-d$_6$): δ 8.75 (s, 1H), 7.70 (d, J=12.8, 1H), 7.49 (s, 1H), 7.73-7.41 (m, 1H), 7.35-7.32 (m, 1H), 6.67-6.66 (m, 1H), 6.63 (d, J=1.6, 1H), 5.87-5.72 (s, 1H), 5.29-5.19 (m, 2H), 5.12-5.11 (m, 1H), 4.65 (s, 1H), 3.97-3.81 (m, 2H), 1.59 (s, 3H), 1.24 (s, 3H), 0.87 (s, 9H), 0.02-0.00 (m, 6H).

Step 7. Synthesis of give (2S)-2-[5-chloro-2-[(R)-hydroxy-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methyl]rphenyl]-2-fluoro-ethanol (94 g)

To a solution of (R)-[4-chloro-2-[(1S)-2-[tert-butyl(dimethyl) silyl]oxy-1-fluoro-ethyl] phenyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (94f, 300 mg, 0.49 mmol) in THF (5 mL) was added TBAF (1M) (0.26 mL, 0.98 mmol). The mixture was stirred at 25° C. for 30 mins under N₂. The mixture was combined with another batch to work up. The reaction was quenched with NH₄Cl, extracted with EA (10 mL×3). The combined organic extracts were washed with brine, dried over MgSO₄, filtered, concentrated in vacuum, and purified by silica gel column chromatography (PE:EA=1:1) to give (2S)-2-[5-chloro-2-[(R)-hydroxy-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methyl]phenyl]-2-fluoro-ethanol (94 g, 200 mg, 0.40 mmol, 82% yield). LCMS [M+H]: 498.1. ¹H NMR (400 MHz, DMSO-d₆): δ 8.67 (s, 1H), 7.65 (d, J=8, 1H), 7.52-7.50 (m, 1H), 7.45-7.42 (m, 1H), 7.35-7.31 (m, 1H), 6.79 (s, 1H), 6.68 (d, J=3.6, 1H), 5.31-5.14 (m, 4H), 4.69 (s, 1H), 4.15-3.85 (m, 2H), 1.62 (s, 3H), 1.33 (s, 3H).

Step 8. Synthesis of (7S)-4-chloro-7-[(3aR,6R, 6aR)-2,2-dimethyl-6-[(1R,4R)-6-chloro-4-fluoro-isochroman-1-yl]-3a,4,6,6a-tetrahydrofuro[3,4-d][1, 3]dioxol-4-yl]pyrrolo[2,3-d]pyrimidine (94h1) and (7S)-4-chloro-7-[(3aR,6R,6aR)-2,2-dimethyl-6-[(1S, 4R)-6-chloro-4-fluoro-isochroman-1-yl]-3a,4,6,6a-tetrahydrofuro[3,4-d][1,3]dioxol-4-yl]pyrrolo[2,3-d] pyrimidine (94h2)

To a solution of 2-[5-chloro-2-[(R)-hydroxy-[(3aR,6R, 6aR)-2,2-dimethyl-4-[(7S)-4-chloropyrrolo[2,3-d]pyrimidin-7-yl]-3a,4,6,6a-tetrahydrofuro[3,4-d][1,3]dioxol-6-yl] methyl]phenyl]-2-fluoro-ethanol (94 g, 200 mg, 0.40 mmol) in THF (mL) was added NaH (19.26 mg, 0.80 mmol) at 25° C. and stirred for 10 mins. Tosyl chloride (76.52 mg, 0.40 mmol) was added and stirred for 1 h. The reaction mixture was combined with another batch to work up. The mixture was quenched with H₂O and extracted with EA (10 mL×3). The combined organic layers were washed with brine (10 mL), dried over MgSO₄, filtered, and concentrated in vacuum. The crude product was purified by prep-HPLC, eluting with CH₃CN in H₂O (0.1% NH₄OH) from 5% to 95% to give (7S)-4-chloro-7-[(3aR,6R,6aR)-2,2-dimethyl-6-[(1S,4R)-6-chloro-4-fluoro-isochroman-1-yl]-3a,4,6,6a-tetrahydrofuro[3,4-d][1,3]dioxol-4-yl]pyrrolo[2,3-d]pyrimidine (94h2, 15 mg, 0.031 mmol, 8% yield); LCMS [M+H]: 480.1, and (7S)-4-chloro-7-[(3aR,6R,6aR)-2,2-dimethyl-6-[(1R,4R)-6-chloro-4-fluoro-isochroman-1-yl]-3a,4,6,6a-tetrahydrofuro[3,4-d][1,3]dioxol-4-yl]pyrrolo[2,3-d]pyrimidine (94h1, 34 mg, 0.071 mmol, 17.6% yield). LCMS [M+H]: 480.1. ¹H NMR (400 MHz, DMSO-d₆): δ 8.60 (s, 1H), 7.60 (d, J=4, 1H), 7.43-7.42 (m, 1H), 7.36-7.33 (m, 1H), 7.15 (d, J=8.4, 1H), 6.60 (d, J=3.6, 1H), 6.55 (d, J=3.6, 1H), 5.25 (d, J=50.8, 1H), 4.99-4.97 (m, 1H), 4.86-4.84 (m, 1H), 4.78-4.74 (m, 2H), 4.43-4.36 (m, 1H), 3.83-3.71 (m, 1H), 1.55 (s, 3H), 1.19 (s, 3H).

Step 9. Synthesis of 4-methyl-7-[(3aR,4R,6R,6aR)-2,2-dimethyl-6-[(1R,4R)-6-chloro-4-fluoro-isochroman-1-yl]-3a,4,6,6a-tetrahydrofuro[3,4-d][1,3]dioxol-4-yl]pyrrolo[2,3-d]pyrimidine (94i)

To a solution of tetrakis(triphenylphosphine)palladium (2.4 mg) and 4-chloro-7-[(3aR,4R,6R,6aR)-2,2-dimethyl-6-[(1R,4R)-6-chloro-4-fluoro-isochroman-1-yl]-3a,4,6,6a-tetrahydrofuro[3,4-d][1,3]dioxol-4-yl]pyrrolo[2,3-d]pyrimidine (94h1, 10 mg, 0.02 mmol) in THF (4 mL) was added dimethyl zinc (20 mg, 0.21 mmol). The mixture was stirred at 70° C. for 3 h. LCMS showed 20% of desired product. Another batch was combined with this reaction and concentrated in vacuum to give crude 4-methyl-7-[(3aR,4R,6R, 6aR)-2,2-dimethyl-6-[(1R,4R)-6-chloro-4-fluoro-isochroman-1-yl]-3a,4,6,6a-tetrahydrofuro[3,4-d][1,3]dioxol-4-yl] pyrrolo[2,3-d]pyrimidine (94i) which was used for the next step directly. LCMS [M+H]: 460.3.

Step 10. Synthesis of (2R,3R,4S,5S)-2-(4-methylpyrrolo [2,3-d] pyrimidin-7-yl)-5-[(1R,4R)-6-chloro-4-fluoro-isochroman-1-yl]tetrahydrofuran-3, 4-diol; 2,2,2-trifluoroacetic acid (Ex. 94)

To a solution of 4-methyl-7-[(3aR,4R,6R,6aR)-2,2-dimethyl-6-[(1R,4R)-6-chloro-4-fluoro-isochroman-1-yl]-3a,4, 6,6a-tetrahydrofuro[3,4-d][1,3]dioxol-4-yl]pyrrolo[2,3-d] pyrimidine (94i, 30 mg, 0.07 mmol) in water (1 mL) was added TFA (1.13 mL, 7.77 mmol). The mixture was stirred at 25° C. for 2 h. The residue was purified by prep-HPLC, eluting with CH₃CN in H₂O (0.1% TFA) from 5% to 95% to give a crude product which was further purified by prep-HPLC, eluted with CH₃CN in H₂O (0.1% NH₃/H₂O) from 5% to 95% to give (2R,3R,4S,5S)-2-(4-methylpyrrolo [2,3-d] pyrimidin-7-yl)-5-[(1R,4R)-6-chloro-4-fluoro-isochroman-1-yl]tetrahydrofuran-3,4-diol; 2,2,2-trifluoroacetic acid (Ex. 94, 3.5 mg, 0.0065 mmol, 10% yield) as a white solid. LCMS [M+H]: 420.3. ¹H NMR (400 MHz, DMSO-d₆+D₂O): δ 8.83 (s, 1H), 7.87 (d, J=3.2, 1H), 7.67 (s, 1H), 7.55-7.49 (m, 2H), 6.96 (s, 1H), 6.35 (d, J=8, 1H), 5.52 (d, J=50.4, 1H), 5.02-5.00 (m, 1H), 4.94-4.91 (m, 1H), 4.61 (d, J=2.8, 1H), 4.53-4.46 (m, 2H), 3.99-3.82 (m, 2H), 2.67 (s, 3H).

Example 95. Synthesis of (2R,3R,4S,5S)-2-(4-aminopyrrolo[2,3-d]pyrimidin-7-yl)-5-[(1R,4R)-6-chloro-4-fluoro-isochroman-1-yl]tetrahydrofuran-3, 4-diol (Ex. 95)

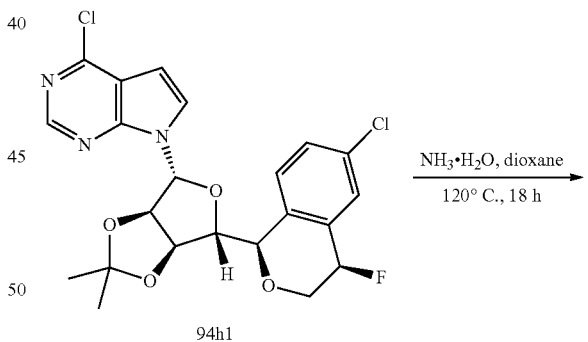

94h1

95a

187

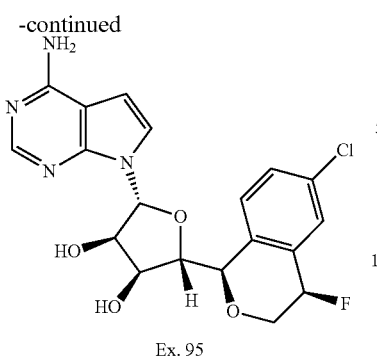

Ex. 95

Step 1. Synthesis of 7-[(3aR,4R,6R,6aR)-2,2-dimethyl-6-[(1R,4R)-6-chloro-4-fluoro-isochroman-1-yl]-3a,4,6,6a-tetrahydrofuro[3,4-d][1,3]dioxol-4-yl]pyrrolo[2,3-d]pyrimidin-4-amine (95a)

To a solution of 4-chloro-7-[(3aR,4R,6R,6aR)-2,2-dimethyl-6-[(1R,4R)-6-chloro-4-fluoro-isochroman-1-yl]-3a,4,6,6a-tetrahydrofuro[3,4-d][1,3]dioxol-4-yl]pyrrolo[2,3-d]pyrimidine (94h1, 35 mg, 0.07 mmol) in 1,4-dioxane (2.5 mL) was added ammonia (2.5 mL, 0.07 mmol). The mixture was sealed and stirred at 120° C. for 16 h. The reaction mixture was concentrated in vacuum to give crude 7-[(3aR,4R,6R,6aR)-2,2-dimethyl-6-[(1R,4R)-6-chloro-4-fluoro-isochroman-1-yl]-3a,4,6,6a-tetrahydrofuro[3,4-d][1,3]dioxol-4-yl]pyrrolo[2,3-d]pyrimidin-4-amine (95a) which was used for the next step directly. LCMS [M+H]: 461.2.

Step 2. Synthesis of (2R,3R,4S,5S)-2-(4-aminopyrrolo[2,3-d]pyrimidin-7-yl)-5-[(1R,4R)-6-chloro-4-fluoro-isochroman-1-yl]tetrahydrofuran-3,4-diol (Ex. 95)

To a solution of 7-[(3aR,4R,6R,6aR)-2,2-dimethyl-6-[(1R,4R)-6-chloro-4-fluoro-isochroman-1-yl]-3a,4,6,6a-tetrahydrofuro[3,4-d][1,3]dioxol-4-yl]pyrrolo[2,3-d]pyrimidin-4-amine (95a, 25 mg, 0.05 mmol) in water (1 mL) was added 2,2,2-trifluoroacetic acid (1.0 mL, 12.98 mmol). The mixture was stirred at 25° C. for 30 mins. The residue was purified by prep-HPLC, eluting with $CH_3CN$ in $H_2O$ (0.1% $NH_4OH$) from 5% to 95% to give (2R,3R,4S,5S)-2-(4-aminopyrrolo[2,3-d]pyrimidin-7-yl)-5-[(1R,4R)-6-chloro-4-fluoro-isochroman-1-yl]tetrahydrofuran-3,4-diol (Ex. 95, 6 mg, 0.014 mmol, 25% yield) as a white solid. LCMS [M+H]: 421.1. $^1H$ NMR (400 MHz, DMSO-$d_6$+$D_2O$): δ 8.07 (s, 1H), 7.65 (s, 1H), 7.51 (s, 2H), 7.38 (d, J=4, 1H), 6.67 (d, J=4.4, 1H), 6.21 (d, J=8, 1H), 5.59-5.46 (d, J=50, 1H), 4.88 (d, J=2.8, 1H), 4.52 (d, J=2.8, 1H), 4.46-4.34 (m, 2H), 3.96-3.87 (m, 1H), 3.81 (d, J=4.8, 1H).

188

Example 92. Synthesis of (2R,3R,4S,5S)-2-(4-methylpyrrolo[2,3-d]pyrimidin-7-yl)-5-[(1R,4S)-6-chloro-4-fluoro-isochroman-1-yl]tetrahydrofuran-3,4-diol (Ex. 92)

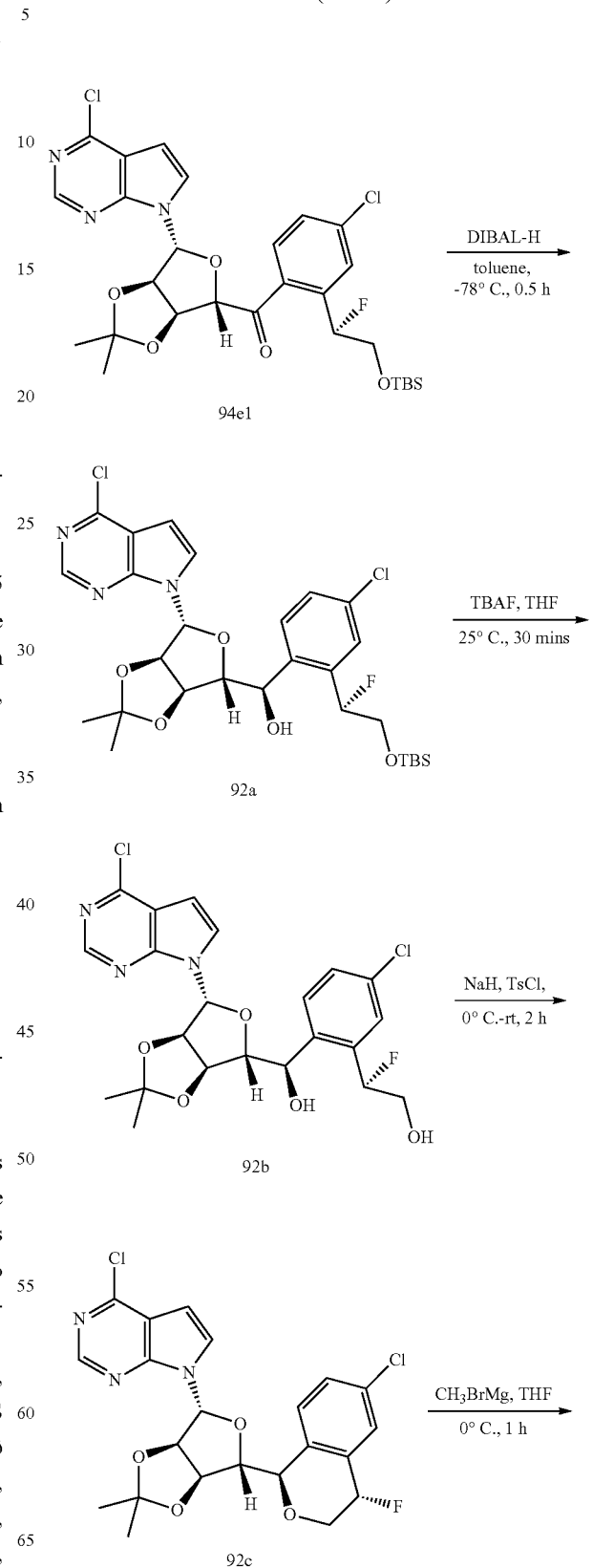

-continued

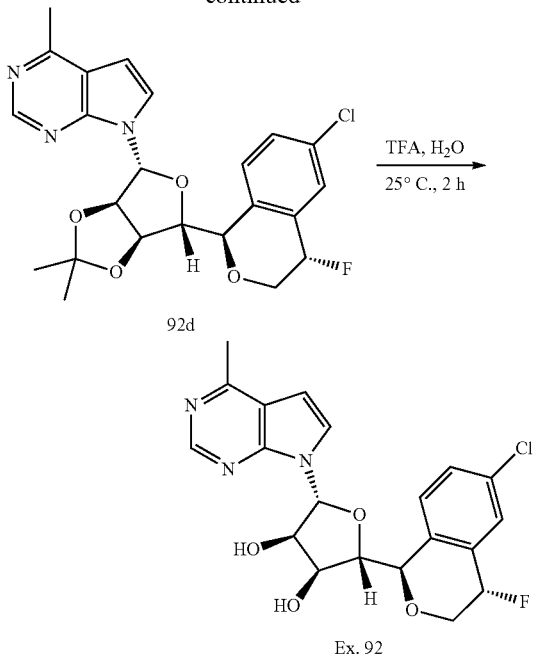

Step 1. Synthesis of (R)-[4-chloro-2-[(1R)-2-[tert-butyl(dimethyl)silyl]oxy-1-fluoro-ethyl]phenyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (92a)

To a solution of [4-chloro-2-[(1R)-2-[tert-butyl(dimethyl)silyl]oxy-1-fluoro-ethyl]phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (94e1, 800 mg, 1.31 mmol) in toluene (7 mL) was added DIBAL (0.45 mL, 3.93 mmol). The mixture was stirred at −78° C. for 30 mins under N$_2$. The solution was quenched with NH$_4$Cl. The mixture was combined with another batch to work up. The mixture was extracted with EtOAc (15 mL×3) and the organic layers were washed with water (20 mL×3), then brine (20 mL×3). The organic layers were dried over MgSO$_4$, filtered, concentrated in vacuum. The crude product was purified by flash column chromatography on silica gel (PE:EA=5:1) to give (R)-[4-chloro-2-[(1R)-2-[tert-butyl(dimethyl)silyl]oxy-1-fluoro-ethyl]phenyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (92a, 520 mg, 0.85 mmol, 65% yield). LCMS [M+H]: 612.2. $^1$H NMR (400 MHz, DMSO-d$_6$): δ 8.68 (s, 1H), 7.69 (d, J=8, 1H), 7.40 (s, 1H), 7.34 (d, J=3.6, 1H), 6.67 (d, J=3.6, 1H), 6.46 (d, J=1.2, 1H), 5.86 (d, J=4.8, 1H), 5.83-5.68 (m, 1H), 5.34 (s, 1H), 5.27-5.16 (m, 1H), 5.16-5.16 (m, 1H), 4.52 (s, 1H), 4.02-3.78 (m, 2H), 1.58 (s, 3H), 1.26 (s, 3H), 0.83 (s, 9H), 0.02-0.00 (m, 6H).

Step 2. Synthesis of (2R)-2-[5-chloro-2-[(R)-hydroxy-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methyl]phenyl]-2-fluoro-ethanol (92b)

To a solution of (R)-[4-chloro-2-[(1R)-2-[tert-butyl(dimethyl)silyl]oxy-1-fluoro-ethyl]phenyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (92a, 520 mg, 0.85 mmol) in THF (5 mL) was added TBAF (1M) (0.44 mL, 1.7 mmol). The mixture was stirred at 25° C. for 30 mins under N$_2$. The mixture was combined with another batch to work up. The solution was quenched with NH$_4$Cl and washed with EA, and the solvent was removed in vacuum. The crude product was purified by flash column chromatography (PE:EA=3:1) to give (2R)-2-[5-chloro-2-[(R)-hydroxy-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methyl]phenyl]-2-fluoro-ethanol (92b, 330 mg, 0.66 mmol, 78% yield). LCMS [M+H]: 498.1. $^1$H NMR (400 MHz, DMSO-d$_6$): δ 8.68 (s, 1H), 7.73 (d, J=8.4, 1H), 7.45-7.40 (m, 2H), 7.33 (d, J=4, 1H), 6.67 (d, J=4, 1H), 6.39 (d, J=1.6, 1H), 5.88-5.73 (m, 2H), 5.33 (s, 1H), 5.28-5.25 (m, 1H), 5.17-5.15 (m, 1H), 4.48 (s, 1H), 3.99-3.67 (m, 2H), 1.59 (s, 3H), 1.32 (s, 3H).

Step 3. Synthesis of 4-chloro-7-[(3aR,4R,6R,6aR)-2,2-dimethyl-6-[(1R,4S)-6-chloro-4-fluoro-isochroman-1-yl]-3a,4,6,6a-tetrahydrofuro[3,4-d][1,3]dioxol-4-yl]pyrrolo[2,3-d]pyrimidine (92c)

To a solution of (2R)-2-[5-chloro-2-[(R)-hydroxy-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methyl]phenyl]-2-fluoro-ethanol (92b, 300 mg, 0.60 mmol) in THF (mL) was added NaH (28.9 mg, 1.2 mmol) at 0° C. and stirred for 10 mins. Tosyl chloride (115 mg, 0.60 mmol) was added to the mixture and stirred for 1 h. The mixture was combined with another batch to work up. The mixture was quenched with H$_2$O and extracted with EA (10 mL×3). The combined organic layers were washed with brine (10 mL), dried over MgSO$_4$, filtered and concentrated in vacuum. The crude product was purified by silica gel column chromatography (PE:EA=5:1) to give 4-chloro-7-[(3aR,4R,6R,6aR)-2,2-dimethyl-6-[(1R,4S)-6-chloro-4-fluoro-isochroman-1-yl]-3a,4,6,6a-tetrahydrofuro[3,4-d][1,3]dioxol-4-yl]pyrrolo[2,3-d]pyrimidine (92c, 90 mg, 0.192 mmol). LCMS [M+H]: 480.1. $^1$H NMR (400 MHz, DMSO-d$_6$): δ 8.61 (d, J=6, 1H), 7.46-7.43 (m, 2H), 7.19 (d, J=8, 1H), 6.98 (d, J=8.4, 1H), 6.62 (d, J=3.6, 1H), 6.37 (d, J=3.2, 1H), 5.57-5.41 (m, 1H), 5.08-5.05 (m, 1H), 4.89-4.85 (m, 2H), 4.53-4.51 (m, 1H), 4.33-4.27 (m, 1H), 3.79-3.72 (m, 1H), 1.54 (s, 3H), 1.25 (s, 3H).

Step 4. Synthesis of 4-methyl-7-[(3aR,4R,6R,6aR)-2,2-dimethyl-6-[(1R,4S)-6-chloro-4-fluoro-isochroman-1-yl]-3a,4,6,6a-tetrahydrofuro[3,4-d][1,3]dioxol-4-yl]pyrrolo[2,3-d]pyrimidine (92d)

To a solution of 4-chloro-7-[(3aR,4R,6R,6aR)-2,2-dimethyl-6-[(1R,4S)-6-chloro-4-fluoro-isochroman-1-yl]-3a,4,6,6a-tetrahydrofuro[3,4-d][1,3]dioxol-4-yl]pyrrolo[2,3-d]pyrimidine (92c, 10 mg, 0.02 mmol) and ferric acetylacetonate (0.74 mg, 0.002 mmol) in THF (4 mL) was slowly added methylmagnesium bromide (23 mg, 0.21 mmol) at −30° C. The mixture was stirred at 0° C. for 1 h. The mixture was concentrated in vacuum to give crude 4-methyl-7-[(3aR,4R,6R,6aR)-2,2-dimethyl-6-[(1R,4S)-6-chloro-4-fluoro-isochroman-1-yl]-3a,4,6,6a-tetrahydrofuro[3,4-d][1,3]dioxol-4-yl]pyrrolo[2,3-d]pyrimidine (92d) which was used for the next step directly. LCMS [M+H]: 460.2.

Step 5. Synthesis of (2R,3R,4S,5S)-2-(4-methylpyr-rolo[2,3-d]pyrimidin-7-yl)-5-[(1R,4S)-6-chloro-4-fluoro-isochroman-1-yl]tetrahydrofuran-3,4-diol (Ex. 92)

To a solution of 4-methyl-7-[(3aR,4R,6R,6aR)-2,2-dimethyl-6-[(1R,4S)-6-chloro-4-fluoro-isochroman-1-yl]-3a,4,6,6a-tetrahydrofuro[3,4-d][1,3]dioxol-4-yl]pyrrolo[2,3-d]pyrimidine (92d, 10 mg, 0.02 mmol) in water (1 mL) was added TFA (1.0 mL, 6.86 mmol). The mixture was stirred at 25° C. for 2 h. The mixture was purified by prep-HPLC, eluted with CH$_3$CN in H$_2$O (0.1% NH$_4$OH) from 5% to 95% to give (2R,3R,4S,5S)-2-(4-methylpyrrolo[2,3-d]pyrimidin-7-yl)-5-[(1R,4S)-6-chloro-4-fluoro-isochroman-1-yl]tetrahydrofuran-3,4-diol (Ex. 92, 7 mg, 0.016 mmol, 75% yield) as a white solid. LCMS [M+H]: 420.2. $^1$H NMR (400 MHz, DMSO-d6+D$_2$O): δ 8.67 (s, 1H), 7.75 (d, J=3.6, 1H), 7.55 (d, J=1.6, 1H), 7.36 (d, J=8.8, 1H), 7.25 (d, J=8.4, 1H), 6.82 (d, J=4, 1H), 6.25 (d, J=7.2, 1H), 5.67-5.52 (m, 1H).

Example 93. Synthesis of (2R,3R,4S,5S)-2-(4-aminopyrrolo[2,3-d]pyrimidin-7-yl)-5-[(1R,4S)-6-chloro-4-fluoro-isochroman-1-yl]tetrahydrofuran-3,4-diol (Ex. 93)

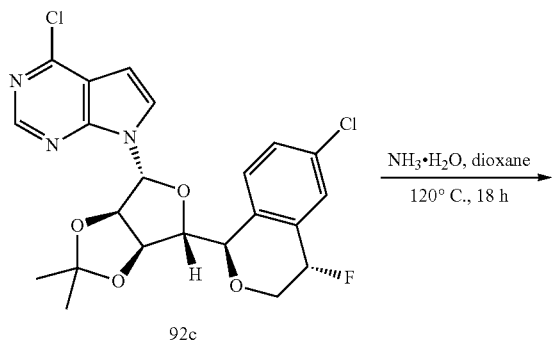

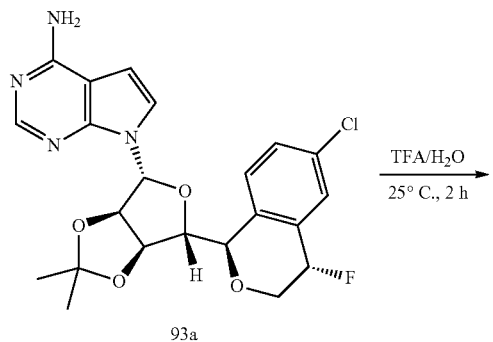

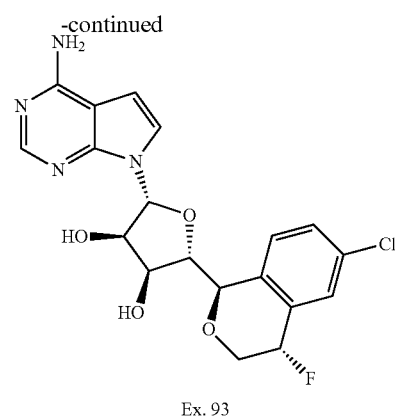

Ex. 93

Step 1. Synthesis of 7-[(3aR,4R,6R,6aR)-2,2-dimethyl-6-[(1R,4S)-6-chloro-4-fluoro-isochroman-1-yl]-3a,4,6,6a-tetrahydrofuro[3,4-d][1,3]dioxol-4-yl]pyrrolo[2,3-d]pyrimidin-4-amine (93a)

To a solution of 4-chloro-7-[(3aR,4R,6R,6aR)-2,2-dimethyl-6-[(1R,4S)-6-chloro-4-fluoro-isochroman-1-yl]-3a,4,6,6a-tetrahydrofuro[3,4-d][1,3]dioxol-4-yl]pyrrolo[2,3-d]pyrimidine (92c, 10 mg, 0.02 mmol) in 1,4-dioxane (2.5 mL) was added ammonia (2.5 mL, 0.02 mmol). The mixture was sealed and stirred at 120° C. for 16 h. The mixture was concentrated in vacuum to give crude 7-[(3aR,4R,6R,6aR)-2,2-dimethyl-6-[(1R,4S)-6-chloro-4-fluoro-isochroman-1-yl]-3a,4,6,6a-tetrahydrofuro[3,4-d][1,3]dioxol-4-yl]pyrrolo[2,3-d]pyrimidin-4-amine (93a) which was used for the next step directly. LCMS [M+H]: 461.2.

Step 2. Synthesis of (2R,3R,4S,5S)-2-(4-aminopyrrolo[2,3-d]pyrimidin-7-yl)-5-[(1R,4S)-6-chloro-4-fluoro-isochroman-1-yl]tetrahydrofuran-3,4-diol (Ex. 93)

To a solution of 7-[(3aR,4R,6R,6aR)-2,2-dimethyl-6-[(1R,4S)-6-chloro-4-fluoro-isochroman-1-yl]-3a,4,6,6a-tetrahydrofuro[3,4-d][1,3]dioxol-4-yl]pyrrolo[2,3-d]pyrimidin-4-amine (93a, 10 mg, 0.02 mmol) in water (2 mL) was added 2,2,2-trifluoroacetic acid (1 mL, 13 mmol). The mixture was stirred at 25° C. for 60 min. The residue was purified by pre-HPLC, eluting with CH$_3$CN in H$_2$O (0.1% NH$_4$OH) from 5% to 95% to give (2R,3R,4S,5S)-2-(4-aminopyrrolo[2,3-d]pyrimidin-7-yl)-5-[(1R,4S)-6-chloro-4-fluoro-isochroman-1-yl]tetrahydrofuran-3,4-diol (5 mg, 0.011 mmol, 53% yield) as a white solid. LCMS [M+H]: 421.1. $^1$H NMR (400 MHz, DMSO-d$_6$+D$_2$O): δ 8.06 (s, 1H), 7.55 (s, 1H), 7.39-7.32 (m, 1H), 7.28 (d, J=19.2, 1H), 7.25 (d, J=8, 1H), 6.65 (d, J=3.6, 1H), 6.11 (d, J=7.2, 1H), 5.64-5.51 (m, 1H), 4.99-4.98 (m, 1H), 4.53-4.50 (m, 1H), 4.40-4.33 (m, 1H), 4.31-4.25 (m, 1H), 4.12-3.98 (m, 1H), 3.95-3.91 (m, 1H).

193
Example 97. Synthesis of (2R,3R,4S,5S)-2-(4-methylpyrrolo[2,3-d]pyrimidin-7-yl)-5-[(4R)-7,8-difluoro-4H-1,3-benzodioxin-4-yl]tetrahydrofuran-3,4-diol (Ex. 97)
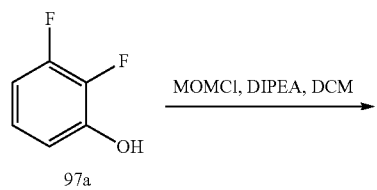
97a
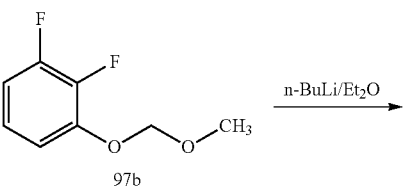
97b
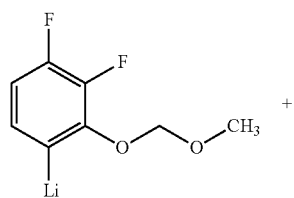
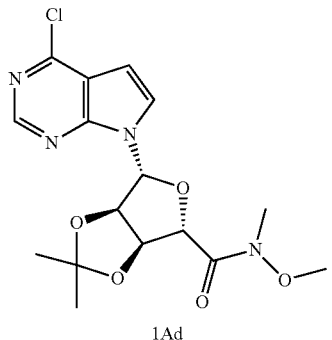
1Ad
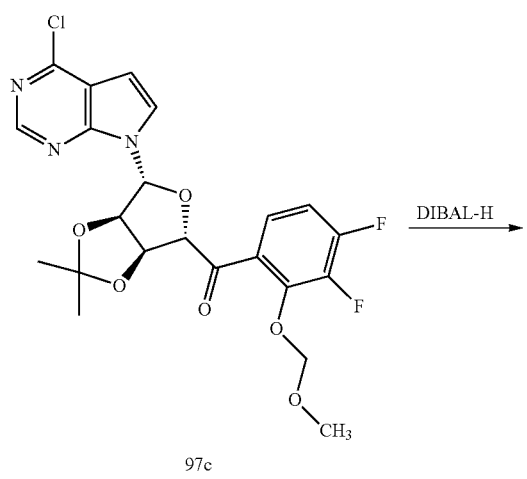
97c
194
-continued
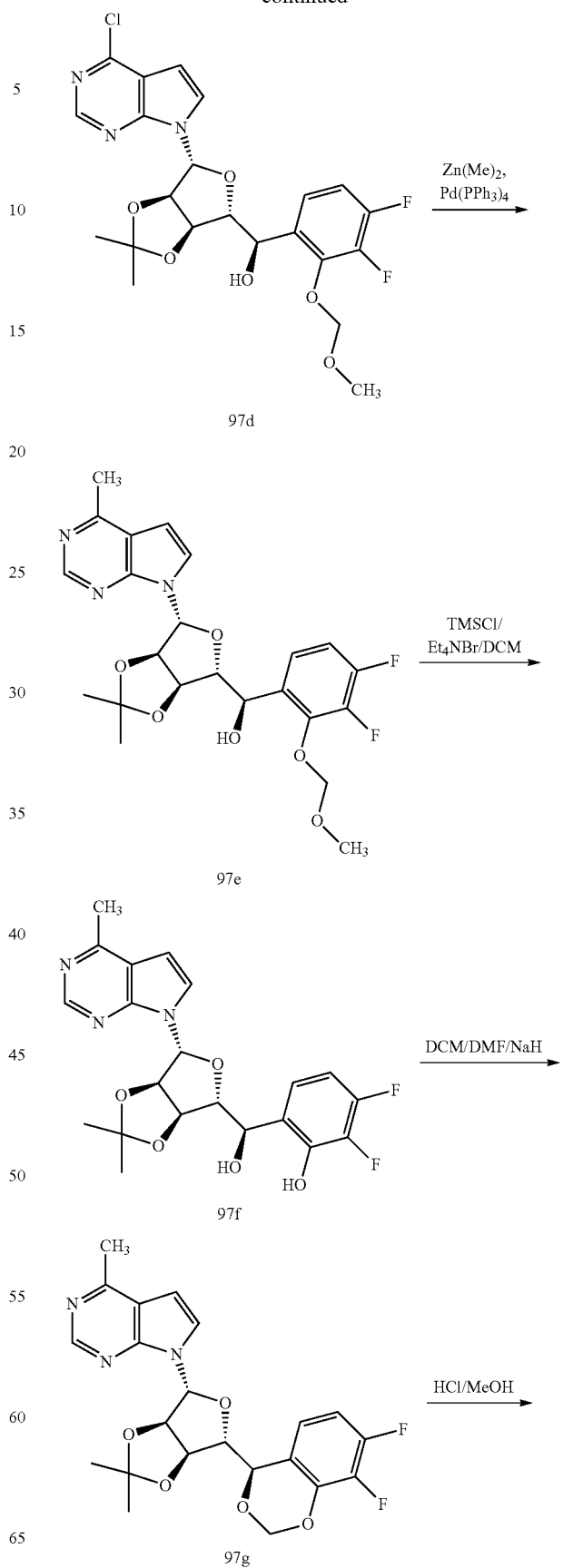

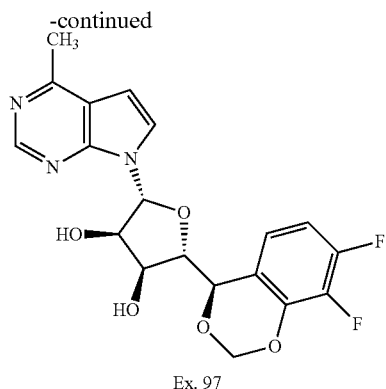

Ex. 97

Step 1. Synthesis of 1,2-difluoro-3-(methoxymethoxy)benzene (97b)

To a clear colorless solution of 2,3-difluorophenol (97a, 3.08 g, 23.68 mmol) and N,N-diisopropylethylamine (4.95 mL, 28.41 mmol) under nitrogen at 0° C. in an ice bath was added chloromethyl methyl ether (2.16 mL, 28.41 mmol) dropwise. The ice bath was removed, and the clear orange reaction stirred at rt. After 35 min, TLC (2% EtOAc/hexanes) shows a clean product spot (rf=0.23) with no remaining phenol. The reaction was concentrated and purified by flash column chromatography (0-3% EtOAc/hexanes, ramping up to 30% to flush out product because peak tails). The product fractions were concentrated to 1,2-difluoro-3-(methoxymethoxy)benzene (97b, 2.79 g, 16.022 mmol, 68% yield), as a clear pale yellow oil. LCMS does not show good ionization.

Step 2. Synthesis of [3,4-difluoro-2-(methoxymethoxy)phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (97c)

A solution of 1,2-difluoro-3-(methoxymethoxy)benzene (97b, 181.96 mg, 1.04 mmol) in diethyl ether (2 mL) was chilled in an ice bath. n-BuLi (0.67 mL, 1.07 mmol) was added drop-wise and the solution was stirred cold for 3 min (yielding a milky mixture), and the ice bath was removed. The reaction becomes a pale yellow suspension. After 2 h, the reaction was returned to an ice bath, and a solution of (3aR,4R,6S,6aS)-4-(4-chloropyrrolo[2,3-d]pyrimidin-7-yl)-N-methoxy-N,2,2-trimethyl-3a,4,6,6a-tetrahydrofuro[3,4-d][1,3]dioxole-6-carboxamide (1Ad, 150 mg, 0.39 mmol) in diethyl ether (1 mL) was added. The bath was removed, and the reaction stirred at rt to yield an orange-red opaque mixture. After 2 h, LCMS showed that the reaction was complete. The reaction was cooled on an ice bath and added sat'd NH₄Cl followed by EtOAc. The layers were separated and the aqueous extracted 2×EtOAc. The combined organics were washed with brine, filtered through cotton and concentrated to an orange oil, which was purified by flash column chromatography, 5%-40% EtOAc/hexanes to yield [3,4-difluoro-2-(methoxymethoxy)phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (97c, 77 mg, 0.15529 mmol, 40% yield). LCMS [M+H]: 496.0.

Step 3. Synthesis of (R)-[3,4-difluoro-2-(methoxymethoxy)phenyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (97d)

An amber solution of [3,4-difluoro-2-(methoxymethoxy)phenyl]-[(3aR,4R,6S,6aS)-4-(4-chloropyrrolo[2,3-d]pyrimidin-7-yl)-2,2-dimethyl-3a,4,6,6a-tetrahydrofuro[3,4-d][1,3]dioxol-6-yl]methanone (97c, 163 mg, 0.33 mmol) in toluene (5 mL) under $N_2$ was cooled to −78° C., and then charged with diisobutylaluminum hydride (1M in toluene; 0.66 mL, 0.66 mmol) slowly dropwise. The resulting clear yellow solution was stirred at −78° C. for 1 h. LCMS shows some starting material remains. An additional portion of diisobutylaluminum hydride (1M in toluene; 0.2 mL, 0.2 mmol) was added. After 30 min, the reaction was transferred to an ice bath and allowed to warm to 0° C. and quenched by slow addition of several mL of EtOAc, followed by several addition of a saturated aqueous solution of Rochelle's salt. The ice bath was removed, additional EtOAc and sat'd Rochelle's salt was added, and the mixture stirred vigorously. The layers were separated and the aqueous was extracted with EtOAc. The combined organic layers were washed with brine, filtered through cotton, and concentrated to yield (R)-[3,4-difluoro-2-(methoxymethoxy)phenyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (97d, 170 mg, 0.34145 mmol, 104% yield), which was used in the next reaction without further purification. LCMS [M+H]: 498.0.

Step 4. Synthesis of (R)-[3,4-difluoro-2-(methoxymethoxy)phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methanol (97e)

To (R)-[3,4-difluoro-2-(methoxymethoxy)phenyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (97d, 170 mg, 0.34 mmol) and tetrakis(triphenylphosphine)palladium(0) (19.73 mg, 0.02 mmol) under nitrogen in a capped 2 mL microwave vial was added THF (10 mL). The mixture was sparged with nitrogen for 10 min. Dimethylzinc (2M in hexanes; 0.75 mL, 1.5 mmol) was added carefully via syringe (gas evolution) to yield a lighter yellow solution, which was heated to 70° C. Reaction gradually becomes dark orange. After 2 h, LCMS showed the reaction was complete. The reaction was cooled to rt and quenched with sat'd NaHCO₃ and extracted 2×EtOAc. The combined organics were washed with brine, filtered through cotton, and concentrated. The crude product was purified by flash column chromatography, 14%-100% EtOAc/hexanes to yield (R)-[3,4-difluoro-2-(methoxymethoxy)phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methanol (97e, 111 mg, 0.23248 mmol, 68% yield). LCMS [M+H]: 478.1.

Step 5. Synthesis of 2,3-difluoro-6-[(R)-hydroxy-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methyl]phenol (97f)

To a mixture of (R)-[3,4-difluoro-2-(methoxymethoxy)phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d]
[1,3]dioxol-6-yl]methanol (97e, 85 mg, 0.18 mmol) and
tetraethylammonium bromide (112.24 mg, 0.53 mmol) was
added DCM (4 mL) and the resulting yellow solution was
chilled on an ice bath. Chlorotrimethylsilane (0.07 mL, 0.53
mmol) was added and the reaction was allowed to warm to
rt in the ice bath and stirred at rt overnight. Added an
additional tetraethylammonium bromide (112.24 mg, 0.53
mmol) and chlorotrimethylsilane (0.07 mL, 0.53 mmol).
After 4 h, the reaction was concentrated and purified by flash
column chromatography (100% DCM-8% MeOH/DCM) to
yield 2,3-difluoro-6-[(R)-hydroxy-[(3aR,4R,6R,6aR)-2,2-
dimethyl-4-(4-methylpyrrolo[2,3-d]pyrimidin-7-yl)-3a,4,6,
6a-tetrahydrofuro[3,4-d][1,3]dioxol-6-yl]methyl]phenol
(97f, 43 mg, 0.01 mmol, 56% yield). LCMS [M+H]: 434.1.

Step 6. Synthesis of 4-methyl-7-[(3aR,4R,6R,6aR)-
2,2-dimethyl-6-[(4R)-7,8-difluoro-4H-1,3-benzodi-
oxin-4-yl]-3a,4,6,6a-tetrahydrofuro[3,4-d][1,3]di-
oxol-4-yl]pyrrolo[2,3-d]pyrimidine (97 g)

To an orange solution of 2,3-difluoro-6-[(R)-hydroxy-
[(3aR,4R,6R,6aR)-2,2-dimethyl-4-(4-methylpyrrolo[2,3-d]
pyrimidin-7-yl)-3a,4,6,6a-tetrahydrofuro[3,4-d][1,3]dioxol-
6-yl]methyl]phenol (97f, 56 mg, 0.13 mmol) in DMF (5 mL)
and DCM (2.5 mL) under nitrogen was added sodium
hydride (51.68 mg, 1.29 mmol) and the reaction was heated
to 80° C. After 5 h, the reaction was chilled on an ice bath
and quenched with sat'd aqueous $NH_4Cl$, diluted with brine,
and extracted 3×EtOAc. The combined organics were
washed 3× brine, filtered through cotton, concentrated and
dried under high vacuum. The crude product was purified by
flash column chromatography, 13%-100% EtOAc/hexanes
to yield 4-methyl-7-[(3aR,4R,6R,6aR)-2,2-dimethyl-6-
[(4R)-7,8-difluoro-4H-1,3-benzodioxin-4-yl]-3a,4,6,6a-tet-
rahydrofuro[3,4-d][1,3]dioxol-4-yl]pyrrolo[2,3-d]pyrimi-
dine (97 g, 31 mg, 0.0696 mmol, 54% yield). LCMS [M+H]:
446.0.

Step 7. Synthesis of (2R,3R,4S,5S)-2-(4-methylpyr-
rolo[2,3-d]pyrimidin-7-yl)-5-[(4R)-7,8-difluoro-4H-
1,3-benzodioxin-4-yl]tetrahydrofuran-3,4-diol (Ex.
97)

A clear solution of 4-methyl-7-[(3aR,4R,6R,6aR)-2,2-
dimethyl-6-[(4R)-7,8-difluoro-4H-1,3-benzodioxin-4-yl]-
3a,4,6,6a-tetrahydrofuro[3,4-d][1,3]dioxol-4-yl]pyrrolo[2,
3-d]pyrimidine (97 g, 29 mg, 0.07 mmol) in methanol (2
mL) was chilled briefly on an ice bath, then hydrochloric
acid (2 mL, 4 mmol) was added and the resulting faintly
hazy solution was stirred at rt. After 5 h, the reaction was
chilled on an ice bath and carefully basified to pH ~8 with
1N NaOH, then extracted 3×EtOAc. The combined extracts
were washed with brine, filtered through cotton and con-
centrated. The crude product was purified by flash column
chromatography, 0-10% MeOH/DCM to yield (2R,3R,4S,
5S)-2-(4-methylpyrrolo[2,3-d]pyrimidin-7-yl)-5-[(4R)-7,8-
difluoro-4H-1,3-benzodioxin-4-yl]tetrahydrofuran-3,4-diol
(Ex. 97, 20 mg, 0.0449 mmol, 69% yield). LCMS [M+H]:
406.1. $^1$H NMR (500 MHz, DMSO-d6) δ 8.66 (s, 1H), 7.76
(d, J=3.8 Hz, 1H), 7.15-7.07 (m, 1H), 7.00 (q, J=9.3 Hz, 1H),
6.80 (d, J=3.7 Hz, 1H), 6.31 (d, J=7.7 Hz, 1H), 5.62 (d, J=5.7
Hz, 1H), 5.35 (d, J=6.9 Hz, 1H), 5.31 (d, J=5.7 Hz, 1H),
5.26-5.22 (m, 2H), 4.56 (td, J=5.1, 7.3 Hz, 1H), 4.41 (dd,
J=1.4, 4.5 Hz, 1H), 3.94 (t, J=4.9 Hz, 1H), 2.66 (s, 3H). D20
exchange: 1H NMR (500 MHz, DMSO-d6) δ 8.66 (s, 1H),
7.75 (d, J=3.8 Hz, 1H), 7.13-7.07 (m, 1H), 6.99 (td, J=7.2,
9.2, 9.6 Hz, 1H), 6.80 (d, J=3.8 Hz, 1H), 6.30 (d, J=7.7 Hz,
1H), 5.61 (d, J=5.7 Hz, 1H), 5.30 (d, J=5.8 Hz, 1H), 5.23 (d,
J=4.4 Hz, 1H), 4.55 (dd, J=5.1, 7.7 Hz, 1H), 4.40 (dd, J=1.4,
4.5 Hz, 1H), 3.93 (dd, J=1.4, 5.1 Hz, 1H), 2.66 (s, 3H).

Example 98. Synthesis of (2R,3S,4R,5R)-2-[(1R)-6-
chloro-1,2,3,4-tetrahydroisoquinolin-1-yl]-5-(4-
methylpyrrolo[2,3-d]pyrimidin-7-yl)tetrahydrofuran-
3,4-diol; 2,2,2-trifluoroacetic acid (Ex. 98)

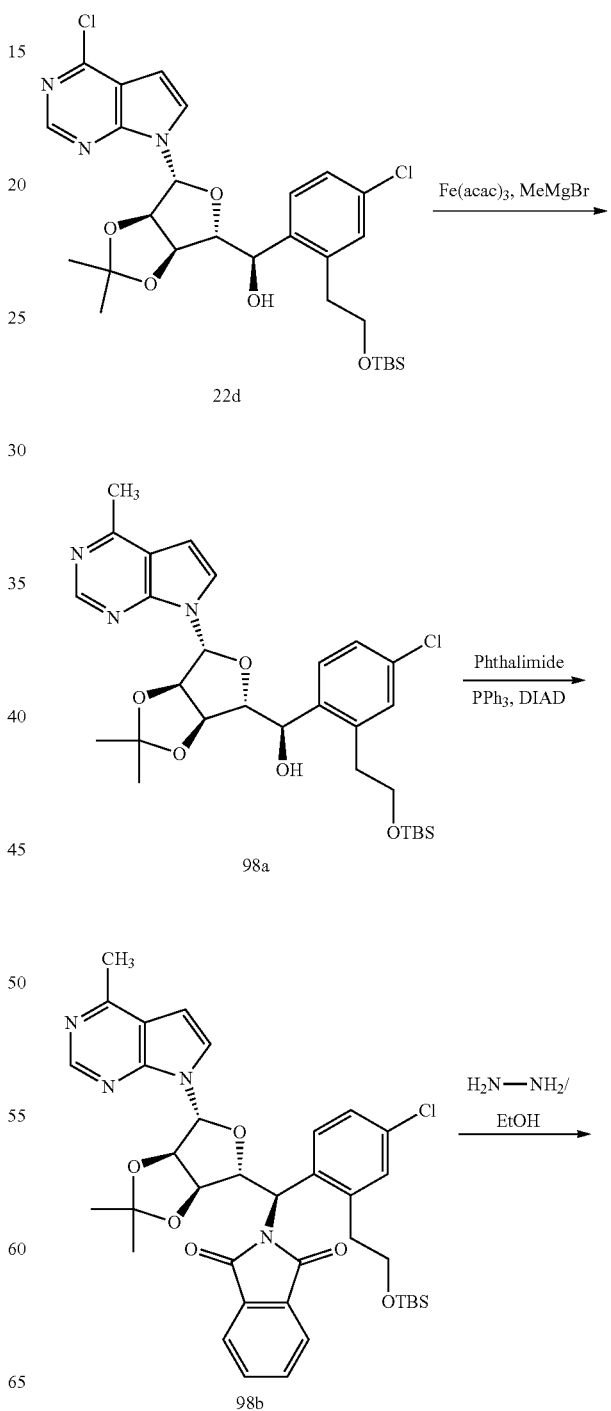

-continued

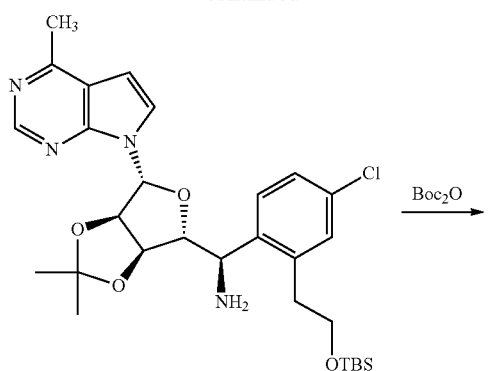

98c

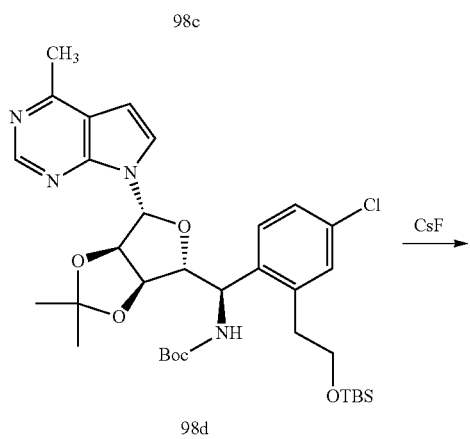

98d

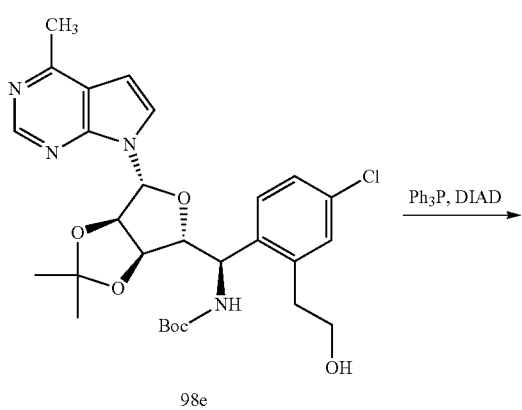

98e

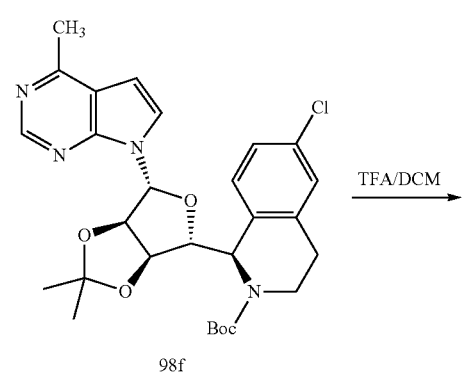

98f

-continued

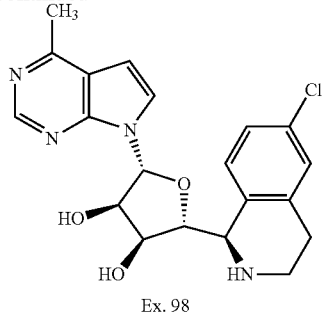

Ex. 98

Step 1. (S)-[2-[2-[tert-butyl(dimethyl)silyl]oxyethyl]-4-chloro-phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methanol (98a)

Methylmagnesium bromide, 3.2 M in MeTHF (0.09 mL, 0.30 mmol) was added dropwise into a suspension of (S)-[2-[2-[tert-butyl(dimethyl)silyl]oxyethyl]-4-chloro-phenyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (22d, 80 mg, 0.13 mmol) and iron(III) acetylacetonate (5 mg, 0.01 mmol) in THF (0.50 mL) at 0° C. The reaction mixture was stirred at 0° C. for 40 min, then at rt overnight. The reaction was quenched with EtOAc, followed by saturated aqueous NH$_4$Cl and the mixture was diluted with EtOAc. The organic layer was separated, washed with brine, dried over Na$_2$SO$_4$ and concentrated. The crude product was purified by flash column chromatography (0-100% EtOAc/hexane) to yield (S)-[2-[2-[tert-butyl(dimethyl)silyl]oxyethyl]-4-chloro-phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methanol (98a, 35 mg, 0.049 mmol, 36% yield) as a yellow oil. LCMS [M+H]: 574.16.

Step 2. 2-[(R)-[2-[2-[tert-butyl(dimethyl)silyl]oxyethyl]-4-chloro-phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methyl]isoindoline-1,3-dione (98b)

Diisopropyl azodicarboxylate (0.02 mL, 0.12 mmol) was added dropwise into a solution of (S)-[2-[2-[tert-butyl(dimethyl)silyl]oxyethyl]-4-chloro-phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methanol (98a, 35 mg, 0.06 mmol), triphenylphosphine (24 mg, 0.09 mmol), and phthalimide (13.45 mg, 0.09 mmol) in THF (0.50 mL). In 30 min, TLC (2:1 Hexane/EA) showed the reaction was complete. The reaction mixture was concentrated and the crude product was purified by flash column chromatography (0-100% EtOAc/hexane) to give 2-[(R)-[2-[2-[tert-butyl(dimethyl)silyl]oxyethyl]-4-chloro-phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methyl]isoindoline-1,3-dione (98b, 37 mg, 0.042 mmol, 69% yield) as a yellow foamy solid. LCMS [M+H]: 703.2/705.2.

Step 3. (R)-[2-[2-[tert-butyl(dimethyl)silyl]oxy-ethyl]-4-chloro-phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methanamine (98c)

Hydrazine monohydrate (2.7 mg, 0.08 mmol) was added to a suspension of 2-[(R)-[2-[2-[tert-butyl(dimethyl)silyl]oxyethyl]-4-chloro-phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methyl]isoindoline-1,3-dione (98b, 37 mg, 0.04 mmol) in EtOH (0.50 mL). The resulting mixture was stirred at rt overnight, then at 80° C. for 6 hr. The reaction mixture was concentrated to give the crude product, (R)-[2-[2-[tert-butyl(dimethyl)silyl]oxyethyl]-4-chloro-phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methanamine (98c, 40 mg, 0.042 mmol, 99.5% yield) which was carried on to the next step without purification. LCMS [M+H]: 574.2/576.1.

Step 4. tert-butyl N—[(R)-[2-[2-[tert-butyl(dimethyl)silyl]oxyethyl]-4-chloro-phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methyl]carbamate (98d)

Triethylamine (0.01 mL, 0.08 mmol) was added dropwise to a suspension of (R)-[2-[2-[tert-butyl(dimethyl)silyl]oxyethyl]-4-chloro-phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methanamine (98c, 40 mg, 0.04 mmol) and di-tert butyl dicarbonate (18 mg, 0.08 mmol) in dry DCM (0.50 mL) at rt and the resulting mixture was stirred at rt for 2 h. The reaction was concentrated and the residue was purified by flash column chromatography (0-8% MeOH/DCM) to give tert-butyl N—[(R)-[2-[2-[tert-butyl(dimethyl)silyl]oxyethyl]-4-chloro-phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methyl]carbamate (98d, 30 mg, 0.036 mmol, 85% yield) LCMS [M+H]: 673.1/675.3. $^1$H NMR (500 MHz, Methanol-d4) δ 8.71 (s, 1H), 7.50 (d, J=3.7 Hz, 1H), 7.36 (d, J=8.4 Hz, 1H), 7.19-7.01 (m, 2H), 6.73 (d, J=3.7 Hz, 1H), 6.19 (d, J=2.5 Hz, 1H), 5.33 (dd, J=2.4, 6.6 Hz, 1H), 5.24 (dd, J=4.4, 6.6 Hz, 1H), 5.16 (d, J=8.9 Hz, 1H), 4.32 (dd, J=4.4, 8.8 Hz, 1H), 3.62-3.52 (m, 1H), 3.46 (dt, J=5.6, 10.6 Hz, 1H), 2.72 (s, 3H), 2.50 (t, J=12.1 Hz, 2H), 1.63 (s, 2H), 1.60 (s, 3H), 1.45 (d, J=10.3 Hz, 9H), 1.36 (s, 3H), 0.77 (s, 9H), −0.25 (d, J=15.6 Hz, 6H).

Step 5. tert-butyl N—[(R)-[4-chloro-2-(2-hydroxyethyl)phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methyl]carbamate (98e)

A suspension of tert-butyl N—[(R)-[2-[2-[tert-butyl(dimethyl)silyl]oxyethyl]-4-chloro-phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methyl]carbamate (98d, 20 mg, 0.02 mmol), cesium fluoride (5.5 mg, 0.04 mmol) in DMSO (0.40 mL) was stirred at rt for 2 h. The reaction mixture was filtered and purified directly by reverse phase chromatography (10%-100% MeCN/water) to give tert-butyl N—[(R)-[4-chloro-2-(2-hydroxyethyl)phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methyl]carbamate (98e, 10 mg, 0.018 mmol, 75% yield). LCMS [M+H]: 559.2/561.1.

Step 6. tert-butyl (1R)-6-chloro-1-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]-3,4-dihydro-1H-isoquinoline-2-carboxylate (98f)

Diisopropyl azodicarboxylate (0.01 mL, 0.04 mmol) was added to a solution of triphenylphosphine (9.38 mg, 0.04 mmol) and tert-butyl N—[(S)-[4-chloro-2-(2-hydroxyethyl)phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methyl]carbamate (98e, 10 mg, 0.02 mmol) in dry THF (0.50 mL). The reaction mixture was stirred at rt for 1 h. Diisopropyl azodicarboxylate (0.01 mL, 0.04 mmol) and triphenylphosphine (9.38 mg, 0.04 mmol) were added and the reaction was stirred for an additional 1 h. The reaction mixture was concentrate and purified by flash column chromatography (0-12% MeOH in DCM) to give tert-butyl (1R)-6-chloro-1-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]-3,4-dihydro-1H-isoquinoline-2-carboxylate (98f, 10 mg, 0.009 mmol, 52% yield). LCMS [M+H]: 541.1/543.3.

Step 7. (2R,3S,4R,5R)-2-[(1R)-6-chloro-1,2,3,4-tetrahydroisoquinolin-1-yl]-5-(4-methylpyrrolo[2,3-d]pyrimidin-7-yl)tetrahydrofuran-3,4-diol; 2,2,2-trifluoroacetic acid (Ex. 98)

A mixture of tert-butyl (1R)-6-chloro-1-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]-3,4-dihydro-1H-isoquinoline-2-carboxylate (98f, 10 mg, 0.02 mmol), HCl (0.67 mg, 0.02 mmol) and methanol (0.50 mL) was stirred at rt overnight. LCMS showed the acetonide was cleaved but not the Boc. The reaction mixture was concentrated and lyophilized to a white solid which was dissolved in DCM (0.50 mL) and TFA (0.26 mL, 2.89 mmol) and stirred at rt for 1 h. The reaction mixture was concentrated and the residue was purified by reverse phase chromatography (0-70% MeCN/water/0.1% TFA) to give (2R,3S,4R,5R)-2-[(1R)-6-chloro-1,2,3,4-tetrahydroisoquinolin-1-yl]-5-(4-methylpyrrolo[2,3-d]pyrimidin-7-yl)tetrahydrofuran-3,4-diol; 2,2,2-trifluoroacetic acid (Ex. 98, 3 mg, 0.006 mmol, 30% yield) as a white solid. LCMS [M+H]: 401.1. $^1$H NMR (500 MHz, DMSO-d$_6$) δ 8.74 (s, 1H), 7.37-7.15 (m, 3H), 7.00 (d, J=3.8 Hz, 1H), 6.75 (d, J=3.8 Hz, 1H), 6.08 (d, J=4.0 Hz, 1H), 4.83 (d, J=3.2 Hz, 1H), 4.50 (dd, J=3.3, 5.5 Hz, 1H), 4.39-4.26 (m, 2H), 3.49 (dd, J=6.8, 13.3 Hz, 1H), 3.33 (dt, J=6.0, 12.3 Hz, 1H), 3.00-2.82 (m, 2H), 2.69 (s, 3H).

Example 102. Synthesis of (2R,3R,4S,5S)-2-(4-aminopyrrolo[2,3-d]pyrimidin-7-yl)-5-[(1R)-7-chloro-1,3,4,5-tetrahydro-2-benzoxepin-1-yl]tetrahydrofuran-3,4-diol; hydrochloride (Ex. 102)

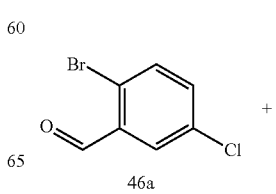

46a

-continued
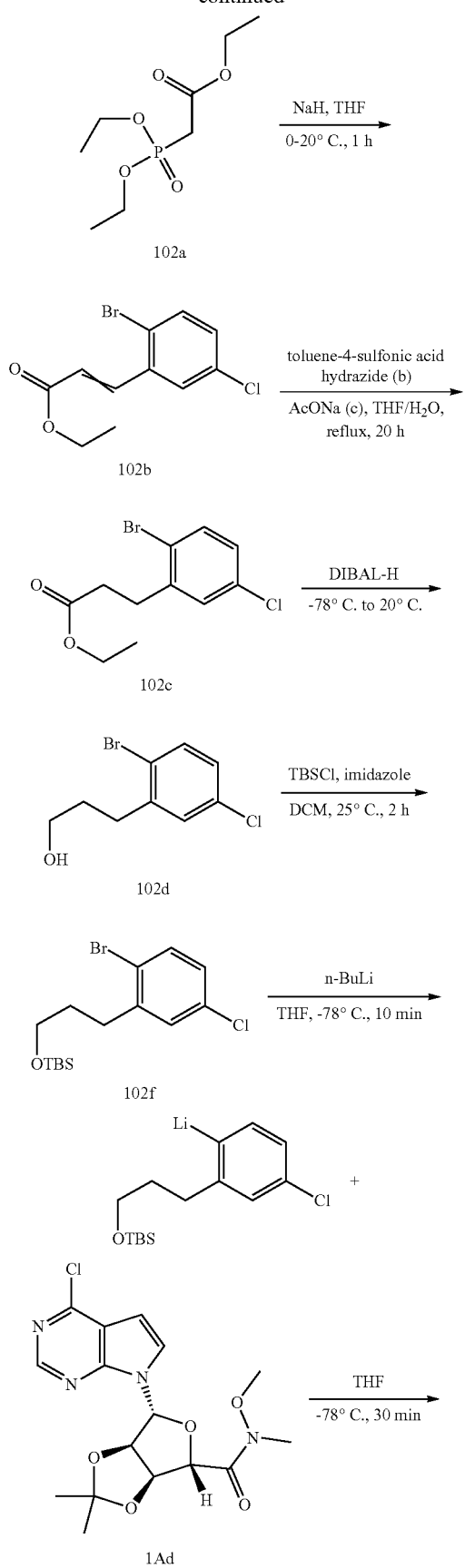
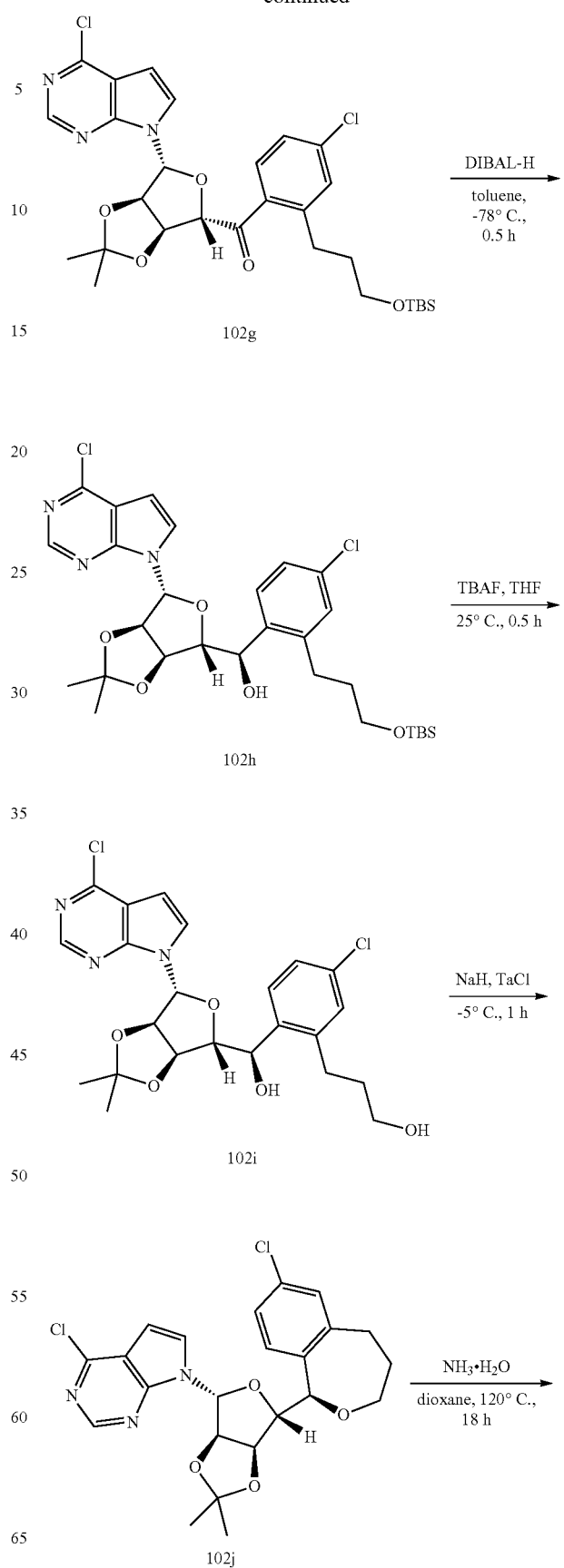

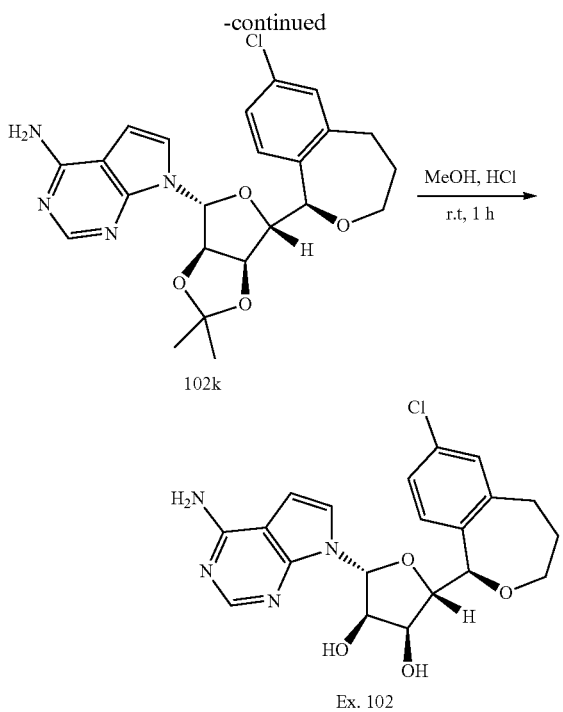

Ex. 102

Step 1. Synthesis of ethyl 3-(2-bromo-5-chloro-phenyl)prop-2-enoate (102b)

To a solution of NaH (0.01 mL, 54.68 mmol) in dry THF (50 mL) was slowly added ethyl 2-(diethoxyphophoryl) acetate (102a, 12.258 g, 54.68 mmol) at 0° C. and stirred for 10 min. 2-bromo-5-chloro-benzaldehyde (46a, 10 g, 45.57 mmol) was added to the reaction mixture and stirred at rt for 1 h. TLC (petroleum ether, $R_f$=0.2) and LCMS showed the reaction was complete. The reaction mixture was poured into ice-water (100 mL), extracted with ethyl acetate (200 mL) and washed with water (50 mL) and brine (50 mL). The organic layer was dried over anhydrous $Na_2SO_4$, filtered, and concentrated in vacuum to give the crude product which was purified by silica gel column chromatography (petroleum ether:ethyl acetate=100:1 to 50:1) to give ethyl 3-(2-bromo-5-chloro-phenyl)prop-2-enoate (102b, 11.6 g, 36.58 mmol, 80% yield) as an off-white oil. LCMS [M+H]: 291.0. $^1$H NMR (400 MHz, CDCl$_3$) δ 7.92-7.97 (m, 1H), 7.53-7.57 (m, 2H), 7.19-7.21 (m, 1H), 6.37-6.40 (m, 1H), 4.26-4.31 (m, 2H), 1.33-1.37 (m, 3H).

Step 2. Synthesis of ethyl 3-(2-bromo-5-chloro-phenyl)propanoate (102c)

A mixture of ethyl 3-(2-bromo-5-chloro-phenyl)prop-2-enoate (102b, 5.0 g, 17.27 mmol), p-toluenesulfonyl hydrazide (32.15 g, 172.68 mmol) and sodium acetate trihydrate (35.24 g, 259.02 mmol) in THF (58 mL)/water (58 mL) was stirred and refluxed for 20 h. Water (50 mL) was added, then extracted with ethyl acetate (100 mL), washed with water (2×300 mL), and brine (100 mL). The organic layer was dried over anhydrous $Na_2SO_4$, filtered, and concentrated in vacuum to give the crude product which was purified by silica gel column chromatography (petroleum ether: ethyl acetate=100:1 to 20:1) to give ethyl 3-(2-bromo-5-chloro-phenyl)propanoate (102c, 4.6 g, 13.8 mmol, 80% yield) as an off-white oil. LCMS [M+H]: 293.0. $^1$H NMR (400 MHz, CDCl$_3$) δ 7.44-7.46 (m, 1H), 7.25-7.26 (m, 1H), 7.05-7.08 (m, 1H), 4.12-4.18 (m, H), 3.01-3.05 (m, 2H), 2.61-2.65 (m, 2H).

Step 3. Synthesis of 3-(2-bromo-5-chloro-phenyl)propan-1-ol (102d)

To a solution of ethyl 3-(2-bromo-5-chloro-phenyl)propanoate (102c, 4.6 g, 15.78 mmol) in toluene (50 mL) was added diisobutylaluminium hydride (31.55 mL, 47.33 mmol) at −78° C. under $N_2$ and the reaction mixture was stirred for 60 min at −78° C. TLC (petroleum ether:ethyl acetate=40:1, $R_f$=0.1, petroleum ether:ethyl acetate=10:1, $R_f$=0.3) showed the reaction was complete. Saturated $NH_4Cl$ solution (100 mL) was added to the mixture, and the mixture was extracted with ethyl acetate (100 mL) and washed with brine (50 mL). The organic layer was dried over anhydrous $Na_2SO_4$ and the solvent was removed in vacuum to give the crude 3-(2-bromo-5-chloro-phenyl)propan-1-ol (102d) which was used without further purification in the next step.

Step 4. Synthesis of 3-(2-bromo-5-chloro-phenyl)-propoxy-tert-butyl-dimethyl-silane (102e)

To a solution of 3-(2-bromo-5-chloro-phenyl)propan-1-ol (102d, 5.1 g, 20.44 mmol) and imidazole (2.78 g, 40.88 mmol) in DCM (20 mL) was slowly added t-butylchlorodiphenylsilane (3.7 g, 24.53 mmol). The reaction mixture was stirred for 2 h at rt. TLC (petroleum ether, $R_f$=0.7) showed the reaction was complete. The solvent was removed in vacuum to yield the crude product which was purified by silica gel column chromatography (petroleum ether) to give 3-(2-bromo-5-chloro-phenyl)-propoxy-tert-butyl-dimethyl-silane (102e, 1.7 g, 4.67 mmol, 23% yield) as an off-white oil. $^1$H NMR (400 MHz, DMSO-d$_6$) δ7.56 (d, 0.83 (s, J=7.6 Hz, 1H), 7.37 (d, J=2.8 Hz, 1H), 7.20 (d, J=2.8 Hz, 1H), 3.56-3.59 (m, 2H), 2.68-2.71 (m, 2H), 1.69-1.72 (m, 2H), 0.83 (s, 9H), 0.00 (s, 6H).

Step 5. Synthesis of [2-[3-[tert-butyl(dimethyl)silyl]oxypropyl]-4-chloro-phenyl]-[4-(4-chloropyrrolo[2,3-d]pyrimidin-7-yl)-2,2-dimethyl-3a,4,6,6a-tetrahydrofuro[3,4-d][1,3]dioxol-6-yl]methanone (102f)

To a solution of 3-(2-bromo-5-chloro-phenyl)propoxy-tert-butyl-dimethyl-silane (102e, 1130.9 mg, 3.11 mmol) in THF (15 mL) was added n-butyllithium (175.71 mg, 2.74 mmol) at −78° C. The reaction mixture was stirred at −78° C. for 10 min. 4-(4-chloropyrrolo[2,3-d]pyrimidin-7-yl)-N-methoxy-N,2,2-trimethyl-3a,4,6,6a-tetrahydrofuro[3,4-d][1,3]dioxole-6-carboxamide (1Ad, 700 mg, 1.83 mmol) was added and the reaction was stirred for 1 h at −78° C. The reaction mixture was poured into water (20 mL), extracted with ethyl acetate (30 mL). The organic layer was dried over anhydrous $Na_2SO_4$, filtered, and concentrated in vacuum to give the crude product which was purified by silica gel column chromatography (petroleum ether:ethyl acetate=1:7) to give [2-[3-[tert-butyl(dimethyl)silyl]oxypropyl]-4-chloro-phenyl]-[4-(4-chloropyrrolo[2,3-d]pyrimidin-7-yl)-2,2-dimethyl-3a,4,6,6a-tetrahydrofuro[3,4-d][1,3]dioxol-6-yl]methanone (102f, 600 mg, 0.99 mmol, 54% yield), as a yellow oil. LCMS [M+H]: 606.2.

Step 6. Synthesis of (R)-[2-[3-[tert-butyl(dimethyl)silyl]oxypropyl]-4-chloro-phenyl]-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methanol (102 g)

To a mixture of [2-[3-[tert-butyl(dimethyl)silyl]oxypropyl]-4-chloro-phenyl]-[(3aR,4R,6S,6aS)-2,2-dimethyl-4-(4- methylpyrrolo[2,3-d]pyrimidin-7-yl)-3a,4,6,6a-tetrahydrofuro[3,4-d][1,3]dioxol-6-yl]methanone (102f, 600 mg, 1.02 mmol) in toluene (3 mL), DIBAL-H (0.24 mL, 2.05 mmol) was added at −78° C. The mixture was stirred at −78° C. for 30 min. The reaction mixture was poured into ethyl acetate (50 mL), concentrated in vacuum to give the crude product which was purified by silica gel column chromatography (petroleum ether:ethyl acetate=8:1) to give (R)-[2-[3-[tert-butyl(dimethyl)silyl]oxypropyl]-4-chloro-phenyl]-[(3aR, 4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methanol (102 g, 320 mg, 0.54 mmol, 53% yield) as a yellow oil. LCMS [M+H]: 608.2.

Step 7. Synthesis of 3-[5-chloro-2-[(R)-hydroxy-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methyl]phenyl]propan-1-ol (102h)

To a mixture of (S)-[2-[3-[tert-butyl(dimethyl)silyl]oxypropyl]-4-chloro-phenyl]-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methanol (102 g, 550 mg, 0.90 mmol) in THF (3 mL) was added tetrabutylammonium fluoride (0.03 mL, 1.08 mmol) at 25° C. The mixture was stirred at 25° C. for 30 min. The reaction mixture was poured into water (10 mL), extracted with ethyl acetate (20 mL). The organic layer was dried over anhydrous $Na_2SO_4$, filtered and concentrated in vacuum to give the crude product which was purified by silica gel column chromatography (ethyl acetate) to give 3-[5-chloro-2-[(R)-hydroxy-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methyl]phenyl]propan-1-ol (102h, 410 mg, 0.83 mmol, 91.8% yield) as a yellow oil. LCMS [M+H]: 494.2.

Step 8. Synthesis of 4-chloro-7-[(3aR,4R,6R,6aR)-2,2-dimethyl-6-[(1R)-7-chloro-1,3,4,5-tetrahydro-2-benzoxepin-1-yl]-3a,4,6,6a-tetrahydrofuro[3,4-d][1,3]dioxol-4-yl]pyrrolo[2,3-d]pyrimidine (102i)

To a mixture of 3-[5-chloro-2-[(R)-hydroxy-[(3aR,4R,6R,6aR)-4-(4-chloropyrrolo[2,3-d]pyrimidin-7-yl)-2,2-dimethyl-3a,4,6,6a-tetrahydrofuro[3,4-d][1,3]dioxol-6-yl]methyl]phenyl]propan-1-ol (102h, 100 mg, 0.20 mmol) in THF (4 mL) was added sodium hydride (0.06 mL, 0.40 mmol) at −5° C. The reaction was stirred at −5° C. for 10 min. Tosyl chloride (38.56 mg, 0.20 mmol) was added at −5° C., then stirred at −5° C. for 30 min. The reaction mixture was poured into water (10 mL) and extracted with ethyl acetate (20 mL). The organic layer was dried over anhydrous $Na_2SO_4$, filtered, and concentrated in vacuum to give the crude 102i which was used without further purification in the next step. LCMS [M+H]: 476.3.

Step 9. Synthesis of 7-[(3aR,4R,6R,6aR)-2,2-dimethyl-6-[(1R)-7-chloro-1,3,4,5-tetrahydro-2-benzoxepin-1-yl]-3a,4,6,6a-tetrahydrofuro[3,4-d][1,3]dioxol-4-yl]pyrrolo[2,3-d]pyrimidin-4-amine (102j)

To a mixture of 4-chloro-7-[(3aR,4R,6R,6aR)-2,2-dimethyl-6-[(1R)-7-chloro-1,3,4,5-tetrahydro-2-benzoxepin-1-yl]-3a,4,6,6a-tetrahydrofuro[3,4-d][1,3]dioxol-4-yl]pyrrolo[2,3-d]pyrimidine (102i, 84 mg, 0.18 mmol) in 1,4-dioxane (3 mL) was added ammonium hydroxide (61.81 mg, 1.76 mmol). The mixture was stirred at 110° C. for 16 h. LCMS showed 10% of product was detected. The reaction was poured into water (10 mL) and extracted with ethyl acetate (20 mL). The organic layer was dried over anhydrous $Na_2SO_4$, filtered, and concentrated in vacuum to give crude product which was purified by prep-HPLC, eluted with MeCN in water (0.1% $NH_3$·water) from 10% to 95% to give 7-[(3aR,4R,6R,6aR)-2,2-dimethyl-6-[(1R)-7-chloro-1,3,4,5-tetrahydro-2-benzoxepin-1-yl]-3a,4,6,6a-tetrahydrofuro[3,4-d][1,3]dioxol-4-yl]pyrrolo[2,3-d]pyrimidin-4-amine (102j, 10 mg, 0.022 mmol, 12% yield). LCMS [M+H]: 457.3.

Step 10. Synthesis of (2R,3R,4S,5S)-2-(4-aminopyrrolo[2,3-d]pyrimidin-7-yl)-5-[(1R)-7-chloro-1,3,4,5-tetrahydro-2-benzoxepin-1-yl]tetrahydrofuran-3,4-diol; hydrochloride (Ex. 102)

To a mixture of 7-[(3aR,4R,6R,6aR)-2,2-dimethyl-6-[(1R)-7-chloro-1,3,4,5-tetrahydro-2-benzoxepin-1-yl]-3a,4,6,6a-tetrahydrofuro[3,4-d][1,3]dioxol-4-yl]pyrrolo[2,3-d]pyrimidin-4-amine (102j, 10 mg, 0.02 mmol) in methanol (2 mL) was added HCl (1.6 mg, 0.04 mmol). The mixture was stirred at 25° C. for 1 h. The mixture was purified by prep-HPLC, eluting with MeCN in water:$CH_3CN$ (0.1% HCl) from 10% to 95% to give (2R,3R,4S,5S)-2-(4-aminopyrrolo[2,3-d]pyrimidin-7-yl)-5-[(1R)-7-chloro-1,3,4,5-tetrahydro-2-benzoxepin-1-yl]tetrahydrofuran-3,4-diol; hydrochloride (Ex. 102, 1.46 mg, 0.0031 mmol, 14% yield) as a white solid. LCMS [M+H]: 417.3. $^1$H NMR (400 MHz, DMSO-d6) δ: 8.44-8.45 (m, 1H), 8.20 (d, J=5.6 Hz, 1H), 7.08-7.10 (m, 3H), 6.82 (d, J=4 Hz, 1H), 6.66-6.69 (m, 1H), 6.22 (d, J=3.6 Hz, 1H), 5.69 (m, 2H), 5.26 (d, J=2 Hz 1H), 5.16 (d, J=4 Hz 2H), 3.94-3.97 (m, 1H), 3.45-3.59 (m, 1H), 2.73-2.77 (m, 2H), 1.96-2.03 (m, 2H), 1.58-1.62 (m, 2H). $^1$H NMR (400 MHz, DMSO-$d_6$+$D_2O$) δ: 8.42-8.43 (m, 1H), 8.20-8.22 (m, 1H), 7.07-7.11 (m, 3H), 6.83 (d, J=4 Hz, 1H), 6.24 (d, J=3.6 Hz, 1H), 5.67-5.71 (m, 2H), 4.84-4.87 (m, 1H), 3.95-3.98 (m, 1H), 2.74-2.77 (m, 2H), 1.98-2.01 (m, 2H), 1.54-1.60 (m, 2H).

Example 101. Synthesis of (2R,3R,4S,5S)-2-(4-methylpyrrolo[2,3-d]pyrimidin-7-yl)-5-[(1R)-7-chloro-1,3,4,5-tetrahydro-2-benzoxepin-1-yl]tetrahydrofuran-3,4-diol (Ex. 101)

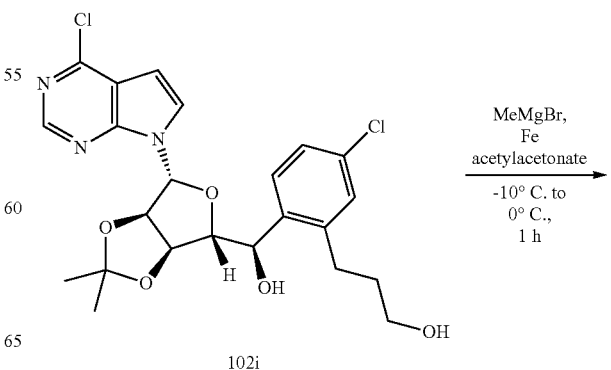

102i

MeMgBr, Fe acetylacetonate

−10° C. to 0° C., 1 h

-continued

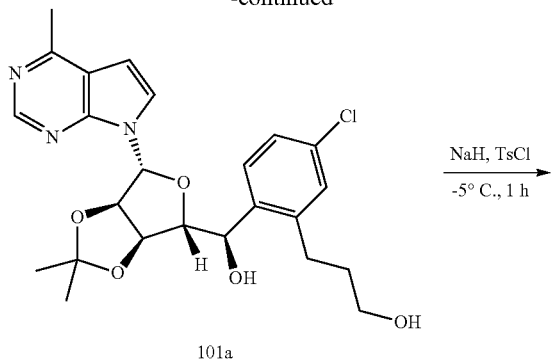

101a

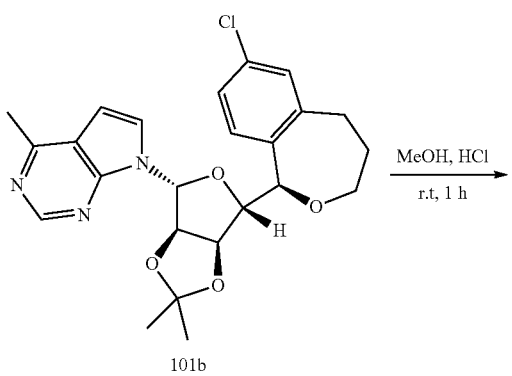

101b

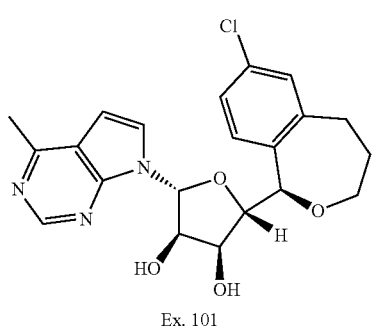

Ex. 101

Step 1. Synthesis of 3-[5-chloro-2-[(R)-hydroxy-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methyl]phenyl]propan-1-ol (101a)

To a mixture of 3-[5-chloro-2-[(R)-hydroxy-[(3aR,4R,6R,6aR)-4-(4-chloropyrrolo[2,3-d]-pyrimidin-7-yl)-2,2-dimethyl-3a,4,6,6a-tetrahydrofuro[3,4-d][1,3]dioxol-6-yl]methyl]phenyl]propan-1-ol (102i, 20 mg, 0.04 mmol) and ferric acetylacetonate (7.14 mg, 0.02 mmol) in THF (2 mL) was added methylmagnesium bromide (48.24 mg, 0.40 mmol) at −10° C. The mixture was warmed to 0° C. and stirred for 1 h. TLC (petroleum ether:ethyl acetate=5:1, $R_f$=0.7) showed the reaction was complete. The reaction mixture was poured into water (5 mL), extracted with DCM (3×5 mL). The organic layer was dried over anhydrous Na$_2$SO$_4$, filtered, and concentrated in vacuum. The crude product was purified by silica gel column chromatography (petroleum ether:ethyl acetate=7:1) to give 3-[5-chloro-2-[(R)-hydroxy-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methyl]phenyl]propan-1-ol (101a, 10 mg, 0.0211 mmol, 52% yield) as a yellow oil. LCMS [M+H]: 474.2.

Step 2. Synthesis of 4-methyl-7-[(3aR,4R,6R,6aR)-2,2-dimethyl-6-[(1R)-7-chloro-1,3,4,5-tetrahydro-2-benzoxepin-1-yl]-3a,4,6,6a-tetrahydrofuro[3,4-d][1,3]dioxol-4-yl]pyrrolo[2,3-d]pyrimidine (101b)

To a mixture of 3-[5-chloro-2-[(R)-hydroxy-[(3aR,4R,6R,6aR)-2,2-dimethyl-4-(4-methylpyrrolo[2,3-d]pyrimidin-7-yl)-3a,4,6,6a-tetrahydrofuro[3,4-d][1,3]dioxol-6-yl]methyl]phenyl]propan-1-ol (101a, 20 mg, 0.04 mmol) in THF (2 mL) sodium hydride (0.06 mL, 0.08 mmol) was added at −5° C. and the reaction was stirred 10 min at −5° C. Tosyl chloride (8.05 mg, 0.04 mmol) was added and the mixture was stirred at −5° C. for 30 min. LCMS showed the reaction was complete. The reaction mixture was poured into NH$_4$Cl (10 mL) and extracted with ethyl acetate (10 mL). The organic layer was dried over anhydrous Na$_2$SO$_4$, filtered and concentrated in vacuum. The crude product was purified by silica gel column chromatography chromatography (petroleum ether:ethyl acetate=7:1) to give 4-methyl-7-[(3aR,4R,6R,6aR)-2,2-dimethyl-6-[(1R)-7-chloro-1,3,4,5-tetrahydro-2-benzoxepin-1-yl]-3a,4,6,6a-tetrahydrofuro[3,4-d][1,3]dioxol-4-yl]pyrrolo[2,3-d]pyrimidine (101b, 4 mg, 0.0088 mmol, 21% yield), as a white solid. LCMS [M+H]: 456.3.

Step 3. Synthesis of (2R,3R,4S,5S)-2-(4-methylpyrrolo[2,3-d]pyrimidin-7-yl)-5-[(1R)-7-chloro-1,3,4,5-tetrahydro-2-benzoxepin-1-yl]tetrahydrofuran-3,4-diol (Ex. 101)

To a mixture of 4-methyl-7-[(3aR,4R,6R,6aR)-2,2-dimethyl-6-[(1R)-7-chloro-1,3,4,5-tetrahydro-2-benzoxepin-1-yl]-3a,4,6,6a-tetrahydrofuro[3,4-d][1,3]dioxol-4-yl]pyrrolo[2,3-d]pyrimidine (101b, 4 mg, 0.01 mmol) in methanol (2 mL) was added HCl (0.64 mg, 0.02 mmol). The mixture was stirred at 25° C. for 1 h. The reaction mixture was purified by prep-HPLC, eluted with MeCN in water (0.1% TFA) from 10% to 95% to give (2R,3R,4S,5S)-2-(4-methylpyrrolo[2,3-d]pyrimidin-7-yl)-5-[(1R)-7-chloro-1,3,4,5-tetrahydro-2-benzoxepin-1-yl]tetrahydrofuran-3,4-diol (Ex. 101, 1 mg, 0.0024 mmol, 27% yield) as a white solid. LCMS [M+H]: 416.3. $^1$H NMR (400 MHz, DMSO-d$_6$) δ: 8.66 (s, 1H), 8.44 (s, 2H), 7.62 (d, J=3.6 Hz, 1H), 7.30 (d, J=1.6 Hz, 1H), 7.18-7.25 (m, 2H), 6.77 (d, J=3.6 Hz, 1H), 6.29 (d, J=7.6 Hz, 1H), 5.44-5.53 (m, 1H), 4.78 (d, J=4.2 Hz, 1H), 4.61-4.64 (m, 1H), 4.39 (d, J=4.8 Hz, 1H), 4.25-4.30 (m, 2H), 3.10-3.16 (m, 1H), 2.89-2.94 (m, 1H), 2.65-2.67 (m, 3H), 1.68-1.77 (m, 2H). $^1$H NMR (400 MHz, DMSO-d$_6$+D$_2$O) δ:8.67 (s, 1H), 8.43 (s, 4H), 7.62 (d, J=4 Hz, 1H), 7.30 (d, J=1.6 Hz, 1H), 7.18-7.25 (m, 2H), 6.78 (d, J=3.6 Hz, 1H), 6.29 (d, J=8 Hz, 1H), 4.78 (d, J=4.2 Hz, 1H), 4.62-4.65 (m, 1H), 4.39 (d, J=4.2 Hz, 1H), 4.25-4.30 (m, 2H), 3.10-3.12 (m, 1H), 2.89-2.94 (m, 1H), 2.65-2.69 (m, 3H), 1.68-1.81 (m, 2H).

TABLE 1

Examples prepared according to the above procedures.

| Ex. # | Structure | Prepared as in Ex. # | Spectral data |
|---|---|---|---|
| 4 | | 1A | HCl salt: ¹H NMR (400 M Hz, DMSO-d6): δ 8.40 (s, 1 H), 7.72 (d, J = 3.2 Hz, 1 H), 7.45-7.49 (m, 1 H), 7.32-7.36 (m, 1 H), 7.06 (s, 1 H), 6.19 (d, J = 7.2 Hz, 1 H), 5.36 (s, 1 H), 5.04-5.13 (m, 2 H), 4.48 (t, J = 6.0 Hz, 1 H), 4.21 (d, J = 4.4 Hz, 1 H), 3.89 (d, J = 4.4 Hz, 1 H). |
| 12 | | 15 | ¹H NMR (400 M Hz, DMSO-d6 + D₂O): δ8.66 (s, 1 H), 7.74 (d, J = 3.2 Hz, 1 H), 7.44 (s, 1 H), 7.32 (d, J = 8.4 Hz, 1 H), 7.25 (d, J = 8.0 Hz, 1 H), 6.84 (d, J = 3.2 Hz, 1 H), 6.29 (d, J = 7.2 Hz, 1 H), 5.38 (br, 1 H), 5.07-5.15 (m, 2 H), 4.56-4.59 (m, 1 H), 4.16 (d, J = 4.4 Hz, 1 H), 3.95 (d, J = 4.8 Hz, 1 H), 2.68 (s, 3 H). |
| 16 | | 1A | ¹HNMR (DMSO-d6 + D₂O, 400 MHz) δ 8.07 (s, 1 H), 7.74 (s, 1 H), 7.63-7.65 (d, J = 8.0 Hz, 1 H), 7.45-7.47 (d, J = 8.0 Hz, 1 H), 7.32-7.33 (d, J = 3.6 Hz, 1 H), 6.66 (d, J = 3.6 Hz, 1H), 6.15-6.17 (d, J = 7.6 Hz, 1H), 5.47 (m, 1 H), 5.16-5.18 (m, 2 H), 4.52-4.55 (m, 1 H), 4.13-4.14 (m, 1 H), 3.97-3.98 (m, 1 H). |
| 17 | | 15 | ¹HNMR (DMSO-d6 + D₂O, 400 MHz) δ 8.67 (s, 1 H), 7.74-7.76 (m, 2 H), 7.62-7.64 (d, J = 7.6 Hz, 1 H), 7.44-7.46 (d, J = 8.0 Hz, 1H), 6.82-6.83 (d, J = 3.6 Hz, 1 H), 6.28-6.30 (d, J = 7.6 Hz, 1 H), 5.49 (m, 1 H), 5.17-5.20 (m, 2 H), 4.59-4.62 (m, 1 H), 4.17-4.19 (m, 1 H), 3.98-3.99 (m, 1 H), 2.68 (s, 3 H) |

TABLE 1-continued

Examples prepared according to the above procedures.

| Ex. # | Structure | Prepared as in Ex. # | Spectral data |
|---|---|---|---|
| 42 | 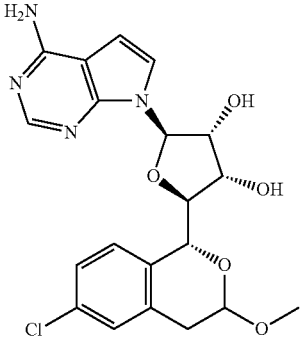 | 44, 1A | LCMS [M + H]: 433.1<br>$^1$H NMR (400 MHz, DMSO-d6) δ 8.39 (s, 1H), 7.71 (s, 1H), 7.23-7.32 (m, 3H) 7.05 (s, 1H), 6.22 (d, 1H), 5.27 (d, 1H), 4.82 (d, 1H), 4.48-4.51 (m, 2H), 3.87 (d, 1H), 3.07-3.12 (q, 2H), 2.78 (d, 1H).<br>$^1$H NMR (400 MHz, DMSO-d6 + D2O) δ 8.37 (d, 1H), 7.73 (s, 1H) 7.25-7.32 (m, 3H), 7.02 (s, 1H), 6.23 (d, 1H), 5.28 (s, 1H), 4.84 (s, 1H), 4.50-4.52 (m, 2H), 3.86 (d, 1H), 3.09 (d, 1H), 2.78 (d, 1H).<br>CH$_3$ peak is under the water peak. |
| 43 | 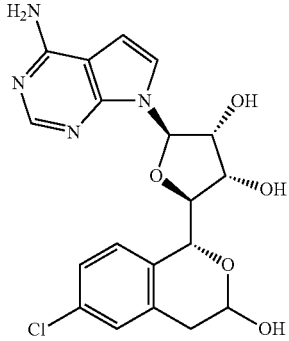 | 50, 1A | LCMS [M + H]: 419.0<br>$^1$H NMR (400 MHz, DMSO-d6) δ 8.05 (s, 1H), 7.58 (s, 1H), 7.06 (s, 1H) 7.22-7.41 (m, 3H), 7.10 (s, 2H), 6.61-6.64 (m, 2H), 6.16-6.23 (m, 1H), δ 5.56 (s, 1H), 5.15-5.18 (m, 1H), 4.95-5.06 (m, 3H) 4.38-4.52 (m, 3H), 3.85 (s, 1H), 3.72-3.74 (m, 1H), 2.76-2.90 (m, 1H), δ 2.49-2.51 (m, 1H).<br>$^1$H NMR (400 MHz, DMSO-d6 + D2O) δ 8.06 (s, 1H), 7.61 (s, 1H), 7.22-7.34 (m, 3H) 6.65 (s, 1H), 6.16-6.23 (m, 1H), 5.56 (s, 1H), 4.95-5.02 (m, 2H), δ 4.39-4.53 (m, 2H), 3.71-3.85 (d, 1H), 2.90-3.00 (m, 1H), 2.67-2.80 (m, 1H). |
| 68 | 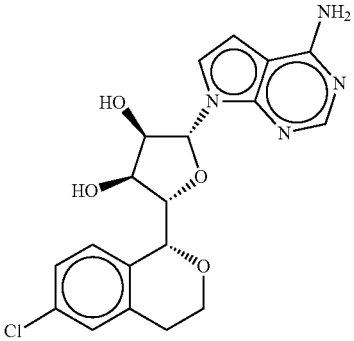 | 22, 1A | LCMS [M + H]: 403.2. 1H NMR (400 MHz, DMSO-d6): δ 8.06 (s, 1 H), 7.37 (d, J = 3.6 Hz, 1 H), 7.28-7.31 (m, 2 H), 7.21-7.24 (m, 1 H), 7.01 (s, 2 H), 6.64 (d, J = 4.0 Hz, 1 H), 6.17 (d, J = 7.6 Hz, 1 H), 5.13 (br, 2 H), 4.86-4.88 (m, 1 H), 4.43-4.47 (m, 1 H), 4.35-4.36 (m, 1 H), 4.21-4.24 (m, 1 H), 3.83-3.85 (m, 1 H), 3.64-3.71 (m, 1 H), 2.89-2.94 (m, 1 H), 2.69-2.74 (m, 1 H).<br>1H NMR (400 M Hz, DMSO-d6 + D2O): δ 8.07 (s, 1 H), 7.38 (d, J = 4.0 Hz, 1 H), 7.27-7.29 (m, 2 H), 7.22-7.25 (m, 1 H), 6.66 (d, J = 3.6 Hz, 1 H), 6.18 (d, J = 7.6 Hz, 1 H), 4.87-4.88 (m, 1 H), 4.44-4.48 (m, 1 H), 4.37-4.39 (m, 1 H), 4.21-4.25 (m, 1 H), 3.83-3.85 (m, 1 H), 3.64-3.70 (m, 1 H), 2.91-2.99 (m, 1 H), 2.70-2.74 (m, 1 H). |
| 70 | 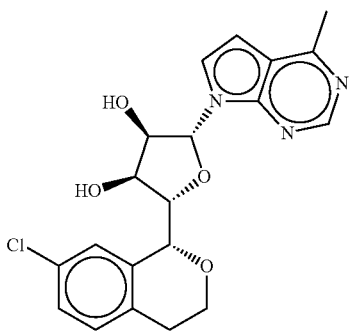 | 22 | LCMS [M + H]: 402.2. 1H NMR (400 MHz, DMSO-d6 + D2O) δ8.95 (s, 1 H), 8.07 (d, J = 2.1 Hz, 1 H), 7.29-7.15 (m, 4H), 6.34 (d, J = 7.5 Hz, 1 H), 4.90 (brs, 1 H), 4.55-4.49 (m, 2 H), 4.28-4.24 (m, 1H), 3.83-3.82 (m, 1 H), 3.66-3.61 (m, 1 H), 2.93-2.86 (m, 4H), 2.69-2.65 (m, 1 H). |

TABLE 1-continued

Examples prepared according to the above procedures.

| Ex. # | Structure | Prepared as in Ex. # | Spectral data |
|---|---|---|---|
| 71 | | 22, 1A | LCMS [M + H]: 403.3. 1H NMR (400 MHz, DMSO-d6 + D2O) δ 8.32 (s, 1 H), 7.71 (d, J = 3.1 Hz, 1 H), 7.26-7.21 (m, 3H), 6.98 (s, 1H), 6.18 (d, J = 7.4 Hz, 1 H), 4.86 (brs, 1 H), 4.49-4.44 (m, 2 H), 4.23-4.21 (m, 1H), 3.81-3.80 (m, 1 H), 3.64-3.59 (m, 1 H), 2.90-2.85 (m, 1H), 2.68-2.63 (m, 1 H). |
| 72 | | 22, 1A | LCMS [M + H]: 403.2. 1H NMR (400 MHz, DMSO-d6) δ 8.06 (s, 1 H), 7.37 (d, J = 4 Hz, 2 H), 7.29 (d, J = 7.6 Hz, 1 H), 7.24-7.20 (t, J = 7.6 Hz, 1 H), 7.01 (s, 2 H), 6.64 (d, J = 3.6 Hz, 1 H), 6.17 (d, J = 7.6 Hz, 1 H), 5.17 (d, J = 7.2 Hz, 1 H), 5.04 (d, J = 4 Hz, 1 H), 4.90 (br, 1H), 4.47-4.40 (m, 2 H), 4.33-4.28 (m, 1 H), 3.83 (t, J = 7.6 Hz, 1 H), 3.76-3.69 (m, 1 H), 2.87-2.76 (m, 2 H). 1H NMR (400 MHz, DMSO-d6 + D2O) δ 8.08 (s, 1 H), 7.40-7.37 (m, 2 H), 7.29-7.22 (m, 2 H), 6.67 (d, J = 3.6 Hz, 1 H), 6.18 (d, J = 7.6 Hz, 1 H), 4.91 (br, 1H), 4.48-4.42 (m, 2 H), 4.33-4.30 (m, 1 H), 3.83-3.78 (m, 2 H), 2.81 (br, 2 H). |
| 73 | | 22, 1A | LCMS [M + H]: 405.3. 1H NMR (400 MHz, DMSO-d6 + D2O): δ 8.08 (s, 1H), 7.35-7.31 (m, 3H), 7.01-7.04 (m, 2H), 6.63-6.65 (m, 1H), 6.17 (d, J = 8.0, 1H ) 5.17-5.19 (d, J = 8.8 Hz, 1H), 5.07 (d, J = 4.0 Hz, 1H), 4.83 (d, J = 3.6 Hz, 1H ), 4.44-4.49 (m, 1H), 4.35-4.38 (m, 1H), 4.20-4.24 (m, 1H), 3.84-3.87 (m, 1H), 3.64-3.72 (m, 1H), 2.85-2.93 (m, 1H), 2.76-2.71 (m, 1H). |
| 74 | | 22 | LCMS [M + H]: 404.4. 1 H NMR (400 MHz, DMSO-d6 + D2O): δ 8.87 (s, 1H), 7.95 (d, J = 3.6 Hz, 1H), 7.28-7.41 (m, 2H), 7.02 (d, J = 3.6 Hz, 1H), 6.3 (d, J = 8.0 Hz, 1H), 4.88 (s, 1H), 4.47-4.54 (m, 2H), 4.24-4.28 (m, 1H), 3.85 (m, 1H), 3.48-3.72 (m, 1H), 2.88 (m, 1H), 2.79 (s, 3H), 2.68-2.72 (m, 1H). |

TABLE 1-continued

Examples prepared according to the above procedures.

| Ex. # | Structure | Prepared as in Ex. # | Spectral data |
|---|---|---|---|
| 75 | | 22 | LCMS [M + H]: 404.4. 1H NMR (400 MHz, DMSO-d6) δ 8.67 (s, 1 H), 7.77 (d, J = 3.6 Hz, 1 H), 7.37 (d, J = 8 Hz, 1 H), 7.37 (d, J = 7.6 Hz, 1 H), 7.22 (t, J = 7.6 Hz, 1 H), 6.81 (d, J = 3.6 Hz, 1 H), 6.30 (d, J = 7.6 Hz, 1 H), 5.26 (d, J = 7.2 Hz, 1 H), 5.5.13 (d, J = 4 Hz, 1 H), 4.92 (br, 1H), 4.53-4.46 (m, 2 H), 4.34-4.30 (m, 1 H), 3.84 (t, J = 4.4 Hz, 1 H), 3.77-3.70 (m, 1 H), 2.87-2.76 (m, 2 H), 2.67 (s, 3 H). 1H NMR (400 MHz, DMSO-d6 + D2O) δ 8.67 (s, 1 H), 7.77 (d, J = 4 Hz, 1 H), 7.40-7.36 (m, 1 H), 7.30-7.23 (m, 2 H), 6.84 (d, J = 4 Hz, 1 H), 6.31 (d, J = 7.6 Hz, 1 H), 4.93 (br, 1H), 4.54-4.48 (m, 2 H), 4.36-4.32 (m, 1 H), 3.82 (d, J = 5.6 Hz, 1 H), 3.79 (s, 1 H), 2.84-2.81 (br, 2 H), 2.68 (s, 3H). |
| 77 | | 22, 1A | LCMS [M + H]: 405.2. 1H NMR (400 MHz, DMSO-d6) δ 8.06 (s, 1 H), 7.38-7.37 (d, J = 4 Hz, 1 H), 7.27-7.22 (m, 1 H), 7.17-7.13 (m, 1 H), 7.02 (s, 2 H), 6.65-6.64 (d, J = 4 Hz, 1 H), 6.18-6.17 (d, J = 4 Hz, 1 H), 5.21-5.20 (d, J = 4 Hz, 1 H), 5.08-5.07 (d, J = 4 Hz, 1 H), 4.87-4.86 (d, J = 4 Hz, 1 H), 4.46-4.45 (m, 1 H), 4.39-4.38 (d, J = 4 Hz, 1 H), 4.29-4.25 (m, 1 H), 3.89-3.88 (m, 1 H), 3.75-3.67 (m, 1 H), 2.84-2.80 (m, 2 H). 1H NMR (400 MHz, DMSO-d6 + D2O) δ 8.07 (s, 1 H), 7.38-7.37 (d, J = 4 Hz, 1 H), 7.26-7.24 (m, 1 H), 7.17-7.14 (m, 1 H), 6.65-6.64 (d, J = 4 Hz, 1 H), 6.18-6.17 (d, J = 4 Hz, 1 H), 4.87-4.86 (d, J = 4 Hz, 1 H), 4.46-4.45 (m, 1 H), 4.39-4.38 (d, J = 4 Hz, 1 H), 4.29-4.25 (m, 1 H), 3.89-3.88 (m, 1 H), 3.75-3.67 (m, 1 H), 2.81 (s, 2 H). |
| 78 | | 76, 1A | LCMS [M + H]: 405.1. 1H NMR (400 MHz, DMSO-d6) δ 8.08 (s, 1 H), 7.73 (d, J = 8 Hz, 1 H), 7.57-7.48 (m, 3 H), 7.34 (d, J = 3.6 Hz, 1 H), 7.05 (s, 2 H), 6.66 (d, J = 3.6 Hz, 1 H), 6.20 (d, J = 7.6 Hz, 1 H), 5.26 (d, J = 7.2 Hz, 1 H), 5.11 (d, J = 4.4 Hz, 1 H), 5.06 (m, 1 H), 4.56-4.40 (m, 3 H), 4.15-4.05 (m, 1H), 3.80 (t, J = 4.2 Hz, 1 H). 1H NMR (400 MHz, DMSO-d6, +D2O) δ 8.08 (s, 1 H), 7.74 (d, J = 7.6 Hz, 1 H), 7.57-7.47 (m, 3 H), 7.34 (d, J = 3.6 Hz, 1 H), 6.67 (d, J = 3.6 Hz, 1 H), 6.20 (d, J = 8 Hz, 1 H), 5.07 (m, 1 H), 4.56-4.41 (m, 3 H), 4.13-4.04 (m, 1 H), 3.81-3.796 (m, 1 H). |

TABLE 1-continued

Examples prepared according to the above procedures.

| Ex. # | Structure | Prepared as in Ex. # | Spectral data |
|---|---|---|---|
| 79 | | 22 | LCMS [M + H]: 404.2. 1H NMR (400 MHz, DMSO-d6) δ 8.67 (s, 1 H), 7.77-7.76 (d, J = 4 Hz, 1 H), 7.27-7.25 (m, 1 H), 7.17-7.14 (m, 1 H), 6.81-6.80 (d, J = 4 Hz, 1 H), 6.31-6.29 (d, J = 8 Hz, 1 H), 5.29-5.28 (d, J = 4 Hz, 1 H), 5.15-5.14 (d, J = 4 Hz, 1 H), 4.90-4.89 (d, J = 4 Hz, 1 H), 4.53-4.51 (m, 1 H), 4.45-4.44 (m, 1 H), 4.32-4.29 (m, 1 H), 3.90-3.88 (m, 1 H), 3.73-3.70 (m, 1 H), 2.84-2.82 (m, 2 H), 2.67 (s, 3H). 1H NMR (400 MHz, DMSO-d6 + D2O): δ 8.66 (s, 1 H), 7.79-7.78 (d, J = 4 Hz, 1 H), 7.25-7.20 (m, 1 H), 7.14-7.11 (m, 1 H), 6.88-6.87 (d, J = 4 Hz, 1 H), 6.33-6.31 (d, J = 8 Hz, 1 H), 4.90 (s, 1 H), 4.59-4.57 (m, 1 H), 4.55-4.50 (m, 1 H), 4.35-4.31 (m, 1 H), 3.90-3.89 (m, 1 H), 3.70-3.68 (m, 1 H), 2.87-2.85 (m, 2 H), 2.70 (s, 3H). |
| 80 | | 22, 1B | LCMS [M + H]: 402.2. 1H NMR (400 M Hz, DMSO-d6 + D2O): δ 8.62 (s, 1 H), 7.66 (d, J = 3.6 Hz, 1 H), 7.27 (d, J = 8.4 Hz, 1H), 7.21-7.15 (m, 2 H), 6.76 (d, J = 4 Hz, 1 H), 6.20 (d, J = 6.4 Hz, 1 H), 4.93 (s, 1 H), 4.49 (s, 1 H), 4.46-4.44 (m, 1 H), 4.36-4.33 (m, 1 H), 4.26-4.22 (m, 1 H), 3.76-3.69 (m, 1 H), 2.87-2.78 (m, 1 H), 2.68-2.63 (m, 4 H). |
| 84 | | 83, 1A | LCMS [M + H]: 421.1 $^1$H NMR (400 MHz, DMSO-d$_6$)8.06 (s, 1 H), 7.39 (d, J = 3.6 Hz, 1H), 7.32-7.27 (m, 2H), 7.03 (s, 2 H), 6.65 (d, J = 3.6 Hz, 1 H), 6.18 (d, J = 7.6 Hz, 1 H), 5.23 (d, J = 7.2 Hz, 1 H), 5.13 (d, J = 4.4 Hz, 1 H), 4.88 (d, J = 3.6 Hz, 1H), 4.62 (dd, J = 6.8 Hz, 1H), 4.40 (d, J = 3.2 Hz, 1H), 4.27 (s, 1 H), 3.87 (t, J = 4 Hz, 1 H), 3.69 (s, 1 H), 2.76 (s, 2H). $^1$H NMR (400 MHz, DMSO-d$_6$ + D$_2$O) 8.07 (s, 1 H), 7.40 (d, J = 3.2 Hz, 1H), 7.30-7.24 (m, 2H), 6.67 (d, J = 4 Hz, 1 H), 6.18 (d, J = 8 Hz, 1 H), 4.89 (d, J = 3.6 Hz, 1H), 4.78 (dd, J = 6.8 Hz, 1H), 4.39 (d, J = 3.2 Hz, 1H), 4.26 (s, 1 H), 3.88 (d, J = 5.2 Hz, 1 H), 3.70 (s, 1 H), 2.76 (s, 2H). |

TABLE 1-continued

Examples prepared according to the above procedures.

| Ex. # | Structure | Prepared as in Ex. # | Spectral data |
|---|---|---|---|
| 85 | | 87, 15 | LCMS [M + H]: 420.1<br>$^1$H NMR (400 MHz, DMSO-d$_6$) δ 8.71 (s, 1 H), 7.69 (s, 1 H), 7.23-7.31 (m, 3 H), 6.36 (m, 1 H), 5.18-5.30 (m, 2 H), 4.89 (s, 1 H), 4.41-4.45 (m, 2 H), 4.26-4.29 (m, 1 H), 3.81-3.83 (m, 1 H), 3.66-3.72 (m, 1 H), 2.90-2.97 (m, 1 H), 2.70-2.74 (m, 4 H).<br>$^1$H NMR (400 MHz, DMSO-d$_6$ + D$_2$O) δ 8.71 (s, 1 H), 7.69 (s, 1 H), 7.23-7.31 (m, 3 H), 6.36 (m, 1 H), 4.89 (s, 1 H), 4.41-4.45 (m, 2 H), 4.26-4.29 (m, 1 H), 3.81-3.83 (m, 1 H), 3.66-3.72 (m, 1 H), 2.90-2.97 (m, 1 H), 2.70-2.74 (m, 4 H). |
| 87 | | 89, 22 | LCMS [M + H]: 436.1<br>$^1$H NMR (400 MHz, DMSO-d$_6$) δ 8.80 (s, 1 H), 7.88 (s, 1 H), 7.59 (s, 1 H), 7.52 (s, 1 H), 6.94 (s, 1 H), 6.33-6.31 (d, J = 8 Hz, 1 H), 5.43-5.11 (m, 2 H), 4.91-4.90 (d, J = 4 Hz, 1 H), 4.52-4.51 (m, 1 H), 4.46-4.45 (m, 1 H), 3.87-3.86 (d, J = 4 Hz, 1 H), 3.69-3.65 (m, 1 H), 3.30-2.96 (m, 1 H), 2.92-2.90 (m, 1 H), 2.74 (s, 3 H), 2.71 (s, 1 H).<br>$^1$H NMR (400 MHz, DMSO-d$_6$+D$_2$O) δ8.84 (s, 1 H), 7.93-7.92 (d, J = 4 Hz, 1 H), 7.56 (s, 1 H), 7.52 (s, 1 H), 7.01-7.00 (d, J = 4 Hz, 1 H), 6.34-6.32 (d, J = 8 Hz, 1 H), 4.91 (s, 1 H), 4.55-4.52 (m, 1 H), 4.48-4.47 (d, J = 4 Hz, 1 H), 4.28-4.24 (m, 1 H), 3.88-3.87 (d, J = 4 Hz, 1 H), 2.93-2.90 (m, 1 H), 2.77 (s, 3 H), 2.76 (s, 1 H). |
| 99 | | 100, 22 | LCMS [M + H]: 416.2<br>$^1$H NMR (400 MHz, DMSO-d$_6$ + D$_2$O) δ9.02 (s, 1 H), 8.08-8.10 (m, 1 H), 7.26-7.28 (m, 2 H), 7.20-7.21 (d, J = 4 Hz, 1 H), 6.37-6.41 (m, 1 H), 4.91 (s, 1 H), 4.53-4.55 (m, 2 H), 4.27-4.31 (m, 1 H), 3.78-3.83 (m, 1 H), 3.63-3.68 (m, 1 H), 2.90-2.93 (m, 4 H), 2.67-2.71 (d, J = 16 Hz, 1 H), 2.25 (s, 3 H). |
| 100 | | 88, using 2-Br-6-Cl-4-methyl benzaldehyde | LCMS [M + H]: 417.2<br>$^1$H NMR (400 MHz, DMSO-d$_6$ + D$_2$O) δ8.40 (s, 1 H), 7.72-7.73 (d, J = 3.6 Hz, 1 H), 7.27-7.28 (m, 2 H), 7.04-7.05 (d, J = 4 Hz, 1 H), 6.20-6.22 (d, J = 7.6 Hz, 1 H), 4.87 (s, 1 H), 4.44-4.51 (m, 2 H), 4.25-4.27 (m, 1 H), 3.77-3.78 (d, J = 4.8 Hz, 1 H), 3.61-3.68 (m, 1 H), 2.66-2.91 (m, 2 H), 2.28 (s, 3 H). |

TABLE 1-continued

Examples prepared according to the above procedures.

| Ex. # | Structure | Prepared as in Ex. # | Spectral data |
|---|---|---|---|
| 103 | [structure diagram] | 22, using CD$_3$MgI | LCMS (ESI): m/z calcd for C$_{20}$H$_{17}$D$_3$F$_2$N$_3$O$_4$ [M + H]$^+$: 407.15; observed: 406.99. $^1$H NMR (600 MHz, DMSO-d6) δ 8.69 (s, 1H), 7.79 (d, J = 3.8 Hz, 1H), 7.42-7.34 (m, 1H), 7.34-7.25 (m, 1H), 6.82 (d, J = 3.7 Hz, 1H), 6.32 (d, J = 7.7 Hz, 1H), 5.26 (d, J = 6.7 Hz, 1H), 5.15 (s, 1H), 4.88 (d, J = 3.5 Hz, 1H), 4.52 (d, J = 5.8 Hz, 1H), 4.44 (d, J = 3.2 Hz, 1H), 4.30-4.19 (m, 1H), 3.88 (d, J = 4.9 Hz, 1H), 3.70 (td, J = 11.0, 3.2 Hz, 1H), 2.97-2.85 (m, 1H), 2.70 (d, J = 16.4 Hz, 1H). |

Biochemical Assay Protocol

Compounds were solubilized and 3-fold diluted in 10000 DMSO. These diluted compounds were further diluted in the assay buffer (20 mM Tris-HCl, pH 8.0, 50 mM NaCl, 0.002% Tween20, 1 mM TCEP, 100 DMSO) for 10-dose IC$_{50}$ mode at a concentration 10-fold greater than the desired assay concentration. Standard reactions were performed in a total volume of 30 μl in assay buffer, with 300 nM histone H4 based AcH4-23 (Anaspec: AS-65002) as substrate. To this was added the PRMT5/MP50 complex diluted to provide a final assay concentration of 2.5 nM and the compounds were allowed to preincubate for 20 minutes at 37° C. The reaction was initiated by adding S-[3H-methyl]-adenosyl-L-methionine (PerkinElmer: NET155001MC) to final concentration of 1 μM. Following a 30 minutes incubation at 37° C., the reaction was stopped by adding 25 μL of 8M Guanidine HCl. Prepare streptavidin YSI SPA beads (Perkinelmer: RPNQ0012) at 0.3 mg/mL in assay buffer. To each reaction, add 150 μL of SPA beads suspension, and incubated while shaking at room temperature for 30 minutes. The plate was centrifuged at 100×g for 30 second before reading in a scintillation counter. IC$_{50}$ values were determined by fitting the data to the standard 4 parameters with Hill Slope using GraphPad Prism software. See Table 2, below (PRMT5 IC$_{50}$).

Cellular Assay Protocol

Cell Treatment and Western Blotting for Detecting Symmetric Di-Methyl Arginine (sDMA) Marks Compound titration and cell culture: Compounds were dissolved in DMSO to make 10 mM stock and 3-fold series dilutions were further conducted to make working stocks top at 1 mM. Granta-519 cells were maintained in PRMI 1640 (Corning Cellgro, Catalog #: 10-040-CV) supplemented with 10% v/v FBS (GE Healthcare, Catalog #: SH30910.03) and U-87 MG cells were maintained in DMEM (Corning Cellgro, Catalog #: 10-013-CV) with 10% FBS and 2 mM Glutamin (Corning Cellgro, Catalog #25005CV).

To determine enzyme inhibition IC$_{50}$ values in Granta-519 and U-87 MG cells using Western Blot analysis. One day before experiment, Granta-519 cells were passaged to a density of 0.5×10$^6$ cells/ml. U-87 MG cells were trypsinized and 4×10$^5$ cells were seeded into 6-well plates and allow to grow overnight. The next day, Granta-519 cells were spun down at 1,500 rpm for 4 min, resuspend in fresh medium at 0.5×10$^6$ cells/ml and 3 mL of culture (1.5×10$^6$ cells) were seeded into 6 well plate. Eight-point, 3-fold serial dilutions of compound working stocks were added to cells (3 ul, 1:1,000 dilution, DMSO concentration was 0.1%; final top concentration at 1 uM) and incubated for 3 days. Cells incubated with DMSO was used as a vehicle control.

Cells were harvested 3 days later, resuspended in 15 uL PBS, lysed in 4% SDS, and homogenized by passing through homogenizer column (Omega Biotek, Catalog #: HCR003). Total protein concentrations were determined by BCA assay (ThermoFisher Scientific, Catalog #: 23225). Lysates were mixed with 5× Laemmli buffer and boiled for 5 min. Forty ug of total protein was separated on SDS-PAGE gels (Bio-Rad, catalog #: 4568083, 4568043), transferred to PVDF membrane, blocked with 5% dry milk (Bio-Rad, Catalog #: 1706404) in TBS with 0.1% v/v Tween 20 (TBST) for 1 hour at room temperature (RT), and incubated with primary antibodies (sDMA: Cell signaling, Catalog #: 13222, 1:3,000; β-Actin: sigma, Catalog #: 1:5,000) in 5% dry milk in TBST at 4° C. overnight. The next day, membranes were washed with TBST, 5×5 min, and incubated with HRP conjugated seconded antibody (GE Healthcare; Catalog #: NA934-1ML, NA931-1ML; 1:5,000) for 2 hours at RT, followed by 5×5 min washes with TBST, and incubation with ECL substrates (Bio-Rad, Catalog #: 1705061, 1705062). Chemiluminescent signal was captured with Fluochem HD2 imager (Proteinsimple). SmD3me2s bands were quantified by ImageJ. Signals were normalized to β-Actin and DMSO control. IC$_{50}$ values were calculated using Graphpad Prism ([Inhibitor] vs. normalized response—Variable slope). See Table 2, below (sDMA IC$_{50}$).

TABLE 2

Biochemical and cellular potency in U-87 MG cell line [Granta-519 cell line]

| Ex# | PRMT5 IC$_{50}$ μM | PRMT5 IC$_{50}$_N | sDMA IC$_{50}$ μM | sDMA IC$_{50}$_N |
|---|---|---|---|---|
| 1A | 0.0038 | 1 | 0.12 [0.027] | 1[1] |
| 2A | 0.68 | 1 | | |
| 3A | 0.021 | 1 | [1.62] | [1] |

TABLE 2-continued

Biochemical and cellular potency in U-87 MG cell line [Granta-519 cell line]

| Ex# | PRMT5 IC$_{50}$ μM | PRMT5 IC$_{50}$_N | sDMA IC$_{50}$ μM | sDMA IC$_{50}$_N |
|---|---|---|---|---|
| 3B | 1.02 | 1 | | |
| 1B | 0.27 | 1 | | |
| 2B | 0.031 | 1 | 0.563 | 1 |
| 4 | 0.0015 | 1 | 0.031 | 1 |
| 5 | 0.001 | 1 | 0.025 | 1 |
| 15 | 0.001 | 1 | | |
| 22 | 0.0048 | 2 | 0.0176 | 2 |
| 42 | 0.428 | | | |
| 43 | 0.019 | | | |
| 44 | 0.606 | | | |
| 50 | 0.059 | | | |
| 55 | 0.0117 | 1 | 4.58 | 2 |
| 68 | 0.0012 | 2 | 0.00258 | 3 |
| 69 | 0.0149 | 2 | 0.109 | 1 |
| 70 | 0.303 | 1 | 0.382 | 1 |
| 71 | 0.0062 | 1 | 0.0297 | 1 |
| 72 | 0.00298 | 1 | | |
| 73 | 0.00145 | 1 | | |
| 74 | 0.00728 | 1 | | |
| 75 | 0.0151 | 1 | | |
| 76 | 0.081 | 1 | | |
| 77 | 0.00282 | 1 | | |
| 78 | 0.0067 | 1 | | |
| 79 | 0.0084 | 1 | | |
| 80 | 1.01 | 1 | | |
| 81 | 0.0415 | 1 | | |
| 82 | 0.585 | 1 | | |
| 83 | 0.0132 | 1 | 0.199 | 2 |
| 84 | 0.0044 | 1 | 0.0276 | 2 |
| 85 | 0.0147 | 2 | 0.173 | 1 |
| 86 | 0.002 | 2 | 0.0054 | 2 |
| 87 | 0.0077 | 1 | 0.12 | 2 |
| 88 | 0.0016 | 2 | 0.0185 | 2 |
| 89 | 0.0157 | 1 | 0.0844 | 2 |
| 90 | 0.0022 | 1 | 0.0114 | 2 |
| 91 | 0.554 | 1 | | |
| 92 | 0.02 | 1 | | |
| 93 | 0.014 | 1 | | |
| 94 | 0.0032 | 1 | | |
| 95 | 0.0016 | 3 | 0.0111 | 1 |
| 97 | 0.0047 | 2 | 0.0517 | 2 |
| 98 | 0.0119 | 2 | 0.579 | 1 |
| 99 | 0.0396 | 1 | | |
| 100 | 0.0056 | 1 | | |
| 101 | 1.58 | 1 | | |
| 102 | 6.28 | 1 | | |

Additional Data

Compound titration and cell culture: Compounds were dissolved in DMSO to make 10 mM stock solutions. Human peripheral blood mononuclear cells (PBMCs) from healthy donors were purchased from AllCells (Emeryville, CA), maintained in RPMI 1640 (Corning Cellgro, Catalog #: 10-040-CV) supplemented with 10% v/v heat-inactivated FBS (GE Healthcare, Catalog #: SH30910.03), 2 mM L-Glutamine (Corning Cellgro, Catalog #25005CV) and 1× Penicillin-Streptomycin (Sigma-Aldrich, Catalog #P4333) in a $CO_2$ incubator (5% $CO_2$) at 37° C.

To determine enzyme inhibition IC$_{50}$ values in human PBMCs: Freshly thawed cells were seeded at a density of 25×10$^5$ cells/ml in 2 ml of media in a 12 well plate. Cells were activated by addition of 5 μg/ml PHA-L (Sigma-Aldrich, Catalog #L4144) for 3 days. A series of 8-point, 3-fold dilutions of compound were dispensed into wells from 1 mM stock solution using TECAN digital dispenser (D300e) and concentration of DMSO was normalized to 0.1%. Cells incubated with 0.1% DMSO only was used as a control.

Cells were harvested 3 days later, resuspended in 15 μL PBS, lysed in 4% SDS, and homogenized by passing through homogenizer column (Omega Biotek, Catalog #: HCR003). Total protein concentration were determined by BCA assay (ThermoFisher Scientific, Catalog #: 23225). Lysates were mixed with 5× Laemmli buffer and boiled for 5 minutes. 30 μg of total protein was separated on SDS-PAGE gels (Bio-Rad, catalog #: 4568083, 4568043), transferred to PVDF membrane, blocked with 5% dry milk (Bio-Rad, Catalog #: 1706404) in TBS with 0.1% v/v Tween 20 (TBST) for 1 hour at room temperature (RT), and incubated with primary antibodies (sDMA: Cell signaling, Catalog #: 13222, 1:2,000; β-Actin: sigma, Catalog #: 1:5,000) in 5% dry milk in TBST at 4° C. overnight. The following day, membranes were washed with TBST, 5×5 min, and incubated with HRP-conjugated secondary antibodies (GE Healthcare; Catalog #: NA934-1ML, NA931-1ML; 1:5,000) for 2 hours at RT, followed by 5×5 min washes with TBST, and incubation with ECL substrates (Bio-Rad, Catalog #: 1705061, 1705062). Chemiluminescent signal was captured with Fluochem HD2 imager (Proteinsimple). SmD3me2s bands were quantified by ImageJ. Signals were normalized to β-Actin and DMSO control. IC$_{50}$ values were calculated using Graphpad Prism ([Inhibitor] vs. normalized response—Variable slope). See Table 3, below.

TABLE 3

Cellular potency in human PBMCs

| Ex# | sDMA IC$_{50}$ μM | sDMA IC$_{50}$_N |
|---|---|---|
| 5 | 0.016 | 3 |

What is claimed:

1. A method of treating a disease or disorder selected from the group consisting of rejection of transplanted organs or tissue; graft-versus-host diseases multiple sclerosis, myasthenia gravis; pollen allergies; type I diabetes; psoriasis; Crohn's disease; ulcerative colitis, acute respiratory distress syndrome; influenza; COVID-19 (coronavirus disease); or rheumatic fever and post-infectious glomerulonephritis, in a patient in need thereof, comprising administering to said patient an effective amount of a compound of Formula I:

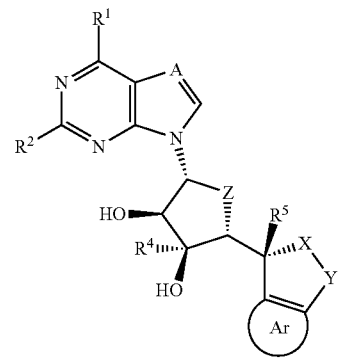

or a pharmaceutically acceptable salt or solvate thereof; wherein

A is N or C—R$^3$;

R$^1$ is H, halo, —C$_1$-C$_6$alkyl, —C$_1$-C$_6$alkoxy, —C$_1$-C$_4$haloalkyl, —C$_3$-C$_6$cycloalkyl, —C$_3$-C$_6$halocycloalkyl, —C$_1$-C$_6$alkyl-O—C$_1$-C$_6$alkyl, —C$_1$-C$_6$alkyl-S(O)—C$_1$-C$_6$alkyl, —C$_1$-C$_6$alkyl- S(O)$_2$—C$_1$-C$_6$alkyl, —CR$^6$R$^{6'}$CN, —NR$^6$R$^{6'}$, —NHCR$^6$R$^{6'}$CN, —NHCONR$^6$R$^{6'}$, —NHC(O)OR$^7$, NHC(O)—C$_1$-C$_6$alkyl, NHC(O)—C$_1$-C$_6$haloalkyl, —NH—C$_1$-C$_6$alkyl-C(O)—C$_1$-C$_6$alkyl, —NHC(S)NR$^6$R$^{6'}$, —NH—O—R$^6$, or —NH—NR$^6$R$^{6'}$;

R$^2$ is H, halo, —C$_1$-C$_6$alkyl, or NH$_2$;

R$^3$ is H, halo, —C$_1$-C$_6$alkyl, —C$_1$-C$_6$alkoxy, —C$_2$-C$_6$alkenyl, or —C$_2$-C$_6$alkynyl;

R$^4$ is H, —C$_1$-C$_6$alkyl, —C$_1$-C$_6$haloalkyl, —C$_2$-C$_6$alkenyl, or —C$_2$-C$_6$alkynyl;

R$^5$ is H or —C$_1$-C$_6$alkyl;

R$^6$ and R$^{6'}$ are each independently H, C$_1$-C$_6$alkyl, or —C$_1$-C$_6$alk-OC$_1$-C$_6$alkyl;

or R$^6$ and R$^{6'}$, together with the atom to which they are attached, form a C$_2$-C$_6$heterocycloalkyl ring or a C$_3$-C$_6$cycloalkyl ring;

R$^7$ is-C$_1$-C$_6$alkyl or —C$_0$-C$_6$alkyl-C$_3$-C$_6$cycloalkyl;

X is O, S, NH, or N(C$_1$-C$_6$alkyl), and Y is —(CR$^9$R$^{9'}$)$_n$—, —CR$^9$=CR$^{9'}$—, C(=O), —C(=O)—(CR$^9$R$^{9'}$)$_n$—, —C(=O)—O—(CR$^9$R$^{9'}$)$_n$—, —CR$^9$R$^{9'}$—O—, —(CR$^9$R$^{9'}$)$_n$—O—(CR$^9$R$^{9'}$)$_m$—, —(CR$^9$R$^{9'}$)$_n$—NR$^{10}$, C(=O)NR$^{10}$, or CH—C$_1$-C$_4$alkyl-NH$_2$; or X is —SO$_2$— and Y is —(CR$^9$R$^{9'}$)$_n$—, —CR$^9$=CR$^{9'}$—, —CR$^9$R$^{9'}$—O—, —(CR$^9$R$^{9'}$)$_n$—O—(CR$^9$R$^{9'}$)$_m$—, —(CR$^9$R$^{9'}$)$_n$—NR$^{10}$, or CH—C$_1$-C$_4$alkyl-NH$_2$;

wherein n=1, 2, or 3; m=1 or 2;

each instance of R$^9$ or R$^{9'}$ is independently H, D, C$_1$-C$_6$alkyl, C$_1$-C$_6$haloalkyl, halo, —C$_1$-C$_6$alkoxy, or hydroxy;

R$^{10}$ is H or C$_1$-C$_6$alkyl;

Z is O, CH$_2$, or CF$_2$; and

Ar is an optionally substituted 6-membered aryl ring, an optionally substituted 6-membered heteroaryl ring, or an optionally substituted 5-membered heteroaryl ring.

2. The method of claim 1 wherein R$^1$ is halo, —NR$^6$R$^{6'}$, —C$_1$-C$_6$alkyl, —C$_1$-C$_6$alkoxy, or —C$_1$-C$_6$alkyl-O—C$_1$-C$_6$alkyl.

3. The method of claim 2, wherein R$^1$ is halo, —F, or —Cl.

4. The method of claim 2, wherein R$^1$ is —NH$_2$.

5. The method of claim 2, wherein R$^1$ is —CH$_3$.

6. The method of claim 2, wherein R$^1$ is —CH$_2$—O—CH$_2$CH$_3$.

7. The method of claim 1, wherein R$^2$ is H.

8. The method of claim 1, wherein R$^4$ is H or —C$_1$-C$_6$alkyl.

9. The method of claim 8, wherein R$^4$ is H.

10. The method of claim 8, wherein R$^4$ is methyl.

11. The method of claim 1, wherein R$^5$ is H.

12. The method of claim 1, wherein R$^5$ is —CH$_3$.

13. The method of claim 1, wherein Ar is an optionally substituted 6-membered aryl ring.

14. The method of claim 13, wherein the 6-membered aryl ring is substituted with —F, or —Cl.

15. The method of claim 13, wherein the 6-membered aryl ring is substituted with one or more —CH$_3$, CF$_3$, or —OCF$_3$ groups.

16. The method of claim 1, wherein Ar is an optionally substituted 6-membered heteroaryl ring.

17. The method of claim 16, wherein the 6-membered heteroaryl ring is substituted with —F, or —Cl.

18. The method of claim 16, wherein the 6-membered heteroaryl ring is substituted with one or more —CH$_3$, CF$_3$, or —OCF$_3$ groups.

19. The method of claim 1, wherein Ar is an optionally substituted 5-membered heteroaryl ring.

20. The method of claim 19, wherein the 5-membered heteroaryl ring is substituted with —F, or —Cl.

21. The method of claim 19, wherein the 5-membered heteroaryl ring is substituted with one or more —CH$_3$, CF$_3$, or —OCF$_3$ groups.

22. The method of claim 1, wherein X is O.

23. The method of claim 1, wherein X is S.

24. The method of claim 1, wherein X is SO$_2$.

25. The method of claim 1, wherein X is NH.

26. The method of claim 1, wherein X is N(CH$_3$).

27. The method of claim 1, wherein Y is —(CR$^9$R$^{9'}$)$_n$.

28. The method of claim 27, wherein —(CR$^9$R$^{9'}$), is —CH$_2$—, —CH$_2$CH$_2$—, —CH$_2$CH$_2$CH$_2$—, —C(CH$_3$)$_2$—, or —CF$_2$—.

29. The method of claim 1, wherein Y is —CR$^9$=CR$^{9'}$—.

30. The method of claim 1, wherein Y is —C(=O)—(CR$^9$R$^{9'}$)$_n$—.

31. The method of claim 1, wherein Y is —C(=O)—O—(CR$^9$R$^{9'}$)$_n$—.

32. The method of claim 1, wherein Y is —CR$^9$R$^{9'}$—O.

33. The method of claim 1, wherein Y is —(CR$^9$R$^{9'}$)$_n$—O—(CR$^9$R$^{9'}$)$_m$—.

34. The method of claim 1, wherein Y is C(=O).

35. The method of claim 1, wherein Y is CH—C$_1$-C$_4$alkyl-NH$_2$.

36. The method of claim 1, wherein Y is —(CR$^9$R$^{9'}$)$_n$—NR$^{10}$.

37. The method of claim 1, wherein Y is —C(=O)NR$^{10}$.

38. The method of claim 27, wherein each R$^9$ and each R$^{9'}$ is independently H, D, —CH$_3$, OH, —OCH$_3$, F, or CF$_3$.

39. The method of claim 27, wherein n=1.

40. The method of claim 27, wherein n=2.

41. The method of claim 27, wherein n=3.

42. The method of claim 33 wherein m=1.

43. The method of claim 33 wherein m=2.

44. The method of claim 1, wherein Z is O.

45. The method of claim 1, wherein Z is CH$_2$.

46. The method of claim 1, wherein Z is CF$_2$.

47. The method of claim 1, wherein A is N.

48. The method of claim 1, wherein A is C—R$^3$.

49. The method of claim 48, wherein R$^3$ is H.

50. The method of claim 48, wherein R$^3$ is —F.

* * * * *